US012591859B2

(12) United States Patent
Merg et al.

(10) Patent No.: US 12,591,859 B2
(45) Date of Patent: Mar. 31, 2026

(54) METHOD AND SYSTEM FOR VEHICLE SERVICE SESSION

(71) Applicant: Snap-on Incorporated, Kenosha, WI (US)

(72) Inventors: Patrick S. Merg, Hollister, CA (US); Jacob G. Foreman, Hollister, CA (US); Joshua C. Covington, San Juan Bautista, CA (US); Joseph R. Grammatico, San Jose, CA (US); Brett A. Kelley, San Jose, CA (US)

(73) Assignee: Snap-on Incorporated, Kenosha, WI (US)

( * ) Notice: Subject to any disclaimer, the term of this patent is extended or adjusted under 35 U.S.C. 154(b) by 250 days.

(21) Appl. No.: 18/159,544

(22) Filed: Jan. 25, 2023

(65) Prior Publication Data

US 2024/0257070 A1 Aug. 1, 2024

(51) Int. Cl.
| | |
|---|---|
| *G06Q 10/20* | (2023.01) |
| *G06Q 10/0631* | (2023.01) |
| *G07C 5/08* | (2006.01) |

(52) U.S. Cl.
CPC ....... *G06Q 10/20* (2013.01); *G06Q 10/06311* (2013.01); *G07C 5/0808* (2013.01)

(58) Field of Classification Search
CPC ........ G06Q 10/20; G06Q 50/40; G06Q 50/10; G06Q 10/1097; G07C 5/008;
(Continued)

(56) References Cited

U.S. PATENT DOCUMENTS

| | | | |
|---|---|---|---|
| 8,032,837 | B2 | 10/2011 | Bowman et al. |
| 9,240,966 | B2 | 1/2016 | Wilsher et al. |

(Continued)

FOREIGN PATENT DOCUMENTS

| | | |
|---|---|---|
| CN | 105234897 B | 1/2017 |
| EP | 2116331 A2 | 11/2009 |

(Continued)

OTHER PUBLICATIONS

T. Laohapensaeng, R. Chaisricharoen and P. Boonyanant, "Evaluation System for Car Engine Performance," 2021, 2021 Joint International Conference on Digital Arts, Media and Technology with ECTI Northern Section Conference on Electrical, Electronics, Computer and Telecommunication Engineering. (Year: 2021).*

(Continued)

*Primary Examiner* — Sarah M Monfeldt
*Assistant Examiner* — Michael J. Monaghan
(74) *Attorney, Agent, or Firm* — McDonnell Boehnen Hulbert & Berghoff LLP

(57) ABSTRACT

A method comprising outputting, for transmission to a server, a request including an identifier of a service session record (SSR) corresponding to a vehicle. The SSR includes a timeline for tracking event(s) corresponding to the SSR. The method includes receiving, in response to the request, a graphical user interface (GUI) corresponding to the SSR, and displaying the GUI in a first display mode. Displaying the GUI in the first display mode includes displaying an event summary of the timeline. The event summary corresponds to a first event of the SSR and includes a user-selectable control selectable to trigger changing a display mode of the GUI. Furthermore, the method includes displaying, in response to a selection of the user-selectable control, the GUI in a second display mode. Displaying the GUI in the second display mode includes displaying a (Continued)

particular detail regarding the first event not shown in the first display mode.

19 Claims, 43 Drawing Sheets

(58) Field of Classification Search
CPC .... G07C 5/0808; G07C 5/006; G07C 5/0841; G07C 5/08; G07C 2205/02; G07C 9/00563; G07C 1/20; G07C 2209/08; G05B 23/0283
See application file for complete search history.

(56) References Cited

U.S. PATENT DOCUMENTS

| | | | |
|---|---|---|---|
| 10,049,168 | B2 | 8/2018 | Mischook et al. |
| 10,703,401 | B2 | 7/2020 | Lee et al. |
| 2006/0095230 | A1 | 5/2006 | Grier et al. |
| 2007/0100520 | A1 | 5/2007 | Shah et al. |
| 2013/0158777 | A1* | 6/2013 | Brauer ................... G06Q 10/20 |
| | | | 701/31.4 |
| 2014/0101539 | A1 | 4/2014 | Ma et al. |
| 2014/0189493 | A1 | 7/2014 | Chandra |
| 2014/0244213 | A1 | 8/2014 | Theriot et al. |
| 2016/0055686 | A1 | 2/2016 | Ukai et al. |
| 2016/0335816 | A1 | 11/2016 | Thoppae et al. |
| 2017/0098199 | A1 | 4/2017 | Merg et al. |
| 2017/0372533 | A1 | 12/2017 | Merg et al. |
| 2018/0095638 | A1* | 4/2018 | Merg ................. G06F 3/04847 |
| 2018/0247277 | A1* | 8/2018 | Livernois ............ G07C 5/0808 |
| 2018/0253700 | A1* | 9/2018 | Coquillette ...... G06Q 10/06311 |
| 2018/0365621 | A1* | 12/2018 | Merg ....................... G09B 7/02 |
| 2020/0126324 | A1* | 4/2020 | Hutchins .............. G07C 5/0808 |
| 2020/0143332 | A1* | 5/2020 | Root ..................... G06Q 10/20 |
| 2020/0234252 | A1* | 7/2020 | Johnson ............. G06Q 30/0283 |
| 2020/0334927 | A1* | 10/2020 | Rozint ................ B60R 21/0136 |
| 2021/0248618 | A1* | 8/2021 | Ionescu ................ G06Q 30/016 |
| 2021/0264383 | A1 | 8/2021 | Kleinhans et al. |
| 2021/0272271 | A1* | 9/2021 | Ranca ...................... G06N 3/08 |
| 2021/0387637 | A1 | 12/2021 | Rogers et al. |
| 2022/0366736 | A1* | 11/2022 | Nistler ................... G07C 5/008 |
| 2024/0220937 | A1* | 7/2024 | Yu ............................. G06F 8/65 |

FOREIGN PATENT DOCUMENTS

| | | |
|---|---|---|
| EP | 2847686 B1 | 10/2019 |
| WO | 2020123608 A1 | 6/2020 |

OTHER PUBLICATIONS

Broadcom Corporation, "Near Field Communications controller with Integrated EEPROM for Battery-off Mode", Jun. 5, 2012.
NXP B.V.; NXP Semiconductors, Near Field Communication (NFC) Controller, PN7160_PN7161 Product data sheet, Rev. 3.3, Feb. 17, 2022.
Snap-On Tools Company, "ControlTech™ Micro Electronic Torque-Angle Wrench", May 22, 2017.
ST Microelectronics; "Dynamic NFC/RFID tag IC with 4-Kbit, 16-Kbit or 64-Kbit EEPROM, and fast transfer mode capability", ST25DV04K, ST25DV16K, ST25DV64K; Feb. 2021.
Calvin Wankhede; "How do NFC tags and readers work? Here's everything you need to know", downloaded from the world wide web at https://www.androidauthority.com/nfc-tags-explained-271872/; May 5, 2022.
International Searching Authority; International search report, written opinion, and notification regarding transmittal international search report and written opinion for corresponding PCT application No. PCT/US2023/081039; mailing date Mar. 28, 2024.

* cited by examiner

Figure 18:
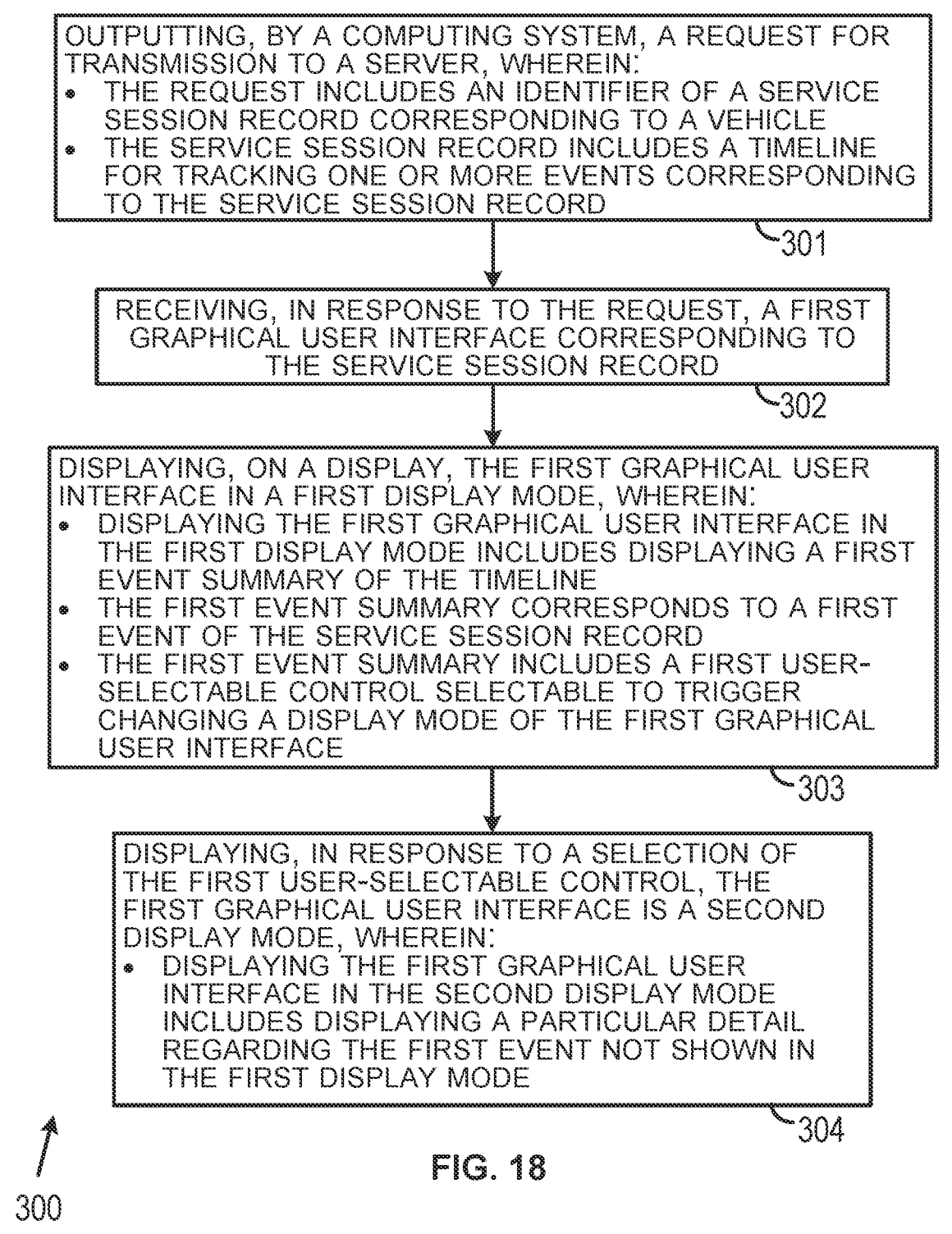

OUTPUTTING, BY A COMPUTING SYSTEM, A REQUEST FOR
TRANSMISSION TO A SERVER, WHEREIN:
* THE REQUEST INCLUDES AN IDENTIFIER OF A SERVICE
  SESSION RECORD CORRESPONDING TO A VEHICLE
* THE SERVICE SESSION RECORD INCLUDES A TIMELINE
  FOR TRACKING ONE OR MORE EVENTS CORRESPONDING
  TO THE SERVICE SESSION RECORD

⟋301

RECEIVING, IN RESPONSE TO THE REQUEST, A FIRST
GRAPHICAL USER INTERFACE CORRESPONDING TO
THE SERVICE SESSION RECORD

⟋302

DISPLAYING, ON A DISPLAY, THE FIRST GRAPHICAL USER
INTERFACE IN A FIRST DISPLAY MODE, WHEREIN:
* DISPLAYING THE FIRST GRAPHICAL USER INTERFACE IN
  THE FIRST DISPLAY MODE INCLUDES DISPLAYING A FIRST
  EVENT SUMMARY OF THE TIMELINE
* THE FIRST EVENT SUMMARY CORRESPONDS TO A FIRST
  EVENT OF THE SERVICE SESSION RECORD
* THE FIRST EVENT SUMMARY INCLUDES A FIRST USER-
  SELECTABLE CONTROL SELECTABLE TO TRIGGER
  CHANGING A DISPLAY MODE OF THE FIRST GRAPHICAL
  USER INTERFACE

⟋303

DISPLAYING, IN RESPONSE TO A SELECTION OF
THE FIRST USER-SELECTABLE CONTROL, THE
FIRST GRAPHICAL USER INTERFACE IS A SECOND
DISPLAY MODE, WHEREIN:
* DISPLAYING THE FIRST GRAPHICAL USER
  INTERFACE IN THE SECOND DISPLAY MODE
  INCLUDES DISPLAYING A PARTICULAR DETAIL
  REGARDING THE FIRST EVENT NOT SHOWN IN
  THE FIRST DISPLAY MODE

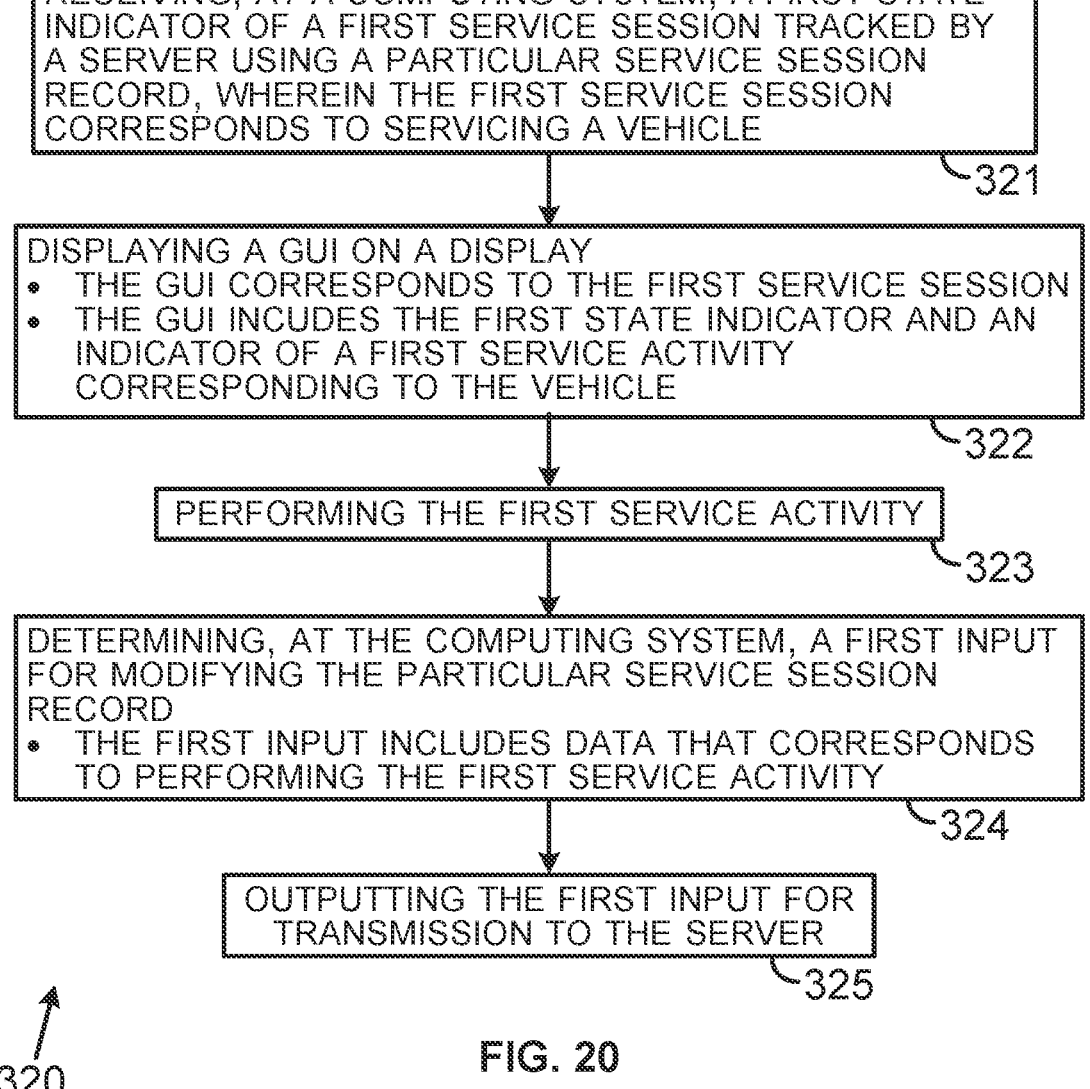

RECEIVING, AT A COMPUTING SYSTEM, A FIRST STATE INDICATOR OF A FIRST SERVICE SESSION TRACKED BY A SERVER USING A PARTICULAR SERVICE SESSION RECORD, WHEREIN THE FIRST SERVICE SESSION CORRESPONDS TO SERVICING A VEHICLE ⌐321

DISPLAYING A GUI ON A DISPLAY
- THE GUI CORRESPONDS TO THE FIRST SERVICE SESSION
- THE GUI INCUDES THE FIRST STATE INDICATOR AND AN INDICATOR OF A FIRST SERVICE ACTIVITY CORRESPONDING TO THE VEHICLE ⌐322

PERFORMING THE FIRST SERVICE ACTIVITY ⌐323

DETERMINING, AT THE COMPUTING SYSTEM, A FIRST INPUT FOR MODIFYING THE PARTICULAR SERVICE SESSION RECORD
- THE FIRST INPUT INCLUDES DATA THAT CORRESPONDS TO PERFORMING THE FIRST SERVICE ACTIVITY ⌐324

OUTPUTTING THE FIRST INPUT FOR TRANSMISSION TO THE SERVER ⌐325

Figure 21:
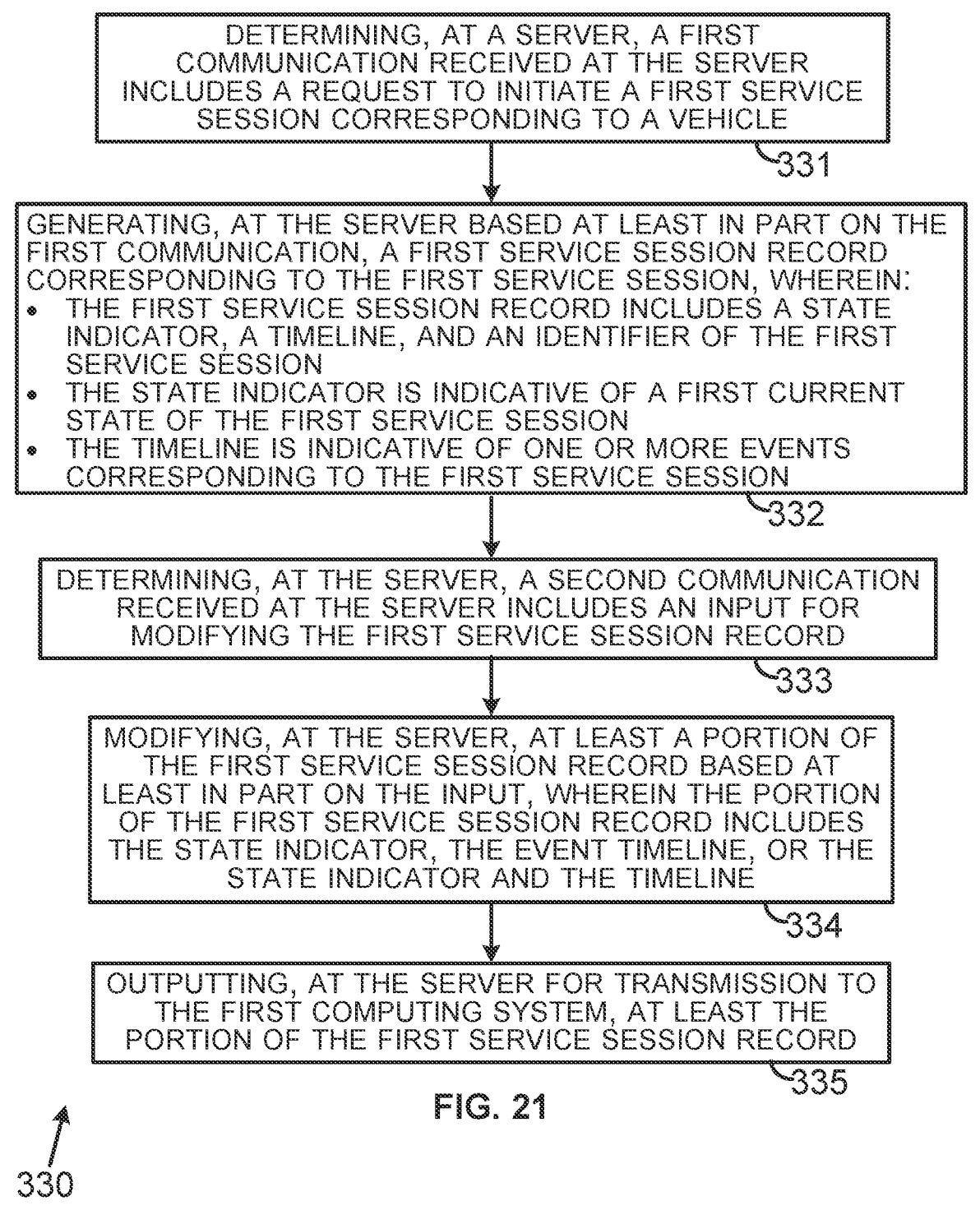

DETERMINING, AT A SERVER, A FIRST COMMUNICATION RECEIVED AT THE SERVER INCLUDES A REQUEST TO INITIATE A FIRST SERVICE SESSION CORRESPONDING TO A VEHICLE

331

GENERATING, AT THE SERVER BASED AT LEAST IN PART ON THE FIRST COMMUNICATION, A FIRST SERVICE SESSION RECORD CORRESPONDING TO THE FIRST SERVICE SESSION, WHEREIN:
• THE FIRST SERVICE SESSION RECORD INCLUDES A STATE INDICATOR, A TIMELINE, AND AN IDENTIFIER OF THE FIRST SERVICE SESSION
• THE STATE INDICATOR IS INDICATIVE OF A FIRST CURRENT STATE OF THE FIRST SERVICE SESSION
• THE TIMELINE IS INDICATIVE OF ONE OR MORE EVENTS CORRESPONDING TO THE FIRST SERVICE SESSION

332

DETERMINING, AT THE SERVER, A SECOND COMMUNICATION RECEIVED AT THE SERVER INCLUDES AN INPUT FOR MODIFYING THE FIRST SERVICE SESSION RECORD

333

MODIFYING, AT THE SERVER, AT LEAST A PORTION OF THE FIRST SERVICE SESSION RECORD BASED AT LEAST IN PART ON THE INPUT, WHEREIN THE PORTION OF THE FIRST SERVICE SESSION RECORD INCLUDES THE STATE INDICATOR, THE EVENT TIMELINE, OR THE STATE INDICATOR AND THE TIMELINE

334

OUTPUTTING, AT THE SERVER FOR TRANSMISSION TO THE FIRST COMPUTING SYSTEM, AT LEAST THE PORTION OF THE FIRST SERVICE SESSION RECORD

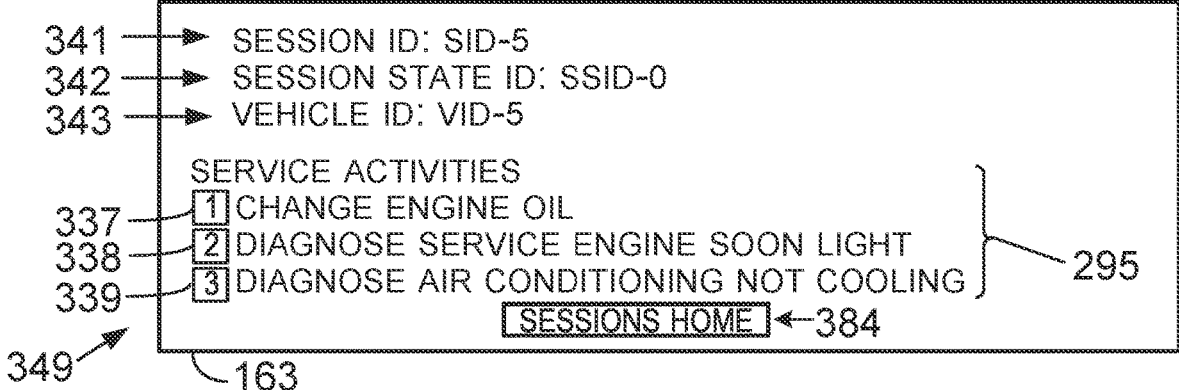

341 → SESSION ID: SID-5
342 → SESSION STATE ID: SSID-0
343 → VEHICLE ID: VID-5

SERVICE ACTIVITIES
337 → 1 CHANGE ENGINE OIL
338 → 2 DIAGNOSE SERVICE ENGINE SOON LIGHT
339 → 3 DIAGNOSE AIR CONDITIONING NOT COOLING          } 295
SESSIONS HOME ← 384
349        163

FIG. 22

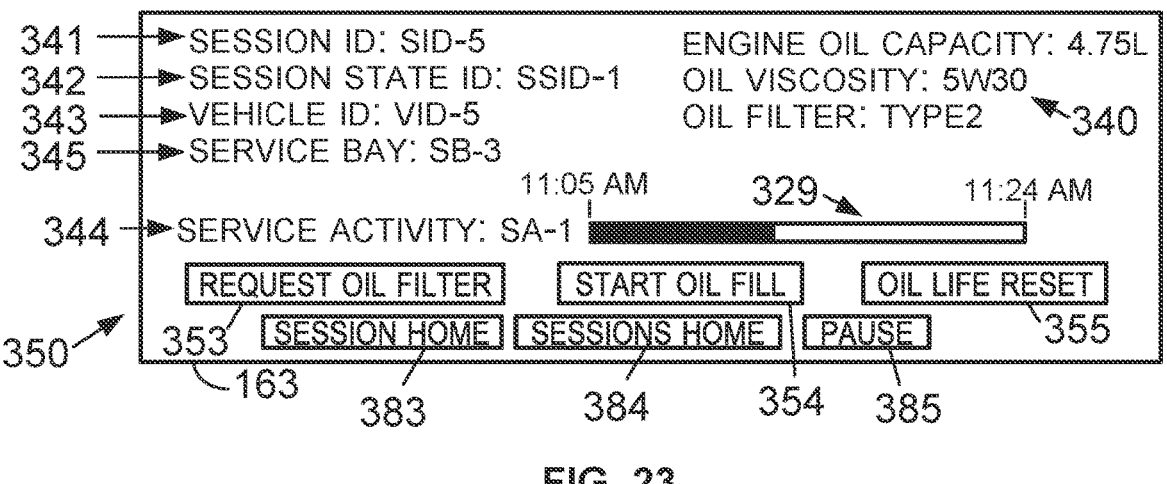

341 → SESSION ID: SID-5          ENGINE OIL CAPACITY: 4.75L
342 → SESSION STATE ID: SSID-1          OIL VISCOSITY: 5W30
343 → VEHICLE ID: VID-5          OIL FILTER: TYPE2          340
345 → SERVICE BAY: SB-3

11:05 AM          329          11:24 AM
344 → SERVICE ACTIVITY: SA-1

REQUEST OIL FILTER          START OIL FILL          OIL LIFE RESET
350          353  SESSION HOME   SESSIONS HOME   PAUSE          355
                163          383          384          354          385

FIG. 23

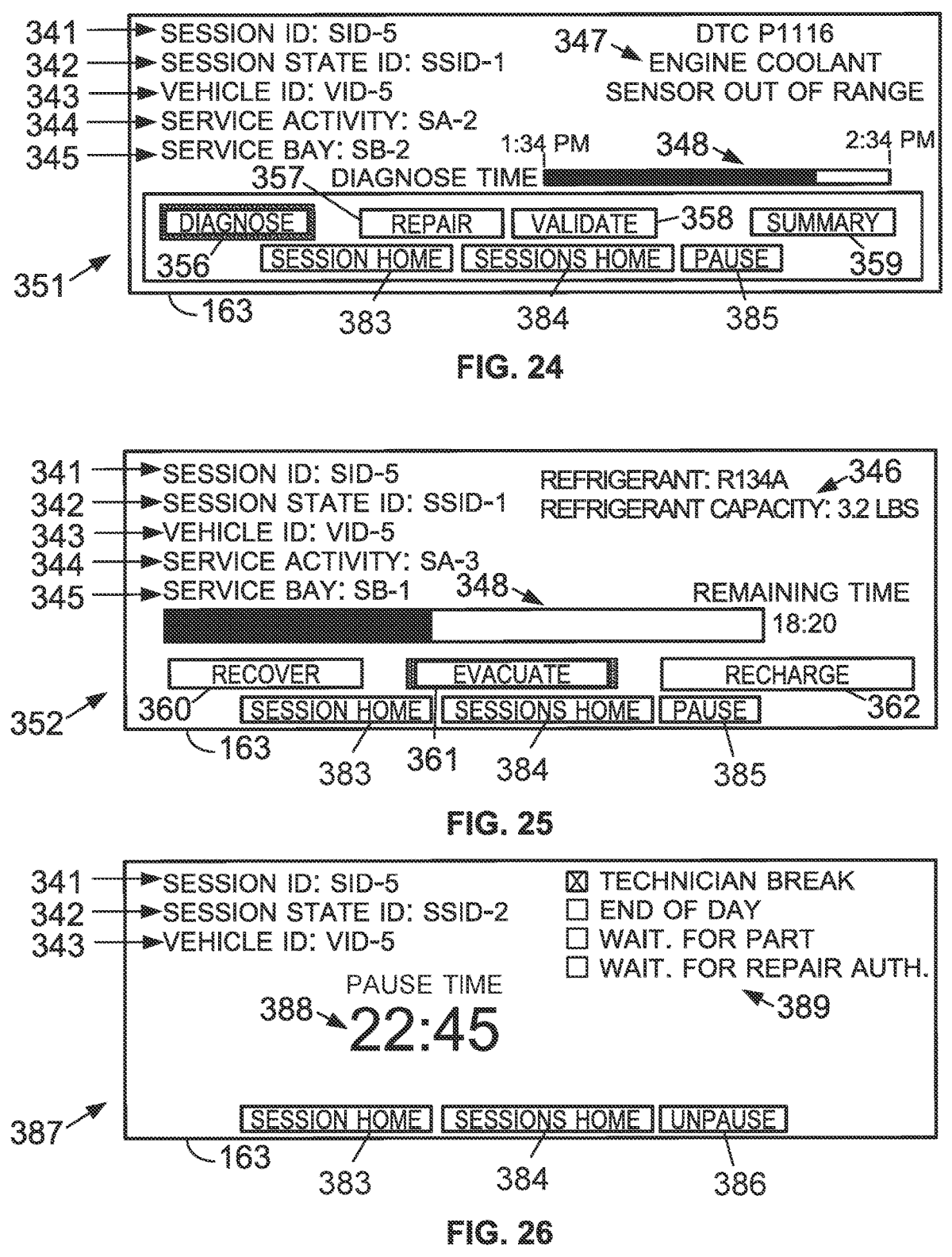

341 — SESSION ID: SID-5

347 — DTC P1116 ENGINE COOLANT SENSOR OUT OF RANGE

342 — SESSION STATE ID: SSID-1

343 — VEHICLE ID: VID-5

344 — SERVICE ACTIVITY: SA-2

345 — SERVICE BAY: SB-2          1:34 PM          348          2:34 PM

357 DIAGNOSE TIME

351

356 DIAGNOSE          REPAIR          VALIDATE — 358          SUMMARY

SESSION HOME          SESSIONS HOME          PAUSE          359

341 — SESSION ID: SID-5          REFRIGERANT: R134A          346

342 — SESSION STATE ID: SSID-1          REFRIGERANT CAPACITY: 3.2 LBS

343 — VEHICLE ID: VID-5

344 — SERVICE ACTIVITY: SA-3

345 — SERVICE BAY: SB-1          348          REMAINING TIME          18:20

352

360 RECOVER          EVACUATE          RECHARGE          362

SESSION HOME          SESSIONS HOME          PAUSE 163          383          361          384          385

FIG. 25

341 — SESSION ID: SID-5          ☒ TECHNICIAN BREAK

342 — SESSION STATE ID: SSID-2          ☐ END OF DAY

343 — VEHICLE ID: VID-5          ☐ WAIT. FOR PART

☐ WAIT. FOR REPAIR AUTH.

PAUSE TIME

388 — 22:45          389

387

SESSION HOME          SESSIONS HOME          UNPAUSE          386

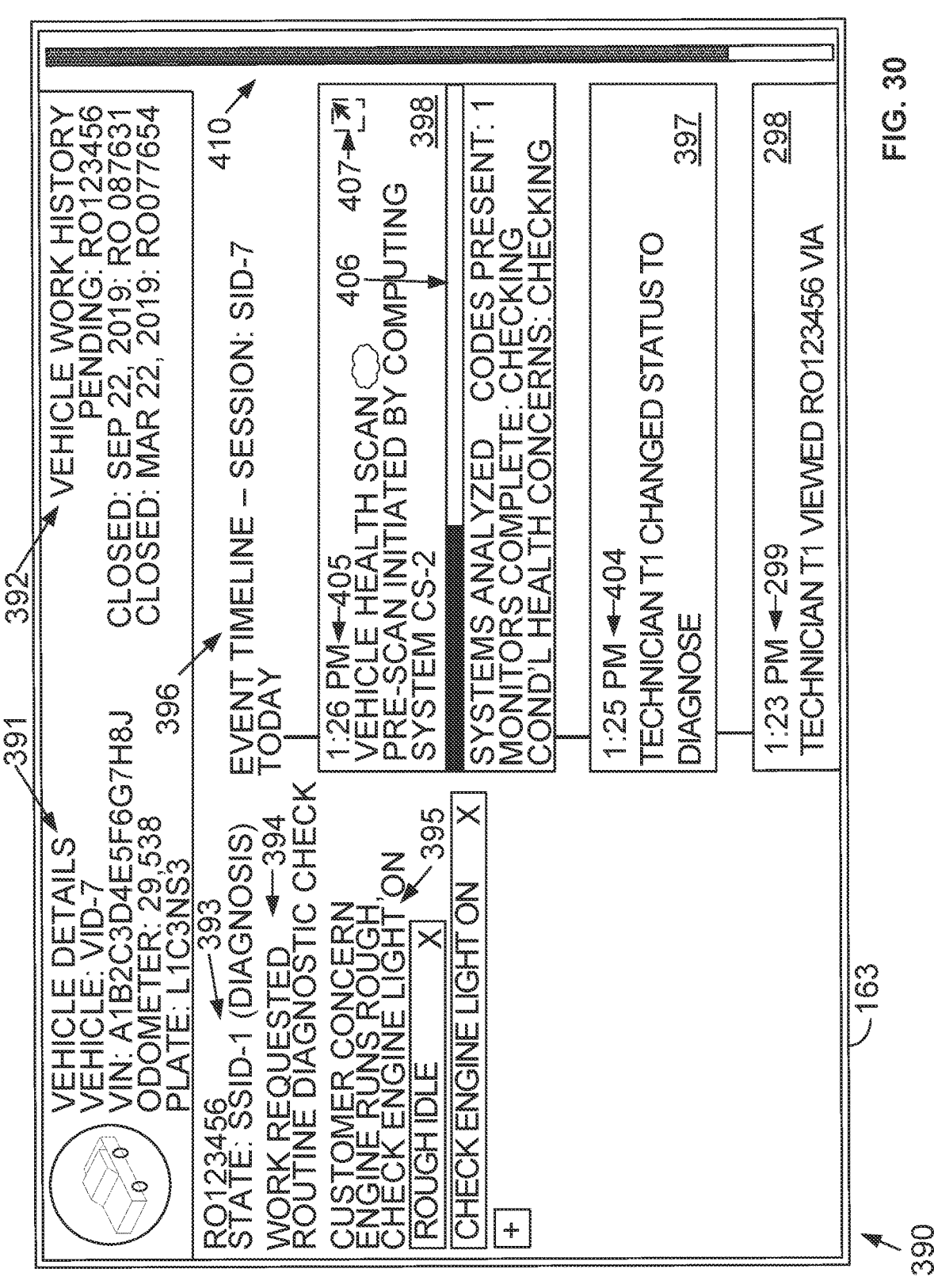

VEHICLE WORK HISTORY
PENDING: RO123456
CLOSED: SEP 22, 2019: RO 087631
CLOSED: MAR 22, 2019: RO077654

410

EVENT TIMELINE – SESSION: SID-7
TODAY

396

1:26 PM ◄–405
VEHICLE HEALTH SCAN ◯   406
PRE-SCAN INITIATED BY COMPUTING
SYSTEM CS-2
407 ◄–🔼
398

SYSTEMS ANALYZED   CODES PRESENT: 1
MONITORS COMPLETE: CHECKING
COND'L HEALTH CONCERNS: CHECKING

1:25 PM ◄–404
TECHNICIAN T1 CHANGED STATUS TO
DIAGNOSE
397

1:23 PM ◄–299
TECHNICIAN T1 VIEWED RO123456 VIA
298

VEHICLE DETAILS
VEHICLE: VID-7
VIN: A1B2C3D4E5F6G7H8J
ODOMETER: 29,538
PLATE: L1C3NS3

391

392

RO123456              393
STATE: SSID-1 (DIAGNOSIS)
WORK REQUESTED   ◄–394
ROUTINE DIAGNOSTIC CHECK

CUSTOMER CONCERN
ENGINE RUNS ROUGH
CHECK ENGINE LIGHT ON   395
ROUGH IDLE    | X |
CHECK ENGINE LIGHT ON | X |
| + |

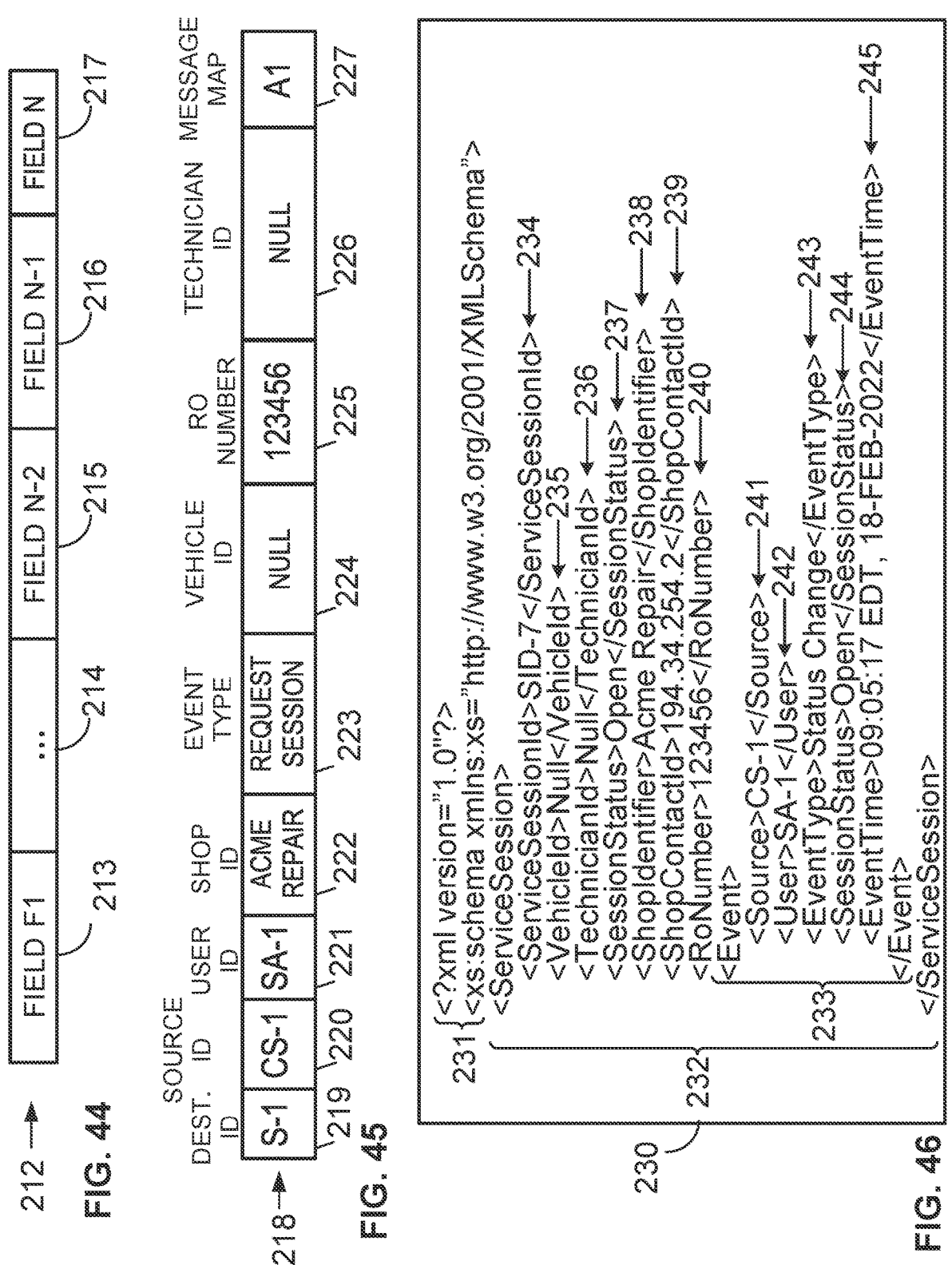

212 →

| FIELD F1 | | … | FIELD N-2 | FIELD N-1 | FIELD N |
|---|---|---|---|---|---|
| | 213 | 214 | 215 | 216 | 217 |

| SOURCE DEST. ID | USER ID | SHOP ID | EVENT TYPE | VEHICLE ID | RO NUMBER | TECHNICIAN ID | MESSAGE MAP |
|---|---|---|---|---|---|---|---|
| S-1 | CS-1 | SA-1 | ACME REPAIR | REQUEST SESSION | NULL | 123456 | NULL | A1 |
| 219 | 220 | 221 | 222 | 223 | 224 | 225 | 226 | 227 |

FIG. 45

```
231 {  <?xml version="1.0"?>
      <xs:schema xmlns:xs="http://www.w3.org/2001/XMLSchema">
         <ServiceSession>
            <ServiceSessionId>SID-7</ServiceSessionId> ←——— 234
            <VehicleId>Null</VehicleId> ←——— 235
            <TechnicianId>Null</TechnicianId> ←——— 236
            <SessionStatus>Open</SessionStatus> ←——— 237
            <ShopIdentifier>Acme Repair</ShopIdentifier> ←——— 238
            <ShopContactId>194.34.254.2</ShopContactId> ←——— 239
            <RoNumber>123456</RoNumber> ←——— 240
            <Event>
               <Source>CS-1</Source> ←——— 241
               <User>SA-1</User> ←——— 242
               <EventType>Status Change</EventType> ←——— 243
               <SessionStatus>Open</SessionStatus> ←——— 244
               <EventTime>09:05:17 EDT, 18-FEB-2022</EventTime> ←——— 245
            </Event>
         </ServiceSession>
```

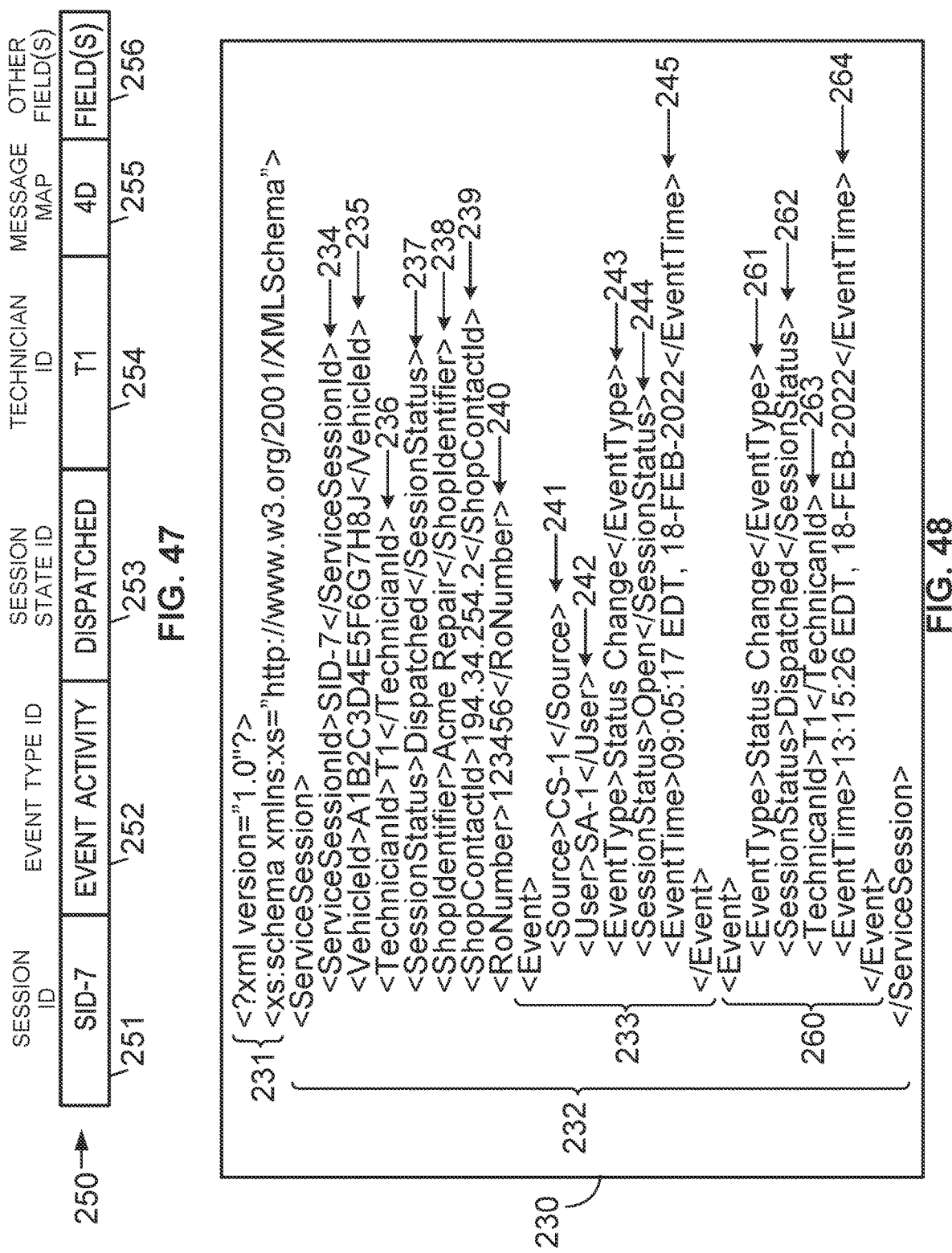

| SESSION ID | EVENT TYPE ID | | | | OTHER FIELD(S) |
|---|---|---|---|---|---|
| | EVENT ACTIVITY | SESSION STATE ID | TECHNICIAN ID | MESSAGE MAP | |
| SID-7 | DISPATCHED | | T1 | 4D | FIELD(S) |
| 251 | 252 | 253 | 254 | 255 | 256 |

```
231 { <?xml version="1.0"?>
       <xs:schema xmlns:xs="http://www.w3.org/2001/XMLSchema">
       <ServiceSession>
         <ServiceSessionId>SID-7</ServiceSessionId>          234
         <VehicleId>A1B2C3D4E5F6G7H8J</VehicleId>           235
         <TechnicianId>T1</TechnicianId>          236
         <SessionStatus>Dispatched</SessionStatus>          237
         <ShopIdentifier>Acme Repair</ShopIdentifier>          238
         <ShopContactId>194.34.254.2</ShopContactId>          239
         <RoNumber>123456</RoNumber>          240
         <Event>
           <Source>CS-1</Source>          241
           <User>SA-1</User>          242
           <EventType>Status Change</EventType>          243
           <SessionStatus>Open</SessionStatus>          244
           <EventTime>09:05:17 EDT, 18-FEB-2022</EventTime>          245
         </Event>
         <Event>
           <EventType>Status Change</EventType>          261
           <SessionStatus>Dispatched</SessionStatus>          262
           <TechnicanId>T1</TechnicanId>          263
           <EventTime>13:15:26 EDT, 18-FEB-2022</EventTime>          264
         </Event>
       </ServiceSession>
```

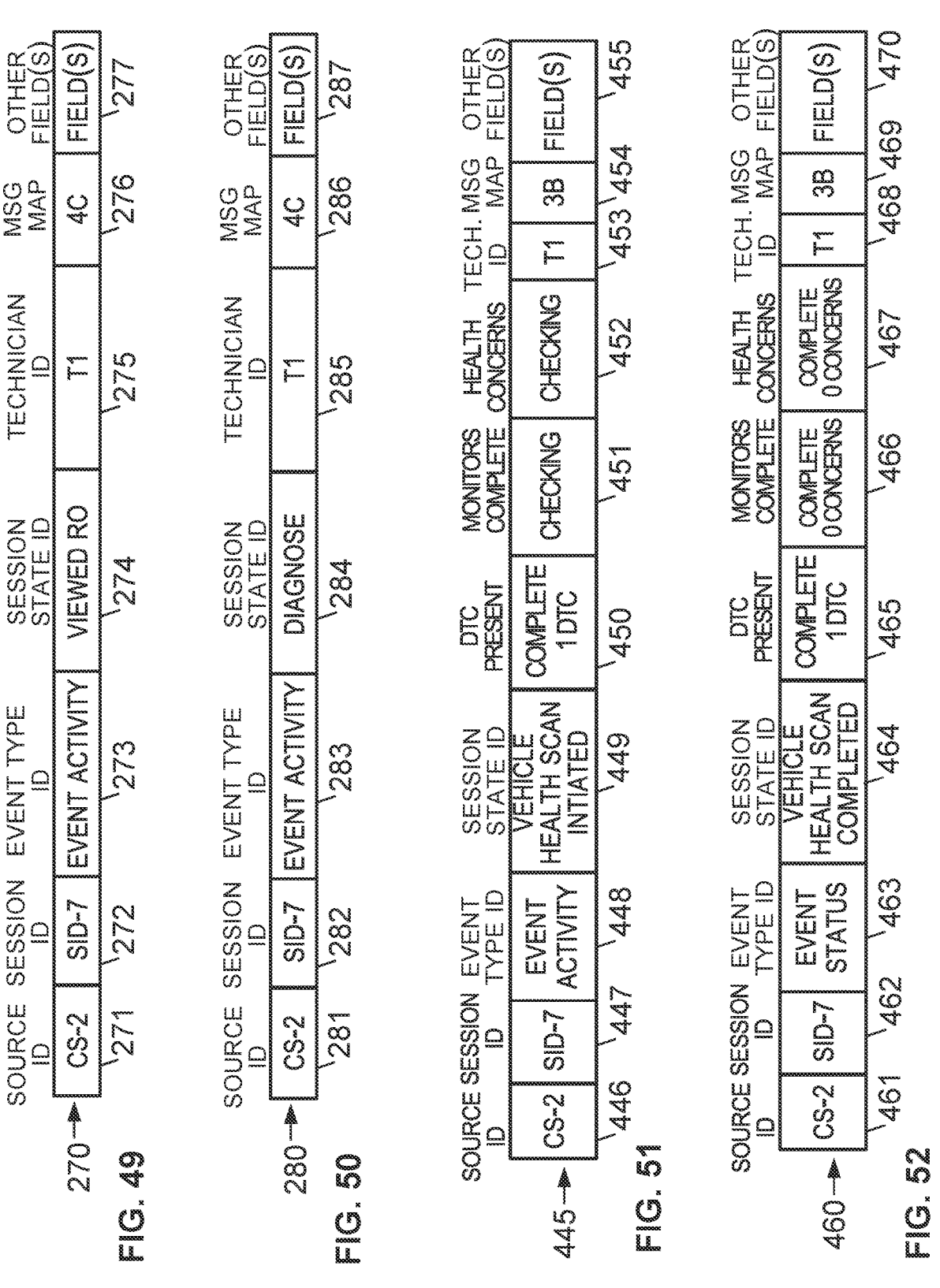

| SOURCE ID | SESSION ID | EVENT TYPE ID | SESSION STATE ID | TECHNICIAN ID | MSG MAP | OTHER FIELD(S) |
|---|---|---|---|---|---|---|
| CS-2 | SID-7 | EVENT ACTIVITY | VIEWED RO | T1 | 4C | FIELD(S) |
| 271 | 272 | 273 | 274 | 275 | 276 | 277 |

| SOURCE ID | SESSION ID | EVENT TYPE ID | SESSION STATE ID | TECHNICIAN ID | MSG MAP | OTHER FIELD(S) |
|---|---|---|---|---|---|---|
| CS-2 | SID-7 | EVENT ACTIVITY | DIAGNOSE | T1 | 4C | FIELD(S) |
| 281 | 282 | 283 | 284 | 285 | 286 | 287 |

| SOURCE ID | SESSION ID | EVENT TYPE ID | SESSION STATE ID | DTC PRESENT | MONITORS COMPLETE | HEALTH CONCERNS | TECH. MSG ID | MSG MAP | OTHER FIELD(S) |
|---|---|---|---|---|---|---|---|---|---|
| CS-2 | SID-7 | EVENT ACTIVITY | VEHICLE HEALTH SCAN INITIATED | COMPLETE 1 DTC | CHECKING | CHECKING | T1 | 3B | FIELD(S) |
| 446 | 447 | 448 | 449 | 450 | 451 | 452 | 453 | 454 | 455 |

| SOURCE ID | SESSION ID | EVENT TYPE ID | SESSION STATE ID | DTC PRESENT | MONITORS COMPLETE | HEALTH CONCERNS | TECH. MSG ID | MSG MAP | OTHER FIELD(S) |
|---|---|---|---|---|---|---|---|---|---|
| CS-2 | SID-7 | EVENT STATUS | VEHICLE HEALTH SCAN COMPLETED | COMPLETE 1 DTC | COMPLETE 0 CONCERNS | COMPLETE 0 CONCERNS | T1 | 3B | FIELD(S) |
| 461 | 462 | 463 | 464 | 465 | 466 | 467 | 468 | 469 | 470 |

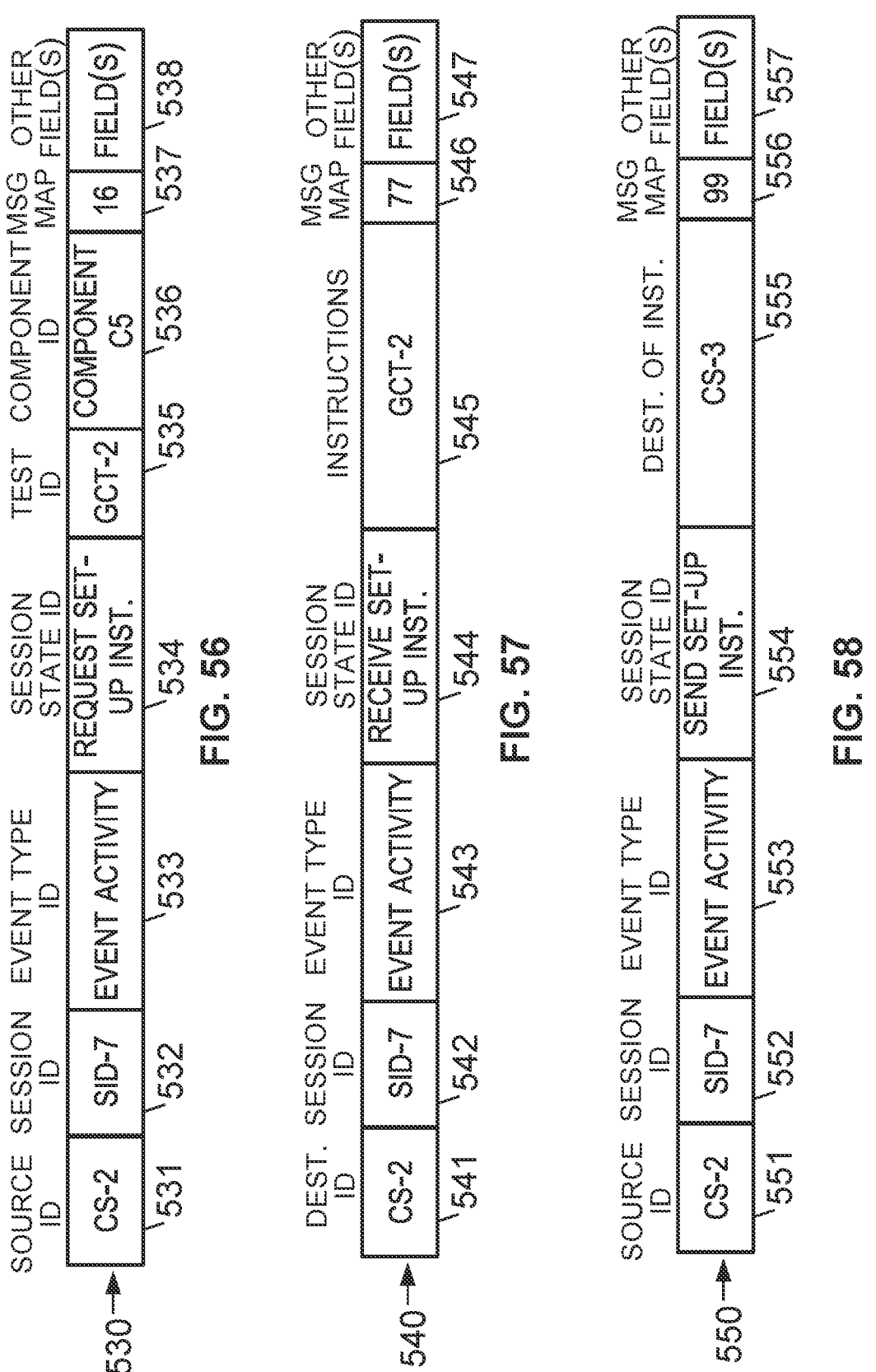

530 →

| SOURCE ID | SESSION ID | EVENT TYPE ID | SESSION STATE ID | TEST ID | COMPONENT ID | MSG MAP | OTHER FIELD(S) |
|---|---|---|---|---|---|---|---|
| CS-2 | SID-7 | EVENT ACTIVITY | REQUEST SET-UP INST. | GCT-2 | COMPONENT C5 | 16 | FIELD(S) |
| 531 | 532 | 533 | 534 | 535 | 536 | 537 | 538 |

| DEST. ID | SESSION ID | EVENT TYPE ID | SESSION STATE ID | INSTRUCTIONS | MSG MAP | OTHER FIELD(S) |
|---|---|---|---|---|---|---|
| CS-2 | SID-7 | EVENT ACTIVITY | RECEIVE SET-UP INST. | GCT-2 | 77 | FIELD(S) |
| 541 | 542 | 543 | 544 | 545 | 546 | 547 |

| SOURCE ID | SESSION ID | EVENT TYPE ID | SESSION STATE ID | DEST. OF INST. | MSG MAP | OTHER FIELD(S) |
|---|---|---|---|---|---|---|
| CS-2 | SID-7 | EVENT ACTIVITY | SEND SET-UP INST. | CS-3 | 99 | FIELD(S) |
| 551 | 552 | 553 | 554 | 555 | 556 | 557 |

FIG. 58

METHOD AND SYSTEM FOR VEHICLE SERVICE SESSION

BACKGROUND

A vehicle is typically serviced to keep the vehicle operating without any malfunction and/or when a malfunction exists in the vehicle. Quite often, the vehicle service occurs at a repair shop with multiple employees, such as a shop manager, a customer advisor that communicates with an owner of the vehicle, a technician, a parts department manager, and a cashier, among others. In some instances, the vehicle service is performed by a single technician. In other instances, the vehicle service is performed by multiple technicians. In some cases, the multiple technicians perform multiple service activities sequentially. In other cases, however, the multiple technicians perform multiple service activities concurrently. Moreover, in at least some cases, multiple technicians cooperatively perform different portions of a single service activity. For instance, a first technician can perform service activities to diagnose a malfunction in a vehicle and a second technician can perform further service activities to diagnose the malfunction in the vehicle after the first technician's work shift ends. In some instances, the second technician repeats a service activity that the first technician performed. Repeating service activities is often a waste of resources.

OVERVIEW

In a first implementation, a method is provided. The method includes outputting, by a computing system, a request for transmission to a server. The request includes an identifier of a service session record (SSR) corresponding to a vehicle. The SSR includes a timeline for tracking one or more events corresponding to the SSR. The method also includes receiving, in response to the request, a first graphical user interface (GUI) corresponding to the SSR. The method further includes displaying, on a display, the first GUI in a first display mode. Displaying the first GUI in the first display mode includes displaying a first event summary of the timeline. The first event summary corresponds to a first event of the SSR. The first event summary includes a first user-selectable control (USC) selectable to trigger changing a display mode of the first GUI. Furthermore, the method includes displaying, in response to a selection of the first USC, the first GUI in a second display mode. Displaying the first GUI in the second display mode includes displaying a particular detail regarding the first event not shown in the first display mode.

In a second implementation, a computing system is provided. The computing system includes a processor and a non-transitory computer-readable memory. Execution of the executable instructions by the processor causes the computing system to perform functions. The functions include outputting a request for transmission to a server. The request includes an identifier of an SSR corresponding to a vehicle. The SSR includes a timeline for tracking one or more events corresponding to the SSR. The functions also include receiving, in response to the request, a first GUI corresponding to the SSR. Furthermore, the functions include displaying, on a display, the first GUI in a first display mode. Displaying the first GUI in the first display mode includes displaying a first event summary of the timeline. The first event summary corresponds to a first event of the SSR. The first event summary includes a first USC selectable to trigger changing a display mode of the first GUI. Furthermore still, the functions include displaying, in response to a selection of the first USC, the first GUI in a second display mode. Displaying the first GUI in the second display mode includes displaying a particular detail regarding the first event not shown in the first display mode.

In a third implementation, a non-transitory computer-readable memory is provided. The computer readable memory has stored therein instructions executable by a processor to cause a computing system to perform functions. The functions include outputting, by the computing system, a request for transmission to a server. The request includes an identifier of an SSR corresponding to a vehicle. The SSR includes a timeline for tracking one or more events corresponding to the SSR. The functions also include receiving, in response to the request, a first GUI corresponding to the SSR. Furthermore, the functions include displaying, on a display, the first GUI in a first display mode. Displaying the first GUI in the first display mode incudes displaying a first event summary of the timeline. The first event summary corresponds to a first event of the SSR. The first event summary includes a first USC selectable to trigger changing a display mode of the first GUI. Furthermore still, the functions include displaying, in response to a selection of the first USC, the first GUI in a second display mode. Displaying the first GUI in the second display mode includes displaying a particular detail regarding the first event not shown in the first display mode.

In a fourth implementation, a method is provided. The method includes receiving, at a first computing system from a server, an identifier of an SSR and set-up information to configure a second computing system. The method also includes displaying, on a display at the first computing system, a GUI including an indication the set-up information has been received. Additionally, the method includes outputting, at a wireless output device at the first computing system, a first wireless signal modulated with the identifier of the SSR and the set-up information. The method further includes receiving, at a wireless input device at the second computing system, the first wireless signal modulated with the identifier of the SSR and the set-up information. Moreover, the method includes demodulating, at the second computing system, the first wireless signal to obtain the identifier of the SSR and the set-up information. Additionally, the method includes configuring, by a processor at the second computing system, the second computing system according to the set-up information. Furthermore, the method includes determining, at the processor at the second computing system, data for the SSR while the second computing system is configured according to the set-up information. Furthermore still, the method includes outputting, at a wireless output device of the second computing system, a second wireless signal modulated with the identifier of the SSR and the data for the SSR for delivery to the server.

In a fifth implementation, a system is provided. The system includes a processor, a display, a wireless input device and a wireless output device. The system also includes a second computing system including a processor, a display, a wireless input device and a wireless output device. Furthermore, the method includes non-transitory computer-readable memory storing executable instructions. Execution of a first portion of the executable instructions at the first processor and a second portion of the executable instructions at the second processor cause the computing system to perform functions. The functions include receiving, at the first computing system from a server, an identifier of an SSR and set-up information to configure the second computing system. The functions also include displaying, on the display of the first computing system, a GUI including an indication the set-up information has been received. Additionally, the functions include outputting, at the wireless output device of the first computing system, a first wireless signal modulated with the identifier of the SSR and the set-up information. The functions further include receiving, at the wireless input device of the second computing system, the first wireless signal modulated with the identifier of the SSR and the set-up information. Moreover, the functions include demodulating, at the second computing system, the first wireless signal to obtain the identifier of the SSR and the set-up information. Additionally, the functions include configuring, by the processor of the second computing system, the second computing system according to the set-up information. Furthermore, the functions include determining, at the processor at the second computing system, data for the SSR while the second computing system is configured according to the set-up information. Furthermore still, the functions include outputting, at the wireless output device of the second computing system, a second wireless signal modulated with the identifier of the SSR and the data for the SSR for delivery to the server.

In a sixth implementation, a non-transitory computer-readable memory is provided. The computer readable memory has stored therein instructions executable by processors to cause a computing system to perform functions. The functions include receiving, at a first computing system from a server, an identifier of an SSR and set-up information to configure a second computing system. The functions also include displaying, on a display at the first computing system, a GUI including an indication the set-up information has been received. The functions further include outputting, at a wireless output device at the first computing system, a first wireless signal modulated with the identifier of the SSR and the set-up information. Additionally, the functions include receiving, at a wireless input device at the second computing system, the first wireless signal modulated with the identifier of the SSR and the set-up information. The functions also include demodulating, at the second computing system, the first wireless signal to obtain the identifier of the SSR and the set-up information. Moreover, the functions include configuring, by a processor at the second computing system, the second computing system according to the set-up information. Furthermore, the functions include determining, at the processor at the second computing system, data for the SSR while the second computing system is configured according to the set-up information. Furthermore still, the functions include outputting, at a wireless output device of the second computing system, a second wireless signal modulated with the identifier of the SSR and the data for the SSR for delivery to the server.

In a seventh implementation, a method is provided. The method includes receiving, at a computing system, a first state indicator of a first service session tracked by a server using a particular SSR. The first service session corresponds to servicing a vehicle. The method also includes displaying a GUI on a display. The GUI corresponds to the first service session. The GUI includes the first state indicator and an indicator of a first service activity corresponding to the vehicle. Additionally, the method includes performing the first service activity. Furthermore, the method includes determining, at the computing system, a first input for modifying the particular SSR. The first input includes data that corresponds to performing the first service activity. Furthermore still, the method includes outputting the first input by the computing system for transmission to the server.

In an eighth implementation, a computing system is provided. The computing system includes a processor and a non-transitory computer-readable memory storing executable instructions. Execution of the executable instructions by the processor causes the computing system to perform functions. The functions include receiving a first state indicator of a first service session tracked by a server using a particular SSR. The first service session corresponds to servicing a vehicle. The functions also include displaying a GUI on a display. The GUI corresponds to the first service session. The GUI includes the first state indicator and an indicator of a first service activity corresponding to the vehicle. Additionally, the functions include performing the first service activity. Furthermore, the functions include determining a first input for modifying the particular SSR. The first input includes data that corresponds to performing the first service activity. Furthermore still, the functions include outputting the first input by the computing system for transmission to the server.

In a ninth implementation, a non-transitory computer-readable memory is provided. The computer readable memory has stored therein instructions executable by processors to cause a computing system to perform functions. The functions include receiving a first state indicator of a first service session tracked by a server using a particular SSR. The first service session corresponds to servicing a vehicle. The functions also include displaying a GUI on a display. The GUI corresponds to the first service session. The GUI includes the first state indicator and an indicator of a first service activity corresponding to the vehicle. Additionally, the functions include performing the first service activity. Furthermore, the functions include determining a first input for modifying the particular SSR. The first input includes data that corresponds to performing the first service activity. Furthermore still, the functions include outputting the first input by the computing system for transmission to the server.

In a tenth implementation, a method is provided. The method includes determining, at a server, a first communication received at the server includes a request to initiate a first service session corresponding to a vehicle. The method also includes generating, at the server based at least in part on the first communication, a first SSR corresponding to the first service session. The first SSR includes a state indicator, a timeline, and an identifier of the first service session. The state indicator is indicative of a first current state of the first service session. The timeline is indicative of one or more events corresponding to the first service session. The method also includes determining, at the server, a second communication received at the server includes an input for modifying the first SSR. Furthermore, the method includes modifying, at the server, at least a portion of the first SSR based at least in part on the input. The portion of the first SSR includes the state indicator, the timeline, or the state indicator and the timeline. Furthermore still, the method includes outputting, at the server for transmission to the first computing system, at least the portion of the first SSR.

In an eleventh implementation, a computing system is provided. The computing system includes determining, at the server, a first communication received at the server includes a request to initiate a first service session corresponding to a vehicle. The functions also include generating, at the server based at least in part on the first communication, a first SSR corresponding to the first service session. The first SSR includes a state indicator, a timeline, and an identifier of the first service session. The state indicator is indicative of a first current state of the first service session.

The timeline is indicative of one or more events corresponding to the first service session. The functions also include determining, at the server, a second communication received at the server includes an input for modifying the first SSR. Furthermore, the functions include modifying, at the server, at least a portion of the first SSR based at least in part on the input. The portion of the first SSR includes the state indicator, the timeline, or the state indicator and the timeline. Furthermore still, the functions include outputting, at the server for transmission to the first computing system, at least the portion of the first SSR.

In a twelfth implementation, a non-transitory computer-readable memory is provided. The computer readable memory has stored therein instructions executable by processors to cause a computing system to perform functions. The functions include determining, at the server, a first communication received at the server includes a request to initiate a first service session corresponding to a vehicle. The functions also include generating, at the server based at least in part on the first communication, a first SSR corresponding to the first service session. The first SSR includes a state indicator, a timeline, and an identifier of the first service session. The state indicator is indicative of a first current state of the first service session. The timeline is indicative of one or more events corresponding to the first service session. The functions also include determining, at the server, a second communication received at the server includes an input for modifying the first SSR. Furthermore, the functions include modifying, at the server, at least a portion of the first SSR based at least in part on the input. The portion of the first SSR includes the state indicator, the timeline, or the state indicator and the timeline. Furthermore still, the functions include outputting, at the server for transmission to the first computing system, at least the portion of the first SSR.

Other implementations will become apparent to those of ordinary skill in the art by reading the following detailed description, with reference where appropriate to the accompanying drawings.

BRIEF DESCRIPTION OF THE DRAWINGS

Example implementations are described herein with reference to the drawings.

FIG. 18, FIG. 19, FIG. 20, and FIG. 21 show flowcharts depicting sets of functions in accordance with the example implementations.

FIG. 22, FIG. 23, FIG. 24, FIG. 25, FIG. 26, FIG. 27, FIG. 28, FIG. 29, FIG. 30, FIG. 31, FIG. 32, FIG. 33, FIG. 34, FIG. 35, FIG. 36, FIG. 37, FIG. 38, FIG. 39, FIG. 40, FIG.

FIG. 44 and FIG. 45 show communications in accordance with the example implementations.

FIG. 46 shows a service session record (SSR) in accordance with the example implementations.

FIG. 47 shows a communication in accordance with the example implementations.

FIG. 48 shows an SSR in accordance with the example implementations.

FIG. 49, FIG. 50, FIG. 51, FIG. 52, FIG. 53, FIG. 54, FIG. 55, FIG. 56, FIG. 57, and FIG. 58 show a communication in accordance with the example implementations.

Figure 1:
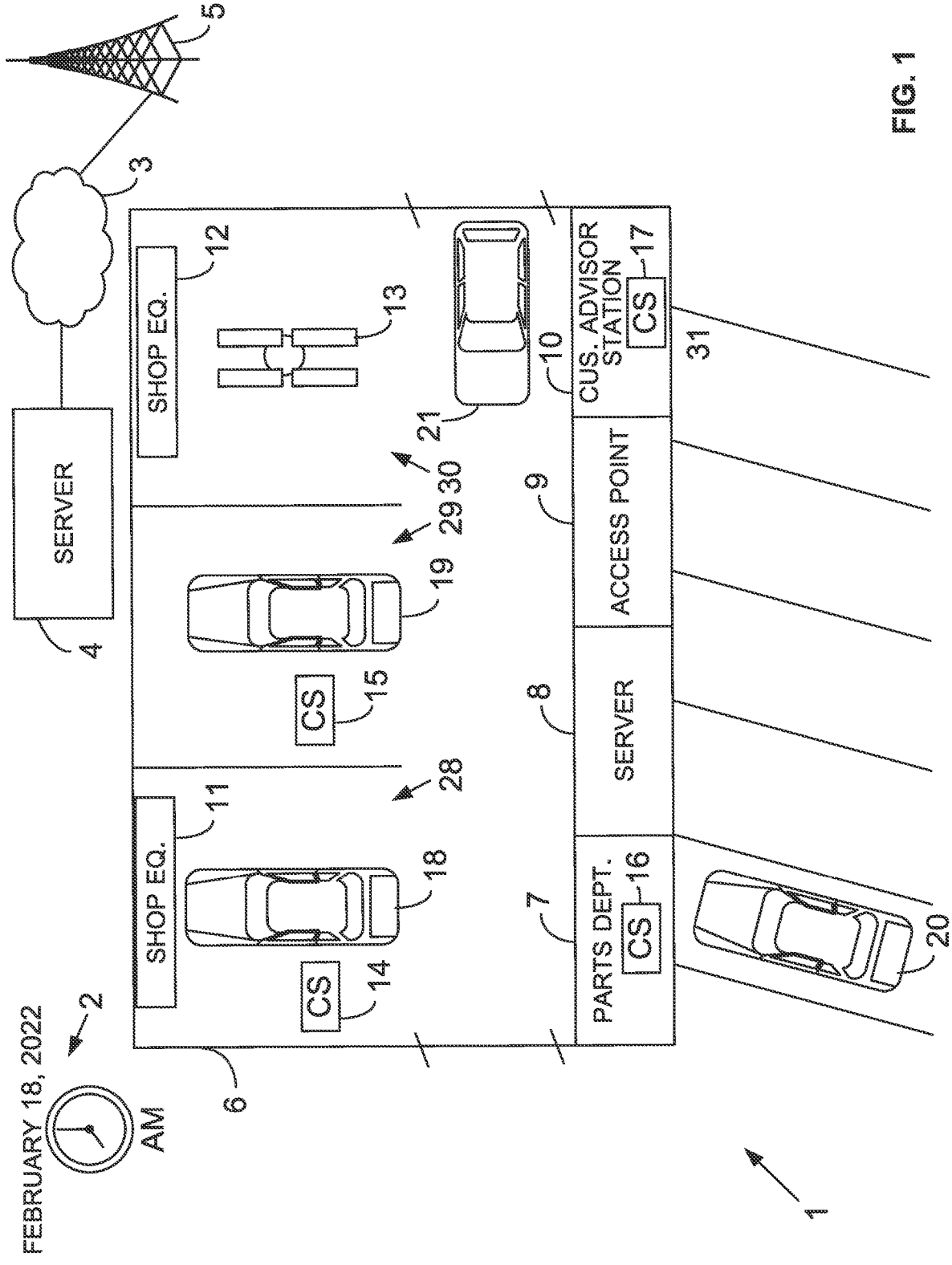
FIG. 1, FIG. 2, FIG. 3, FIG. 4, FIG. 5, and FIG. 6 show an architecture in accordance with the example implementation.

All the figures are schematic, not necessarily to scale, and generally only show parts which are necessary to elucidate example embodiments, wherein other parts may be omitted or merely suggested.

DETAILED DESCRIPTION

I. Introduction

This description describes several example implementations, at least some which pertain to performing a vehicle service session. A service session record corresponding to the vehicle service session can be generated and modified as events and activities of the service session are initiated, performed, and/or completed. The events and activities can be performed using one or multiple computing systems or pieces of equipment, such as equipment in a repair shop. The event and activities can be arranged temporally within the service session record. The service session record can be displayed on a display by displaying aspects of the service session record in a graphical user interface. The programming executed by a processor to track a vehicle service session using a service session record can be referred to as a "session manager."

One or more computing systems can transmit a communication about service events or activities to a server that tracks the vehicle service session. At least some of the communications can include and/or indicate that the content (e.g., content about a service event or activity) in a communication has a particular priority level. The server can modify the service session record based on the priority level of multiple communications should a conflict arise based on the content of the multiple communications.

A GUI displaying a service session record or content of a service session record can include one or more user-selectable controls. As an example, the user-selectable control can be selectable to initiate performance of a test (e.g., a guided component test using a meter or oscilloscope, or a functional test that includes sending a vehicle data message to a vehicle) using a component system. Initiating performance of a test can include configuring the component system to perform the test. As another example, the user-selectable control can be selectable to cause the GUI to show results of a test previously-performed during the service session. As yet another example, the user-selectable control can be selectable to configure the computing system for re-performing a test that was performed previously during the vehicle service session with the same configuration setting(s) or different configuration setting(s).

This description refers to a status in several ways. For example, the description refers to one or more of an operating status, operating state, a status identifier, state identifier, status indicator, status identifier, a service session status, or a service session state. The terms "status" and "state" in this description are synonymous with one another, unless the context dictates otherwise. Similarly, the terms "indicator" and "identifier" in this description are synonymous with one another, unless the context dictates otherwise. Additionally, the terms "paused" and "halted" in this description are synonymous with one another, unless the context dictates otherwise. Furthermore, the terms "scope" and "oscilloscope" in this description are synonymous with one another, unless the context dictates otherwise.

II. Example Architecture

Figure 2:
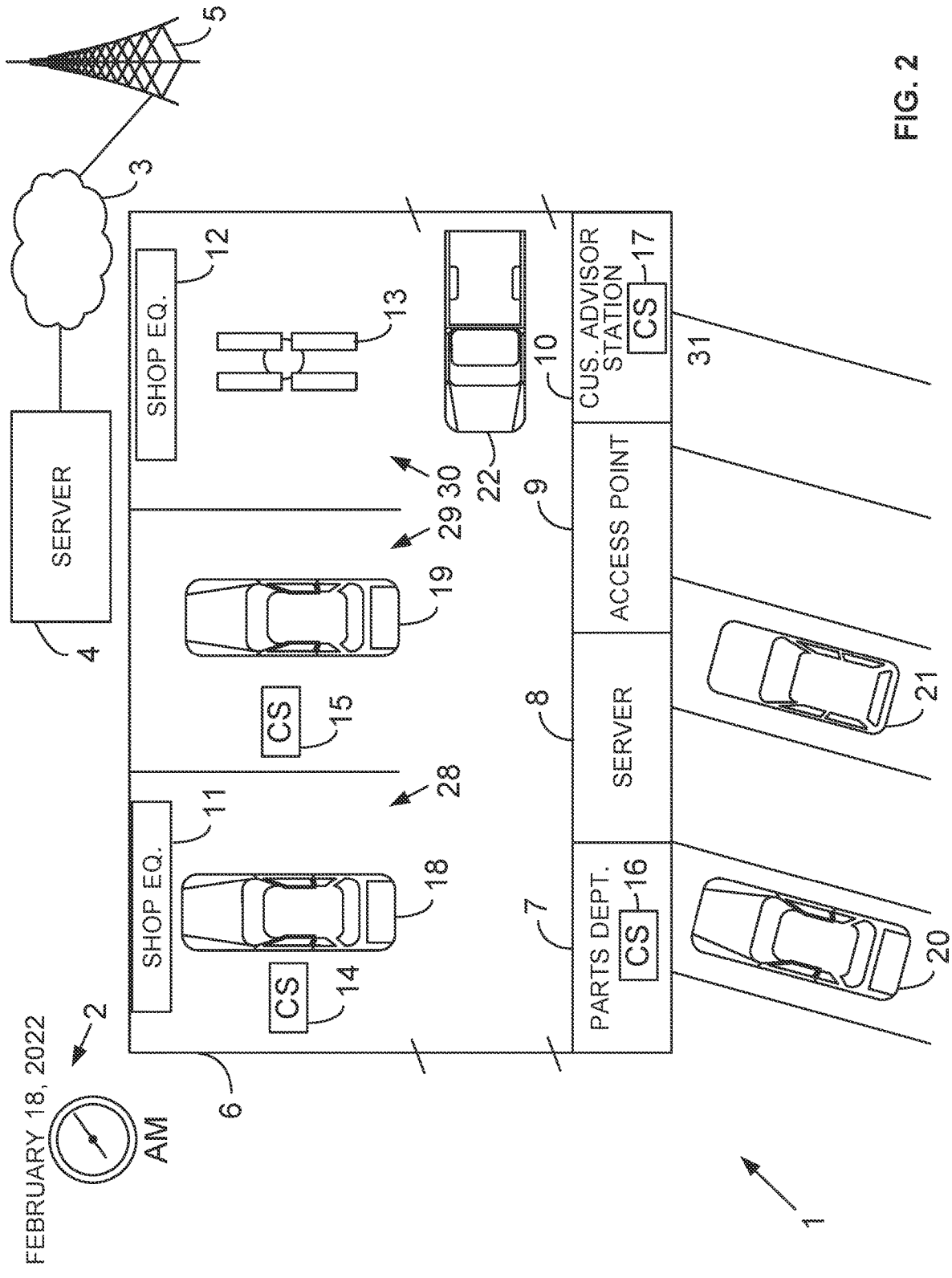
Figure 3:
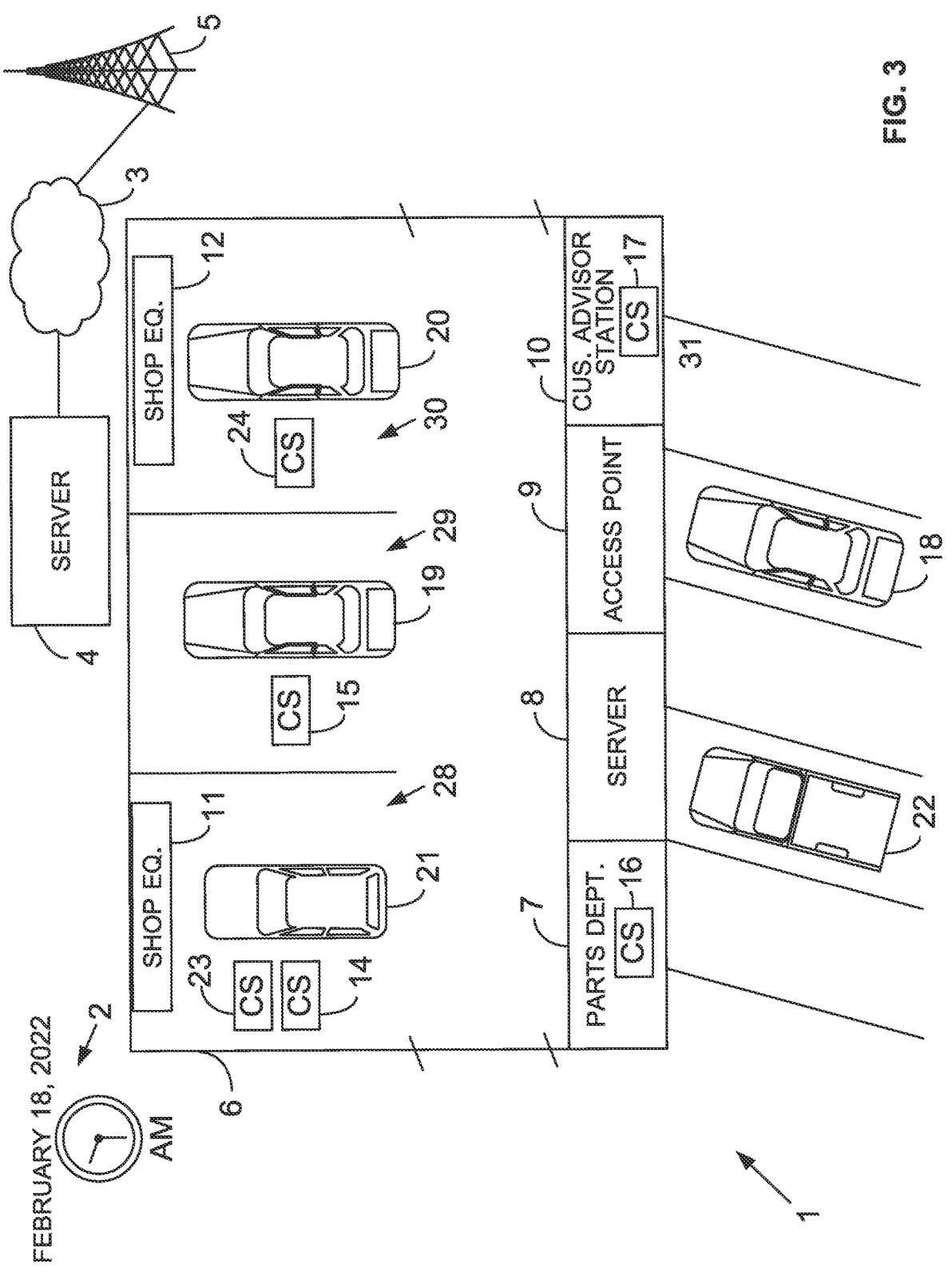
Figure 4:
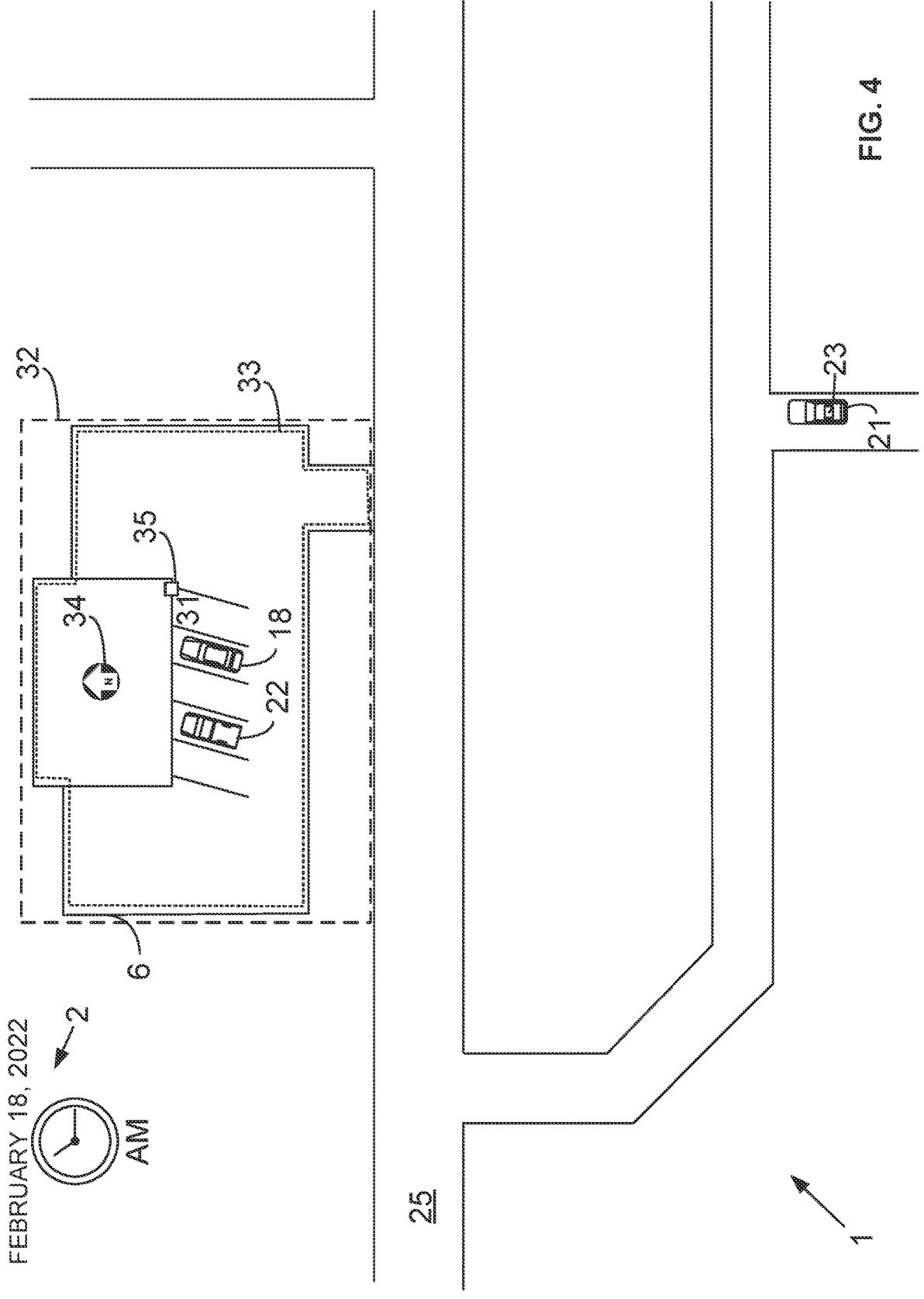

FIG. 1 to FIG. 6 show an architecture 1 and a temporal reference 2. FIG. 4 shows a zoomed out view of the architecture 1 with respect to views of the architecture 1 in FIG. 1 to FIG. 3, FIG. 5, and FIG. 6.

Figure 5:
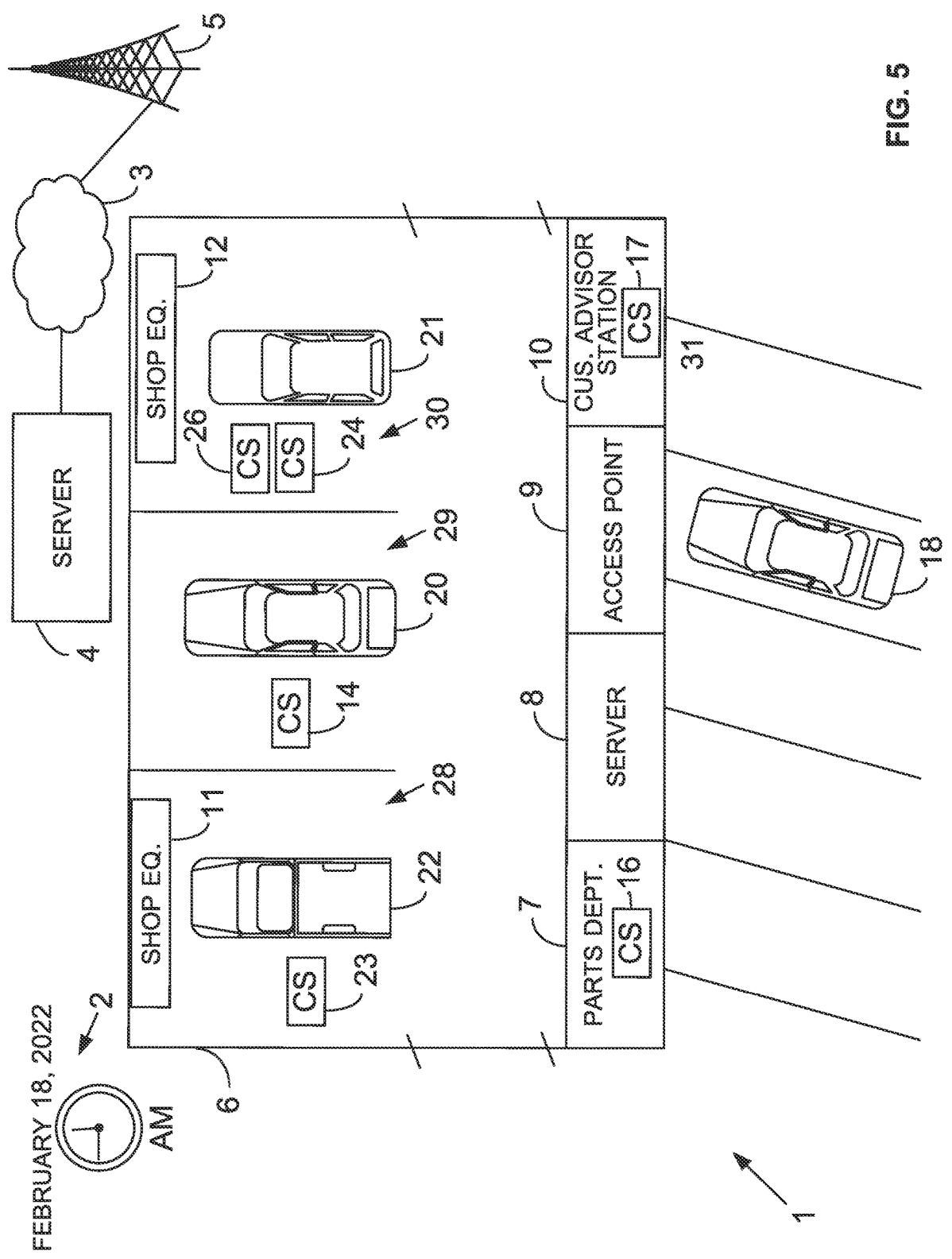

The architecture 1 includes a communication network 3, a server 4, an access point 5, and a repair shop 6. The repair shop 6 includes a parts department 7, a server 8, an access point 9, a customer advisor station 10, shop equipment 11, shop equipment 12, a vehicle lift 13, (a vehicle lift 27 shown in FIG. 6), a computing system 14, 15, 16, 17, and a service bay 28 (e.g., "service bay: SB-1"), 29 (e.g., "service bay: SB-2"), 30 (e.g., "service bay: SB-3"). FIG. 1 also shows a vehicle 18, 19, 20, 21. FIG. 2 shows a vehicle 22. The vehicle 18, 19, 20, 21, 22 is shown in other drawings as well. FIG. 3 shows a computing system 23, 24 and FIG. 5 shows a computing system 26. One or more of the computing system 14, 15, 16, 17, 23, 24, 26 is shown in a drawing other than FIG. 1, FIG. 3, or FIG. 5. FIG. 4 shows a path 25 upon which a vehicle can be driven. FIG. 4 shows the vehicle 21 on the path 25. As an example, the path 25 can include a road (such as a paved or unpaved road), an unpaved path, a motorway, a highway, a freeway, an expressway, a toll road, or some other type of path.

The temporal reference 2 is also shown in FIG. 2 to FIG. 6. In each figure including the temporal reference 2, the temporal reference 2 includes a common date (i.e., Feb. 18, 2022), but different times on a clock (i.e., 8:00 AM, 8:10 AM, 9:30 AM, 10:15 AM, 11:45 AM, 2:00 PM in FIG. 1 to FIG. 6, respectively). One purpose of showing the temporal reference 2 in the drawings is to show where vehicles and computing systems shown in the drawings are located at the time indicated by the temporal reference.

The server 4 and the access point 5 are communicatively coupled to the communication network 3. That coupling can occur wirelessly or via a wired connection. The access point 5 provides means for a computing system to access the communication network 3. The access point 5 can, for example, include a cellular network base station. As an example, a computing system shown in the drawings (e.g., the computing system 14, 15, 16, 17 shown in FIG. 1, a computing system 23, 24 shown in FIG. 3, or a computing system 26 shown in FIG. 5) can access the communication network 3 via the access point 5. In some implementations, that access occurs directly. For instance, the computing system communicates wirelessly with the access point 5 using a particular communication standard, such as a cellular telephone communication standard. In some other implementations, the access occurs indirectly. For instance, the computing system communicates directly with the access point 9, which in turn communicates directly or indirectly with the access point 5.

Figure 6:
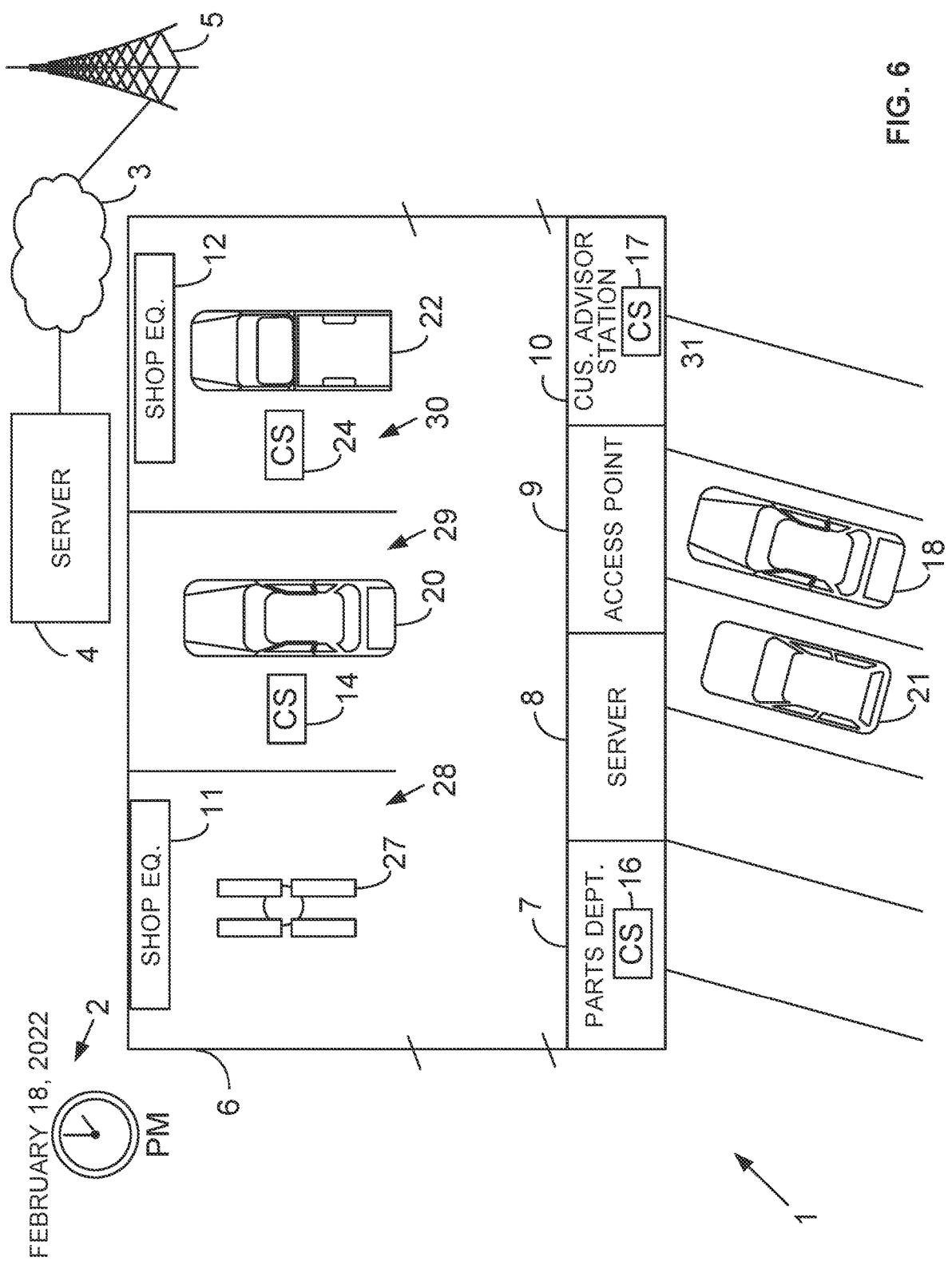

A computing system can be mobile. For example, FIG. 1 to FIG. 3 show the computing system 14 in the service bay 28, and FIG. 5 and FIG. 6 show the computing system 14 in the service bay 29. As another example, FIG. 3 shows the computing system 23 in the service bay 28 and FIG. 4 shows the computing system 23 within the vehicle 21 outside of the repair shop 6.

The access point 9 can include a device that provides means for a computing system or server to access a computer network, such as the communication network 3. In at least some implementations, the access point 9 can be coupled to a local area network within the repair shop 6 and/or to the communication network 3 via the access point 5 wirelessly or to the communication network 3 via a wired connection. In at least some implementations, the access point 9 includes one or more from among: a Wi-Fi hot spot, a femtocell, a WiMax hot spot, a mobile ad hoc network (MANET), a wireless mesh network, or some other device.

The repair shop 6 includes a facility at which a vehicle is repaired. The parts department 7 includes replacement parts (e.g., a sensor, an electronic control unit, a bolt, a fluid, a filter or some other replacement part) for installing on a vehicle to repair or otherwise servicing the vehicle (e.g., maintaining a vehicle by changing engine oil in an internal combustion engine or replacing a battery cell in an electric vehicle). The parts department 7 includes the computing system 16 for entry of vehicle service session data regarding a replacement part. For purposes of this description a replacement part is sometime referred to as a vehicle component.

FIG. 4 shows a geo-fence 32, 33 and a location 34 corresponding to the repair shop 6. In at least some implementations, a geo-fence corresponding to the repair shop can include a circumference a given distance from the location 34. The location 34 can include a latitude and longitude corresponding to some portion of the repair shop 6. FIG. 4 also shows that the repair shop 6 includes a near field communication (NFC) device 35. The NFC device 35 can be located in proximity to a key drop-box at which a vehicle owner can drop off a key or key fob for a vehicle delivered to the repair shop 6. The NFC device 35 can be configured to receive a communication from an NFC device within a mobile telephone carried by the vehicle owner. In at least some implementations, that mobile telephone can execute an application with a geo-fencing feature for providing data to the NFC device 35 indicating the owner's vehicle has been delivered to the repair shop. In at least some implementations, the NFC device 35 can transmit the data regarding delivery of the vehicle to the server 4, 8, 100.

The server 4 is located remote from the repair shop. The server 8 is located at the repair shop. The server 4, 8, 100 can communicate with a computing system, such as any computing system shown in the drawings. The server 4, 8, 100 can provide web-services to a computing system. A web-service can include a web-service pertaining to a vehicle service session.

The shop equipment 11, 12 can include any of a variety of different shop equipment that can be deployed in the repair shop 6. As an example, the shop equipment 11, 12, can include a wheel alignment system, an ADAS target stand, an engine analyzer, a dynamometer, an exhaust gas analyzer, a wheel balancer, a wheel aligner, an air conditioning recharging and recycling machine, a battery charger, or a tire changer. Other examples of the shop equipment 11, 12 are also possible. The shop equipment 11, 12 can include and/or be arranged as a computing system, such as the computing system 150 shown in FIG. 13A. The vehicle lift 13, 27 (shown in FIG. 6) can include any type of vehicle lift, such an electric vehicle lift, a hydraulic vehicle lift, a one post vehicle lift or a two post vehicle lift. Other examples of the vehicle lift 13, 27 are also possible.

The vehicle service session data can include spatial and temporal data regarding a vehicle. Table A shows an example of vehicle service session data based on FIG. 1 to FIG. 6.

TABLE A

| Vehicle | Location | Time, Date |
|---|---|---|
| 18 | Service bay 28 | 8:00 AM, 2022 Feb. 18 |
| 18 | Service bay 28 | 8:10 AM, 2022 Feb. 18 |
| 18 | Parking lot 31 | 9:30 AM, 2022 Feb. 18 |
| 18 | Parking lot 31 | 10:15 AM, 2022 Feb. 18 |
| 18 | Parking lot 31 | 11:45 AM, 2022 Feb. 18 |
| 18 | Parking lot 31 | 2:00 PM, 2022 Feb. 18 |
| 19 | Service bay 29 | 8:00 AM, 2022 Feb. 18 |
| 19 | Service bay 29 | 8:10 AM, 2022 Feb. 18 |
| 19 | Service bay 29 | 9:30 AM, 2022 Feb. 18 |
| 20 | Parking lot 31 | 8:00 AM, 2022 Feb. 18 |
| 20 | Parking lot 31 | 8:10 AM, 2022 Feb. 18 |
| 20 | Service bay 30 | 9:30 AM, 2022 Feb. 18 |
| 20 | Service bay 29 | 11:45 AM, 2022 Feb. 18 |
| 20 | Service bay 29 | 2:00 PM, 2022 Feb. 18 |
| 21 | Customer advisor station 10 | 8:00 AM, 2022 Feb. 18 |
| 21 | Parking lot 31 | 8:10 AM, 2022 Feb. 18 |
| 21 | Service bay 28 | 9:30 AM, 2022 Feb. 18 |
| 21 | Latitude Y, Longitude X | 10:15 AM, 2022 Feb. 18 |
| 21 | Service bay 30 | 11:45 AM, 2022 Feb. 18 |
| 21 | Parking lot 31 | 2:00 PM, 2022 Feb. 18 |
| 22 | Customer advisor station 10 | 8:10 AM, 2022 Feb. 18 |
| 22 | Parking lot 31 | 9:30 AM, 2022 Feb. 18 |
| 22 | Parking lot 31 | 10:15 AM, 2022 Feb. 18 |
| 22 | Service bay 28 | 11:45 AM, 2022 Feb. 18 |
| 22 | Service bay 30 | 2:00 PM, 2022 Feb. 18 |

III. Example Vehicle

A vehicle is a mobile machine that can be used to transport a person, people, and/or cargo. Accordingly, a vehicle can be driven and/or otherwise guided along a path (e.g., a paved road or otherwise) on land, in water, in the air, and/or outer space. A vehicle can be wheeled, tracked, railed, and/or skied. A vehicle can include an automobile, a motorcycle (e.g., a two or three wheel motorcycle), an all-terrain vehicle (ATV) defined by ANSI/SVIA-1-2007, a snowmobile, a watercraft (e.g., a JET SKI® personal watercraft), a light-duty truck, a medium-duty truck, a heavy-duty truck, a semi-tractor, a drone, and/or a farm machine. A vehicle can include and/or use any appropriate voltage and/or current source, such as a battery, an alternator, a fuel cell, and the like, providing any appropriate current and/or voltage, such as about 12 volts, about 42 volts, 400 volts, 800 volts, or some other voltage level. A vehicle can include and/or use any system and/or engine to provide its mobility. Those systems and/or engines can include vehicle components that use fossil fuels, such as gasoline, natural gas, propane, and the like, electricity, such as that generated by a battery, magneto, fuel cell, solar cell and the like, wind and hybrids and/or combinations thereof. A vehicle can include an electronic control unit (ECU), an on-board diagnostic connector (OBDC), and a vehicle network that connects the OBDC to the ECU. A vehicle can be operable to operate as an autonomous vehicle.

Some vehicles and types of vehicles can be identified by characteristics of the vehicle such as characteristics indicative of when the vehicle was built (e.g., a vehicle year), who built the vehicle (e.g., a vehicle make), marketing names associated with vehicle (e.g., a vehicle model name, or more simply "model"), and features of the vehicle (e.g., an engine type). This description uses an abbreviation YMME and/or Y/M/M/E, where each letter in the order shown represents a model year, vehicle make, vehicle model name, and engine type, respectively. Another vehicle feature can include a type of fuel system (e.g., sequential fuel injection, or throttle body injection). This description uses an abbreviation YMMEF and/or Y/M/M/E/F, where each letter in the order shown represents a model year, vehicle make, vehicle model name, engine type, and fuel system type, respectively. This description uses an abbreviation YMM and/or Y/M/M, where each letter in the order shown represents a model year, vehicle make, and vehicle model name, respectively.

An example Y/M/M/E is 2020/Toyota/Camry/4Cyl, in which "2020" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (e.g., a four cylinder internal combustion engine) within the vehicle. A person skilled in the art will understand that other features in addition to or as an alternative to "engine type" can be used to identify a vehicle. These other features can be identified in various manners, such as a regular production option (RPO) code, such as the RPO codes defined by the General Motors Company LLC, Detroit Michigan.

Some vehicles, such as automobiles, are associated with a unique vehicle identification number (VIN). Some VINs include seventeen alpha-numeric characters. For at least some seventeen character VINs, the last six characters represent a unique serial number associated with a particular type of vehicle represented by the first eleven alpha-numeric characters of those VINs. The first eleven alpha-numeric characters typically represent at least a YMME or a YMM. In some instances, a vehicle includes a one dimensional bar code indicative of a VIN associated with that vehicle.

Modern vehicles typically have multiple vehicle systems. In some respects, a vehicle system can be defined based on a transfer of energy performed by the vehicle system. In this regard a vehicle system can be defined as an electrical vehicle system, a mechanical vehicle system, a pneumatic vehicle system, or a hydraulic vehicle system. For purposes of this description, a pneumatic vehicle system can include a vacuum vehicle system. In at least some implementations, a vehicle system can include a combination of two or more of the aforementioned example vehicle systems. For example, a vehicle system can include an electro-mechanical vehicle system, an electro-hydraulic, or an electro-pneumatic vehicle system. In at least some vehicles, an electro-mechanical vehicle system can include an electro-magnetic-mechanical vehicle component, such as a starter motor. In those or in other vehicles, an electrical system can include one or more batteries that store chemical energy and convert it to electrical energy.

In addition or in other respects, a vehicle system can be defined according to one or more functions performed by a vehicle system and/or a purpose of the vehicle system. In this regard, a vehicle system can include an advanced driver assistance system (ADAS), an anti-lock brake system, an audio system, a body control system, a brake system, a charging system, a chassis system, an engine system, a heating, ventilation, and air conditioning (HVAC) system, a navigation system, a powertrain system, a steering system, a supplemental restraint system, a suspension system, a traction control system, or a thermal management system.

In still other respects, a vehicle system can be defined as including multiple sub-systems. For example, a powertrain vehicle system can include one or more from among: a charging system, an emissions system, an engine cooling system, an engine exhaust system, an engine system, an exhaust system, a fuel system, an ignition system, a starting system, and a transmission system. As another example, a body control vehicle system can include a lighting system, a seating system, and a locking/unlocking system.

A vehicle network, such as a vehicle communication network 44 (shown in FIG. 7) can include one or more conductors (e.g., copper wire conductors) and/or can be wireless. As an example, a vehicle network can include one or two conductors for carrying vehicle data messages in accordance with a vehicle data message (VDM) protocol, such as a bi-directional VDM protocol. A bi-directional VDM protocol can include a SAER J1850 (PWM or VPW) VDM protocol, an SAER J1939 VDM protocol based on the SAER J1939_201808 serial control and communications heavy duty vehicle network—top level document, and/or any other core J1939 standard, an ISO® 15764-4 controller area network (CAN) VDM protocol, an ISO® 9141-2 K-Line VDM protocol, an ISO® 14230-4 KWP2000 K-Line VDM protocol, an ISO® 17458 (e.g., parts 1-5) FlexRay VDM protocol, an ISO® 17987 local interconnect network (LIN) VDM protocol, a CAN 2.0 VDM protocol, standardized in part using an ISO® 11898-1:2015 road vehicle—CAN—Part I: data link layer and physical signaling protocol, a CAN FD VDM protocol (e.g., CAN with flexible data rate VDM protocol), a MOST® Cooperation VDM protocol (such as the MOST Specification Rev. 3.0 E2, or the MOST® Dynamic Specification, Rev. 3.0.2), an Ethernet VDM protocol (e.g., an Ethernet 802.3 protocol using a BROADR-REACH® physical layer transceiver specification for Automotive Applications by Broadcom Inc., San Jose, California), or some other VDM protocol defined for performing communications with or within a vehicle (e.g., any vehicle discussed in this description). Each and every VDM discussed in this description is arranged according to a VDM protocol.

Instead of being bidirectional, a VDM protocol can be a unidirectional. For example, a SENT VDM protocol (e.g., a single-edge nibble transmission VDM protocol) is a unidirectional VDM protocol. The SENT VDM protocol has been standardized as the SAE J2716 VDM protocol. A sensor in a vehicle can include a transmitter operable to communicate using the SENT VDM protocol (e.g., a SENT VDM transmitter). A vehicle communication bus can operatively connect the SENT VDM transmitter and an ECU within the vehicle. A transceiver within a computing system discussed in this description can include a SENT VDM receiver connectable to the vehicle communication bus operatively connected to the SENT VDM transmitter. The SENT VDM receiver can receive SENT VDM protocol messages representing sensor values output by the sensor with the SENT VDM transmitter.

Figure 7:
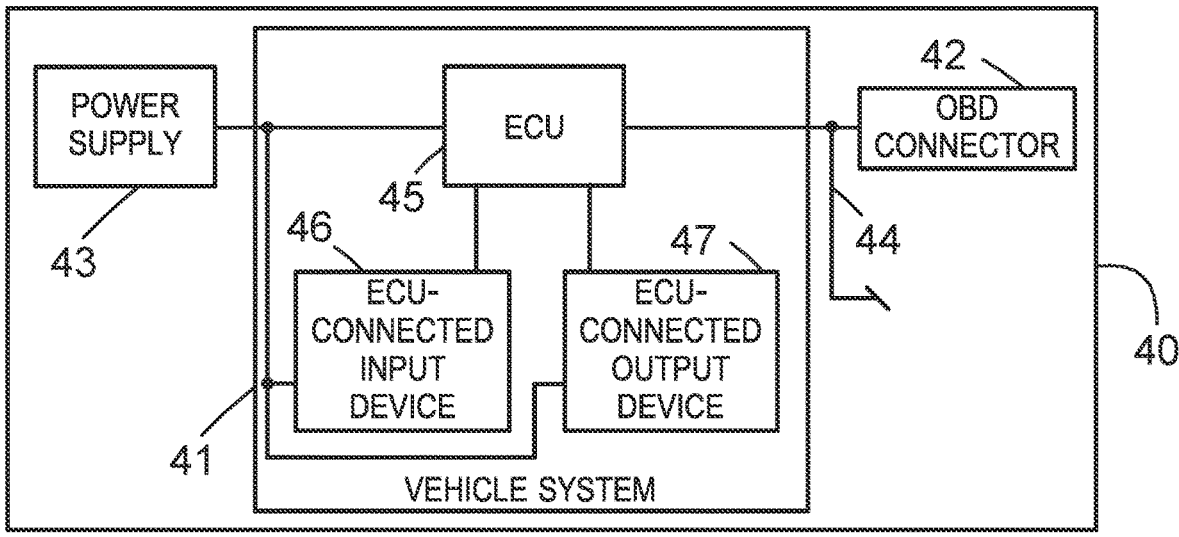
FIG. 7, FIG. 8, FIG. 9, and FIG. 10 show a vehicle in accordance with the example implementations.

An OBDC, such as an OBDC 42 shown in FIG. 7, can include an on-board diagnostic (OBD) connector, such as an OBD II connector. An OBD II connector can include slots for retaining up to sixteen connector terminals, but can include a different number of slots or no slots at all. As an example, an OBDC can include an OBD II connector that meets the SAE J1962 specification such as a connector 16M, part number 12110252, available from Aptiv LLC of Dublin, Ireland. An OBDC can include conductor terminals that connect to a conductor in a vehicle. For instance, an OBDC can include connector terminals that connect to conductors that respectively connect to positive and negative terminals of a battery or battery pack. An OBDC can include one or more conductor terminals that connect to a conductor of a vehicle communication bus such that the OBDC is operatively connected to one or more ECUs.

An OBDC can include a service-side and a vehicle-side. In at least some implementations, the service-side is a portion of the OBDC to which a computing system or a dongle for servicing a vehicle is operatively connectable and the vehicle-side is a portion of the OBDC to which conductors of the vehicle are connected. A dongle can be referred to as a scan module.

A computing system, such as a computing system described in this description, can operatively connect to an OBDC in order to receive a VDM from the vehicle including that OBDC. A VDM can carry VDM data. The VDM data can include a PID and parameter values associated with the PID. The VDM data can include a DTC. The operative connection between the OBDC and a computing system can occur via the arrangement 86, 87, 88 shown in FIG. 11 or via some other arrangement.

A PID can be associated with one or more thresholds. A threshold corresponding to a PID can be dependent upon an operating condition of a vehicle. At least some of the PID thresholds depend on an operating condition. The PID thresholds can include a threshold range top and a threshold range bottom. The threshold range top and threshold range bottom can be specified in some units. Alternatively, the PID thresholds can include an expected value.

As an example, the operating condition for a PID can be a "key-on, engine off" condition or a "key-on, engine on" condition. Other examples of an operating condition corresponding to a PID threshold for a PID include an engine, an engine coolant temperature, an engine load condition, a selected transmission gear condition, an ambient air temperature, an elevation condition, among others. Based on those additional examples, there may be more than two different operating conditions corresponding to PID thresholds for a PID. For instance, the engine coolant temperature operating conditions may include a distinct operating condition for each whole degree between the range between −40° C. and 130° C., and the PID thresholds can include a threshold range top and bottom for each of those operating condition degrees.

An ECU can control various aspects of vehicle operation and/or components within a vehicle system. For example, an ECU can include a powertrain (PT) system ECU, an engine control module (ECM) ECU, a supplemental inflatable restraint (SIR) system (e.g., an air bag system) ECU, an entertainment system ECU, or some other ECU such an ECU for some other vehicle system discussed in this description. An ECU can receive an electrical or optical input from an ECU-connected input device (e.g., a sensor input), control an ECU-connected output device (e.g., a solenoid) via an electrical or optical signal output by the ECU, generate a vehicle data message (VDM) (such as a VDM based on a received input or a controlled output), and set a diagnostic trouble code (DTC) to a state (such as active or history).

An ECU can perform a functional test in response to receiving a VDM requesting performance of the functional test, such as a VDM transmitted by the computing system 14, 15, 17, 23, 24, 26. In at least some implementations, the ECU is operable to perform the functional test and/or provide the diagnostic trouble code in accordance with an industry standard, such as the SAE J1979_201202 and/or ISO 15031-5 standards for E/E diagnostic test modes. The functional test can be used to test an ECU-connected output device.

In at least some implementations, a functional test can be classified as an information test, a toggle test, a variable control test, or a reset test. An information test can be a read-only test, such as an information test to request a VIN stored in the ECU. The computing system can display the VIN received in response to transmitting a VDM requesting performance of the information test. A toggle test can be a test to switch a component, such as a solenoid, relay or switch, between two different operating states (e.g., on/off or open/closed). A variable control test includes a test in which an ECU commands an ECU controlled output device, such as the controlled output device 63, or a setting within the ECU to a certain value. An example of a variable control test includes a variable control test to set a spark timing advance to a certain number of degrees (e.g., one degree) or to increment or decrement the spark timing advance by the certain number of degrees. Another example of a variable control test includes a variable control test to set an EGR valve duty cycle to a particular duty cycle setting or to increment or decrement the EGR valve duty cycle by a particular percentage (e.g., ten percent). A reset functional test is a test to reset an adaptive or learned value in the ECU to a default value or to calibrate one or more data values in the ECU to different data values to calibrate the ECU. A reset functional test can include receiving a vehicle data message including data indicating the default value or data values were written into memory of the ECU properly. Calibrating one or more data values in the ECU can include re-programming the ECU with different executable program instructions.

Next, FIG. 7 shows a vehicle 40 and example details of a vehicle system 41. As shown in FIG. 7, the vehicle 40 includes the vehicle system 41, an on-board diagnostics connector (OBDC) 42, a power supply 43, and a vehicle communication network 44. FIG. 7 also shows that the vehicle system 41 includes an electronic control unit (ECU) 45, an ECU-connected input device 46, and an ECU-connected output device 47. The power supply 43 can include a battery or a battery pack. A computing system, such as the computing system 14, 15, 17, 23, 24, 26 is operable to be operatively coupled to the OBDC 42. One or more of the computing system 14, 15, 17, 23, 24, 26 is also operable to be operatively uncoupled from the OBDC 42 such that the computing system 14, 15, 17, 23, 24, 26 can be operatively coupled to an OBDC in another vehicle (not shown). In at least some implementations, a computing system, such as the computing system 14, 15, 17, 23, 24, 26 is operable to be operatively coupled to the ECU-connected input device 46 and/or the ECU-connected output device 47.

The ECU-connected input device 46 includes one or more input devices. As an example, the ECU-connected input device 46 includes a sensor, a relay, or a switch. The ECU-connected output device 47 includes one or more output devices. As an example, the ECU-connected output device 47 includes a pump, a motor, a solenoid, a valve, a relay, an injector, a horn, a light, a display, or an aural output device (e.g., speaker). A VDM protocol listed above or some other VDM protocol can be used to communicate on the vehicle communication network 44. Examples of the ECU 45 are shown in FIG. 8 to FIG. 10, and examples of the vehicle system 41 are discussed elsewhere in this description.

As another example, the ECU-connected output device 47 can include a haptic feedback component of the vehicle. In at least some implementations, the haptic feedback component of the vehicle includes a component typically in contact with an occupant of the vehicle during a test drive of the vehicle, such as a steering wheel, a seat belt, a seat, a dashboard, or a pedal, such as an accelerator pedal, a clutch pedal, or a brake pedal.

Figure 8:
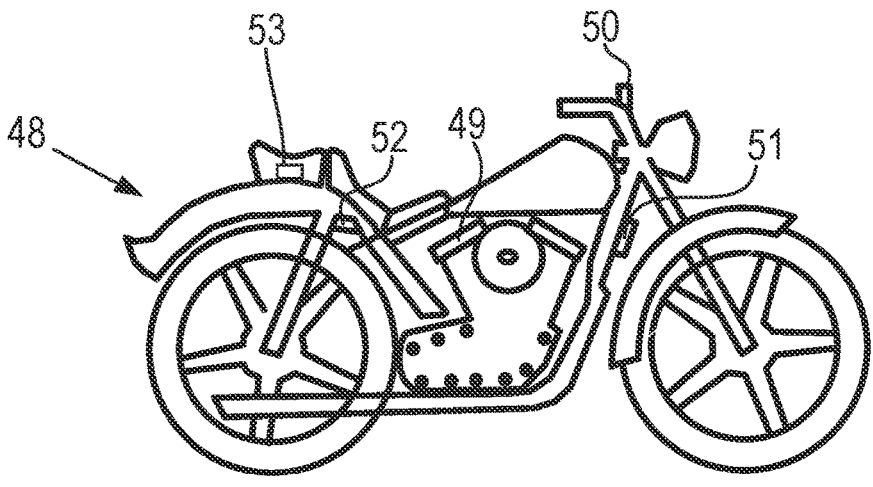

Next, FIG. 8 shows a vehicle 48 in accordance with the example implementations. The vehicle 48 can be arranged as a motorcycle that includes a fuel injection system ECU 49, an instrument cluster ECU 50, an ABS ECU 51, an ignition system ECU 52, and/or an OBDC 53. The ECUs on the vehicle 48 are connected to a power supply (not shown) and can be connected to the OBDC 53 via a vehicle network (not shown). Similar to the ECU 45 shown in FIG. 7, each ECU of the vehicle 48 can be connected to one or more ECU-connected input device 46 and one or more ECU-connected output device 47. A vehicle shown in FIG. 1 to FIG. 6 can be arranged like the vehicle 48.

Figures 9, 10:
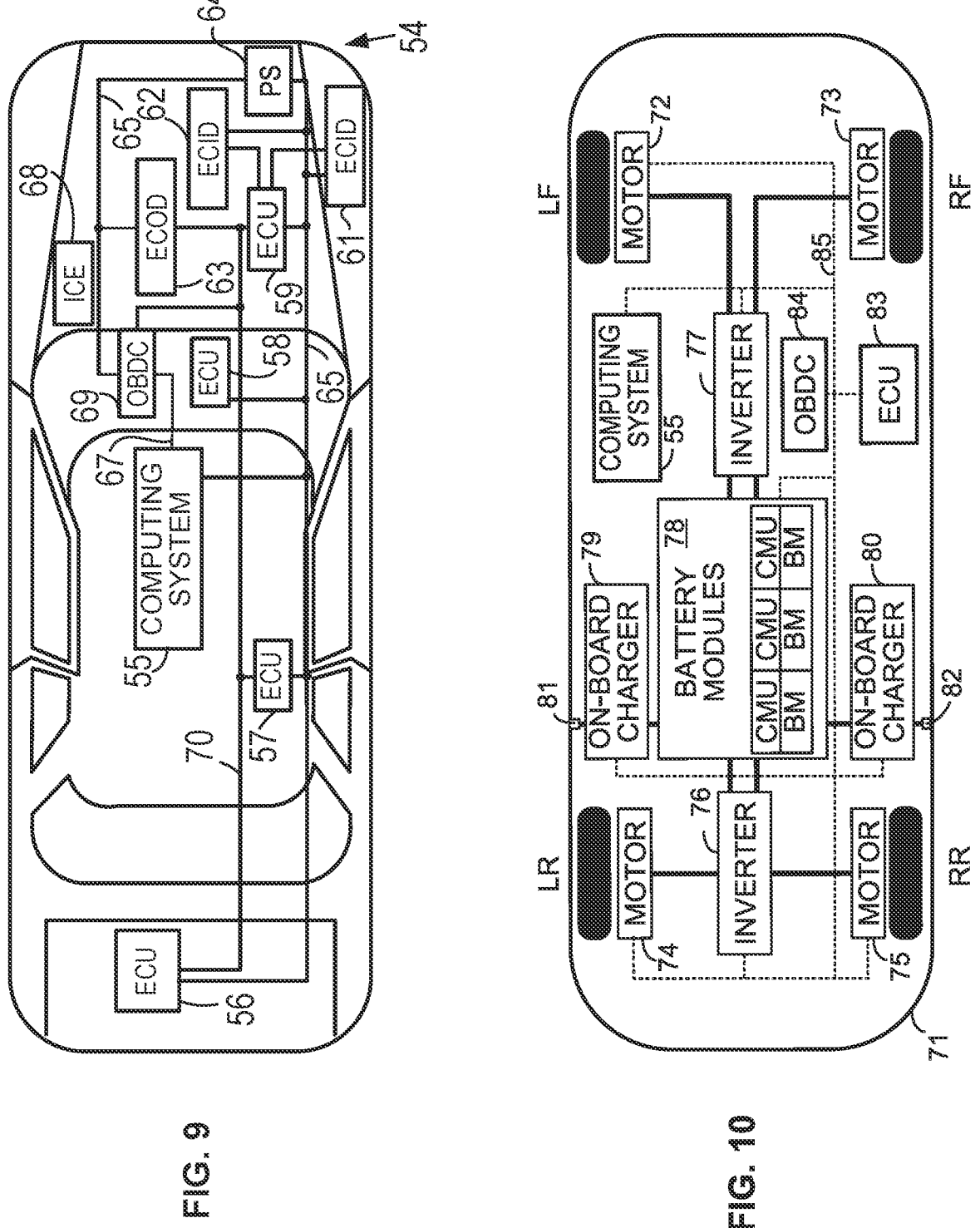

Next, FIG. 9 shows a vehicle 54 (e.g., an automobile having an ECU and an OBDC) in accordance with the example implementations and example placement of a computing system 55 within the vehicle 54. The computing system 55 can include any of the computing system 14, 15, 16, 17, 23, 24, 26, 150. FIG. 9 also shows that the vehicle 54 includes an ECU 56, 57, 58, 59, an OBDC 69, an ECU controlled input device 61, 62, an ECU controlled output device 63, a power supply 64 (such as a battery), a power distribution circuit 65, and an internal combustion engine (ICE) 68. The ECU 56, 57, 58, 59 are shown in FIG. 9 to represent that the ECU 45 shown in FIG. 7 can include multiple ECUs. The ECU 56, 57, 58, 59 are operatively connected to the OBDC 69 via the vehicle network 70 to allow transmission of a VDM between the OBDC 69 and the ECU connected to the vehicle network 70. The ECU 56, 57, 58, 59 can be arranged as one of the example ECU described elsewhere in this description. The vehicle network 70 can include a wired and/or wireless network.

The OBDC 69 can, for example, be located within a passenger compartment of the vehicle 54, within a powertrain compartment (such as an engine compartment) of the vehicle 54, or within a storage compartment within the vehicle 54 in front of or behind the passenger compartment. The computing system 55 is removably attachable to the OBDC 69. The computing system 55 can connect to vehicle network 70 via the OBDC 69. The computing system 55 can include the communication link 67 (e.g., a harness). The computing system 55 is typically removed after the vehicle 54 has been serviced at a repair shop. In that way, the computing system 55 can be used to diagnose other vehicles after those vehicles arrive at the repair shop.

The power distribution circuit 65 can include one or more electrical circuits. For example, the power distribution circuit 65 can include a cable connected to a positive terminal of a battery, a cable connected to a negative terminal of a battery and/or one or more other electrical conductors. FIG. 9 shows the power distribution circuit 65 extending between the power supply 64 and the ECU 56, 57, 58, 59 between the power supply 64 and the OBDC 69, between the power supply 64 and the ECU controlled output device 63, and between the power supply 64 and the ECU controlled input device 61, 62.

The ECU controlled input device 61, 62 is a device that provides a signal to the ECU 59. The signal represents some characteristic of a vehicle the ECU 59 is operable to monitor. As an example, the ECU controlled input device 61, 62 can include one from among: an accelerometer, a camshaft position sensor, a crankshaft position sensor, a current sensor, a fluid level sensor, a fluid pressure sensor, a fluid temperature sensor, a hall effect sensor, an infrared sensor, a knock sensor, a mass air flow sensor, an oil pressure sensor, an oxygen sensor, a photo transistor, a piezoelectric sensor, a position sensor, a pressure sensor, a rain sensor, a refrigerant sensor, a temperature sensor, a thermistor, a throttle position sensor, a tire pressure sensor, a vehicle speed sensor, a voltage sensor, a wheel speed sensor, a yaw rate sensor, or some other type of sensor. An ECU, such as the ECU 59, can generate a PID parameter value based on a signal received from an ECU controlled input device. A computing system can perform a test (e.g., a guided component test on the ECU controlled input device 61, 62).

The ECU controlled output device 63 is a device controlled by the ECU 59. The ECU 59 can control the ECU controlled output device 63 using an output signal. As an example, the ECU controlled output device 63 can include one from among: a fuel injector, a motor, a pump, a relay, solenoid, a transformer, or a valve. Other examples of the ECU controlled output device 63 are also possible. An ECU, such as the ECU 59, can generate a PID parameter value based on a signal the ECU provides to an ECU controlled input device. Moreover, an ECU, such as the ECU 59, can receive a vehicle data message from the computing system 55 requesting the ECU to activate the ECU controlled output device. A computing system can perform a test (e.g., a guided component test) on the ECU controlled output device 63. A computing system can initiate a test (e.g., a functional test) on the ECU controlled output device 63.

A vehicle can include matched components. Matched components can include components that perform similar functions for different portions of the vehicle. In at least some implementations, matched components correspond to different sides of a vehicle, such as left and right sides, or the front and rear sides. In at least some implementations, matched components correspond to different banks of the ICE 68.

As an example, the ECID 61, 62 can be matched components (e.g., matched sensors). For instance, the ECID 61 can be a sensor of a first bank of the ICE 68, the ECID 62 can be a sensor of a second bank of the ICE 68, and the ECID 61, 62 both output a signal corresponding to a similar vehicle characteristic, but for a different portion of the vehicle. Examples of matched sensors and other matched vehicle components are listed in Table B below.

location of the vehicle 71, and a motor 75 at a right rear location of the vehicle 71. The vehicle 71 also includes an inverter 76, 77, an on-board charger 79, 80, a charge port 81, 82, an ECU 83, an on-board diagnostic connector 84, and a vehicle network 85. As an example, the charge port 81 can include an AC voltage charge port and the charge port 82 can include a DC voltage charge port. The vehicle 71 can further include battery modules 78 including multiple battery modules (BM) and multiple cell monitoring units (CMU). The CMU can determine parameters regarding the battery modules, such as a battery voltage, a battery temperature, or a battery internal resistance.

Figure 11:
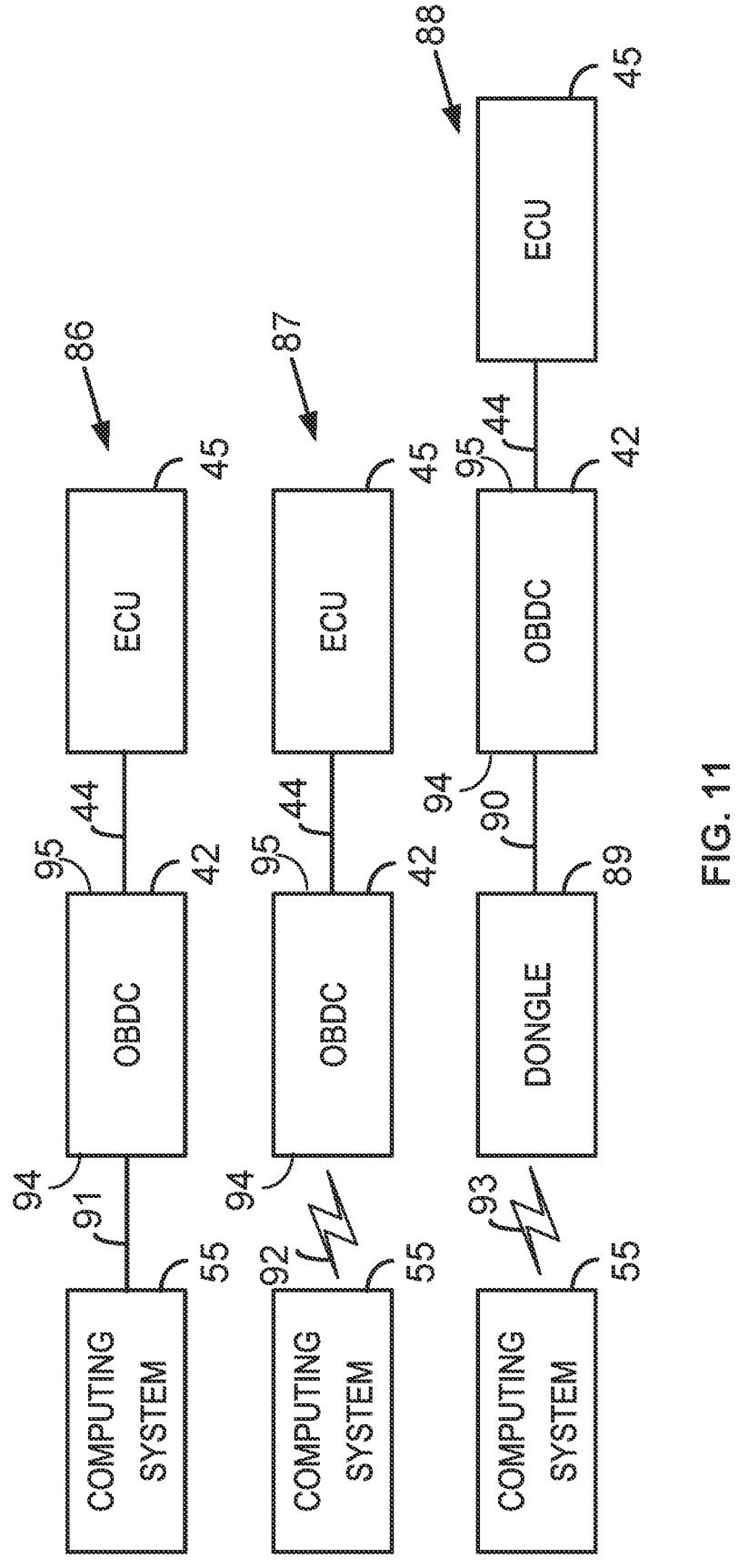
FIG. 11 shows arrangements for connecting a computing system to a vehicle in accordance with an example implementation.

Turning to FIG. 11, an arrangement 86, 87, 88 for operatively connecting the computing system 55 to a vehicle via the vehicle communication network 44 represented in FIG. 7 is shown. In the arrangement 86, 87, 88, the OBDC 42 is operatively connected to the ECU 45 within the vehicle 40 using the vehicle communication network 44. In FIG. 11, the ECU 45 represents one or more ECUs, such as the ECU 56, 57, 58, 59 of the vehicle 54 shown in FIG. 9. In FIG. 11, a service-side 94 and a vehicle-side 95 of the OBDC 42 are shown.

In the arrangement 86, the computing system 55 is directly connected to the OBDC 42 using a wired network 91. As an example, the wired network 91 can be contained within a harness with multiple wires, at least one of which is operable to carry a VDM between the computing system 55 and the OBDC 42. The harness can include a connector removably attachable to the OBDC 42. The wired network 91 can include one or more wires.

In the arrangement 87, the computing system 55 is directly connected to the OBDC 42 using a wireless network 92. The wireless network 92 can include an air interface established to carry a VDM between the computing system 55 and the OBDC 42. The wireless network 92 and the air interface can be configured in accordance with a wireless communication standard or protocol, such as any wireless communication standard or protocol described in this description.

TABLE B

| First matched component | Second matched component |
| --- | --- |
| Mass air flow sensor - Bank-1 | Mass air flow sensor - Bank-2 |
| Charge air pressure sensor - Bank-1 | Charge air pressure sensor - Bank-2 |
| Camshaft position sensor - Bank-1 | Camshaft position sensor - Bank-2 |
| Intake air temperature sensor - Bank-1 | Intake air temperature sensor - Bank-2 |
| Engine coolant temperature sensor - Bank-1 | Engine coolant temperature sensor - Bank-2 |
| O2 sensor (pre-converter) - Bank-1 | O2 sensor (pre-converter) - Bank-2 |
| O2 sensor (post-converter) - Bank-1 | O2 sensor (post-converter) - Bank-2 |
| Intake manifold pressure sensor - Bank-1 | Intake manifold pressure sensor - Bank-2 |
| Ambient air temperature sensor - Bank-1 | Ambient air temperature sensor - Bank-2 |
| Fuel rail pressure sensor - Bank-1 | Fuel rail pressure sensor - Bank-2 |
| Variable valve timing sensor - intake, Bank-1 | Variable valve timing sensor - intake, Bank-2 |
| Variable valve timing sensor-exhaust, Bank-1 | Variable valve timing sensor-exhaust, Bank-2 |
| Seat cooling fan - left side | Seat cooling fan - right side |
| Seat heating grid - left side | Seat heating grid - right side |
| Power window motor - left front window | Power window motor - right front window |

Next, FIG. 10 shows a vehicle 71 and example placement of the computing system 55 within the vehicle 71. A vehicle shown in FIG. 1 to FIG. 6 can be arranged like the vehicle 71. The vehicle 71 is an electrical vehicle. In at least some implementations, the vehicle 71 includes an ICE such that the vehicle 71 is a hybrid vehicle.

As shown in FIG. 10, the vehicle 71 includes a motor 72 at a left front location of the vehicle 71, a motor 73 at a right front location of the vehicle 71, a motor 74 at a left rear In the arrangement 88, the computing system 55 is indirectly connected to the OBDC 42 using a wireless network 93 and a dongle 89. The dongle 89 includes a connector 90 removably attachable to the OBDC 42 and a wireless transceiver and a wired transceiver. The wireless network 93 can include an air interface established to carry a VDM between the computing system 55 and the dongle 89. The wireless network 93 and the air interface can be configured in accordance with a wireless communication standard or protocol, such as any wireless communication standard or protocol described in this description. The wired transceiver of the dongle 89 can receive a VDM transmitted to the OBDC 42 over the vehicle communication network 44 from an ECU and can transmit a VDM onto the vehicle communication network 44 for transmission to an ECU in the vehicle 40. A computing system 150 shown in FIG. 13A can be used in place of the computing system 55 shown in the arrangement 86, 87, 88 within FIG. 11.

IV. Example Systems

A. Server

Figure 12:
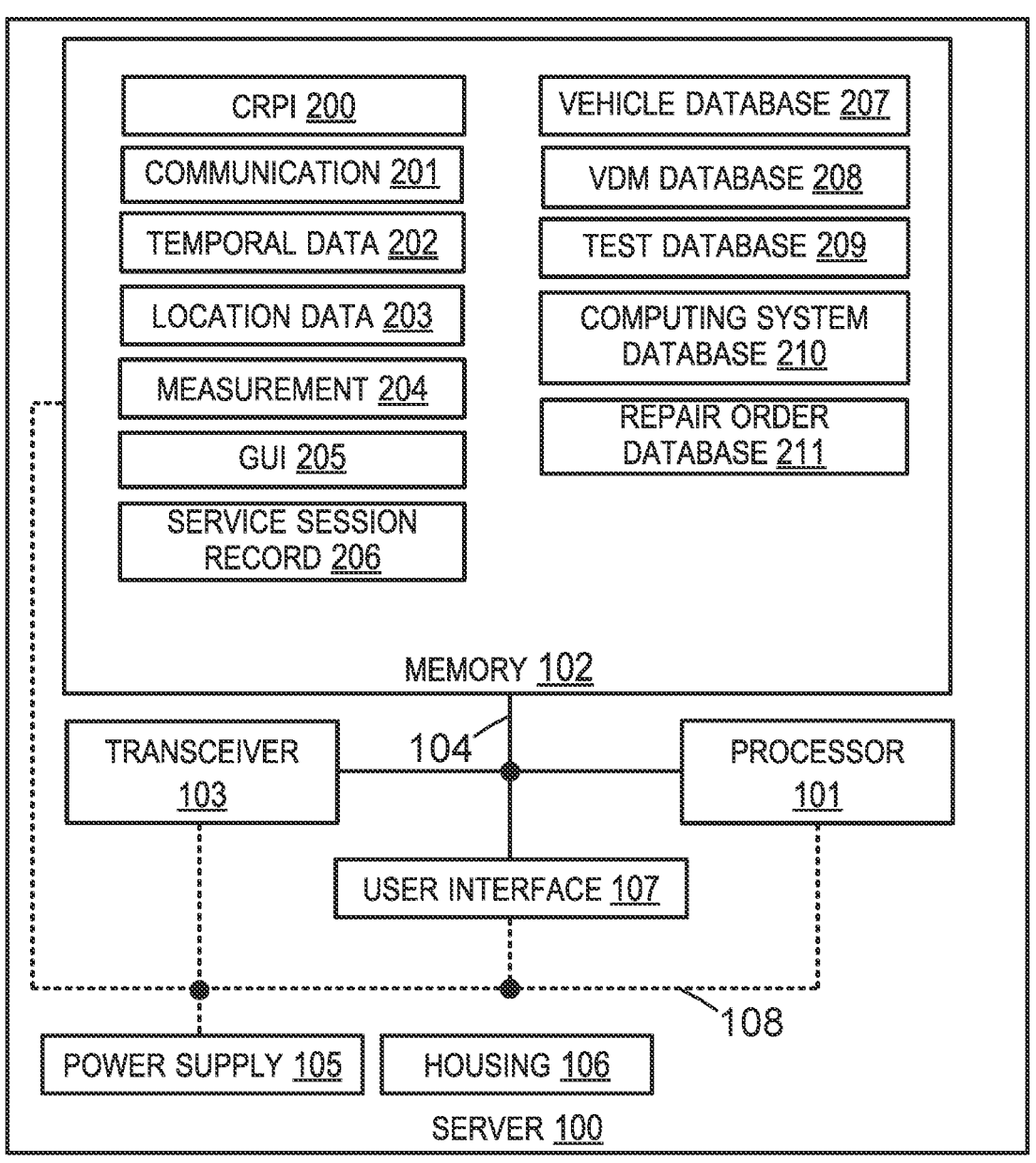
FIG. 12 is a block diagram of a server in accordance with the example implementations.

FIG. 12 is a block diagram of a server 100 in accordance with the example implementations. Other servers described in this description, such as the server 4, 8, can be arranged like the server 100. The server 100 includes one or more from among: a processor 101, a memory 102, a transceiver 103, a data bus 104, or a user interface 107. The data bus 104 operatively connects the processor 101, the memory 102, the transceiver 103, and/or the user interface 107 to one another. In other words, the data bus 104 provides an operative connection between two or more of the processor 101, the memory 102, the transceiver 103, and/or the user interface 107. In at least some implementations, the server 100 also includes one or more from among: a power supply 105, a housing 106, or power circuitry 108.

The operative connection provided by the data bus 104 allows the processor 101 to read data from the memory 102. The operative connection provided by the data bus 104 allows the processor 101 to write data into the memory 102. The operative connection provided by the data bus 104 allows the processor 101 to receive data input using the user interface 107 and to output data to the user interface 107 for outputting by the user interface 107. The operative connection provided by the data bus 104 allows the processor 101 to receive data received by the transceiver 103 and to provide the transceiver 103 with data that is to be transmitted by the transceiver 103.

The housing 106 surrounds at least a portion of one or more from among: the processor 101, the memory 102, the transceiver 103, the data bus 104, the power supply 105, the user interface 107, or the power circuitry 108. The housing 106 can include and/or support a substrate. In at least some example implementations, at least a portion of one or more from among: the processor 101, the memory 102, the transceiver 103, the data bus 104, the power supply 105, the housing 106, the user interface 107, or the power circuitry 108 is/are mounted on and/or connected to the substrate. In at least some implementations, the housing 106 includes a rack and/or cabinet having one or more shelves.

B. Computing System

Figure 13A:
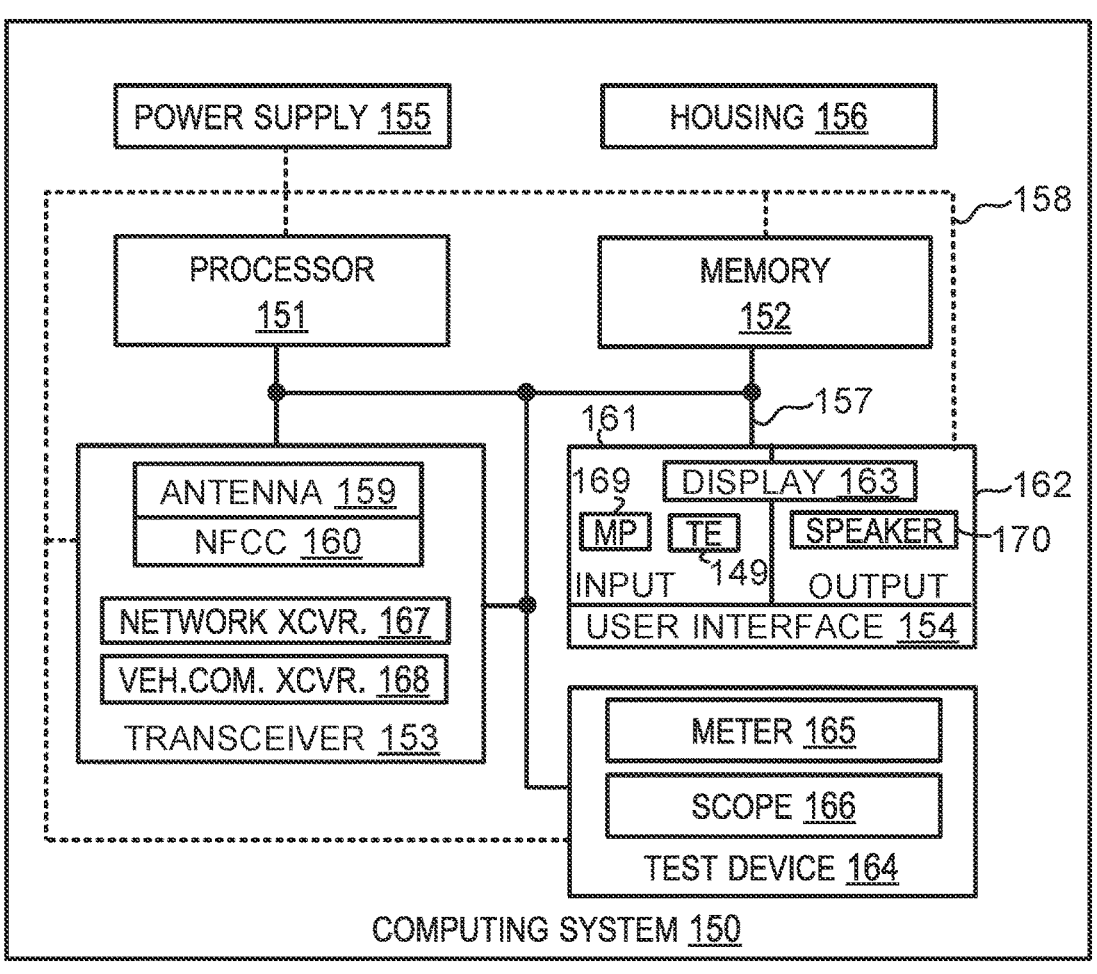
FIG. 13A is a block diagram of a computing system in accordance with the example implementations.

FIG. 13A is a block diagram of a computing system 150 in accordance with the example implementations. Other computing systems described in this description, such as the computing system 14, 15, 16, 17, 23, 24, 26, 55 can be arranged like the computing system 150. The computing system 150 includes one or more from among: a processor 151, a memory 152, a transceiver 153, a user interface 154, a data bus 157, or a test device 164. The data bus 157 operatively connects the processor 151, the memory 152, the transceiver 153, the user interface 154, and/or the test device 164 to one another. In other words, the data bus 157 provides an operative connection between two or more of the processor 151, the memory 152, the transceiver 153, the user interface 154, and/or the test device 164. In at least some implementations, the computing system 150 also includes one or more from among: a power supply 155, a housing 156, or power circuitry 158. The test device 164 can include a meter 165 and/or a scope 166 (i.e., an oscilloscope). As an example, the meter 165 can include a multi-meter, a digital volt-ohm meter, a voltage meter, an ohm meter, or a gas analysis meter, among others.

The operative connection provided by the data bus 157 allows the processor 151 to read data from the memory 152. The operative connection provided by the data bus 157 allows the processor 151 to write data into the memory 152. The operative connection provided by the data bus 157 allows the processor 151 to receive data input using the user interface 154 and to output data to the user interface 154 for outputting by the user interface 154. The operative connection provided by the data bus 157 allows the processor 151 to receive data received by the transceiver 153 and to provide the transceiver 153 with data that is to be transmitted by the transceiver 153. The operative connection provided by the data bus 157 allows the processor 151 to send instructions to set up the test device 164 and to receive a measurement made using the test device 164.

The housing 156 surrounds at least a portion of one or more from among: the processor 151, the memory 152, the transceiver 153, the user interface 154, the power supply 155, the data bus 157, or the power circuitry 158. The housing 156 can include and/or support a substrate. In at least some example implementations, at least a portion of one or more from among: the processor 151, the memory 152, the transceiver 153, the user interface 154, the power supply 155, the data bus 157, or the power circuitry 158 is/are mounted on and/or connected to the substrate.

In at least some implementations, the computing system 150 can include and/or be arranged as a tablet device, such as an IPAD® tablet device from Apple Inc. of Cupertino, California or a SAMSUNG GALAXY TAB tablet device from Samsung Electronics Co., Ltd. of Maetan-Dong, Yeongtong-Gu Suwon-Si, Gyeonggi-Do, Republic of Korea. In accordance with some other implementations, the computing system 150 can include and/or be arranged as a smart-phone (e.g., an IPHONE® smart-phone from Apple Inc., or a GALAXY® smart-phone from Samsung Electronics Co., Ltd.). In accordance with the aforementioned implementations, at least a portion of the computer-readable data stored in the memory can be include computer-readable data downloaded to a transceiver from the APP STORE® online retail store, from the GOOGLE PLAY® online retail store, or another source of the applications or computer-readable data. In accordance with at least some of the aforementioned implementations, the tablet device or smart-phone can be programmed to include one or more applications for executing a CRPI to perform a function described in this description and/or to display a GUI in accordance with the example implementations described in this description.

C. System Components
1. Processor

A processor, such as the processor 101, 151 or any other processor discussed in this description, can include one or more processors. Any processor discussed in this description can thus be referred to as "at least one processor" or "one or more processors." Furthermore, any processor discussed in this description can include a general purpose processor (e.g., an INTEL® single core microprocessor or an INTEL® multicore microprocessor), and/or a special purpose processor (e.g., a digital signal processor, a graphics processor, an embedded processor, or an application specific integrated circuit (ASIC) processor). Furthermore still, any processor discussed in this description can include or be operatively connected to a memory controller that controls a flow of data going to and from a memory, such as the memory 102, 152.

Any processor discussed in this description can be configured to execute computer-readable program instructions (CRPI). Any CRPI discussed in this description can, for example, include assembler instructions, machine instructions, machine dependent instructions, microcode, firmware instructions, state-setting data, and/or either source code or object code written in one or any combination of two or more programming languages. As an example, a programming language can include an object-oriented programming language such as Java, Python, or C++, or a procedural programming language, such as the "C" programming language. Any processor discussed in this description can be configured to execute hard-coded functionality in addition to or as an alternative to software-coded functionality (e.g., via CRPI).

An embedded processor refers to a processor with a dedicated function or functions within a larger electronic, mechanical, pneumatic, and/or hydraulic device, and is contrasted with a general-purpose computer. The embedded processor can include a central processing unit chip used in a system that is not a general-purpose workstation, laptop, or desktop computer. In some implementations, the embedded processor can execute an operating system, such as a real-time operating system (RTOS). As an example, the RTOS can include the SMX® RTOS developed by Micro Digital, Inc., such that the embedded processor can, but need not necessarily, include (a) an advanced RISC (reduced instruction set computer) machine (ARM) processor (e.g., an AT91SAM4E ARM processor provided by the Atmel Corporation, San Jose, California), or (b) a COLDFIRE® processor (e.g., a 52259 processor) provided by NXP Semiconductors N.V., Eindhoven, Netherlands. A general-purpose processor, a special purpose processor, and/or an embedded processor can perform analog signal processing and/or digital signal processing.

2. Memory

A memory, such as the memory 102, 152 or any other memory discussed in this description, can include one or more memories. Any memory discussed in this description can thus be referred to as "at least one memory" or "one or more memories." A memory can include a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a volatile or non-volatile storage component, such as an optical, magnetic, organic or other memory or disc storage component. Additionally or alternatively, a non-transitory memory can include or be configured as a random-access memory (RAM), a read-only memory (ROM), a programmable read-only memory (PROM), an erasable programmable read-only memory (EPROM), a flash memory, an electrically erasable programmable read-only memory (EEPROM), or a compact disk read-only memory (CD-ROM). The RAM can include static RAM or dynamic RAM. A non-transitory memory can be configured as a removable storage device, a non-removable storage device, or a combination thereof. A removable storage and/or a non-removable storage device can, but need not necessarily, include a magnetic disk device such as a flexible disk drive or a hard-disk drive (HDD), an optical disk drive such as a compact disc (CD) drive and/or a digital versatile disk (DVD) drive, a solid state drive (SSD), or a tape drive.

A transitory memory can include, for example, CRPI provided over a communication network, such as the communication network 3.

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable mediums." Any of those alternative terms can be preceded by the prefix "transitory" if the memory is transitory or "non-transitory" if the memory is non-transitory. For a memory including multiple memories, two or more of the multiple memories can be the same type of memory or different types of memories.

3. Transceiver

A transceiver, such as the transceiver 103, 153 or any other transceiver discussed in this description, can include one or more transceivers. Each transceiver includes one or more transmitters configured to transmit data onto a network and/or a data bus within a computing system or server including the transceiver. Each transceiver includes one or more receivers configured to receive data or a communication carried over a network and/or a data bus within a computing system or server including the transceiver. Unless stated differently, any data described as being transmitted to a device or system is considered to be received by that device or system. Similarly, unless stated differently, any data described as being received from a device or system is considered to be transmitted by that device or system directly or indirectly to the receiving device or system. For some implementations, a transceiver can include a transmitter and a receiver in a single semiconductor chip. In at least some of those implementations, the semiconductor chip can include a processor. A transceiver can include a modem to modulate signals to be transmitted by the transceiver and to demodulate signals received at the transceiver.

For purposes of this description and with respect to a particular vehicle (e.g., the vehicle 18, 19, 20, 21, 22, 40, 48, 54, 71), a network can be configured as a vehicle network, a non-vehicle network, or a multi-purpose network. The vehicle network is at least partly on-board the particular vehicle and has an OBDC and one or more electronic controls units interconnected to the OBDC and/or to each other. In at least some implementations, the computing system 150 includes a harness that operatively connects to the OBDC in the particular vehicle and allows the computing system 150 to be disposed outside of the particular vehicle. In those or in other implementations, the computing system 150 is configured to communicate with the OBDC and can be disposed within or outside of the particular vehicle. The non-vehicle network is off-board of the particular vehicle and includes one or more network nodes outside of the particular vehicle. The multi-purpose network is contained at least partly within the particular vehicle and at least partly off-board the particular vehicle. The multi-purpose network can include a vehicle network and a non-vehicle network.

In at least some of the example implementations, a transmitter, such as a transmitter within any transceiver described in this description, transmits radio signals carrying data, and a receiver, such as a receiver within any transceiver described in this description, receives radio signals carrying data. A transceiver with a radio transmitter and radio receiver can include one or more antennas and can be referred to as a "radio transceiver," an "RF transceiver," or a "wireless transceiver." "RF" represents "radio frequency." For purposes of this description, radio signals can include ultrasonic signals and a transceiver can include an ultrasonic transceiver configured to transmit and receive ultrasonic signals.

A radio signal transmitted or received by a radio transceiver can be arranged in accordance with one or more wireless communication standards or protocols such as an IEEE® standard, such as (i) an IEEE® 802.11 standard for wireless local area networks (wireless LAN) (which is sometimes referred to as a WI-FI® standard) (e.g., 802.11a, 802.11b, 802.11g, 802.11n, or 802.11p), (ii) an IEEE® 802.15 standard (e.g., 802.15.1, 802.15.3, 802.15.4 (ZIG-BEE®), or 802.15.5) for wireless personal area networks (PANs), (iii) a BLUETOOTH® version 4.1 or 4.2 standard developed by the Bluetooth Special Interest Group (SIG) of Kirkland, Washington, (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LOWPAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, (xviii) the LoRaWAN communication standard, or a 5G new radio (5G NR) communication standard by the 3rd Generation Partnership Project (3GPP) standards organization, such as the 5G NR, phase 1 or 5G NR, phase 2 communication standard, or an ultra-wideband (UWB) standard, such as a multi-band orthogonal frequency division multiplex UWB standard or an impulse radio UWB standard. Other examples of the wireless communication standards or protocols are possible.

In at least some of the implementations, a transmitter, such as a transmitter within any transceiver described in this description, can be configured to transmit a signal (e.g., one or more signals or one or more electrical waves) carrying or representing data onto an electrical circuit (e.g., one or more electrical circuits). Similarly, a receiver, such as a receiver within any transceiver described in this description, can be configured to receive via an electrical circuit a signal carrying or representing data over the electrical circuit. The electrical circuit can be part of a non-vehicle network, a vehicle network, or a multi-purpose network. The signal carried over an electrical circuit can be arranged in accordance with a wired communication standard such as a Transmission Control Protocol/Internet Protocol (TCP/IP), an IEEE® 802.3 Ethernet communication standard for a LAN, a data over cable service interface specification (DOCSIS standard), such as DOCSIS 3.1, a universal serial bus (USB) specification, a vehicle data message (VDM) protocol, or some other wired communication standard or protocol. Examples of a VDM protocol are listed in Section VI of this description. An electrical circuit can include a wire, a printed circuit on a circuit board, and/or a network cable (e.g., a single wire, a twisted pair of wires, a coaxial cable, a wiring harness, a power line, a printed circuit, a CAT5 cable, and/or CAT6 cable). The wire can be referred to as a "conductor". An electrical circuit provides for transmission of data electrically. An optical circuit, such as a fiber optic cable, provides for transmission of data optically.

In accordance with at least some implementations, a transceiver includes a network transceiver and/or a vehicle communication transceiver. As an example, the transceiver 153 includes a network transceiver 167 and a vehicle communication transceiver 168. A network transceiver (e.g., the network transceiver 167) is configured to communicate over a non-vehicle network and/or a multi-purpose network. A vehicle communication transceiver (e.g., the vehicle communication transceiver 168) is configured to communicate over a vehicle network and/or a multi-purpose network. The vehicle communication transceiver 168 can transmit a VDM and receive a VDM. The vehicle communication transceiver 168 can be configured to transmit or receive a VDM electronically, electromagnetically, or optically. As an example, the vehicle communication transceiver 168 can transmit a VDM by connecting to an OBDC and modulating content of the VDM directly onto the vehicle bus or modulating content of the VDM to a dongle connected to an OBDC.

In accordance with at least some implementations, the network transceiver includes a modem, a network interface card, a local area network (LAN) on motherboard (LOM), and/or a chip mountable on a circuit board. As an example, the chip can include a CC3100 Wi-Fi® network processor available from Texas Instruments, Dallas, Texas, a CC256MODx Bluetooth® Host Controller Interface (HCI) module available from Texas instruments, or a different chip for communicating via Wi-Fi®, Bluetooth® or another communication protocol.

A network node that is within and/or coupled to a non-vehicle network and/or that communicates via a non-vehicle network or a multi-purpose network using a packet-switched technology can be locally configured for a next 'hop' in the network (e.g., a device or address where to send data to, and where to expect data from). As an example, a device (e.g., a transceiver) configured for communicating using an IEEE® 802.11 standard can be configured with a network name, a network security type, and a password. Some devices auto-negotiate this information through a discovery mechanism (e.g., a cellular phone technology).

In accordance with at least some implementations, the network transceiver includes a global navigation satellite system (GNSS) receiver configured receive signals from satellites of a GNSS, such as the global positioning system (GPS), the BeiDou system, the Galileo system, or some other GNSS. A processor connected to the GNSS receiver can use data received at the GNSS receiver to determine a position of the server or computing system including the GNSS receiver.

The network transceiver can be arranged to transmit a request and/or receive a response using a transfer protocol, such a hypertext transfer protocol (i.e., HTTP), an HTTP over a secure socket link (SSL) or transport layer security (TLS) (i.e., HTTPS), a file transfer protocol (i.e., FTP), or a simple mail transfer protocol (SMTP). The network transceiver can be arranged to transmit an SMS message using a short message peer-to-peer protocol or using some other protocol.

The data transmitted by a transceiver can include a destination identifier or address of a computing system, server, vehicle or other component to which the data is to be transmitted. The data or communication transmitted by the transceiver can include a source identifier or address of the computing system or server including the transceiver. The source identifier or address can be used to send a response to the computing system or server including the transceiver. This data can include a GUI, content within a GUI, a VDM or other data instead or as well. An identifier or address discussed in this paragraph can be contained in a communication transmitted by the server 100, the computing system 150 and/or a communication shown in the drawings, such as a communication shown in FIG. 44, FIG. 45, FIG. 47, or FIG. 49 to FIG. 58.

As noted above, a radio signal transmitted or received by a radio transceiver can be arranged in accordance with a standard for Near Field Communication (NFC). In accordance with such implementations, the radio transceiver can include an antenna and an NFC controller. As shown in FIG. 13A, the transceiver 153 can include an antenna 159 and an NFC controller 160. In at least some implementations, the antenna 159 and NFC controller 160 are arranged as an NFC tag (e.g., an active NFC tag or a passive NFC tag).

In accordance with at least some implementations, the antenna 159 can include an antenna coil and the NFC controller 160 can include an integrated circuit, such as a dynamic NFC/RFID tag IC. STMicroelectronics NV of Geneva, Switzerland produces such integrated circuits knows as ST25DV04K, ST25DV16K, or ST25DV64K with a 4K, 16K, or 64K EEPROM, respectively, and fast transfer mode capability, and known as ST25DV04KC, ST25DV16KC, or ST25DV64KC with a 4K, 16K, or 64K EEPROM, respectively, and fast transfer mode capability and optimized I²C. In accordance with these implementations, the data bus 157 connecting the NFC controller 160 and the processor 151 can include an inter-integrated circuit (I²C) data bus and the processor 151 can include an I²C host.

In accordance with at least some other implementations, the antenna at a computing system is contained within the near field communication controller or is connected to the near field communication controller. As an example, the near field communication controller can include a PN7160 NFC controller available from NXP B.V., Eindhoven, Netherlands. As another example, the near field communication controller can include a BCM20793S NFC controller available from Broadcom Corporation, Irvine California. Other examples of the near field communication controller are also possible.

4. User Interface

A user interface, such as the user interface 107, 154 or any other user interface discussed in this description, can include a user interface input component and a user interface output component. The user interface output component includes a display. In at least some implementations, a user interface includes a touch screen display configured to operate as a user interface input component to allow entry of data and as a user interface output component to display content visually.

The user interface 154 includes a user interface input component 161 and a user interface output component 162. The user interface 107 can include a similar user interface input component and a similar user interface output component.

The user interface input component 161 can include one or more from among: a text entry component 149, a microphone 169, or a display 163. The text entry component 149 can include one or more from among: a keypad, a keyboard, buttons, or a computer mouse.

The user interface output component 162 can include one or more from among: a speaker 170 or the display 163. The display 163 can include a touch screen display configured for inputting data (e.g., text characters and/or selections of a user-selectable control) and for displaying content (such as a GUI) visually. In addition to or as an alternative of the user interface 154 including the display 163, the user interface output component 162 can include one or more LEDs that the processor 151 can control to output signals indicative of a status of a service activity or a service session record.

A display of a user interface can include one or more displays. As an example, each display of the one or more displays includes a capacitive touch screen display, a resistive touch screen display, a plasma display, a light emitting diode (LED) display, a cathode ray tube display, an organic light-emitting diode (OLED) display (such as an active-matrix OLED or a passive-matrix OLED), a liquid crystal display (LCD) (such as include a backlit, color LCD), a touch screen display with the LCD, a capacitive touch screen display, or a resistive touch screen display.

In at least some implementations, the display 163 is affixed (e.g., removably affixed) to a substrate of the housing 156. In those or in other implementations, the display 163 is on and/or within a wearable device, such as a pair of glasses or goggles, a head-mountable display, or a wrist display, such as a smartwatch.

A display, such as the display 163 or any other display described in this description, can display a GUI, such as any GUI described in this description or shown in the drawings. The display can also display one or more from among: a still image (such as a visible light image, a thermal image, and/or a blended image based on a visible light image and a thermal image), a video, a text file (such as a text file with a PDF file extension or an XML file extension), a hypertext markup language file, a web page (such as a web page including a search bar, and/or a cursor. In at least some implementations, the display is configured to display a horizontal scroll bar and/or a vertical scroll bar. The horizontal scroll bar and the vertical scroll bar can be used to cause the display to display content not currently displayed on the display 163. A web page displayable on the display can include any content shown in or described with respect to any one or more of FIG. 22 to FIG. 41. Other examples of content displayable on a display of the example implementations are also possible.

In the implementations that include the speaker 170, the speaker 170 includes one or more speakers configured to convert electrical signals to audible sounds. In at least some implementations, the speaker 170 includes wired headphones and/or wireless headphones. The wired headphones can connect to an audio plug operatively connectable to an audio jack. The wireless headphones can include in-ear headphones, such as the AIRPODS PRO® in-ear headphones by Apple Inc.

5. Additional Components

A power supply, such as the power supply 105, 155 or any other power supply discussed in this description, can be arranged in any of a variety of configurations. As an example, the power supply can be configured to include circuitry to receive AC current from an AC electrical supply (e.g., electrical circuits operatively connected to an electrical wall outlet) and convert the AC current to a DC current for supplying to one or more of the components connected to the power supply. As another example, the power supply can be configured to include a battery or be battery operated. As yet another example, the power supply can be configured to include a solar cell or be solar operated. Moreover, a power supply can be configured to include power circuitry to distribute electrical current throughout the device or system including that power supply. Other examples of a power supply are also possible.

In at least some implementations, the server 100 includes the housing 106 and/or the computing system 150 includes the housing 156. The housing 106 surrounds at least a portion of the following: the processor 101, the memory 102, the transceiver 103, the data bus 104, the power supply 105, the user interface 107, or the power circuitry 108. The housing 106 can support a substrate. In at least some implementations, at least a portion of the processor 101, the memory 102, the transceiver 103, the data bus 104, the power supply 105, the user interface 107, or the power circuitry 108 is/are mounted on and/or connected to a substrate of the housing 106.

Similarly, the housing 156 surrounds at least a portion of the following: the processor 151, the memory 152, the transceiver 153, the user interface 154, the power supply 155, the data bus 157, or the power circuitry 158. The housing 106, 156 can be made from various materials. For example, the housing 106, 156 can be made from a plastic material (e.g., acrylonitrile butadiene styrene (ABS)) and a thermoplastic elastomer used to form a grip on the housing 106, 156. The housing 156 can support a substrate. In at least some implementations, at least a portion of the processor 151, the memory 152, the transceiver 153, the data bus 157, the power supply 155, the user interface 154, or the power circuitry 158 is/are mounted on and/or connected to a substrate of the housing 156.

6. Memory Content

Figure 13B:
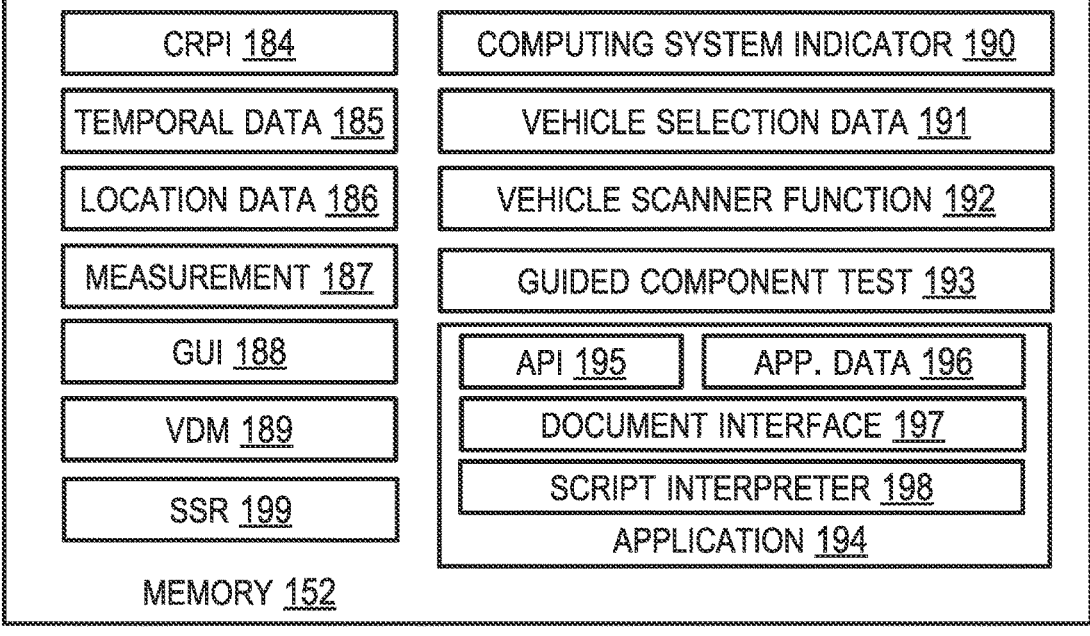
FIG. 13B shows example data stored in a memory of the computing system shown in FIG. 13A in accordance with the example implementations.

The example implementations (e.g., the server 100, the computing system 150 or other example implementation) can determine, generate, store, and/or use a variety of computer-readable data. At least some of the computer-readable data can be stored in a memory, such as the memory 102, 152. FIG. 12 shows example data that can be stored in the memory 102. Similarly, FIG. 13B shows example data that can be stored in the memory 152.

a) Server Memory

As shown in FIG. 12, the memory 102 can include one or more from among: computer-readable programmable instructions (CRPI) 200, communication 201, temporal data 202, location data 203, a measurement 204, a GUI 205, a service session record 206, a vehicle database 207, a VDM database 208, a test database 209, a computing system database 210, or a repair order (RO) database 211. The data within the memory 102 can include data written into the memory 102 by the processor 101 or by a different processor, such as a processor where the memory 102 and/or the computing system 150 is manufactured. The data written into the memory 102 can include one or more of the following types of data: data generated by the processor 101, data input via the user interface 107, or data received by the transceiver 103.

As an example, the CRPI 200 can include program instructions executable by the processor 101 to perform a method including one or more functions of the set 330 shown in FIG. 21. As another example, the CRPI 200 can include program instructions executable by the processor 151 to perform a method including one or more functions of one or more the set 300, the set 310, the set 320, or the set 330. As yet another example, the CRPI 200 can include program instructions executable by the processor 101 to perform any function described as being performed by a component of the server 100, to write data into the memory 102, or to read data stored in the memory 102.

The communication 201 includes one or more communications and/or data contained in one or more communications. The one or more communications of the communication 201 can include one or more communications received at the transceiver 103. As an example, the communication 201 can include a communication including a request to initiate a service session record corresponding to a vehicle. As another example, the communication 201 can include a communication including an input for modifying a service session record. As yet another example, the communication 201 can include a communication 212, 218, 250, 270, 280, 445, 460, 475, 490, 505, 530, 540, or 550 shown in FIG. 44, FIG. 45, FIG. 47, FIG. 49 to FIG. 58.

As another example, the communication 201 can include one or more communications provided to the transceiver 103 from the processor 101 for transmission away from the server 100. As an example, the communication 201 provided to the transceiver 103 can include a communication including a GUI to be output on the display 163, content for populating with a GUI to be output on the display 163, a GUI file, a service session record, or some other content stored within the memory 102.

The temporal data 202 can include temporal data indicative of a time of day and/or a calendar date. The temporal data 202 can include temporal data generated by a clock within the server 100 (e.g., within or connected to the server 100). The temporal data 202 can include temporal data received via a communication transmitted to the server 100, such as a communication from the computing system 150.

The temporal data 202 can include a time range. As an example, the time range can include a time range defined by a first time and a second time later than the first time. The first time can include a time indicative of when a service activity of a service session began. The second time can include a current time if the service activity is on-going, a pause time if the service activity is paused or a completion time if the service activity has been completed. The processor 101 can use temporal data corresponding to a service activity for ordering the service activity of a particular service session record with respect to other service activit(ies) of the particular service session record. The temporal data corresponding to a service activity of a particular service session record can be stored within the service session record 206 as part of the particular service session record.

The location data 203 can include location data corresponding to one or more locations of one or more computing systems (such as the locations of one or more computing systems shown in FIG. 1 to FIG. 6 or FIG. 13A). As an example, the location data 203 can include a current location and one or more prior locations of the computing system 150. A location corresponding to a computing system performing a service activity of a particular service session record can be stored within the service session record 206 as part of the particular service session record. The location corresponding to a computing system performing a service activity can be reported to the server 100 as part of an input to modify the particular service session record. An input to modify a service session record can be contained within one or more fields of a communication. The location data 203 can include location data corresponding to a location of something other than the computing system 150, such as a vehicle. The location data 203 can include GPS data indicative of a latitude and longitude corresponding to where the computing system 150 or the vehicle was or is currently located. The location data 203 can be associated with a time at which the computing system 150 or the vehicle was at a location. The location data 203 corresponding to a previous location of the computing system 150 or vehicle can be identical to a current location of the computing system 150 or vehicle except that the time associated with the previous location is indicative of a time in the past.

The measurement 204 can include one or more measurements. As an example, the measurement 204 can include a measurement received in a communication from the computing system 150. The measurement in that communication can be at least part of an input for modifying a service session record. The measurement in that communication can include a measurement made by and/or by using the test device 164, the meter 165, and/or the scope 166. Alternatively, the measurement in that communication can include a measurement based on content of a vehicle data message output by a vehicle. As an example, the vehicle data message can include a PID and corresponding parameter value indicative of the measurement, such as a voltage or pressure measurement.

In at least some implementations, a communication that includes a measurement based on content of a vehicle data message output by a vehicle can include a communication transmitted by the vehicle (such as a communication transmitted by a telematics system within the vehicle). A measurement corresponding to a service activity of a particular service session record can be stored within the service session record 206 as part of the particular service session record. The processor 101 can use a vehicle identifier in the communication from the vehicle to determine which service session record the measurement is to be added.

The GUI 205 includes one or more GUIs and/or content for populating one or more GUIs. As an example, a GUI or data for populating within a GUI can include a service session record. The GUI 205 can include temporal data corresponding to multiple event summaries of a service session record so that the processor 101 can arrange the multiple event summaries within a GUI chronologically. The temporal data can also be used for filtering the multiple event summaries to omit one or more event summaries for service activities that were carried out during a time outside of a particular time range. As another example, the GUI 205 can include the GUI 171, 172, 173, 174, 349, 350, 351, 352, 387, 390, 421, 428, 433, 444 or content of that GUI. In at least some implementations, communications including temporal data for multiple event summaries can be sent to the server 100 after the computing system 150 reestablishes a connection to the communication network 3 after having lost connection to the communication network 3.

The service session record 206 can include one or more service session records. Each service session record includes data regarding a service session. The service session can include a service session that has just been initiated, a service session that is ongoing (e.g., paused or unpaused), or a service session that is already completed. In at least some implementations, a service session record corresponds to a service session that was completed and then re-opened. As an example, a service session record can be arranged as a computer-readable file, such as an XML file, a JSON file, a PDF file, or a comma separated variable (CSV) file. As another example, a service session record can be arranged as a record within a database file, such as a database file having a DB extension, an MDB extension (for a MICROSOFT ACCESS® database file), an SQL extension (for Structured Query Language database file), or some other extension.

In an implementation in which the service session record 206 includes multiple service session records, the service session record 206 can include multiple service session records for one or more repair shops. In at least some implementations, a computing system at a first repair shop can access a service session record for a service session that was performed or is being performed at a second repair shop. In accordance with those implementations, the first and second repair shops can be affiliated with one another (e.g., two repair shops owned by a single owner, or two repair shops that are franchises of a common franchisor). In accordance with at least some implementations, a computing system outside of a repair shop can access a service session record from the server 100.

A service session record within the service session record 206 can include the data of any service session record described in this description. As an example, a service session record within the service session record 206 can include one or more from among: a state indicator (e.g., a status indicator), a timeline, an identifier of the service session record, a vehicle identifier, a measurement, or a vehicle data message.

The vehicle database 207 includes data regarding multiple types of vehicles. As an example, the vehicle database 207 includes data regarding vehicles corresponding to different vehicle identifiers, such as different YMM, YMME, or YMMEF. As an example, the vehicle database 207 can include multiple VINs or portions of multiple VINs. A serial number portion of a VIN is omitted in some implementations.

The vehicle database 207 can include one or more vehicle identifiers corresponding to each type of vehicle. As an example, the vehicle identifiers for a particular type of vehicle can include a VIN, a YMM, a YMME, and a YMMEF. Including multiple vehicle identifiers for a particular type of vehicle allows the processor 101 to determine whether multiple vehicles connected to different computing systems are a particular type of vehicle even if the different computing systems are configured to provide the server 100 with different forms of vehicle identifiers for the particular type of vehicle.

The vehicle database 207 can also include component identifier(s), system identifier(s), and/or symptom identifier(s) that correspond to each type of vehicle identified in the vehicle database 207. The processor 101 can use the component identifier(s), system identifier(s), and/or symptom identifier(s) that correspond to particular type of vehicle to determine a test for the particular type of vehicle from within the test database 209.

The VDM database 208 includes data for determining what VDM is to be sent to a computing system. As an example, the VDM database 208 can include data indicating what VDM protocol is to be used to generate and transmit a VDM to a particular vehicle and/or a particular ECU within a vehicle. As another example, the VDM database 208 can include data indicating content of a VDM to be sent to a computing system. Table C below shows example content of a VDM message including a request for PID parameter values. As another example, the VDM database 208 includes data for determining the content of a VDM for populating into a service session record.

The test database 209 includes identifiers of tests and/or settings of the tests for a vehicle operatively coupled to a vehicle. As example, the test identifiers can include identifiers of a functional test or a guided component test. The functional test can be an information test, a toggle test, a variable control test, or a reset test. The guided component test can include a test configured to be performed by the test device 164.

The computing system database 210 includes data regarding one or more computing systems. As an example, the computing system database 210 can include data regarding the computing system 14, 15, 16, 17, 23, 24, 26, 55, 150. As an example, the data regarding a computing system within the computing system database 210 can include one or more from among: a model identifier of the computing system, a serial identifier of the computing system, a technician identifier corresponding to a user and/or owner of the computing system, a user identifier corresponding to an owner and/or current user of the computing system, or a computing system indicator, such as a shop identifier or a network address (e.g., an internet-protocol (IP) address).

The processor 101 can use data within the computing system database 210 to determine how to communicate with a computing system (e.g., what network address to add as a destination identifier into a communication to be sent by the transceiver 103). The processor 101 can use data within the computing system database 210 to determine capabilities of the computing system so that the processor 101 can determine from within the test database 209 a test the computing system can perform and/or request. The determined test can be further based on a component identifier, system identifier, and/or symptom identifier associated with a vehicle type associated with the vehicle.

The processor 101 can write data regarding a new computing system into the computing system database 210 in response to a request to register the new computing system for associating with a service session record and/or a service activity corresponding to use of the new computing system.

The repair order database 211 can include one or more repair orders (ROs). In at least some implementations, the server 100 generates the repair orders. The RO database 211 can include one or more ROs that correspond to a single, particular vehicle. As an example, the RO database 211 can include multiple ROs for the particular vehicle. In one case, all of the multiple ROs for the particular vehicle are historical ROs regarding the particular vehicle. In another case, all but one of the multiple ROs for the particular vehicle are historical ROs regarding the particular vehicle and one RO is a current RO. Other cases are possible. A historical RO can include an RO that pertains to a past instance of servicing the particular vehicle and/or a closed SSR. A current RO can include an RO that pertains to a current instance of servicing the vehicle and/or an open, dispatched or paused SSR. The RO database 211 can also include one or more ROs for different vehicles.

The processor 101 can determine an RO corresponds to a service session, The processor 101 can read the RO to determine data corresponding to the service session. The processor 101 can augment a service session record with data read from an RO in the RO database 211.

An RO can include various types of data. The type of data on the RO can depend on various factors, such as a status of servicing a vehicle represented on the RO, the type of repair shop servicing the vehicle, the type of vehicle, or some other factors. In any event, an RO for a vehicle typically includes one or more of the following types of RO data: a repair shop identifier, an RO number, a customer identifier, a vehicle service request, a complaint, a cause of the complaint, a correction of the complaint, a labor operation code, a part number, a part cost, a mileage or kilometer reading, or a vehicle identifier (e.g., a VIN).

b) Computing System Memory

As shown in FIG. 13B, the memory 152 can include one or more from among: CRPI 184, temporal data 185, location data 186, a measurement 187, a GUI 188, a VDM 189, a computing system indicator 190, vehicle selection data 191, vehicle scanner function 192, a guided component test 193, an application 194, or a service session record (SSR) 199. The data within the memory 152 can include data written into the memory 152 by the processor 151 or by a different processor, such as a processor where the memory 152 and/or the computing system 150 is manufactured. The data written into the memory 152 can include one or more of the following types of data: data generated by the processor 151, data generated by the test device, data input via the user interface 154, or data received by the transceiver 153.

As an example, the CRPI 184 can include program instructions executable by the processor 151 to perform a method including one or more functions of the set 300 shown in FIG. 18. As another example, the CRPI 184 can include program instructions executable by the processor 151 to perform a method including one or more functions of the set 310 shown in FIG. 19. As yet another example, the CRPI 184 can include program instructions executable by the processor 151 to perform a method including one or more functions of the set 320 shown in FIG. 20. As still yet another example, the CRPI 184 can include program instructions executable by the processor 151 to perform a method including one or more functions of the set 330 shown in FIG. 21. As still further another example, the CRPI 184 can include program instructions executable by the processor 151 to perform a method including one or more functions of one or more of the set 300, the set 310, the set 320, or the set 330. As yet another example, the CRPI 184 can include program instructions executable by the processor 151 to perform any function described as being performed by a component of the computing system 150, to write data into the memory 152, or to read data stored in the memory 152. A portion of the CRPI 184 can be arranged as an operating system. Another portion of the CRPI 184 can be arranged as an application of the application 194.

The temporal data 185 can include temporal data indicative of a time of day and/or a calendar date. As an example, the temporal data 185 can include temporal data generated by a clock within the computing system 150 (e.g., a clock within or connected to the processor 151). As another example, the temporal data 185 can include temporal data received within a communication received from the communication network 3, such as a communication including data indicating a time tracked by the communication network 3 or a communication from a different computing system. As yet another example, the temporal data 185 can include temporal data determined by the processor 151 based on signals received at a GNSS receiver of the transceiver 153.

The temporal data 185 can include a time range. As an example, the time range can include a time range defined by a first time and a second time later than the first time. The first time can include a time indicative of when a service activity of a service session record began. The second time can include a current time if the service activity is on-going, a pause time if the service activity is paused or a completion time if the service activity has been completed.

Temporal data within the temporal data 185 can be transmitted to the server 100 for generating or modifying a timeline and ordering an event summary among other event summaries of the timeline based on temporal data associated with each event summary. For an event summary summarizing multiple activities of a vehicle service session, a time associated with each activity can be used to order each activity summary within the event summary. A communication shown in communication shown in FIG. 44, FIG. 45, FIG. 47, or FIG. 49 to FIG. 58 can include one or more fields containing temporal data.

The location data 186 can include location data corresponding to a current location of the computing system 150. The location data can include location data indicative of a latitude and longitude where the computing system 150 is currently located. In at least some implementations, the location data 186 includes location data determined by the processor 151 based on signals received at a GNSS receiver of the transceiver 153.

Additionally or alternatively, the location data 186 can include location data corresponding to a previous location of the computing system 150. The location data can be associated with a time at which the computing system 150 was at a location. The location data corresponding to a previous location of the computing system 150 can be identical to a current location of the computing system except that the time associated with the previous location is indicative of a time in past. The location data 186 can include location data corresponding to a location of something other than the computing system 150, such as a vehicle or a second computing system other than the computing system 150. The processor 151 can associate a location within the location data 186 with an event summary and/or activity of a time-line. Additionally or alternatively, the computing system 150 can transmit a location stored in the location data 186 to the server 4, 8, 100 so that the server 4, 8, 100 can associate the location with an event summary and/or activity of a timeline.

In at least some embodiments, the processor 151 can determine that the computing system 150 is operatively connected to a vehicle. As an example, the processor 151 can determine the operative connection by receiving electrical power from the vehicle via an OBDC in the vehicle or receiving a vehicle data message from the vehicle. The vehicle data message can include a vehicle identifier. The processor 151 can also determine the computing system 150 is within proximity to the repair shop 6 (e.g., with the geo-fence 32, 33) and then report to the server 4 that the vehicle is within geo-fence 32, 33. In accordance with that example, the processor 151 associates the location of the computing system 150 to the location of the vehicle.

The measurement 187 can include one or more measurements. As an example, the measurement 187 can include a measurement made by and/or by using the test device 164, the meter 165, and/or the scope 166. As another example, the measurement 187 can include a measurement received at the transceiver 153. The measurement received at the transceiver 153 can include a measurement transmitted to the transceiver 153 from another computing system using a personal area network using an NFC communication standard, a BLUETOOTH® communication standard or some other communication standard. A measurement stored in the measurement 187 can be made while performing a service activity of a service session. A measurement stored in the measurement 187 can be transmitted to the server 4, 8, 100 for including within a timeline (e.g., as part of an event summary or as a detail of the event summarized by the event summary). A communication shown in communication shown in FIG. 44, FIG. 45, FIG. 47, or FIG. 49 to FIG. 58 can include one or more fields containing a measurement.

The GUI 188 includes one or more GUIs displayable on the display 163. The GUI 188 can include any GUI shown in the drawings or a GUI including any content shown in the drawings and/or configured like a GUI shown in the drawings. The GUI 188 can include a GUI received by the transceiver 153 from the server 4, 8, 100. As an example, the GUI 188 can include an html file received from the server. The GUI 188 can include a template that the processor 151 populates with data to generate a GUI displayable on the display 163.

The VDM 189 includes one or more vehicle data messages. A VDM within the VDM 189 can include a VDM received by the vehicle communication transceiver 168. A VDM within the VDM 189 can include a VDM that is to be or has been transmitted by the vehicle communication transceiver 168. The VDM can include a message map for decoding a VDM received by the vehicle communication transceiver 168 and/or for encoding a VDM that is to be transmitted by the vehicle communication transceiver 168. The message map can include a formula for converting one or more fields of a VDM to a value represented by the one or more fields. As an example, the fields can represent an engine RPM or an engine coolant temperature.

The computing system indicator 190 can include one or more indicators corresponding to the computing system 150. As an example, the computing system indicator 190 can include a model number of the computing system 150. The model number can be indicative of a particular type of computing system. As another example, the computing system indicator 190 can include a serial number of the computing system 150. The serial number can be indicative of a particular one of the particular type of computing system. As another example, the computing system indicator 190 can include a user identifier that identifies, for example, an owner and/or a current user of the computing system 150. As another example, the computing system indicator 190 can include a shop identifier that identifies a repair shop (e.g., the repair shop 6) that owns the computing system 150. As another example, the computing system indicator 190 can include a network address (e.g., an IP address assigned for use by the computing system 150) or a name that identifies the computing system for pairing in a personal area network. A communication shown in communication shown in FIG. 44, FIG. 45, FIG. 47, or FIG. 49 to FIG. 58 can include one or more fields containing a computing system indicator. The server 100 can use the computing system indicator to include within an event summary of a timeline.

The vehicle selection data 191 can include one or more vehicle selection menus. The processor 151 can output a vehicle selection menu on the display 163 to allow a user to select a type of vehicle or a particular vehicle. The vehicle selection data 191 can also include data that represents relationships between vehicle model years and the types of vehicles that were built for and/or during each model year. For instance, for a given model year, the vehicle selection data 191 can include data that indicates all vehicle makes that include at least one type of vehicle for the given model year, and for each of those vehicle makes, the vehicle selection data 191 can include data that indicates all vehicle models that correspond to one of the vehicle makes that built at least one type of vehicle for the given model year. The processor 151 can generate a vehicle selection menu based on the other data within the vehicle selection data 191. The vehicle selection menu can be displayed on the display 163. A communication shown in communication shown in FIG. 44, FIG. 45, FIG. 47, or FIG. 49 to FIG. 58 can include one or more fields containing a vehicle identifier based on selections made using the vehicle selection menu.

The vehicle scanner function 192 includes executable instructions and/or data to cause the computing system 150 to perform a function that includes the computing system 150 transmitting a VDM to a vehicle and/or receiving a VDM from the vehicle. As an example, the vehicle scanner function 192 includes executable instructions and/or data to cause the vehicle communication transceiver 168 to transmit a VDM to the vehicle and/or to receive a VDM from the vehicle. In at least some implementations, a VDM received from the vehicle can include data indicative of a type of vehicle and/or a particular vehicle. In those or in other implementations, a VDM received from the vehicle can include data indicative of a DTC set in the vehicle.

In at least some implementations, a VDM transmitted to a vehicle by the computing system 150 includes a PID, and a VDM transmitted to the computing system 150 from the vehicle in response includes a parameter value corresponding to the PID. That response VDM can include the PID or an identifier representative of the PID.

Table C shows an example of a request and response message including a PID according to an example vehicle data protocol referred to as a controller area network protocol. In this example, the node identifier is an eleven-bit identifier written as an octal and two hexadecimal numbers, and the remaining data bytes (DB) are written as hexadecimal. For instance, the PID $4D equates to PID 77 (in decimal format) for engine speed. To determine an engine speed measurement, a status of a service activity, an event detail, or otherwise, the hexadecimal parameter values $3C90 can be converted to decimal and then divided by four to arrive at an engine speed of 3,876 revolutions per minute. The node identifier can indicate which device sent the vehicle data message. The number of additional data bytes used indicates how many subsequent data bytes in the VDM includes data to be interpreted. The $55 values indicate that the data bytes are not used. Other examples of a request and response message including a PID and/or a formula for converting a hexadecimal PID parameter value to a decimal PID parameter value using the same or another data protocol are possible.

TABLE C

| Node ID | No. of additional DB | OBD II Mode | PID | DB #1 | DB #2 | DB #3 | DB #4 | DB #5 |
|---|---|---|---|---|---|---|---|---|
| 4A1 | 02 | 01 | 4D | 55 | 55 | 55 | 55 | 55 |
| 7F0 | 04 | 41 | 4D | 3C | 90 | 55 | 55 | 55 |

The computing system 150 can monitor a vehicle system in a vehicle by requesting PID parameter values from an electronic control unit in the vehicle system, receiving the vehicle service modes of the computing system 150, such as the diagnostic mode, the repair mode, the test drive mode, and the post-repair report mode. The computing system 150 may store the PID parameter values as part of the measurement 187, the VDM 189, or otherwise.

The guided component test 193 can include one or more component tests. Each component test can include computer-readable program instructions (e.g., a component test module) executable to perform the component test. Execution of a component test module can include configuring a test device for performing the component test for the component and/or vehicle to be tested. As an example, a component test can include a voltage test, an amperage test, a frequency test, a resistance test, a duty cycle test, or a pressure test. As another example, a component test can be specified for a particular component, such as a fuel pump voltage test or a fuel pump pressure test. As yet another example, a component test can be specified for a particular vehicle on a particular vehicle, such as a fuel pump voltage test on a 2018 Jeep Wrangler JL with 3.6 L engine, or a fuel pump pressure test on a 2018 Jeep Wrangler JL with a 3.6 L engine.

In at least some implementations, the guided component test 193 includes multiple sets of test device configuration parameters and each set of test device configuration parameters is associated with an index value. The server 100 can determine which set of device configuration parameters is to be used to set up the test device during a service session. The server 100 can transmit the determined set of test device configuration parameters to the computing system 150. Alternatively, the server 100 can transmit the index value associated with the determined set of test device configuration parameters to the computing system 150. In this alternative configuration, the computing system can determine the appropriate test device configuration parameters for the service session based on the index value received at the computing system 150.

Table D includes data that can be stored in the guided component test 193. For instance, the guided component test 193 can include an index value corresponding to test device configuration parameters. Additionally, the guided component test 193 can include data indicating which test device is to be used to perform the test (e.g., make a measurement) and a test name. Furthermore, the guided component test can include one or more parameters (where N=1 and M≥0). Transmission of an index value can take less bandwidth than transmitting a set of test device configuration parameters.

TABLE D

| Index Value | Test Device | Test | Parameter N | Parameter N + M |
|---|---|---|---|---|
| 01 | Meter | Battery Pack Voltage | 5 volts/division | 100 ms/division |
| 02 | Scope | Battery Pack Voltage | 100 volts/division | 100 ms/division |
| 03 | Meter | Fuel Pump Voltage | 5 volts/division | 100 ms/division |
| 04 | Meter | Injector Frequency | Hertz | Null |
| 05 | Scope | Injector Frequency | 5 volts/division | 10 ms/division |
| 06 | Meter | MAP sensor Voltage | 1 volt/division | 100 ms/division |

PID parameter values, and comparing the PID parameter values to one or more PID parameter thresholds to determine whether the PID parameter value is within an expected operating range for the vehicle system to be operating correctly. Monitoring the vehicle system can also include the computing system 150 storing PID parameter values in the memory. In at least some implementations, the computing system 150 monitors the electronic system in multiple The application 194 includes one or more applications executable by the processor 151. Accordingly, the application 194 can be contained within or include at least a portion of the CRPI 184. The application 194, for example, can include a browser application. The browser application can interface with the server 100 to generate a GUI of the GUI 188. In at least some implementations, the application 194 includes one or more from among: an application programming interface (API) 195, application data 196, a document interface 197, or a script interpreter 198.

The API 195 can include one or more APIs. As an example, the API 195 can include an API that interfaces with the server 100 via, for example, the network transceiver 167 and the communication network 3. As another example, the API 195 can include an API that interfaces with the vehicle communication transceiver 168 for transmitting or receiving a VDM via the vehicle communication transceiver 168. As yet another example, the API 195 can include an API that interfaces with the test device 164 for providing set-up instructions and/or set-up information to the test device 164 for configuration of the test device 164 and/or to receive a measurement performed by the test device 164. In at least some implementations, set-up information can include a set-up instruction.

The application data 196 can include one or more from among: the temporal data 185, the location data 186, the measurement 187, the VDM 189, the computing system indicator 190, or the vehicle selection data 191. Additionally or alternatively, the application data 196 can include one or more from among: a script, cache data, a set-up instruction, set-up information, or a cookie.

The document interface 197 can include one or more document interfaces, such as an hyper-text markup language (HTML) document interface for an HTML document, an XML document interface for an XML document, a scalable vector graphic (SVG) document interface for an SVG document, or another type of document interface for a different type of document. The document interface 197 can define a USC for a GUI.

The script interpreter 198 can include one or more script interpreters. The script interpreter 198 can include a script. The script interpreter 198 can interpret a script therein or elsewhere, such as a script stored within the application data 196 or the CRPI 184. A script interpreter can use the document interface 197 to generate a USC shown on a GUI. A script interpreter can pass an object associated with the USC to the processor 151 executing the script interpreter and obtain an attribute corresponding to the object so that the processor 151 can perform a function corresponding to the USC upon selection of the USC.

The SSR 199 can include one or more service session records. The SSR 199 can include an SSR transmitted to the computing system 150 from the server 100. The SSR 199 can include an SSR stored in the SSR 206.

D. Shop Equipment

1. ADAS Target Rig

Figure 14B:
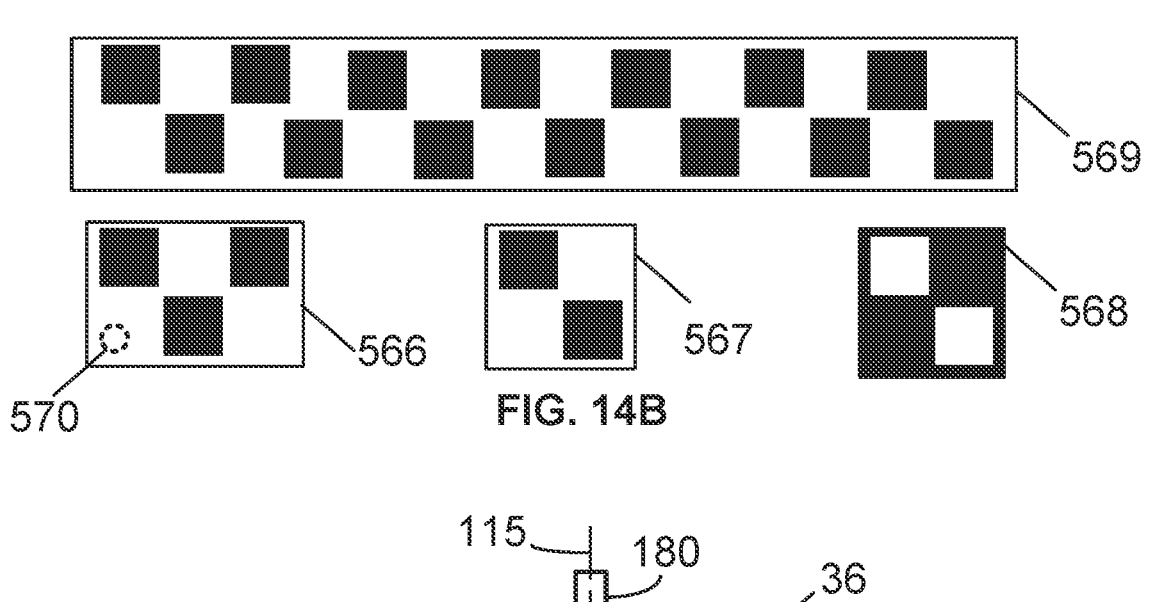
FIG. 14A, FIG. 14B, FIG. 15A, FIG. 15B, FIG. 15C, FIG. 16, and FIG. 17 show shop equipment or aspects of shop equipment in accordance with the example implementations.
Figure 14A:
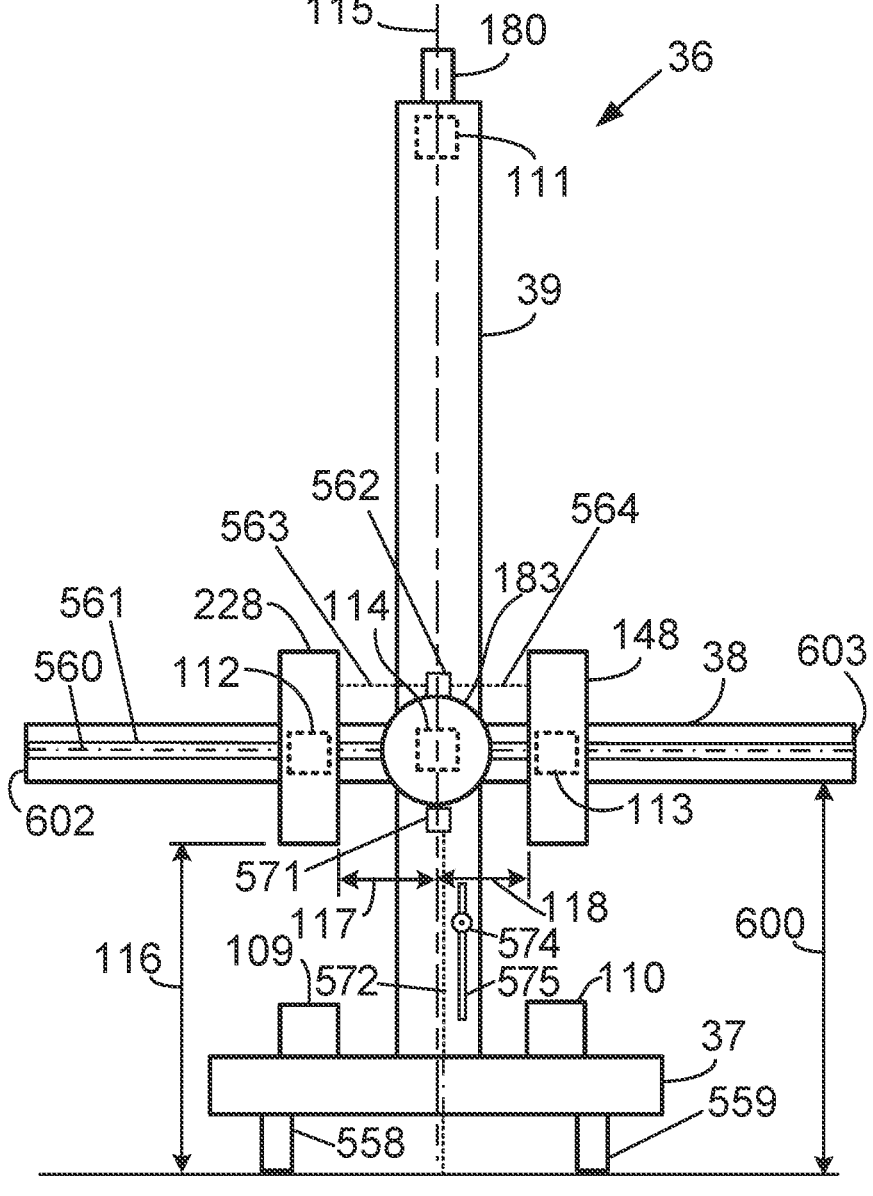
Figure 15B:
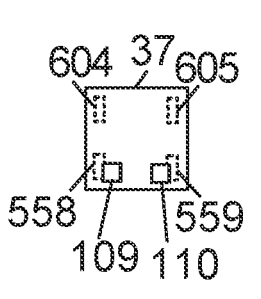
Figure 15C:
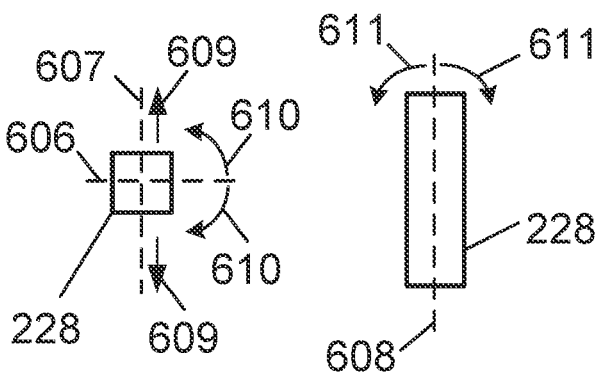
Figure 15A:
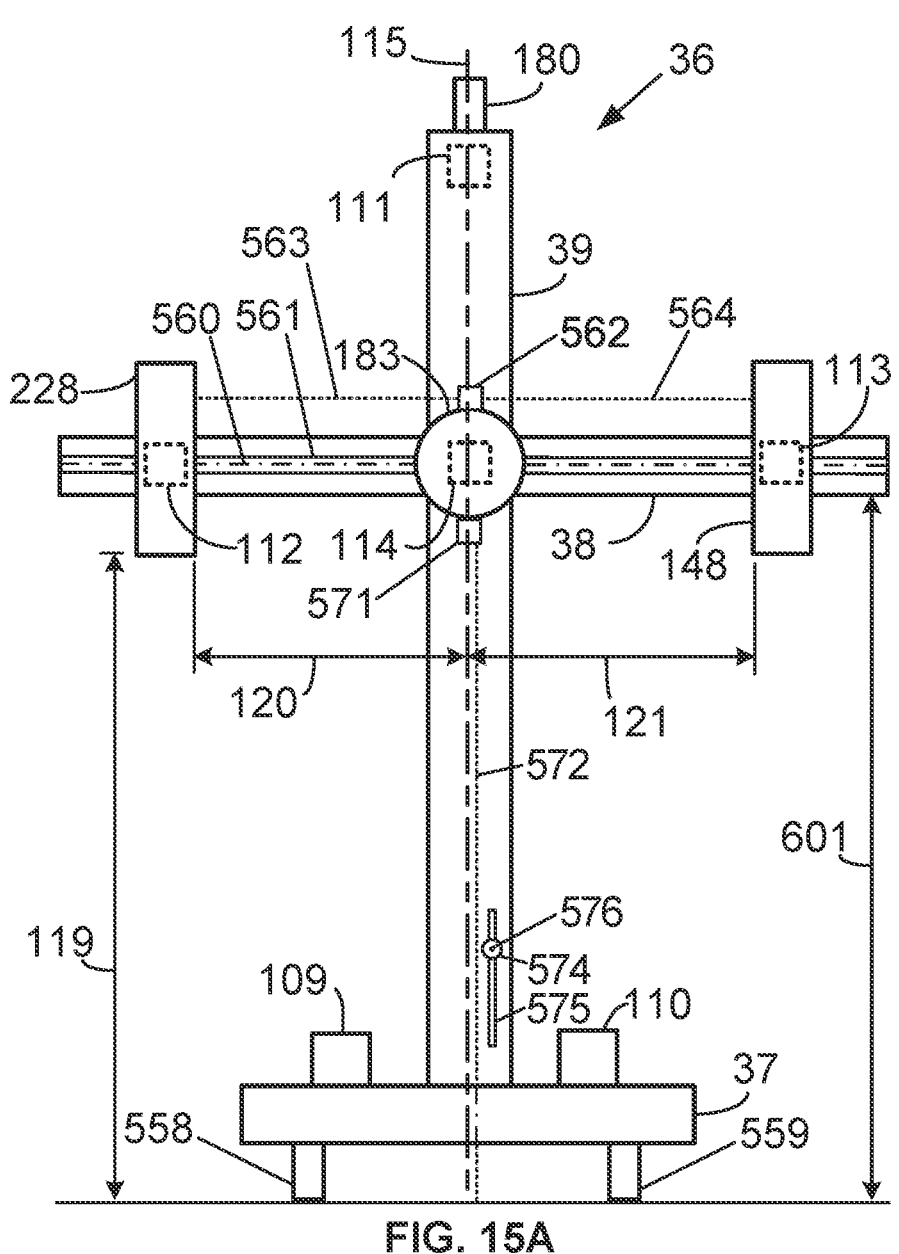

Next, FIG. 14A and FIG. 15A show shop equipment 36. As an example, the shop equipment 36 can be disposed within the repair shop 6, such as the shop equipment 11, 12. The shop equipment 36 can include the computing system 150 or one or more components of the computing system 150. The shop equipment 36 can be referred to as an ADAS target stand, an ADAS target rig, an ADAS calibration stand, an ADAS calibration rig, and/or a carrier stand. The shop equipment 36 can be arranged to include aspects of the ADAS calibration equipment described in U.S. Patent Application Publication No. 2021/0387637 A1, entitled apparatus and method for calibrating and aligning automotive sensors. U.S. Patent Application Publication No. 2021/0387637 A1 is incorporated herein by reference.

As shown in FIG. 14A and FIG. 15A, the shop equipment 36 includes a base 37, a cross beam 38, a vertical beam 39, a pulley 180, a rotation assembly 183, a target mount 148, 228, a processor 109, and a transceiver 110. The target mount 148, 228 are configured to be repositioned along the cross beam 38. The rotation assembly 183 can be used to rotate the cross beam 38 such that the cross beam 38 and the vertical beam 39 are aligned longitudinally. The cross beam 38 can include a slot 561. A portion (e.g., a flange) of the target mount 148, 228 can pass through the slot 561 for removable attachment of the target mount 148, 228 to the cross beam 38 and/or means for automated movement of the target mount 148, 228.

A calibration object, such as a calibration target can be attached to the target mount 148, 228. As an example, the calibration object can be attached to the target mount 148, 228 magnetically. As another example, the calibration object can be attached to the target mount 148, 228 using fasteners, such as bolts, screws, pins, or hook and loop fasteners. A calibration target can include or be referred to as an optical target.

FIG. 14B shows a calibration target 566, 567, 568, 569 in accordance with the example embodiments. In at least some embodiments, a calibration target attaches to a single target mount. For example, the calibration target 566, 567, 568 can attach to the target mount 148 or the target mount 228. In at least some embodiments, a calibration target attaches to multiple target mounts. For example, the calibration target 569 can attach to the target mount 148 and the target mount 228. In at least some embodiment, a calibration target can include an NFC tag. As an example, the calibration target 566 can include an NFC tag 570. Use of such an NFC tag is discussed below. Other examples of a calibration target are also possible.

In at least some implementations, the shop equipment 36 includes means 111 for automated movement of the cross beam 38, means 112 for automated movement of the target mount 148, and means 113 for automated movement of the target mount 228. The automated movement of the cross beam 38 can include movement that raises or lowers the cross beam 38 with respect to the base 37. The automated movement of the target mount 148, 228 can include movement of the target mount 148, 228 closer to or farther from a center-line 115 of the vertical beam 39. In other words, the automated movement of the target mount 148, 228 can change a horizontal spacing between the target mount 148 and the target mount 228. The automated movement of the target mount 148, 228 can include changing a pitch, roll, or yaw of the target mount 148, 228. FIG. 15C shows, on the left, a plan view of the target mount 228, and on the right, an elevation view of the target mount 228. A center-line 606, 607, 608 of the target mount 228 is also shown, as well as arrows 609 representing pitch movement of the target mount 228, arrows 610 representing yaw movement of the target mount 228, and arrows 611 representing roll movement of the target mount 228.

The means 111, 112, 113 can include multiple components. As an example, those multiple components of the means 111, 112, 113 can include a motor, a pulley and cable, a rack and pinion gear and shaft (such as a shaft connected to a motor), or a linear actuator driven with a belt, screw or cylinder (e.g., a pneumatic or hydraulic cylinder).

The base 37 can include and/or be attached to multiple actuators. FIG. 14A shows an actuator 558 559. In at least some implementations, one or more of the multiple actuators contact the ground. FIG. 15A shows the actuator 558, 559 in an elevation view of the shop equipment 36 and FIG. 15B shows a plan view of the base 37. The plan view of the base 37 also shows an actuator 604, 605, the processor 109, and the transceiver 110. The vertical beam 39 is not depicted in the plan view of the base 37.

As an example, the actuator 558, 559, 604, 605 can include a screw jack for leveling the base 37. In some embodiments, the screw jack includes a manual screw jack. In other embodiments, the screw jack includes an automatic screw jack, such as an electric or hydraulic screw jack. The processor 109 can execute program instructions to actuate the automatic screw jack to level the base 37. Leveling the base 37 can be performed when the ground (e.g., a shop floor) is sloped or pitted, or for some other reason. Leveling the base 37 can be performed so that the center-line 115 is vertical to the ground.

As another example, 558, 559, 604, 605 can include a caster, rotatable to make movement of the shop equipment 36 easier. As a particular example, the actuator 558, 559, 604, 605 can include and/or be arranged as a motor-powered caster, such as a DRIVE CASTER® caster wheel available from Caster Concepts, Albion, Michigan. The processor 109 and/or the processor 151 of the computing system 150 can be programmed with CRPI executable to control a motor of the motor-powered caster so that the shop equipment 36 can be moved automatically. The automatic movement of the shop equipment 36 can include moving the shop equipment 36 closer to or further away from a vehicle having a component requiring calibration, and or moving the shop equipment 36 to align a center-line of the shop equipment 36 with a longitudinal center-line of the vehicle. As an example, the center-line of the shop equipment 36 can pass through the cross beam 38 vertically at a point half-way between ends 602, 603 of the cross beam 38. As another example, the center-line of the shop equipment 36 can coincide with the center-line 115.

FIG. 14A includes arrowed line segments representing a dimension 116, 117, 118, 600. Similarly, FIG. 15A includes arrowed line segments representing a dimension 119, 120, 121, 601. The dimension 116, 119 represents a height of the target mount 148, 228 above the ground. The dimension 117, 120 represents a distance between the target mount 148 and the center-line 115. The dimension 118, 121 represents a distance between the target mount 228 and the center-line 115. The dimension 600, 601 represents a distance (a height) of the cross beam 38 above the ground. Assuming FIG. 14A shows initial positions of the cross beam 38 and the target mount 148, 228, then FIG. 15A shows subsequent positions of the cross beam 38 and the target mount 148, 228 after the means 111, 112, 113 are used to raise the cross beam 38, move the target mount 148 outward, and move the target mount 228 outward, respectively. In some embodiments, such as embodiments in which a single calibration target (e.g., the calibration target 569) is attached to the target mount 148 and the target mount 228, the means 112, 113 can be controlled together (i.e., synchronously) and in relation to each other so that the single calibration target remains attached to the target mount 148 and the target mount 228.

The computing system 150 can transmit an identifier of a service session record and set-up information to the shop equipment 36. The set-up information can include a spatial dimension, such as the dimension 119, 120, 121. The dimension 119, 120, 121 can be a dimension for setting up the shop equipment 36 for a vehicle corresponding to a service session record associated with the identifier of the service session.

The shop equipment 36 can also include a transceiver 114. The transceiver 114 can be part of the transceiver 110. For example, the transceiver 114 can include the antenna 159 and the NFC controller 160 (shown in FIG. 13A) and the transceiver 110 can include network transceiver 167 (shown in FIG. 13A). In at least some embodiments, the transceiver

114 can receive a communication including a service session record or some portion of a service session record, such as a vehicle identifier for a vehicle to be calibrated using the shop equipment 36.

As another example, the transceiver 114 can read the NFC tag 570 to determine which calibration target is being attached to the shop equipment 36. In at least some embodiments, the transceiver 114 can be disposed in, on, or adjacent the target mount 148, 228 such that the transceiver 114 is in proximity to the NFC tag 570 when the calibration target is attached to the target mount 148, 228. The NFC tag 570 can communicate an identifier of the calibration target to the transceiver 114.

A processor can determine which calibration target is attached to the target mount. Afterwards, the processor can determine whether the attached calibration target is the correct calibration target to use for a vehicle identified by the vehicle identifier. Moreover, the processor can use the identifier of the calibration target to and the vehicle identifier to look up position data, such as position data that indicates positions for the target mount 148, 228, and the cross beam 38, or a position data that indicates a specific distance between the shop equipment 36 and the vehicle. A processor, such as the processor 109 can control the means 111, 112, 113 or the actuator 558, 559, 604, 605 to move the target mount 148, 228, the cross beam 38, or the shop equipment to required positions for calibrating the vehicle. In at least some embodiments, the processor can access the position data from a local memory and/or via the transceiver 110.

In at least some embodiments, the shop equipment 36 can include a measurement device 562, 571, 574. The measurement device 562, 571, 574 can include a light source (e.g., a laser diode), a lens, and a light sensor, and a processor. In at least some implementations, the processor 109 can be configured to operate as the processor of the measurement device 562, 571, 574. The processor can cause the light source to output a pulsed light signal. The sensor can be configured to detect the pulsed light if the pulse light is reflected back to the measurement device. In at least some implementations, measurement device 574 is movable via a slot 575 so that the measurement device 574 can be raised or lowered so that a light wave output by the measurement device 547 is reflected off of a particular portion of a vehicle, such as a front-end bumper of the vehicle.

As an example, a light wave 572 (e.g., a pulsed light) output by the measurement device 571 can be reflected by the ground and then detected by a light sensor in the measurement device 571. The processor can determine a distance between the measurement device 571 and the ground based on a speed of light and an amount of time it takes for the light wave output by the measurement device 571 to be detected by the sensor. In other words, the measurement device 571 can determine distances based on a time-of-flight of the light wave output by the measurement device 571. In FIG. 14A and FIG. 15A, the line representing the light wave 572 has a different pattern within the base 37 to represent a portion of the base 37 blocks seeing the light wave 572 when passing through the base 37 from a view shown by those figures. In an alternative arrangement, the light wave 571 can be seen in front of the base 37 from the view shown by those figures. In the latter arrangement, the base 37 includes one or more openings to allow the light wave 572 to pass through the base 37.

As another example, a light wave 563, 564 (e.g., a pulsed light) output by the measurement device 562 can be reflected by the target mount 228, 148, respectively, and then detected by a light sensor in the measurement device 562. The processor can determine a distance between the measurement device 562 and the target mount 228, 148 based on a speed of light and an amount of time it takes for the light wave output by the measurement device 562 to be detected by the sensor. The processor can compensate for distances between the measurement device 562, 571 and another point of the shop equipment 36, such as the center-line 115 or a center-line 560 indicating a center line of the cross beam 38.

As yet another example, a light wave (e.g., a pulsed light) output by the measurement device 574 can be reflected by a vehicle component, and then detected by a light sensor in the measurement device 574. FIG. 15A depicts that light wave as a point 576. The processor can determine a distance between the measurement device 574 and the vehicle component based on a speed of light and an amount of time it takes for the light wave output by the measurement device 574 to be detected by the sensor. The processor can compensate for various distances, such as a first distance indicating how far away a face of a calibration target mounted to a target mount extends from the vertical beam 39, and a second distance indicating how far away a distal end of the measurement device 574 extends from the vertical beam 39. A measurement determined using the measurement device 574 can be used during activation of the actuator 558, 559, 604, 605 as the shop equipment 36 is being repositioned with respect to the vehicle.

2. Torque Wrench

Figure 16:
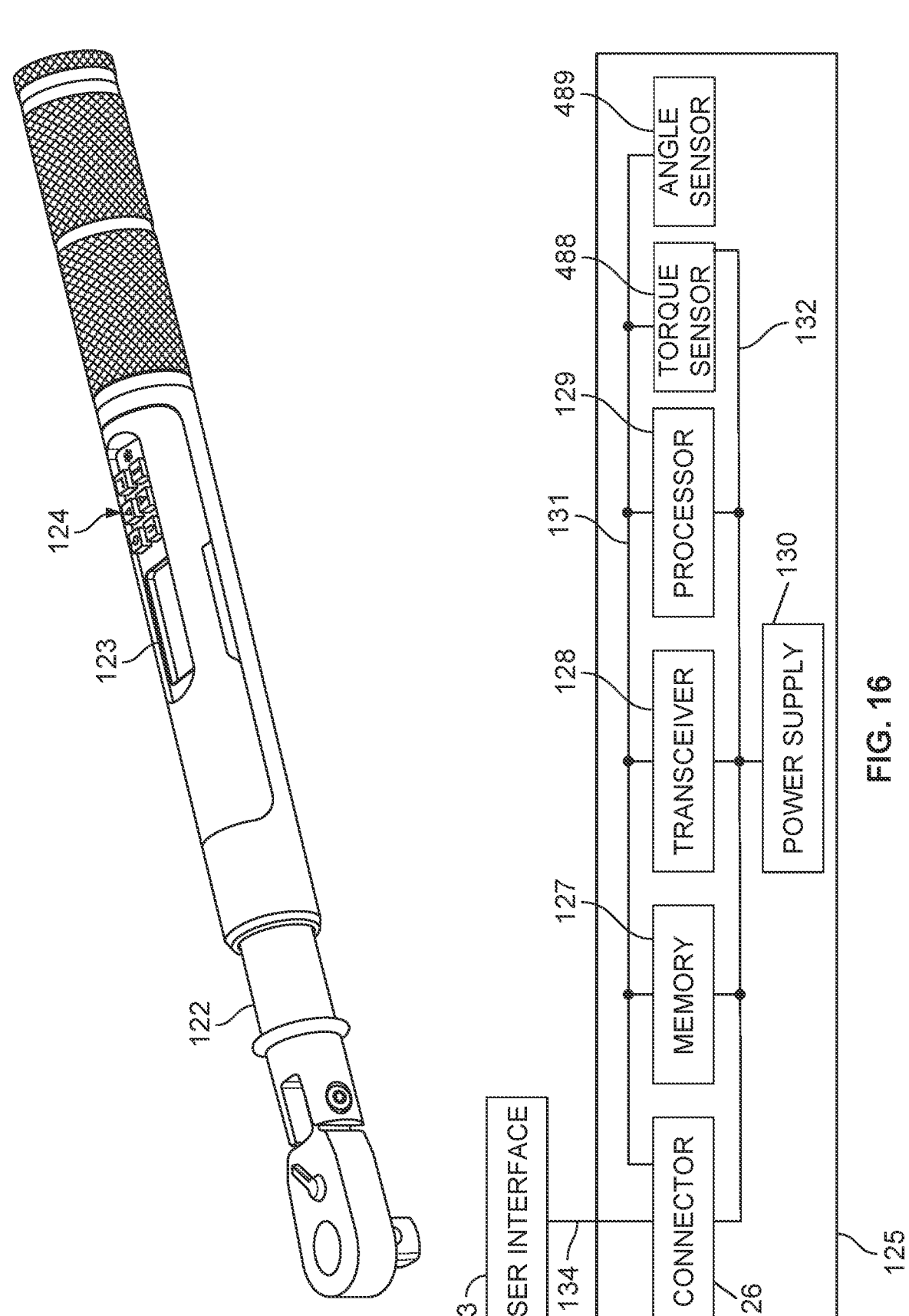

Next, FIG. 16 shows shop equipment 122. As an example, the shop equipment 122 can be disposed within the repair shop 6, such as the shop equipment 11, 12. The shop equipment 122 can include the computing system 150 or one or more components of the computing system 150. The shop equipment 122 can be referred to as a torque wrench.

As shown in FIG. 16, the shop equipment 122 includes a display 123 and user-selectable controls 124. FIG. 16 also shows a substrate 125 that can be within a housing of the shop equipment 122. A connector 126, a memory 127, a transceiver 128, a processor 129, a power supply 130, a data bus 131, power circuitry 132, a torque sensor 488, and/or an angle sensor 489 can be mounted to and/or formed within or on the substrate 125. A harness 134 can connect a user interface 133 to the connector 126. The user interface 133 includes the display 123 and the user-selectable controls 124. The user interface 133 can include a device, such as a speaker to output a tone. The tone, for example, can indicate when a particular torque level or a particular angle of rotation using the shop equipment has been reached.

The memory 127 can be arranged like the memory 152 and include at least a portion of the data shown in FIG. 13B. The processor 129 can be arranged like the processor 151. The power supply 130 can be arranged like the power supply 155. The data bus 131 can be arranged like the data bus 157. The power circuitry 132 can be arranged like the power circuitry 158. The transceiver 128 can be arranged like the transceiver 153. Accordingly, the transceiver 128 can include one or more of the antenna 159, the NFC controller 160, or the network transceiver 167. The user interface 133 can be arranged like the user interface 154. Accordingly, the display 123 can be arranged like the display 163 and the user-selectable controls 124 can be arranged like the user interface input component 161.

Figure 42:
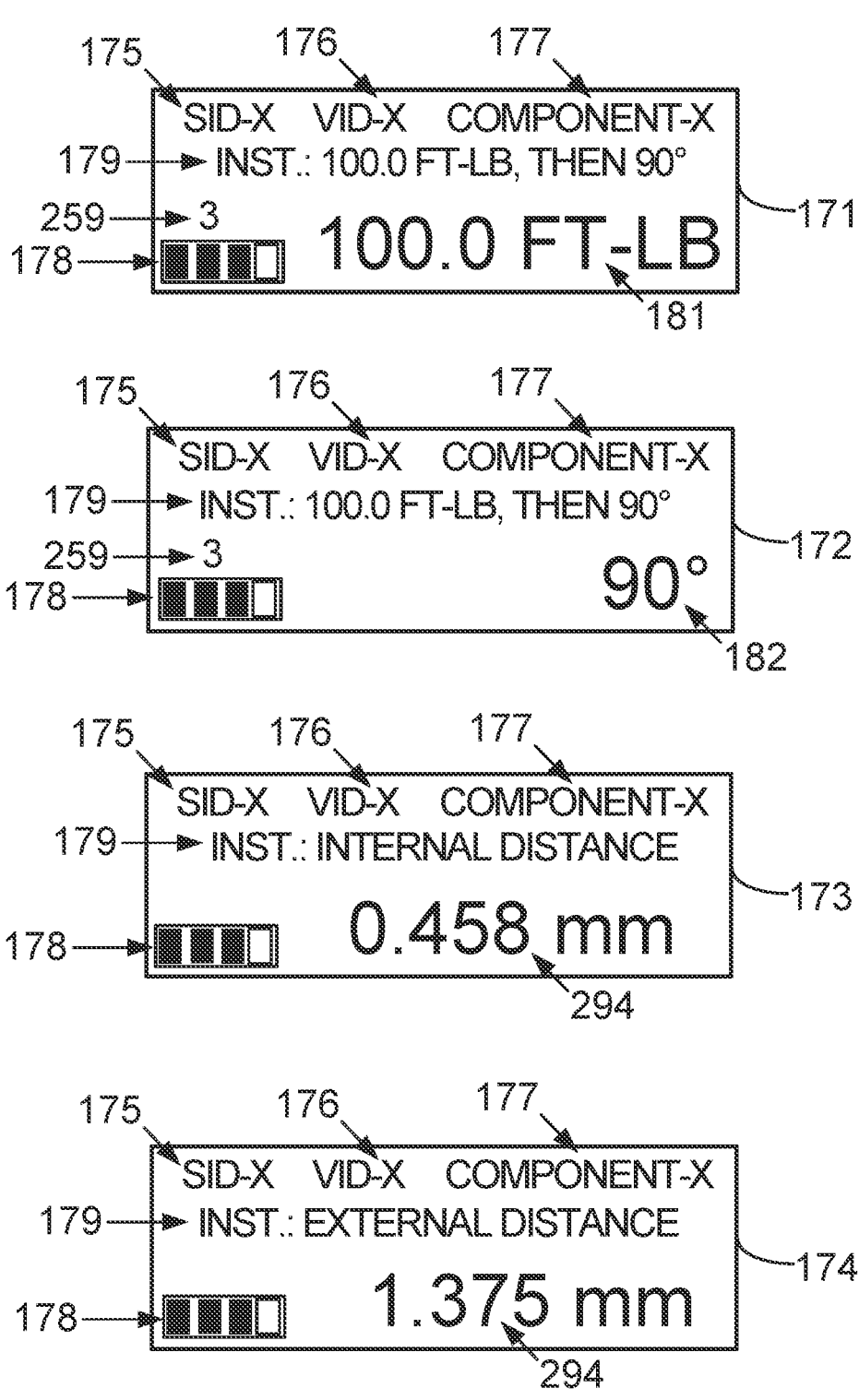
FIG. 42, and FIG. 43 show graphical user interfaces in accordance with the example implementations.

As an example, the user-selectable controls 124 can include a USC selectable to power the shop equipment 122 on or off and to re-zero a reading on the display 123, a USC selectable to input an increment command, a USC selectable to select an operating mode of the shop equipment 122 or an menu option, a USC selectable enter a units selection, a USC selectable to input a decrement command, and/or a USC selectable to turn a backlight within the display 123 on or off, or to cause the display 123 to display a peak torque or angle value. FIG. 42 shows example GUIs displayable on the display 123.

The torque sensor 488 (e.g., a strain gauge) can include a transducer that outputs a signal indicative of an amount of torque being applied by the shop equipment 122. The processor 129 can receive that signal from the torque sensor 488 and display the amount of torque on the display 123. The angle sensor 489 (e.g., a rotation sensor) can output a first signal indicative of a first number of degrees from a marker and a second signal indicative of a second number of degrees from the marker. The processor 129 can store the first number of degrees when the amount of torque being applied by the shop equipment 122 reaches a certain torque value and then monitor the output of the angle sensor 489 and output an alert (e.g., an audible or visible alert) when the processor detect the second signal output by the angle sensor 489.

3. Measurement Caliper

Figure 17:
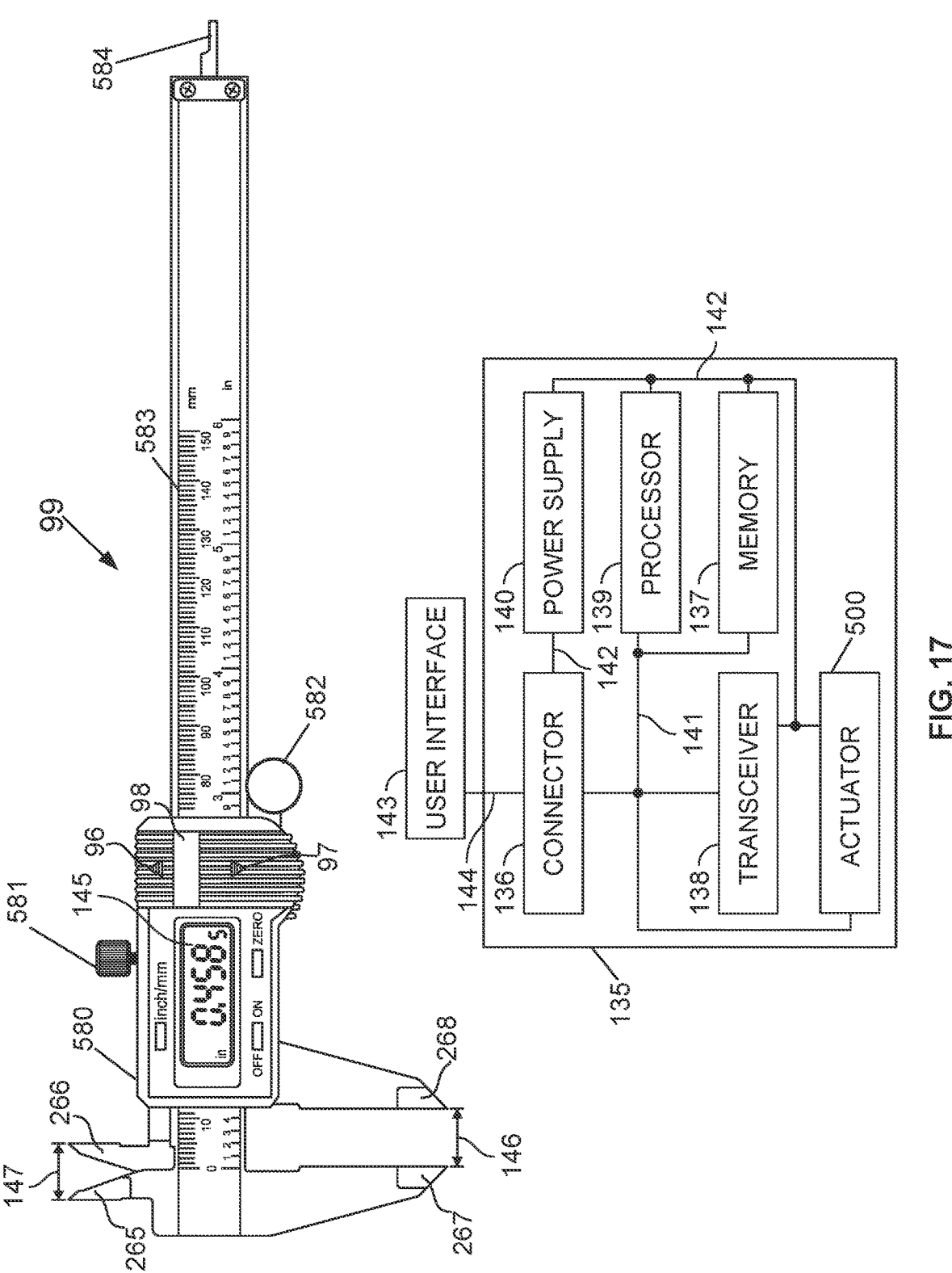

Next, FIG. 17 shows shop equipment 99. As an example, the shop equipment 99 can be disposed within the repair shop 6, such as the shop equipment 11, 12. The shop equipment 99 can include the computing system 150 or one or more components of the computing system 150. The shop equipment 99 can be referred to as a digital caliper or a measurement caliper. The shop equipment 99 includes a measurement arm 265, 266, 267, 268. As an example, the measurement arm 265 and the measurement arm 266 can be used for measuring an interior dimension of an object, such as an interior diameter of a pipe. The measurement arm 265 and the measurement arm 266 can be referred to as upper jaws. As another example, the measurement arm 267 and the measurement arm 268 can be used for measuring an exterior dimension of an object, such as an exterior diameter of the pipe. The measurement arm 267 and the measurement arm 268 can be referred to as lower jaws.

The shop equipment 99 can also include a display and actuator module 580 including a display 145 and an actuator 500. The shop equipment can also include a lock screw 581, a thumb screw 582, a main scale 583 and a depth gauge 584.

As shown in FIG. 17, the shop equipment 99 includes a display 145 and a USC, 96, 97, 98. FIG. 17 also shows a substrate 135 that can be within a housing of the shop equipment 99. A connector 136, a memory 137, a transceiver 138, a processor 139, a power supply 140, a data bus 141, power circuitry 142, and/or an actuator 500 can be mounted to and/or formed within or on the substrate 135. A harness 144 can connect a user interface 143 to the connector 136. The user interface 143 includes the display 145 and the USC 96, 97, 98. In at least some implementations, the USC 96, 97 can be used to display within the display 145 different selectable features of the shop equipment 99 (e.g., changing the display from inches to mm or vice versa, or zeroing the display 145). As an example, the display 145 can display a measurement indicative of a dimension 147 between ends of the measurement arm 265 and the measurement arm 266, as well as a dimension 146 between ends of the measurement arm 267 and the measurement arm 268. In at least some implementations, the USC 98 can be selectable to power the shop equipment 99 on or off and to indicate a measurement has been made.

The memory 137 can be arranged like the memory 152 and include at least a portion of the data shown in FIG. 13B. The processor 139 can be arranged like the processor 151. The power supply 140 can be arranged like the power supply 155. The data bus 141 can be arranged like the data bus 157. The power circuitry 142 can be arranged like the power circuitry 158. The transceiver 138 can be arranged like the transceiver 153. Accordingly, the transceiver 138 can include one or more of the antenna 159, the NFC controller 160, or the network transceiver 167. The user interface 143 can be arranged like the user interface 154. Accordingly, the display 145 can be arranged like the display 163. FIG. 42 shows example GUIs displayable on the display 145.

Table E includes set-up information in accordance with the example implementations. In Table E, ADAS T.S. represents ADAS target stand. The shop equipment 36 shown in FIG. 14A and FIG. 15A is applicable to the ADAS T.S. In Table E, a torque wrench is an example of the equipment 122 shown in FIG. 16 and a caliper is an example of the shop equipment 99 shown in FIG. 17. The memory 102, 152 can include set-up information similar to or based on the set-up information in Table E. In at least some implementations, the server 100 can transmit an index value to the computing system 150 and the computing system 150 can determine a shop equipment identifier, an element identifier, a set-up parameter and/or a set-up parameter value based on the received index value. The computing system 150 can then configure shop equipment based on the set-up parameter value without the server having to transmit the shop equipment identifier, the element identifier, the set-up parameter and the set-up parameter value. In at least some implementations, the server 100 and the computing system 150 can include multiple sets of set-up information. Each set of set-up information can correspond to one or more different types of vehicles.

a vehicle (e.g., a technician) and/or a person (e.g., a customer advisor) involved with servicing of the vehicle.

Block 301 includes outputting, by a computing system, a request for transmission to a server. The request includes an identifier of a service session record corresponding to a vehicle. The SSR includes a timeline for tracking one or more events corresponding to the SSR. Each event corresponds to servicing a vehicle.

One or more events of the service session record can include an event based on data corresponding to one or more service activities performed on the vehicle. As an example, an event can include testing the vehicle using a particular computing system. As another example, an event includes performing multiple activities of an event by one or more computing systems. In at least some implementations, a computing system arranged as a vehicle scan tool can perform an event that includes multiple activities, such as a vehicle scanning activity in which the computing system requests VDM to determine whether any ECU has a diagnostic trouble code set and a vehicle scanning activity in which the computing system requests VDM to determine whether system monitors are on-going or completed. In at least some other implementations, a computing system arranged as a wheel balancer can perform an activity of balancing wheels of the vehicle and provide data regarding balancing the wheels to the computing system 150 and a computing system arranged as the shop equipment 122 can be used to torque fasteners when reinstalling the balanced wheels on the vehicle and to provide data regarding torquing the fasteners to the computing system 150.

TABLE E

| Index Value | Shop Equipment ID | Element ID | Set-up parameter | Set-up parameter value | |
|---|---|---|---|---|---|
| F1 | ADAS T.S. | Target mount (left) | Distance from center | 90 | cm |
| F2 | ADAS T.S. | Target mount (right) | Distance from center | 90 | cm |
| F3 | ADAS T.S. | Cross beam | Height | 70 | cm |
| F4 | ADAS T.S. | Vertical beam | Distance from vehicle | 60 | cm |
| F5 | Torque wrench | Torque sensor | Torque | 75 | Nm |
| F6 | Torque wrench | Angle sensor | Rotation | 90 | degrees |
| F7 | Caliper | Display | Measurement | 2.54 | cm |
| F8 | Caliper | Measurement Arm | Measurement | 2.54 | cm |
| F9 | Caliper | Actuator | Linear position | 2.54 | cm |

V. Example Operation

A. First Flowchart

FIG. 18 is a flowchart depicting a set 300 of functions of a method in accordance with the example implementations. Two or more functions and/or portions of two or more functions of the set 300 can be performed at the same time. The functions of the set 300 can be performed by a computing system, such as the computing system 14, 15, 16, 17, 23, 24, 26, 55, 150 and/or a component of the computing system (e.g., the processor 151). A computing system that performs a function of the set 300 can perform other function(s) and/or operate in an operating state(s) other than those discussed with respect to FIG. 18. One or more functions within the set 300 or a portion of one of those functions can be performed by a server or in response to a function performed by the server, such as the server 4, 8, 100 and/or a component of the server (e.g., the processor 101). A method including a function of the set 300 can be used to repair a vehicle. A method including one or more functions of the set 300 can be performed to guide a person servicing Additionally or alternatively, one or more events of the service session record can include an event based on data corresponding to a non-service activity regarding the vehicle that will be, is being, or was serviced during a service session corresponding to the SSR. As an example, a non-service activity can include a customer advisor checking the vehicle in at the repair shop 6, the customer advisor contacting an owner of the vehicle, the owner paying an invoice for servicing the vehicle, or the owner picking up the keys for vehicle after the vehicle has been serviced. The data regarding a non-service activity can be used to determine a status of a service session.

Next, block 302 receiving, in response to the request, a first GUI corresponding to the service session record. In at least some implementations, receiving the first GUI includes receiving one or more GUI resources, such as text, an image, a user-selectable control, executable program instructions, a style sheet, data for populating in a GUI template, or some other GUI resource. In at least some implementations, receiving the first GUI includes receiving one or more GUI files, such as an html file, a bitmap file, a script file, a jpeg file, an xml file, a json file, or some other type of file. A GUI resource and/or GUI file can be arranged for displaying on the display 163 or providing instructions for displaying at least a portion of a GUI resource and/or a GUI file on the display 163. In at least some implementations, receiving the first GUI can include receiving data and/or instructions for displaying a GUI or some aspect of the GUI 297, 349, 350, 351, 352, 387, 390, 421, 428, 433, 444 shown in FIG. 22 to FIG. 38.

The processor 151 can write the received first GUI into the GUI 188 so as to store the first GUI. In at least some implementations, the processor 151 can determine a GUI template to use for displaying a GUI with the data for populating in the GUI template. As an example, the GUI template can include a quantity of containers equal to a quantity of event summaries defined by a timeline for the service session record.

Next, block 303 includes displaying, on a display, the first GUI in a first display mode. Displaying the first GUI in the first display mode incudes displaying a first event summary of the timeline. The first event summary corresponds to a first event of the service session record. The first event summary includes a first user-selectable control (USC) selectable to trigger changing a display mode of the first GUI.

As an example, the first USC can include and/or be arranged as a link (e.g., a hyperlink), a thumbnail image, a selection button, a drop-down menu, or a container. As an example, selection of the first USC including or arranged as a link can cause the processor 151 to access a web page corresponding to the link. As another example, selection of the first USC including or arranged as a link can cause the processor 151 to execute CRPI corresponding to the link, such as CRPI that causes the processor 151 to perform or request performance of a test of the vehicle. As yet another example, selection of the first USC including or arranged as a thumbnail image can cause the processor 151 to output a larger version of the image represented by the thumbnail image.

In at least some implementations, displaying the first event summary of the timeline includes displaying the first event summary in a container, such as a display card. In at least some other implementations, displaying the first event summary of the timeline includes displaying the timeline as a list, and the first event summary as a part of the list.

Next, block 304 includes displaying, in response to a selection of the first user-selectable control, the first GUI in a second display mode. Displaying the first GUI in the second display mode includes displaying a particular detail regarding the first event not shown in the first display mode.

In accordance with at least some implementations of a method that includes performing one or more functions of the set 300, displaying the first GUI in the first display mode includes displaying multiple event summaries arranged in a first temporal order. The multiple event summaries include the first event summary. The drawings of this disclosure show examples of the first GUI in the first display mode. For example, see the GUI 349 shown in FIG. 22 and the GUI 390 shown in FIG. 30.

As an example, the first temporal order is based on a respective time when each event corresponding to an event summary of the multiple event summaries is added into an SSR or when the event summary is modified. As another example, the first temporal order is based on a respective time when each event corresponding to an event summary of the multiple event summaries is dispatched, initiated, or completed. As yet another example, the first temporal order is based on a respective time when a state of each event corresponding to an event summary of the multiple event summaries changes. In at least some implementations, the temporal order includes an arrangement of event summaries in which the event summaries are arranged starting with an event summary associated with an earliest time and ending with an event summary associated with a latest time, or vice versa. In accordance with these examples, an event summary can be dispatched, initiated, completed, or modified based on performance of one or more service activities corresponding to the event summary.

In at least some implementations, an event summary of an event with multiple activities can be shown in the timeline using multiple event summaries. In at least some of those implementations, an event summary of an event with multiple activities can include a USC selectable to cause the processor 151 to display a different portion of the GUI. The different portion of the GUI includes another event summary of the multiple event summaries. As an example, the USC can function and/or be arranged like a USC 278 shown in FIG. 31 or a USC 279 shown in FIG. 32. A benefit of using such USC is that a user is not required to search for the other event summary and/or use a scroll bar, like the scroll bar 410 shown in FIG. 31 or FIG. 32 to cause at least a portion of the other event summary to be displayed.

Figure 32:
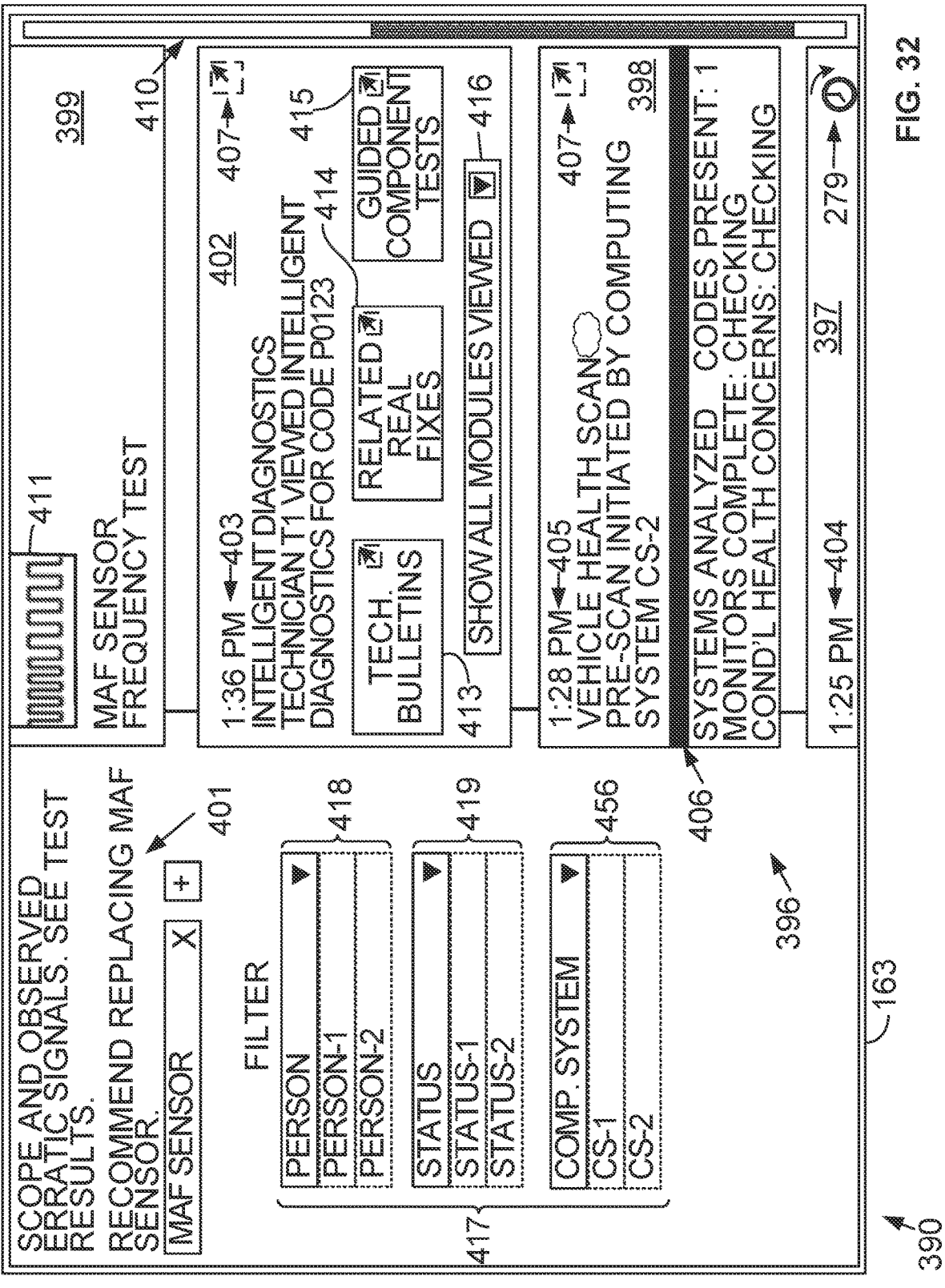
Figure 38:
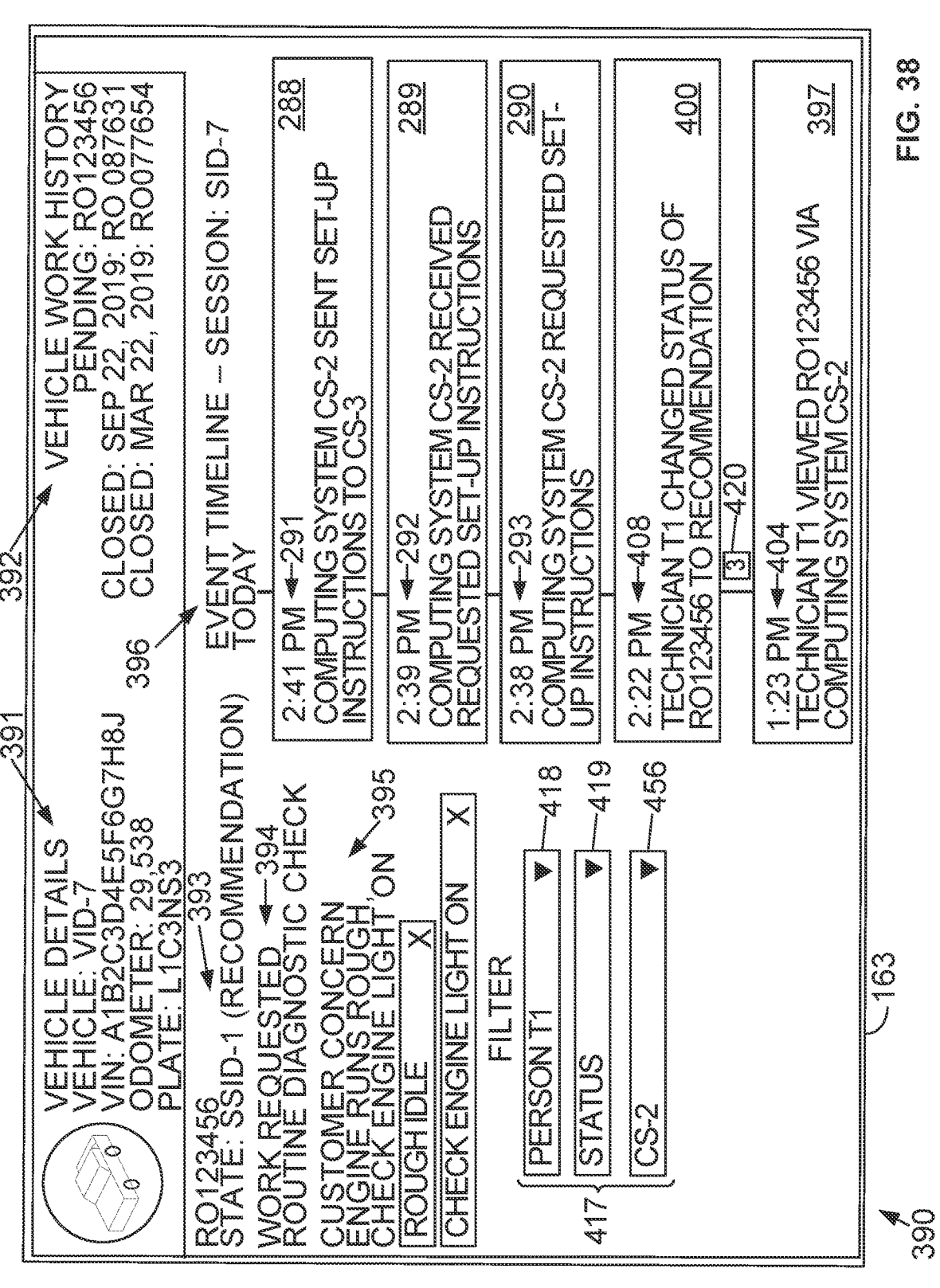

In accordance with at least some implementations of a method that includes performing one or more functions of the set 300, displaying the first GUI in the first display mode further includes displaying a filter selector including a first selection criterion. In these implementations, the method also includes determining a selection of the first selection criterion has occurred and displaying a modified version of the first GUI. Displaying the modified version of the first GUI incudes displaying a subset of the one or more event summaries arranged in a second temporal order. FIG. 32 shows a GUI 390 including a filter selector 417 prior to selection of a filter selection criterion and FIG. 38 shows the GUI 390 after a selection of a filter selection criterion. As an example, the selection criterion can include a particular state of a plurality of states that have occurred as part of the service session record or that are possible for the service session record. The second temporal order can include ordering the event summaries (that are not omitted due to filtering) chronologically.

In at least some of the implementations discussed in the preceding paragraph, the processor 151 modifies the first GUI in response to the selection of the first selection criterion. In at least some other implementations, the computing system 150 transmits data indicative of the selection to the server 100, the processor 101 modifies the first GUI in response to the selection and transmits the modified version of the first GUI to the computing system 150.

In accordance with at least some implementations of a method that includes performing one or more functions of the set 300, the method further includes outputting, by the computing system for transmission to the server, a communication including an input for modifying the service session record. The communication includes one or more from among: the identifier of the service session record, an identifier of the vehicle, or data that corresponds to the input for modifying the service session record. The input for modifying the service session is generated by the computing system in response to performing an event with respect to the vehicle using the computing system or a service activity of the event.

In accordance with at least some of the implementations discussed in the preceding paragraph, performing the event with respect to the vehicle using the computing system or the service activity of the event includes performing one or more from among: capturing data generated by the vehicle, testing operation of a vehicle component, measuring a vehicle component, inspecting the vehicle, capturing an image of at least a portion of the vehicle, capturing a screen shot of the display, capturing a sound made by the vehicle, analyzing a gas emitted by the vehicle, aligning a vehicle component, adjusting a vehicle component, performing a maintenance task on the vehicle, test driving the vehicle, selecting a new state of the service session record, selecting a new state of an event of the service session record, or using a module of the computing system.

As an example, capturing the image can include capturing a thermal image or a visible light image. As another example, capturing a screen shot can include capturing a screen shot showing one or more measurements made by the computing system, such as measurements made by an oscilloscope or a multimeter. The measurement can be made during performance of a test, such as a functional test or a guided component test.

In accordance with at least some of the implementations discussed in any of the three preceding paragraphs, the method further includes the server 100 modifying the service session record based on the input. In at least some of those implementations, the server 100 determines a temporal aspect (e.g., a time or time range) corresponding to the service activity of the event. In at least some of those implementations, the server 100 adds data into the event summary corresponding to the event and/or re-ordering the event summary with respect to other event summaries in the service session record based on the temporal aspect corresponding to the service activity and temporal aspects corresponding to the other event summaries. In at least some of these implementations, a new container is added into the GUI to show additional aspect of an event summary for which the GUI includes a container for other aspects of the event summary. Those containers are arranged in a timeline based on the temporal aspects associated with each portion of the event summary.

In accordance with at least some implementations of a method that includes performing one or more functions of the set 300, each event of the one or more events is classified with a particular state from among multiple states. The multiple states include one or more from among: an open state, a dispatched state, a paused stated, and a closed state.

In accordance with at least some of the implementations discussed in the preceding paragraph, the first event of the service session record is classified with one or more additional states based on one or more from among: the computing system being selected for use during the service session, or an operating state of the computing system. As an example, the computing system can include a battery charger and/or a battery balancing system and the operating state is a slow-charge operating state, a quick-charge operating state, or a non-charging operating state. As another example, the computing system can include an air conditioning recycling, recovery, and recharge (ACRRR) system and the operating state is a recovery state, an evacuation state, or a recharging state. As yet another example, the computing system can include an oscilloscope or multimeter and the operating state is a voltage measurement state, an amperage measurement state, or a resistance measurement state. As still yet another example, the computing system can include a vehicle scan tool and the operating state is a functional test state, a reset procedure state, or a vehicle scanning state. As a further example, the computing system can include a brake lathe and the operating state is a machining state, a machining paused state, or a machining completed state. As yet another example, the computing system can include a fluid filler system, and the operating state can be dispensing or not dispensing.

In accordance with at least some of the implementations discussed in the preceding paragraph, the computing system includes a vehicle scan tool operatively connectable directly or indirectly to the vehicle. The vehicle scan tool is operable to transmit a vehicle data message onto a communication link in the vehicle and to receive a vehicle data message transmitted by a component in the vehicle onto the communication link. The one or more additional states include a state selected from among: a diagnose state, a repair state, a recommendation state, or a report state.

In accordance with at least some of the implementations discussed three paragraphs above, the first event is classified with the paused state. The first event summary includes a classification indicating why the first event is classified with the paused state. As an example, the classification is indicative of one or more from among: a technician is waiting for customer authorization, a technician is waiting for a vehicle component, or the vehicle is out to a third-party vendor.

In accordance with at least some of the implementations discussed four paragraphs above, the closed state includes a classification indicative of why a state of the repair order is the closed state. As an example, the classification is indicative of one or more from among: (i) service complete, but customer invoice unpaid, (ii) service complete and customer invoice paid, or (iii) customer declined recommended service.

In accordance with at least some implementations of a method that includes performing one or more functions of the set 300, the particular detail regarding the first event includes a user-selectable control selectable to: (i) display information based on diagnostic data determined during the first event, (ii) configure a test device for performing a component test during the first event, or (iii) cause a vehicle communication transceiver to transmit a vehicle data message to the vehicle including a request to perform a functional test. Additionally or alternatively, as another example, the particular detail regarding the first event includes one or more from among: a vehicle message log, a test result, a measurement, an inspection result, an image, or a graph.

In accordance with at least some implementations of a method that includes performing one or more functions of the set 300, the particular detail regarding the first event includes a user-selectable control selectable to display information based on diagnostic data determined during the first event. The method further includes determining a selection of the user-selectable control occurs, and displaying, on the display, the information based on diagnostic data determined during the first event. As an example, for this paragraph and the preceding paragraph, the information can include a technical service bulletin or a real-fix tip.

In accordance with at least some implementations of a method that includes performing one or more functions of the set 300, the particular detail regarding the first event includes a user-selectable control selectable to configure a test device (e.g., the test device 164) for performing a component test. The method further includes determining a selection of the user-selectable control occurs. The method also includes configuring the test device for performing the component test in response to the determined selection. Furthermore, the method includes determining a test result by performing the component test using the configured test device. Furthermore still, the method includes modifying the first event summary to include the test result or adding into the service session record a new event summary including the test result. As an example, the test device includes the meter 165 or the scope 166.

In accordance with at least some implementations of a method that includes performing one or more functions of the set 300, the particular detail regarding the first event includes a user-selectable control selectable to cause a vehicle communication transceiver to transmit a vehicle data message to the vehicle including a request to perform a functional test. The method includes determining a selection of the user-selectable control occurs. The method also includes transmitting the vehicle data message to the vehicle including the request to perform the functional test. Furthermore, the method includes determining a status or result of performing the functional test. Furthermore still, the method includes modifying the first event summary to include the test result or status, or adding into the service session record a new event summary including the test result or status.

In accordance with at least some implementations of a method that includes performing one or more functions of the set 300, the first user-selectable control corresponds to a test executable by the computing system. The first GUI in the second display mode includes one or more from among: a container corresponding to the test or a user-selectable control corresponding to the test. The container includes content including an identifier of the test. The user-selectable control corresponding to the test is selectable to cause the processor 151 of the computing system 150 to launch or re-launch performance of the test for the service session. The test can include a guided component test in which the processor 151 configures the test device 164 to perform the test, or a functional test in which the processor 151 configures the vehicle communication transceiver 168 to transmit a first vehicle data message to the vehicle.

In accordance with at least some of the implementations discussed in the preceding paragraph, the method further includes determining, by the processor 151, a selection of the user-selectable control corresponding to the test. The method also includes the processor 151 configuring the test device 164 to perform the test or the vehicle communication transceiver 168 to transmit the first vehicle data message to the vehicle.

In accordance with at least some implementations of a method that includes performing one or more functions of the set 300, the computing system includes a first computing system. The method further includes outputting, by the first computing system or a second computing system for transmission to the computing sever, a communication including an input for modifying the service session. The communication includes one or more from among: the identifier of the service session, an identifier of the vehicle, or data that associates the input for modifying the service session record with the service session. The input for modifying the service session record is generated in response to performance of at least at a portion of an event with respect to the vehicle using the first computing system or the second computing system.

In accordance with at least some implementations of a method that includes performing one or more functions of the set 300, the method further includes receiving, while the first GUI is displayed in the first display mode or the second display mode, a communication indicating that the timeline has been modified resulting in a modified timeline. The method also includes displaying, on the display, a notification that the timeline has been modified. The method further includes displaying, on the display, at least a portion of the modified timeline. In at least some implementations, the notification is displayed in the first GUI or a second GUI. In at least some implementations, the notification is displayed in the first GUI and the modified timeline is displayed in the second GUI.

In accordance with at least some of the implementations discussed in the preceding paragraph, modifying the timeline can occur while the service session record is active (e.g., open or dispatched) or while the service session record is inactive (e.g., paused or closed). As an example, modifying the timeline when the service session record is inactive can include annotating an event summary of the timeline.

In accordance with at least some of the implementations discussed in one or both of the two preceding paragraphs, the notification can be within the second GUI. The second GUI can be pushed to the computing system by the server 100 or requested from the server 100 by the computing system 150.

In accordance with at least some implementations of a method that includes performing one or more functions of the set 300, the computing system includes a first computing system. The first event summary includes event identification information generated by the first computing system or a second computing system used during performance of the first event. The event identification information includes one or more from among: an identifier of the particular computing system or the second computing system, an event identifier, a time identifier, or an event type identifier. The identifier of the first computing system or the second computing system, and the event identifier can be unique such that the first computing system and the server know which computing system was used during the performance of the first event and which type of event from among multiple types of events was performed.

In accordance with at least some of the implementations discussed in the preceding paragraph, the method further includes outputting, by the first computing system, a request for transmission to the second computing system. The request includes at least a portion of the event identification information. The method further includes receiving, in response to the request for transmission to the second computing system, a communication from the second computing system including the detail regarding the first event. Displaying the first GUI in the second display mode is conditioned on receiving the communication from the second computing system including the detail regarding the first event.

In accordance with at least some implementations of a method that includes performing one or more functions of the set 300, receiving the first GUI includes receiving the first event summary of the timeline and the particular detail regarding the first event.

In accordance with at least some implementations of a method that includes performing one or more functions of the set 300, the timeline includes at least one event summary corresponding to an event or service activity performed using the computing system.

In accordance with at least some implementations of a method that includes performing one or more functions of the set 300, the timeline includes at least one event summary corresponding to an event or a non-service activity performed using the computing system.

In accordance with at least some implementations of a method that includes performing one or more functions of the set 300, displaying the particular detail regarding the first event includes displaying information determined or captured during performance of the first event. As an example, the information determined or captured during performance of the first event can include one or more from among: a visible light image, a thermal image, a video, a sound recording, a technical service bulletin, a real-fix tip, or a test result. The technical service bulletin and/or the real-fix tip can include an instruction for repairing the vehicle. In at least some cases, the instruction for repairing the vehicle includes an instruction for using the computing system to align, reset, or calibrate a component on the vehicle. In at least some of those cases, the instruction for using the computing system to align, reset, or calibrate a component on the vehicle includes an instruction to configure the computing system for aligning, resetting, or calibrating the vehicle component. In at least some of those cases, the computing system is configured as a piece of shop equipment.

In accordance with at least some implementations of a method that includes performing one or more functions of the set 300, the computing system includes a first computing system. In these implementations, displaying the first GUI in the second display mode further includes displaying a user-selectable control. The method further includes outputting, by the first computing system in response to a selection of the user-selectable control, a communication for transmission to a second computing system. The communication includes a request for the second computing system to perform a service activity for the service session record. The method also includes displaying, on the display, a notification indicating a status of the second computing system performing the service activity for the service session record. As an example, the service activity for the service session record can include recharging an air conditioning system in the vehicle, turning off a battery charger charging a battery in the vehicle, or performing a post-repair scan of the vehicle.

B. Second Flowchart

Figure 19:
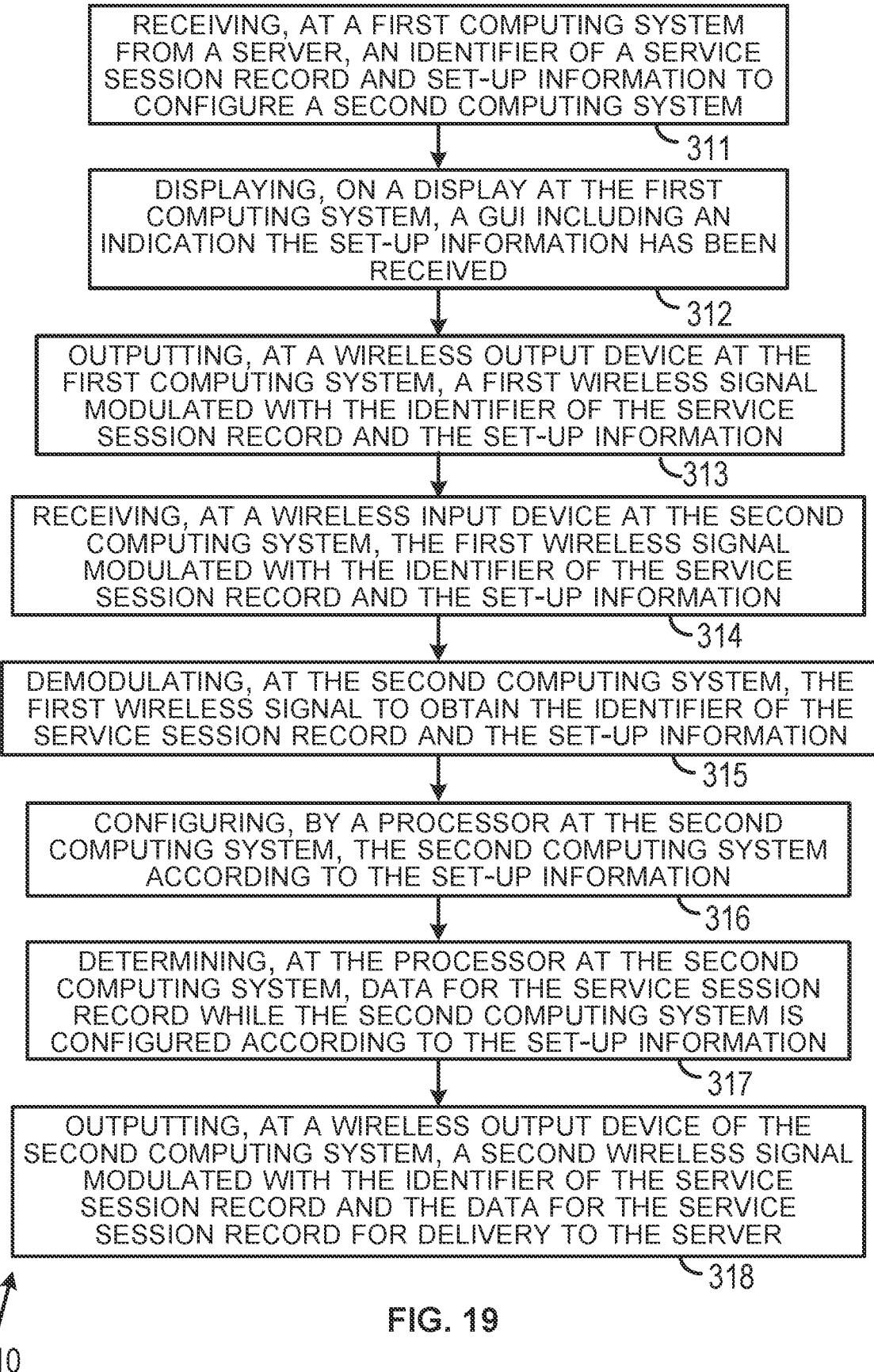

FIG. 19 is a flowchart depicting a set 310 of functions of a method in accordance with the example implementations. Two or more functions and/or portions of two or more functions of the set 310 can be performed at the same time. The functions of the set 310 can be performed by a computing system, such as the computing system 14, 15, 16, 17, 23, 24, 26, 55, 150 and/or a component of the computing system (e.g., the processor 151). A computing system that performs a function of the set 310 can perform other function(s) and/or operate in an operating state(s) other than those discussed with respect to FIG. 19. One or more functions within the set 310 or a portion of one of those functions can be performed by a server or in response to a function performed by the server, such as the server 4, 8, 100 and/or a component of the server (e.g., the processor 101). A method including a function of the set 310 can be used to repair a vehicle. A method including one or more functions of the set 310 can be performed to guide a person servicing a vehicle (e.g., a technician) and/or a person (e.g., a customer advisor) involved with servicing of the vehicle.

Block 311 includes receiving, at a first computing system from a server, an identifier of a service session record and set-up information to configure a second computing system. As an example, the set-up information can include one or more configuration parameters alone or with one or more of a test device indicator and a test name. As another example, the set-up information can include an index value corresponding to one or more configuration parameters already stored at the first computing system and/or the second computing system. As yet another example, the first computing system can include a first instance of the computing system 150, the server can include the 4, and the second computing system can include a second instance of the computing system 150.

As still yet another example, receiving the identifier and the set-up information can include receiving a communication including the identifier and the set-up information, such as a communication 540 shown in FIG. 57. In accordance with that example, the destination identifier of a field 541 can include an identifier of the first computing system, and the identifier of the service session record can be contained within a field 542, and set-up information can be contained in a field 545 or in a field 547. Those fields are shown in FIG. 57.

In at least some implementations, the set-up information can include an index value and a set-up parameter, such as those shown in Table E. Based on that example, the index value can indicate a shop equipment identifier, an element identifier, and a set-up parameter such that a server doesn't need to explicitly transmit the shop equipment identifier, the element identifier, and the set-up parameter.

Next, block 312 includes displaying, on a display at the first computing system, a GUI including an indication the set-up information has been received. FIG. 38 shows an event summary 289 including an indication the set-up information has been received. Other examples of displaying the indication are also possible.

Next, block 313 includes outputting, at a wireless output device at the first computing system, a first wireless signal modulated with the identifier of the service session record and the set-up information. As an example, the wireless output device can include the transceiver 153 or at least a portion of the transceiver 153. The wireless output device can include an antenna (e.g., the antenna 159). The wireless output device can include a modem for modulating and demodulating signals.

In at least some implementations, the set-up information output at the first computing system includes a set of test device configuration parameters, such as a set of test device configuration parameters described with respect to Table D. In at least some implementations, the set-up information output at the first computing system includes an index value associated with a set of test device configuration parameters.

In at least some implementations, outputting the first wireless signal can include outputting a wireless signal including a communication including the identifier and the set-up information, such as a communication 550 shown in FIG. 58. In accordance with these implementations, the source identifier of a field 551 can include an identifier of the first computing system, and a field 557 can include a destination identifier of the second computing system, the identifier of the service session record and the set-up information to configure the second computing system. Those fields are shown in FIG. 58.

Next, block 314 includes receiving, at a wireless input device at the second computing system, the first wireless signal modulated with the identifier of the service session record and the set-up information. As an example, the wireless input device can include the transceiver 153 or at least a portion of the transceiver 153. The wireless input device can include an antenna (e.g., the antenna 159). The wireless input device can include a modem for modulating and demodulating signals.

As an example, the set-up information received at the wireless input device includes one or more configuration parameters alone or with one or more of a test device indicator and a test name. As another example, the set-up information received at the wireless input device includes an index value associated with a set of test device configuration parameters.

Next, block 315 includes demodulating, at the second computing system, the first wireless signal to obtain the identifier of the service session record and the set-up information. Demodulating the first wireless signal can be carried out by the modem of the wireless input device.

Next, block 316 includes configuring, by a processor at the second computing system, the second computing system according to the set-up information. As an example, configuring the second computing system can include a processor controlling an actuator of the second computing system to reposition the second computing system or a component of the second computing system. As another example, configuring the second computing system can include configuring operating parameters of the computing system to be configured to make particular measurements. Additional examples of configuring the second computing system are described below.

Next, block 317 includes determining, at the processor at the second computing system, data for the service session record while the second computing system is configured according to the set-up information. Examples of data for the service session record are described elsewhere in this description.

Next, block 318 includes outputting, at a wireless output device of the second computing system, a second wireless signal modulated with the identifier of the service session record and the data for the service session record for delivery to the server. Modulating the second wireless signal can be carried out by the modem of the wireless output device.

In accordance with at least some implementations of a method that includes performing one or more functions of the set 310, the wireless output device includes an antenna (e.g., the antenna 159). The first wireless signal modulated with the identifier of the service session record and the set-up information includes a radio carrier signal.

In accordance with at least some implementations discussed in the preceding paragraph, the first computing system includes a near field communication controller. The antenna is contained within the near field communication controller or is connected to the near field communication controller. In accordance with some of these implementations, delivery of the data for the service session record can occur indirectly in that first computing system receives the data for the service session record from second computing system and the first computing system transmits the data for the service session record to the server.

In accordance with at least some implementations of a method that includes performing one or more functions of the set 310, the wireless output device includes a light emitting diode configured to output infrared light.

In accordance with at least some implementations of a method that includes performing one or more functions of the set 310, the second computing system includes a torque wrench. The set-up information includes a torque or angle setting for the torque wrench. Configuring the second computing system according to the set-up information includes configuring the torque wrench to tighten a fastener to the torque or angle setting, or the torque or angle setting plus or minus a threshold amount.

In accordance with at least some implementations of a method that includes performing one or more functions of the set 310, the second computing system includes a measurement caliper. The set-up information includes a dimension to be measured using the measurement caliper and/or an identifier of a component to be measured using the measurement caliper. As an example, a component to be measured can include a brake rotor, a brake drum, a piston head, a crankshaft journal, or a camshaft journal. Other examples of the component to be measured are possible. As another example, the set-up information can indicate whether the measurement corresponds to an internal measurement that can be made using the measurement arm 265, 266 or an external measurement made using the measurement arm 267, 268.

In accordance with at least some implementations of a method that includes performing one or more functions of the set 310, the second computing system includes a dongle (e.g., the dongle 89) that is removably attachable to an on-board diagnostic connector (e.g., the OBDC 42) in a vehicle. In accordance with at least some of the implementations discussed in this paragraph, the set-up information includes a VDM protocol to be used to communicate with an ECU within the vehicle. In accordance with at least some of the implementations discussed in this paragraph, the set-up information can include a vehicle identifier of the vehicle and/or a component identifier of a component within the vehicle so that the dongle 89 can select a VDM protocol based on the vehicle and/or component identifier. In accordance with at least some of the implementations discussed in this paragraph the set-up information can include the session identifier so that the dongle 89 can report the session identifier back to the first computing system when reporting a VDM or content of a VDM from the vehicle back to the first computing system. In accordance with at least some of the implementations discussed in this paragraph, the set-up information can include data for the dongle 89 to generate and transmit a VDM within the vehicle. The VDM can include a VDM to request performance of a functional test within the vehicle.

In accordance with at least some implementations of a method that includes performing one or more functions of the set 310, the second computing system includes an advanced driver-assistance system target rig. The set-up information includes a spatial dimension corresponding to the advanced driver-assistance system target rig. As an example, the spatial dimension can include a dimension specifying a height of a target mount or target connectable or connected to the target rig. As another example, the spatial dimension can include a dimension specifying a distance between a vertical beam of the target rig and the target mount or target. As another example, the spatial dimension can include a dimension specifying a distance between a vertical beam of the target rig, a target mount or a target and the ground upon which the target rig is disposed.

In accordance with at least some implementations of a method that includes performing one or more functions of the set 310, the second computing system includes a wheel aligner. The set-up information can include specifications, such as alignment specifications and tire pressure specifications. The wheel aligner can be configured to populate a GUI at the wheel aligner with the alignment specifications, such as a caster, camber, and toe specifications for a vehicle being serviced by the wheel aligner. The wheel aligner can be configured to adjust a tire pressure within a tire when a tire chuck is attached to a valve stem on the tire.

In accordance with at least some implementations of a method that includes performing one or more functions of the set 310, the method further includes receiving, at the first computing system from the server, the GUI and metadata. The set-up information is contained within the metadata.

In accordance with at least some implementations of a method that includes performing one or more functions of the set 310, the GUI includes a user-selectable control configured for selecting the set-up information. Displaying the GUI including displaying the user-selectable control. The method further includes determining, by the first computing system, that the user-selectable control is selected. Outputting the first wireless signal modulated with the identifier of the service session record and the set-up information occurs in response determining that the user-selectable control is selected.

In accordance with at least some implementations of a method that includes performing one or more functions of the set 310, outputting the identifier of the service session record and the data for the service session record for delivery to the server includes outputting, at the wireless output device of the second computing system, a second wireless signal modulated with the identifier of the service session record and the data for the service session record directly to the first computing system. In at least some of these implementations, the first computing system is configured to responsively transmit the identifier of the service session record and the data for the service session record to the server 4, 8, 100. In at least some of these implementations, the second wireless signal is further modulated with a request for the first computing system to forward the identifier of the service session record and the data for the service session record to the server 4, 8, 100.

In accordance with at least some implementations of a method that includes performing one or more functions of the set 310, the set-up information includes a code to unlock the second computing system. In accordance with these implementations, the second computing system is configured to lock and unlock.

When the second computing system is unlocked, the second computing system is operable to perform a particular function (e.g., make a measurement, display a measurement, or transmit a VDM to a vehicle). In contrast, when the second computing system is locked, the second computing system is not operable to perform the particular function.

Moreover, when the second computing system is unlocked, the second computing system is operable to receive the set-up information, determine the set-up information includes a code to lock the second computing system, and lock the second computing system. In contrast, when the second computing system is locked, the second computing system is operable to receive the set-up information, determine the set-up information includes the code to unlock the second computing system, and unlock the second computing system.

Configuring the second computing system to be lockable and unlockable can be useful to owners that loan and/or rent the second computing system to other people. The second computing system would likely have less value to the other people when locked so as to encourage the other people to return the second computing system to the owner.

In accordance with at least some implementations of a method described in four paragraphs above, the set-up information further includes data to unlock the second computing system for a predetermined amount of time.

In accordance with at least some implementations of a method that includes performing one or more functions of the set 310, the set-up information includes a code to lock the second computing system. The second computing system, upon receiving the code to lock the second computing system, can lock the second computing system to prevent the second computing system from performing a particular function until the second computing system is unlocked.

In accordance with at least some implementations of a method that includes performing one or more functions of the set 310, the second computing system is configured to communicate with the first computing system, but is unable to communicate with the server.

In accordance with at least some implementations of a method that includes performing one or more functions of the set 310, outputting the first wireless signal includes the wireless output device of the first computing system transmitting the first wireless signal over a personal area network established between the first computing system and the second computing system. Additionally, outputting the second wireless signal includes the wireless output device of the second computing system transmitting the second wireless signal over the personal area network established between the first computing system and the second computing system.

In accordance with at least some implementations of a method that includes performing one or more functions of the set 310, outputting the first wireless signal includes the wireless output device of the first computing system transmitting the first wireless signal over a personal area network established between the first computing system and the second computing system. Additionally, outputting the second wireless signal includes the wireless output device of the second computing system transmitting the second wireless signal to the first computing system indirectly over a wide area network.

In accordance with at least some implementations of a method that includes performing one or more functions of the set 310, the wireless output device includes an audio speaker (e.g., the speaker 170). The wireless input device includes a microphone (e.g., the microphone 169). The first wireless signal includes an ultrasonic signal.

C. Third Flowchart

FIG. 20 is a flowchart depicting a set 320 of functions of a method in accordance with the example implementations. Two or more functions and/or portions of two or more functions of the set 320 can be performed at the same time. The functions of the set 320 can be performed by a computing system, such as the computing system 14, 15, 16, 17, 23, 24, 26, 55, 150 and/or a component of the computing system (e.g., the processor 151). The computing system discussed with respect to the set 320 can include and/or be configured as an arrangement of shop equipment, such as the shop equipment 11, 12. A computing system that performs a function of the set 320 can perform function(s) other than those discussed with respect to FIG. 20. One or more functions within the set 320 or a portion of one of those functions can be performed by a server or in response to a function performed by the server, such as the server 4, 8, 100 and/or a component of the server (e.g., the processor 101). A method including a function of the set 320 can be used to repair a vehicle. A method including one or more functions of the set 320 can be performed to guide a person servicing a vehicle (e.g., a technician) and/or a person (e.g., a customer advisor) involved with servicing of the vehicle.

Block 321 includes receiving, at a computing system, a first state indicator of a first service session tracked by a server (e.g., the server 4, 8, 100) using a particular service session record. The first service session corresponds to servicing a vehicle.

Next, block 322 includes displaying a GUI on a display. The GUI corresponds to the first service session. The GUI includes the first state indicator and an indicator of a first service activity corresponding to the vehicle. In at least some implementations, the GUI is configured as a web page displayed on a browser application. In at least some of those implementations, the computing system receives the first state indicator as part of the web page, which can be configured as a computer-readable file, such as an HTML file. In at least some implementations, the computing system generates the GUI from a template based on data from the server, such as the first state indicator and other data regarding the first service session and/or the vehicle. As an example, the data from the server can include data within a service session record, examples of which are shown in FIG. 46 and FIG. 48.

Next, block 323 includes performing the first service activity. Examples of the first service activity are described throughout this description.

Next, block 324 includes determining, at the computing system, a first input for modifying the particular service session record. The first input includes data that corresponds to performing the first service activity. Determining the first input can occur before, after and/or during performance of the first service activity.

Next, block 325 includes outputting the first input by the computing system for transmission to the server. As an example, outputting the first input can include transmitting a communication, such as a communication in one or more of FIG. 49 to FIG. 58.

In accordance with at least some implementations of a method that includes performing one or more functions of the set 320, the method further includes displaying a preliminary graphical user interface on the display. The preliminary GUI includes one or more user-selectable controls. Each of the one or more user-selectable controls is configured for selecting a respective service session record. The one or more user-selectable controls include a first user-selectable control configured for selecting the particular service session record. Displaying the first GUI occurs in response to receiving a selection of the first user-selectable control. As an example, the preliminary GUI can be arranged like the GUI 363 shown in FIG. 40 and/or can include one or more aspects of the GUI 363. The method of these implementations allows for a specific service session to be selected from multiple service sessions. Moreover, a selection of a specific service session can, for example, be made from a computing system used by a technician away from the customer advisor station 10, from the computing system 17 used at the customer advisor station 10, or a different computing system.

In accordance with at least some implementations of a method that includes performing one or more functions of the set 320, the first state indicator indicates the first service session is in an open state, a dispatched state, a paused state, or a closed state. One or more of those states can include multiple states. For example, the open state can include: (i) an open, never-closed state, or (ii) an open, previously-closed state. As another example, the paused state can include: (i) a paused, waiting for customer authorization state, (ii) a paused, waiting for part state, (iii) a paused, waiting for a vendor state, or (iv) a paused, technician on break state.

In accordance with at least some of the implementations discussed in the preceding paragraph, the first state indicator of the first service session further indicates a current state of the computing system.

In accordance with at least some of the implementations discussed in the preceding paragraph, the computing system includes a vehicle scan tool configured to transmit a vehicle data message onto a communication link within the vehicle and to receive a vehicle data message transmitted by the vehicle onto the communication link. The current state corresponding to the computing system includes a diagnose state, a repair state, a validate state, or a summary state. As an example, the repair state can include a state for repairing, maintaining, servicing, or reconditioning the first vehicle. As another example, the validate state can include a state for checking a repair made to the vehicle (e.g., a state for performing a test drive of the first vehicle, confirming a malfunction on the vehicle no longer occurs, and/or performing a functional or component test). As yet another example, the summary state includes a state for compiling a report regarding the first service session.

In accordance with at least some of the implementations discussed in the preceding paragraph, the current state of the computing system is the diagnose state. The method further includes displaying, on the display, a list of components received from the server in response to outputting the first input for modifying the particular service session record. The method also includes determining, by the computing system, a component selection from the displayed list of components. Additionally, the method includes switching, in response to determining the component selection, the current state of the computing system from the diagnose state to the repair state. Moreover, the method includes outputting, by the computing system, a second input for modifying the particular service session record for transmission to the server. The second input is indicative of the component selection and switching the current state of the computing system from the diagnose state to the repair state.

In accordance with at least some of the implementations, such as the implementations discussed three paragraphs above, the computing system includes an air conditioning refrigerant recovery, recycle, and recharge station. The current state of the computing system includes a refrigerant recovery state, an evacuation state, a recharge state, or a flushing state.

In accordance with at least some of the implementations discussed in the preceding paragraph, a refrigerant system component to add into the vehicle during the recharge state includes a refrigerant or a refrigerant oil. Additionally, the method further includes measuring, via the computing system, an amount of the refrigerant system component added into the vehicle during the recharge state. In accordance with these implementations and/or those discussed in the preceding paragraph, performing the first service activity can include recovering refrigerant and/or oil from an air conditioning system in a vehicle, evacuating the air conditioning system after recovery of the refrigerant and/or oil, recharging the air conditioning system with refrigerant and/or oil, or flushing the air conditioning system.

In accordance with at least some of the implementations, such as the implementations discussed five paragraphs above, the computing system is configured to perform a multi-point inspection of the vehicle. The multi-point inspection includes multiple inspection points. The current state associated with the computing system is indicative of one or more from among: (i) a percentage of the multiple inspection points completed, (ii) a quantity of the multiple inspection points completed, (iii) a percentage of the multiple inspection points that remain to be completed, a quantity of the multiple inspection points that remain to be completed, or (iv) a result of each inspection point of the quantity of the multiple inspection points completed.

In accordance with at least some of the implementations discussed in the preceding paragraph, the computing system can determine a result of a particular inspection point based on content of a specific vehicle data message received from the vehicle. As an example, the content of the specific vehicle data message can include a parameter identifier and a parameter value corresponding to the parameter identifier. The computing system can determine the result by determining whether the parameter value is within or beyond a range of parameter values corresponding to the parameter identifier. For example, a parameter value within the range of parameter values can indicate a passing result. In contrast, a parameter value beyond the range of parameter can indicate a fail result. In at least some of these implementations, the parameter value is obtained while the vehicle is performing a functional test of a vehicle component that corresponds to the parameter identifier.

As noted above, in accordance with at least some implementations of a method that includes performing one or more functions of the set 320, the first state indicator indicates the first service session is in an open state, a dispatched state, a paused state, or a closed state. In at least some of these implementations, the graphical user interface includes a first graphical user interface and the first state indicator indicates the first service session is in the dispatched state. Additionally, performing the first service activity includes diagnosing a malfunction on the vehicle to determine a recommended vehicle component to be replaced, and outputting the first input includes outputting a communication indicative of the recommended vehicle component to be replaced. The method of these implementations also includes include, at the computing system, a second state indicator of the first service session while displaying the first graphical user interface. The second state indicator indicates the first service session is in the paused state. The method also includes displaying a second graphical user interface on the display. The second graphical user interface includes the second state indicator. The method also includes receiving, at the computing system while displaying the second graphical user interface, a third state indicator of the first service session. The third state indicator indicates the first service session is in the dispatched state. Additionally, the method includes displaying a third graphical user interface on the display. The third graphical user interface corresponds to the first service session. The third graphical user interface includes the third state indicator, and an indicator of a second service activity corresponding to the vehicle. Moreover, the method includes performing the second service activity. The method also includes determining, at the computing system, a second input for modifying the particular service session record. The second input for modifying the particular service session record includes data that corresponds to performing the second service activity. Furthermore, the method includes outputting the second input, by the computing system for transmission to the server. Furthermore still, the method includes receiving, at the computing system while displaying the third graphical user interface, a fourth state indicator. The fourth state indicator indicates the first service session is in the closed state. Finally, the method includes displaying a fourth graphical user interface on the display. The fourth graphical user interface corresponds to the first service session. The fourth graphical user interface includes the fourth state indicator.

As noted above, in accordance with at least some implementations of a method that includes performing one or more functions of the set 320, the first state indicator indicates the first service session is in an open state, a dispatched state, a paused state, or a closed state. In at least some of these implementations, the first state indicator further indicates a current state associated with performing the first service activity. The current state associated with performing the first service activity includes an un-started state, an active state, a halted state, or a completed state. Furthermore, in at least some of these implementations, the computing system can be configured to output data regarding the current state, such as data indicating progress towards finishing the current state. Additionally or alternatively, the computing system can determine a time corresponding to the first service session record changing to the current state and/or a time corresponding to the current state ending. The time(s) can be provided to the server for establishing a timeline corresponding to the first service session.

As noted above, in accordance with at least some implementations of a method that includes performing one or more functions of the set 320, the first state indicator further indicates a current state associated with performing the first service activity. The current state associated with performing the first service activity includes an un-started state, an active state, a halted state, or a completed state. In at least some of these implementations, the halted state includes a classification indicative of why the first service activity is the halted state. As an example, the classification is indicative of one or more from among: waiting for customer authorization, waiting for a vehicle component, waiting for insurance company approval, a technician assigned to work on first vehicle being on a break, or waiting for a vendor to complete work on the first vehicle. As an example, the vendor includes another repair shop or a tow truck driver.

In accordance with at least some implementations of a method that includes performing one or more functions of the set 320, the computing system includes an image capture device. Moreover, determining the first input for modifying the particular service session record includes capturing one or more from among: an image with the image capture device or a screen shot of the display. As an example, the screen shot of the display can include a screen shot of a GUI. As another example, the screen shot of the display can include a screen shot of the display while displaying a graph based on measurements made by a test device (e.g., the test device 164) within the computing system. As another example, the screen shot of the display can include a screen shot of the display while displaying parameter values corresponding to a parameter identifier contained in a vehicle data message received from the vehicle. In at least some of these implementations, capturing the screen shot occurs in response to use of a user-selectable control at the computing system. In at least some of these implementations, capturing the screen shot occurs in response to a processor of the computing system comparing a measurement made by the meter or a parameter value contained within the vehicle data message exceeding a threshold value corresponding to the measurement or the parameter identifier. As still yet another example, the screen shot of the display can include a screen shot of the display while displaying a menu. As still yet another example, the image capture device can include a visible light camera and/or a thermal imaging device.

In accordance with at least some implementations of a method that includes performing one or more functions of the set 320, performing the first service activity corresponding to the vehicle includes making a measurement with respect to a vehicle component on the vehicle. The data that corresponds to performing the first service activity corresponding to the vehicle includes a measurement value obtained by using a measurement device embedded within the computing system or a measurement device external to the computing system. As an example, the measurement device includes the test device 164, the meter 165, the scope 166, or the processor 151 determining the measurement from data within a VDM received from the vehicle communication transceiver 168. The measurement device external to the computing system can be contained within a second computing system and the second computing system can transmit the data corresponding to performing the first service activity via the transceiver 153 (e.g., transmitting the data using an NFC or BLUETOOTH® standard).

In accordance with at least some implementations of a method that includes performing one or more functions of the set 320, performing the first service activity corresponding to the vehicle includes performing a first service activity on the vehicle. Performing the first service activity on the vehicle includes one or more from among: replacing a vehicle component on the vehicle, reconditioning a vehicle component on the vehicle, aligning a vehicle component on the vehicle, tightening a vehicle component on the vehicle, diagnosing a malfunction on the vehicle, performing a new vehicle preparation activity for an original equipment manufacturer, washing the vehicle, or detailing the vehicle. Replacing the vehicle component can include removing and replacing the vehicle component. Aligning the vehicle component can include aligning the vehicle component using a wheel alignment system or an ADAS target stand. Reconditioning the vehicle component can include reprogramming, cleaning, or adjusting the vehicle component or replacing a fluid within the vehicle component. Performing the first service activity can include repairing damage to the first vehicle that occurred during a collision.

In accordance with at least some implementations of a method that includes performing one or more functions of the set 320, performing the first service activity corresponding to the vehicle includes performing a first service activity on the vehicle. Furthermore, performing the first service activity on the vehicle includes one or more from among: performing a pre-adjustment inspection of a vehicle component on the vehicle, performing a pre-adjustment of a service tool to be used in adjusting the vehicle component on the vehicle, performing an adjustment of the vehicle component on the vehicle, or performing a verification of the adjustment of the vehicle component on the vehicle. As an example, the first service activity can include performing a calibration of a vehicle component, such as a vehicle component of an ADAS (e.g., a radar, a laser, or a camera). As another example, the first service activity can include adjusting a vehicle component using a collision repair tool. As yet another example, the first service activity can include adjusting a vehicle component (e.g., a tie-rod end, a control arm, or a control arm cam bolt) based on measurements of a wheel aligner system.

Performing a pre-adjustment inspection can include inspecting the vehicle to determine whether an adjustment of the vehicle component is necessary, how to adjust the vehicle component, and/or the type of adjustment to be made to the vehicle component. Performing the pre-adjustment of the tool includes adjusting service tool before adjusting the vehicle component. In accordance with these implementations, adjusting a vehicle component can include adjusting the vehicle component by transmitting a VDM including a calibration value that causes adjustment of the vehicle component.

In accordance with at least some implementations of a method that includes performing one or more functions of the set 320, the first input for modifying the particular service session record includes data indicating a state of the particular service session record has changed. The method also includes displaying a modified graphical user interface on the display. The modified graphical user interface includes both a state indicator and a service activity indicator. The state indicator on the modified graphical user interface indicates that the particular service session record is in a second state.

In accordance with at least some of the implementations discussed in the preceding paragraph, the first state indicator of the first service session corresponds to the first service activity. The data indicating the state of the particular service session record has changed includes data indicating the first service activity has ended. The service activity indicator on the modified graphical user interface corresponds to the first service activity or to a second service activity that is to be performed after the first service activity.

In accordance with at least some of the implementations discussed two paragraphs above, a first state of the first service session corresponds to the first service activity. The data indicating the state change includes data indicating the first service activity has changed to the second state. The service activity indicator on the modified graphical user interface corresponds to the first service activity.

In accordance with at least some implementations of a method that includes performing one or more functions of the set 320, the first input also includes data indicating a first particular state of the first service session has ended. The method also includes receiving, at the computing system, a second state indicator that indicates the first service session is a second particular state. The method further includes displaying, on the display, a second graphical user interface. The second graphical user interface includes the second state indicator and an indicator of a second service activity corresponding to the vehicle. The method further includes performing the second service activity. Furthermore, the method includes determining, at the computing system, a second input for modifying the particular service session record. The second input includes data that corresponds to performing the second service activity. Furthermore still, the method includes outputting the second input by the computing system for transmission to the server.

In accordance with at least some implementations of a method that includes performing one or more functions of the set 320, the vehicle includes a first vehicle. Moreover, the method further includes displaying a second GUI on the display. The second GUI includes a list of multiple service session records tracked by the server. The list of multiple service session records includes an identifier of the particular service session record and an identifier of a second service session record. The method also includes transmitting, by the computing system to the server, a communication indicating that the identifier of the second service session record was selected from the list of multiple service session records. Furthermore, the method includes receiving, at the computing system, the identifier of the second service session record and a state indicator indicative of a first state of the second service session record, wherein the second service session record corresponds to a second vehicle. Furthermore still, the method includes displaying a third GUI on the display. The third GUI includes both the state indicator indicative of the first state of the second service session record and a service activity indicator. The service activity indicator corresponds to a particular service activity.

In accordance with at least some of the implementations discussed in the preceding paragraph, the computing system includes a first computing system. The particular service activity indicates (i) a service activity performed by use of a second computing system other than the first computing system, or (ii) a service activity performed by use of the first computing system prior to receiving the identifier of the second service session record and the state indicator indicative of the first state of the second service session record. As an example, the first computing system and the second computing system can be configured as a vehicle scan tool and the shop equipment 11, respectively or conversely. As another example, the first computing system and the second computing system can be configured as (i) a vehicle scan tool, and (ii) the meter 165 or the scope 166, respectively or conversely.

As yet another example in accordance with the implementations described in the preceding paragraph, the first computing system and the second computing system can be configured as a computing system with a first NFC controller and a computing system with a second NFC controller, respectively. In accordance with this example, first NFC controller transmits to the second NFC controller data for performing the particular service activity by the second computing system. The data for performing the particular service activity can include data for configuring the second computing system according to particular settings for the particular service activity with respect to the first vehicle.

For implementations in which the second computing system includes a torque wrench, the data for configuring the second computing system can include a torque or angle setting for the torque wrench. For implementations in which the second computing system includes the scope 166, the data for configuring the second computing system can include a volts/division setting, a time scale setting, a horizontal axis scale, a vertical axis scale, a sample rate, a trigger source, a peak detect setting, an invert signal setting, and/or a trigger setting. For implementations in which the second computing system includes the meter 165, the data for configuring the second computing system can include a meter mode setting (e.g., DC volts, AC volts, amperage, frequency, pulse width, duty cycle, capacitance, dwell, temperature, pressure, continuity, or resistance) and can include a meter range setting (e.g., 0-2 volts, 0-20 volts, 0-2 amperes, or 0-20 amperes). For implementations in which the second computing system includes the ACRRR, the data for configuring the second computing system can include a refrigerant volume corresponding to a capacity of a refrigerant system, and a refrigerant oil volume.

In accordance with at least some of the implementations discussed four paragraphs above, the particular service activity indicates a service activity performed by use of the computing system prior to the computing system receiving the identifier of the second service session record and the state indicator indicative of the first state of the second service session.

In accordance with at least some of the implementations discussed five paragraphs above, the data that corresponds to performing the first service activity includes data entered via a user interface of the first computing system. As an example, the data entered via the user interface include data indicating selection of a different service session, data indicating selection of a different state indicator corresponding to the first service session, or data indicating a result of performing the first service activity.

In accordance with at least some implementations of a method that includes performing one or more functions of the set 320, the computing system includes non-transitory computer-readable memory. The non-transitory computer-readable memory contains multiple GUIs. Each GUI of the multiple GUIs corresponds to both one or more states of a service session record and one or more service activities. The multiple GUIs include the GUI. The method further comprises determining, at the computing system, the GUI is to be displayed based at least in part on the first state indicator. The method also includes automatically displaying the GUI in response to determining that the GUI is to be displayed.

In accordance with at least some of the implementations discussed in the preceding paragraph, a GUI corresponding to multiple states of service session can include a GUI corresponding to multiple event summaries of a timeline with different states. Additionally or alternatively, a GUI corresponding to one or more service activities can include one or more service activities for a single repair job or event summary, or multiple service activities for multiple different jobs or event summaries on the first GUI. As an example, a wheel alignment job can include multiple service activities, such as determining air pressure within tires on a vehicle using a computing system arranged as a scan tool, setting a ride height of the vehicle using the computing system arranged as the scan tool, adjusting the wheel aligner equipment, determining wheel alignment measurements, and aligning the vehicle wheels.

In accordance with at least some of the implementations discussed two paragraphs above, the method further includes receiving, at the computing system from the server, the indicator of the first service activity in connection with receiving the first state indicator. Determining the first graphical user interface is to be displayed is further based on the indicator of the first service activity.

In accordance with at least some implementations of a method that includes performing one or more functions of the set 320, performing the first service activity includes transmitting a request for a vehicle component to be replaced on the vehicle. The method also includes receiving a delivery of the vehicle component.

In accordance with at least some of the implementations discussed in the preceding paragraph, receiving the delivery of the vehicle component includes receiving the delivery by a robot or a drone. In at least some of these implementations, transmitting the request for the vehicle component can include a computing system within the repair shop 6 (e.g., the computing system 14, 15, 23, 24, 26) transmitting the request to the computing system 16 at the parts department 7. The robot or drone can be dispatched by and/or from the parts department 7. The computing system 16 can include a scanner for scanning a code (e.g., a bar code or UPC code) on a vehicle component or package containing a vehicle component. The scanner can be used to scan a code on a service session record. The computing system 16 can update an inventory record based on selecting the vehicle component for use on a vehicle and update output data regarding the vehicle component (e.g., a part number, part name, or price) to the server 4 for updating the service session record.

In accordance with at least some implementations of a method that includes performing one or more functions of the set 320, the method further includes receiving the GUI at the computing system, Receiving the GUI can include receiving the first state indicator. Receiving the first GUI can also include receiving an identifier of the first service session. In at least some of these implementations, the server 4, 8, 100 transmits the GUI to the computing system as part of a web-service and/or as web page.

In accordance with at least some implementations of a method that includes performing one or more functions of the set 320, the method further includes: associating, at the server based on a communication received at the server, the particular service session record with one or more from among: (i) the computing system, (ii) a user identifier of a user associated with the computing system, or (iii) a repair shop identifier of a repair shop associated with the computing system. The method also includes transmitting the first state indicator and an identifier of the particular service session record to the computing system from the server after associating the particular service session record with one or more from among: the computing system, the user identifier of the user associated with the computing system, or the repair shop identifier of the repair shop associated with the computing system. As an example, the communication received at the server can include a communication sent from the computing system or a different computing system. As an example, the different computing system can include the computing system 17 at the customer advisor station 10 and the computing system can include a computing system used by a technician, such as the computing system 14, 15, 23, 24, 26 or the shop equipment 11, 12.

In accordance with at least some implementations of a method that includes performing one or more functions of the set 320, a computing system can determine the data indicative of the state of a service activity being completed by determining a particular amount of a fluid (e.g., engine oil or refrigerant) has been added into the vehicle. As another example, the computing system can determine the data indicative of the state of the first service session being completed by determining a diagnostic monitor performed by an ECU in the vehicle finished during a test drive of the first vehicle. As yet another example, the computing system can determine the data indicative of the first state of the first service session being completed by determining a user-selectable control selectable to indicate the first state of the first service session is completed.

D. Fourth Flowchart

FIG. 21 is a flowchart depicting a set 330 of functions of a method in accordance with the example implementations. Two or more functions and/or portions of two or more functions of the set 330 can be performed at the same time. The functions of the set 330 can be performed by a server, such as the server 4, 8, 100 and/or a component of the server (e.g., the processor 101). A server that performs a function of the set 330 can perform other function(s) in addition to a function discussed with respect to FIG. 21. One or more functions within the set 330 or a portion of one of those functions can be performed by a computing system or in response to a function performed by the computing system, such as the computing system 14, 15, 16, 17, 23, 24, 26, 55, 150 and/or a component of the computing system (e.g., the processor 151). A method including a function of the set 330 can be used to repair a vehicle. A method including one or more functions of the set 330 can be performed to guide a person servicing a vehicle (e.g., a technician) and/or a person (e.g., a customer advisor) involved with servicing of the vehicle.

Block 331 includes determining, at a server, a first communication received at the server includes a request to initiate a first service session corresponding to a vehicle. In at least some implementations, the first communication includes an explicit request to initiate the first service session. As an example, the first communication includes the explicit request and is sent from the computing system 17 used at the customer advisor station 10. In at least some implementations, the first communication includes data that does not correspond to any service session record in existence. As an example, the data that does not correspond to any service session record in existence can include a vehicle identifier that corresponds to the vehicle and a repair order number that is not contained in an existing service session record and/or is not contained within an existing service session record corresponding to the vehicle.

As an example, the first communication received at the server can be arranged like and/or include at least a part of a communication 212 shown in FIG. 44 and/or a communication 218 shown in FIG. 45. Other examples of the first communication and/or content of the first communication are also possible.

Next, block 332 includes generating, at the server based at least in part on the first communication, a first service session record corresponding to the first service session. The first service session record includes a state indicator, a timeline, and an identifier of the first service session. The state indicator is indicative of a first current state of the first service session. The timeline is indicative of one or more events corresponding to the first service session.

Next, block 333 includes determining, at the server, a second communication received at the server includes an input for modifying the first service session record. As an example, the second communication can include a communication, such as a communication in one or more of FIG. 49 to FIG. 58.

Next, block 334 includes modifying, at the server, at least a portion of the first service session record based at least in part on the input. The portion of the first service session record includes the state indicator, the timeline, or the state indicator and the timeline.

Next, block 335 includes outputting, at the server for transmission to the first computing system, at least the portion of the first service session record. As an example, the first service session record can include and/or be arranged like at least a portion of the service session record 230 shown in FIG. 46 and FIG. 48.

In accordance with at least some implementations of a method that includes performing one or more functions of the set 330, determining that the first communication includes the request includes determining that the first communication includes a vehicle identifier corresponding to the vehicle and an identifier of a repair order corresponding to the vehicle, and that a service session record corresponding to the repair order and the vehicle does not exist. Furthermore, generating the first service session record includes adding the vehicle identifier and the identifier of the repair order to the first service session record.

In accordance with at least some of the implementations discussed in the preceding paragraph, determining that the first communication includes the request also includes determining an image file and performing optical character recognition on the image file. The character(s) in the image file include a request to initiate the service session. In accordance with at least some of the implementations discussed in the preceding paragraph, determining that the first communication includes the request also includes comparing individual aspects of the first communication to respective aspects defined within a message map and determining the respective aspects defined within the message map indicate the request to initiate a first service session. In accordance with at least some of the implementations discussed in the preceding paragraph, determining that the first communication includes the request also includes determining an image file and reading metadata corresponding to the image file. The metadata includes data requesting initiation of the service session.

In accordance with at least some of the implementations discussed in the preceding two paragraphs, the first current state of the first service session is indicative of a first current state of the repair order. Moreover, the first current state of the first repair order is an open state, a dispatched state, a paused state, or a closed state.

In accordance with at least some of the implementations discussed in the preceding paragraph, the first current state of the first service session further includes a current state corresponding to an event being performed by the first computing system or a second computing system. Moreover, the input for modifying the first service session record includes an indicator that the current state corresponding to the event being performed by the first computing system or the second computing system is a diagnose state, a repair state, a validate state, or a summary state.

In accordance with at least some implementations discussed in any of the preceding four paragraphs, determining that the first communication includes the request further includes determining one or more from among: an indication that a first repair order regarding the vehicle was generated, an indication that a vehicle scan occurred on a vehicle that does not correspond to an active service session, or an indication that the first communication includes a communication transmitted from a telematics system within the vehicle.

In accordance with at least some implementations of a method that includes performing one or more functions of the set 330, the first communication includes a communication transmitted from a telematics system within the vehicle.

In accordance with at least some of the implementations discussed in the preceding paragraph, the method further includes determining, at the server after receiving the first communication, a first repair order generated for the vehicle. The first repair order includes an identifier of the first repair order and an identifier of the vehicle. Generating the first service session record includes adding the identifier of the first repair order and the identifier of the vehicle to the first service session record. In at least some of these implementations, the server that receives the first communication or another server generates the repair order.

In accordance with at least some of the implementations discussed in any of the two preceding paragraphs, the communication transmitted from the telematics system within the vehicle includes one or more from among: an indication that the first communication is from a telephone call placed from the vehicle and/or a telephone number corresponding to the vehicle. In at least some of those implementations, the telephone number corresponding to the vehicle includes a telephone number corresponding to a mobile telephone corresponding to an owner of the vehicle. In at least some of those further implementations, the mobile telephone is configured to communicate with the vehicle via a dongle connected to an OBDC within the vehicle.

In accordance with at least some implementations of a method that includes performing one or more functions of the set 330, the input for modifying the first service session record includes the identifier of the first service session. In at least some of those implementations or in in other implementations, the input for modifying the first service session record includes one or more from among: measurement data, an image file, a vehicle data message, or data contained within a vehicle data message.

In accordance with at least some implementations of a method that includes performing one or more functions of the set 330, the input for modifying the first service session record does not include the identifier of the first service session, but includes data from which the identifier of the first service session record can be derived. Moreover, the method further includes the server deriving the identifier of the first service session record from the data.

In accordance with at least some of the implementations discussed in the preceding paragraph, the data includes one or more from among: a vehicle identification number of the vehicle, alpha-numeric characters from a license plate attached to the vehicle, an image of a portion of the vehicle, an identifier of a technician to whom a repair order was dispatched, an identifier of a repair order corresponding to the first service session, data from shop equipment required to perform an event listed on a repair order corresponding to the first service session, or an indicator of a particular repair shop. In at least some implementations, the server performs optical character recognition on the image of the portion of the vehicle so as to obtain text from which the identifier of the first service session record can be derived.

In accordance with at least some implementations of a method that includes performing one or more functions of the set 330, modifying at least the portion of the first service session record includes modifying the timeline. Modifying the timeline includes adding to the timeline an indicator of an event performed by the first computing system.

In accordance with at least some of the implementations discussed in the preceding paragraph, the event performed by the first computing system includes one or more from among: navigation of a hierarchy of menus, obtaining a result of a test performed on the vehicle, capture of a screen shot of a display at the first computing system, capture of one or more vehicle data messages from the vehicle, or capture of an image of a portion of the vehicle. As an example, the test performed on the vehicle includes a functional test or a component test. In at least some implementations, the component test incudes a component test performed by the meter or oscilloscope within the first computing system. In at least some of those implementations, the component test includes a guided component test in which the first computing system automatically configures one or more settings of the meter or the oscilloscope to perform a measurement. In at least some implementations, the one or more vehicle data messages are captured during a scan of the vehicle prior to a repair being made to the vehicle or after a repair to the vehicle has been made. In at least some implementations, the one or more vehicle data messages are captured during a scan of the vehicle to capture baseline value(s) regarding the vehicle.

In accordance with at least some implementations of a method that includes performing one or more functions of the set 330, the second communication includes a communication from the first computing system indicative of a first service session state and a communication from a second computing system indicative of a second service session state. The first service session state and the second service session state are different service session states. Moreover, determining the input for modifying the first service session record includes resolving a conflict based on the communication from the first computing system indicative of the first service session state and the communication from the second computing system indicative of the second service session state. In accordance with at least some of these implementations, the first computing system is and/or includes the second computing system.

In accordance with at least some of the implementations discussed in the preceding paragraph, the communication from the first computing system indicative of the first service session state is associated with a first hierarchy value and the communication from the second computing system indicative of the second service session state is associated with a second hierarchy value. Furthermore, resolving the conflict includes the server determining which of the first hierarchy value and the second hierarchy value is greater. Furthermore still, modifying at least the portion of the first service session record includes modifying the portion of the first service session record based on the first service session state if the first hierarchy value is greater than the second hierarchy value or based on the second service session state if the second hierarchy value is greater than the first hierarchy value. In at least some implementations, communications from a particular computing system at the repair shop 6 have a hierarchy value that is greater than a hierarchy value contained in communications from other computing systems corresponding to the repair shop 6. As an example, the particular computing system can include a computing system assigned to a service manager that works at the repair shop 6.

In accordance with at least some of the implementations discussed in the preceding paragraph, the first service session state indicates that a repair is recommended and customer approval is pending. The second service session state indicates that a repair is recommended and customer approval was received. The second hierarchy value is greater than the first hierarchy value.

In accordance with at least some of the implementations discussed in the preceding two paragraphs, the communication from the first computing system is received at the server at a first time, and the communication from the second computing system is received at the server at a second time. Moreover, resolving the conflict includes the server determining which of the first time and the second time occurred later. Additionally, modifying the portion of the first service session record includes modifying the state indicator based on the first service session state if the first time is later than the second time or based on the second service session state if the second time is later than the first time.

In accordance with at least some implementations of a method that includes performing one or more functions of the set 330, the method further includes managing, by the server, multiple service session. In accordance with these implementations, the multiple service session includes the first service session. Each service session record of the multiple service session is associated with a unique service session identifier. The unique service session record identifier of the first service session is the identifier of the first service session. Determining the second communication received at the server includes the input for modifying the first service session record is conditioned on the server determining that the second communication includes the identifier of the first service session.

In accordance with at least some of the implementations discussed in the preceding paragraph, managing the multiple service session records includes one or more from among: the server permitting a computing system associated with a first repair shop to access the first service session, or the server blocking a computing system associated with a second repair shop other than the first repair shop from accessing the first service session.

In accordance with at least some implementations of a method that includes performing one or more functions of the set 330, the method further includes determining, at the server, a location of the vehicle and an identifier of the vehicle. The method also includes determining the location of the vehicle is within a threshold distance of a location associated with a repair shop corresponding to the first computing system. As an example, the threshold distance can include a threshold distance less than or equal to 50 meters, less than or equal to 100 meters, less than or equal to 250 meters, less than or equal to 500 meters, less than or equal to 550 meters, less than or equal to 1,000 meters or some other threshold distance.

In accordance with at least some of the implementations discussed in the preceding paragraph, the first communication can be sent from the vehicle. As an example, the first communication sent from the vehicle can be sent from an ECU within the vehicle or from a mobile telephone, such as a mobile telephone operatively coupled to a dongle connected to an OBDC within the vehicle. In accordance with these implementations, the ECU, dongle, or the mobile telephone can determine a location corresponding to the vehicle for reporting to the server via the first communication.

In accordance with at least some of the implementations discussed in the preceding paragraph in which the mobile telephone transmits the first communication, the mobile telephone can contain and be configured to execute a particular application. As an example, the particular application can include a geo-fencing feature for determining when the mobile telephone and/or the vehicle is within proximity to the repair shop 6. The repair shop 6 can correspond to a particular location (e.g., a particular latitude and longitude) and the geo-fencing feature can compare a location of the mobile telephone or the vehicle to the particular location to determine if the location of the mobile telephone or the vehicle is within a threshold distance of the particular location. Upon determining the location of the mobile telephone or the vehicle is within a threshold distance of the particular location, the mobile telephone can send a communication, such as the first communication, for notifying the server 4, 8, 100 that the vehicle has arrived in proximity to the repair shop. As an example, the threshold distance can include a threshold distance less than or equal to 50 meters, less than or equal to 100 meters, less than or equal to 250 meters, less than or equal to 500 meters, less than or equal to 550 meters, less than or equal to 1,000 meters or some other threshold distance. As an example, the first communication can include an ultra-wideband signal, similar to an ultra-wideband signal that can be transmitted by an AIRTAG produced by Apple Inc., Cupertino, California, except the payload includes data regarding the mobile telephone or the vehicle.

In accordance with at least some of the implementations discussed in the preceding paragraph, the first communication can include time data determined by the first computing system and/or time data determined by the server from a source other than the first communication. As an example, the time data determined by the server can include time data indicating when the server received the first communication. The temporal data 202 can include the time data determined by the server.

In accordance with at least some of the implementations discussed in the preceding two paragraphs, the first communication includes a communication generated by a telematics system within the vehicle. In accordance with at least some of those implementations, the telematics system includes a dongle connected to an OBDC in the vehicle and to a mobile telephone that transmits the first communication to the server 4, 8, 100 by way of the communication network 3.

In accordance with at least some implementations of a method that includes performing one or more functions of the set 330, the method further includes determining, at the server, multiple service session records corresponding to a single identifier. The method also includes outputting, at the server, a third communication including at least a portion of each service session record of the multiple service session records. Outputting the third communication includes outputting at least the portion of the first service session record. As an example, the single identifier for this method can be a repair shop identifier, an identifier of a computing system (e.g., the computing system 150), or a technician identifier.

In accordance with at least some of the implementations described in the preceding paragraph, a state indicator associated with each of the multiple service session records is an open state, a dispatched state, a paused state, or a closed state.

In accordance with at least some implementations of a method that includes performing one or more functions of the set 330, the first service session record includes a vehicle identifier corresponding to the vehicle. Additionally, generating the first service session record includes generating a first file within a particular non-transitory computer-readable memory, and a processor of the server writing the state indicator, the timeline, the identifier of the first service session, and the vehicle identifier into the first file. Moreover, the method further includes determining, at the server, the particular non-transitory computer-readable memory includes a second service session record corresponding to the vehicle within a second file. The second service session record includes the vehicle identifier corresponding to the vehicle and a state indicator indicating that a second service session corresponding to the vehicle is active. The second service session record includes a timeline indicative of one or more events corresponding to the second service session. The method also includes merging the first service session record with the second service session record. Merging the first service session record with the second service session record includes aggregating the one or more events of the timeline from the first service session record and the one or more events of the timeline from the second service session record.

In accordance with at least some of the implementations described in the preceding paragraph, the method further includes deleting, from the particular computer-readable memory, one or more from among: the first file or the second file after merging the first service session record with the second service session record.

In accordance with at least some of the implementations described in the preceding two paragraphs, the first and second service session records can be based on separate communications from the same or different computing systems. As an example, two different customer advisors at the repair shop could use the computing system 17 to send communications to the server 4, 8, 100 to request creation of the first and second service session records, where one or more of those communications does not include vehicle identifier or data from a vehicle identifier can be determined with certainty. As another example, the two separate communications can include the first communication and a third communication, the first communication can include a communication from a computing system at the repair shop 6 and third communication can include a communication from a telematics system in the vehicle.

In accordance with at least some implementations of a method that includes performing one or more functions of the set 330, generating the first service session record includes generating a file within a particular non-transitory computer-readable memory, and a processor of the server writing the state indicator, the timeline, and the identifier of the first service session record into the file within the particular non-transitory computer-readable memory. In at least some of these implementations, the processor of the server can read the file and write to the file. As an example, the file can include an XML file, a JSON file, a PDF file, or a comma separated variable (CSV) file.

In accordance with at least some implementations of a method that includes performing one or more functions of the set 330, outputting at least the portion of the first service session record can include outputting a GUI including at least the portion of the first service session record. As an example, the GUI including at least the portion of the first service session record can include the state indicator, the identifier of the first service session, and at least a portion of the timeline. As another example, the GUI including at least the portion of the first service session record can include at least a part of and/or is arranged as at least a part of the GUI 349, 350, 351, 352, 387, 390, 421, 428, 433, 444. As yet another example, the GUI including at least the portion of the first service session record can include a GUI contained in the GUI 205 stored in the memory 102, or the GUI 188 stored in the memory 152. As still yet another example, the GUI including at least the portion of the first service session record can include the first GUI discussed in the set 300 or in any method described as including a function of the set 300, the GUI discussed in the set 310 or in any method described as including a function of the set 310, or the first GUI discussed in the set 320 or in any method described as including a function of the set 320.

In accordance with at least some implementations of a method that includes performing one or more functions of the set 330 and receiving a state indicator, such as the first state indicator, the second state indicator, the third state indicator, or the fourth state indicator, an identifier of the particular service session record accompanies the state indicator or is transmitted in conjunction with the state indicator such that the processor determines the received state indicator corresponds to the particular service session record and/or the first service session.

In accordance with at least some implementations discussed in the preceding paragraph, receiving the state indicator can include receiving a GUI and/or GUI file that includes the state indicator. As an example, receiving the first, second, third or fourth state indicator can include receiving the first, second, third, or fourth GUI, respectively. As another example, receiving the first, second, third or fourth state indicator can include receiving a GUI file for generating the first, second, third, or fourth GUI, respectively.

In accordance with at least some implementations of a method that includes performing one or more functions of the set 300, the set 310, the set 320, or the set 330, the identifier of a service session is identical to an identifier of a service session record corresponding to the service session. Likewise, in accordance with at least some implementations of a method that includes performing one or more functions of the set 300, the set 310, the set 320, or the set 330, the identifier of a service session record is identical to an identifier of a service session corresponding to the service session record. Moreover, the server or a computing system can include data and/or program instructions to derive the identifier of a service session record based at least in part on the identifier of service session corresponding to the service session record if those two identifiers are not identical.

Likewise, the server or a computing system can include data and/or program instructions to derive the identifier of a service session based at least in part on the identifier of a service session record corresponding to the service session if those two identifiers are not identical.

VI. Example Graphical User Interfaces

This section describes graphical user interfaces (GUIs) shown in the drawings. In accordance with the example implementations, the GUIs shown in the drawings can be output on a display, such as the display 163. In accordance with one or more of the example implementations, a graphical user interface (GUI) can include text with or without a graphic. Some text of a GUI can be contained within a link, such as a hyperlink. Two or more of the GUIs shown in the drawings include common aspects with the same or different content.

In at least some implementations, a GUI is a web-based GUI that a server (e.g., the server 4, 8, 100) serves to a computing system (e.g., the computing system 14, 15, 16, 17, 23, 24, 26, 55, 150) over a communication network. In these implementations, a processor within the computing system (e.g., the processor 151) can execute a web-browser application to receive a GUI file from the server and to output the GUI on a display. The server can generate the GUI file and modify the GUI file based on inputs to modify the GUI. As an example, the GUI file can include a file such as an HTML file.

In at least some implementations, a GUI includes one or more containers. A container is an element of a GUI. A container is associated with content that can be displayed within an area of a GUI and/or a page defined for the container. As an example, the content associated with a container can include one or more of a USC, a graph (e.g., a graphed waveform), an event summary, an icon, text (such as text describing an event performed for a session), an image, a video, a PID, or a parameter value corresponding to a PID. Other examples of content displayable within a container are also possible. The application drawings show at least some of those other examples.

A container can be associated with a default location within a GUI. In at least some implementations, the default location within a GUI to display the container is fixed. In at least some other implementations, a location to display the container can change, such as by moving the container from one location (e.g., a default location) within the GUI to another location within the GUI, and/or by increasing or decreasing a size of an area of the container. In at least some implementations, a container can be moved in response to use of a scroll bar or based on filtering event summaries displayed on the GUI. In at least some implementation, a container can be moved and/or resized in response to addition or removal of another container within a timeline or modifying an existing an event summary in an existing container.

A container can be related to one or more other containers. As an example, two or more containers can be related as defined by a hierarchical relationship in which a first of the two containers is within a second of the two containers, and/or the second of the two containers includes the first container. In accordance with this example, the second container is considered to be as a parent container, whereas the first container is considered to be a sub-container (and/or a child container). Although the example hierarchical relationship refers to the first container being within the second container, the hierarchical relationship does not require that displaying the first and second containers includes displaying the first container, wholly or even partly, within a boundary established for the second container. For example, in some implementations, displaying the first container could include displaying at least a portion of the first container beyond the boundary established for the second container.

A sub-container is a container that corresponds to a parent container. In at least some implementations, a container defined within a GUI and/or page as being within another container is a sub-container. The container that includes that sub-container is a parent container. A sub-container can be a parent container to one or more other sub-containers.

Figure 27:
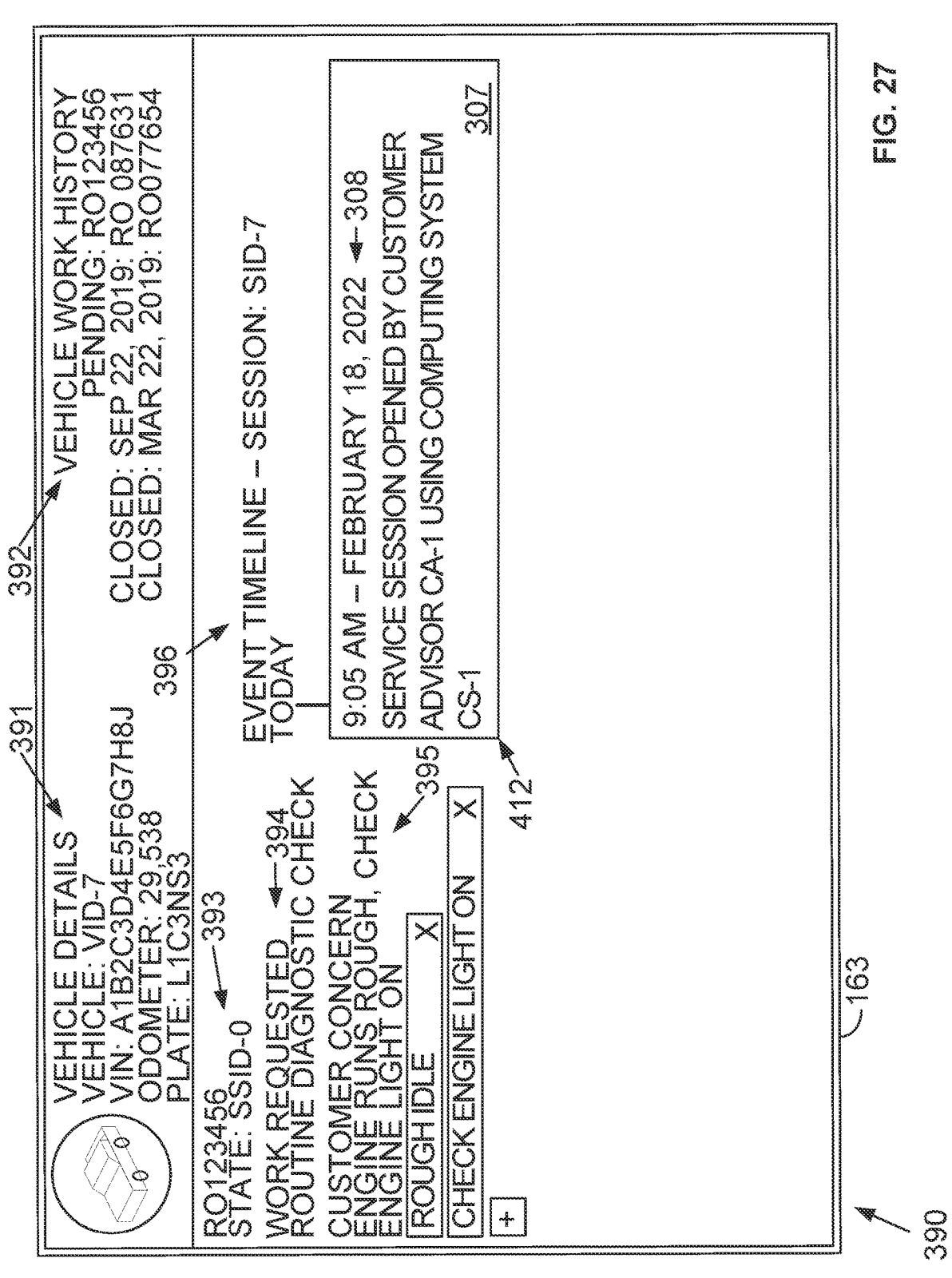

In at least some implementations, a container or sub-container is arranged as a display card. The containers within the user-interfaces of the example implementations can be displayed using various container properties. As an example, in at least some implementations, a container can have a boundary. A boundary property can be non-visible, such that no visible boundary is displayed while the container having that boundary property is displayed. A different boundary property can be visible, such that a visible boundary is displayed while the container having that boundary property is displayed. As an example, a visible boundary could specify one or more of a line thickness, color, or a drop shadow. Other examples of a container property are also possible. A visible boundary 412 in accordance with an example implementation is shown in FIG. 27.

FIG. 22 to FIG. 26 show different GUIs with common aspects in two or more of the GUIs shown in those figures. The common aspects include an identifier (i.e., ID), such as a session ID 341, a session state ID 342, a vehicle ID 343, a service activity ID 344, or a service location identifier 345. As another example, the aspects shown in one more of the different GUIs include a specification 346, a customer complaint 347, or a graphical timer 348. In FIG. 22 to FIG. 26, a session state ID of SSID-0 indicates an open state, SSID-1 indicates a dispatched state, SSID-2 indicates a paused state, and SSID-3 indicates a closed state. Other examples of a session state ID are possible.

FIG. 22 shows a GUI 349 output on the display 163. The GUI 349 can be displayed in response to a selection of the row 364 corresponding to the session SID-5. In the GUI 349, the session ID 341 is SID-5, the session state ID 342 is SSID-0, and the vehicle ID 343 is VID-5. The GUI 349 includes a set 295 of the service activity identifiers that include three different service activities to be performed for the session SID-5. The GUI 349 includes a USC 337 selectable to select a service activity referred to as "change engine oil," or alternatively "LOF" for "lube, oil, and filter," a USC 338 selectable to select a service activity referred to as "diagnose service engine soon lights," and a USC 339 selectable to select a service activity referred to as "diagnose air conditioning not cooling." The GUI 349 includes a USC 384 selectable to cause the display 163 to display a GUI from which sessions can initially be selected. As an example, in response to determining the USC 384 has been selected, a processor can cause the display 163 to display a GUI showing different sessions, such as the GUI 363 shown in FIG. 40.

FIG. 23 shows a GUI 350 output on the display 163. In at least some implementations, the GUI 349 shown in FIG. 22 is a first display mode of the GUI 349 and the GUI 350 is a second display mode of the GUI 349. The GUI 350 can be displayed in response to a selection of the USC 337 within the GUI 349. In the GUI 350, the session ID 341 is SID-5, the session state ID 342 is SSID-1, the vehicle ID 343 is VID-5, the service activity ID 344 indicates service activity SA-1, which corresponds to "change engine oil," and the service location identifier 345 is service bay SB-3. The GUI 350 also includes a specification. As an example, the specification 340 includes a specification regarding the service activity SA-1 and a vehicle corresponding to the vehicle ID VID-5.

The GUI 350 includes the USC 384, and a USC 353, 354, 355, 383, 385. The USC 384 is described above. The USC 353 is selectable to cause the computing system (e.g., the computing system 24 in service bay 30) to transmit to the computing system 16 at the parts department 7 a communication including a request for an oil filter, such as the oil filter defined by the specification 340. The USC 354 is selectable to cause the computing system (e.g., the computing system 24 in service bay 30) to transmit to the computing system 26 (e.g., configured as a computing system that controls dispensing fluids into the vehicle) a communication including a request to dispense an amount of a particular fluid, such as an amount and fluid defined by the specification 340. The USC 355 is selectable to cause the computing system (e.g., the computing system 24 in service bay 30) to transmit to a vehicle (e.g., the vehicle 21 as shown in FIG. 5) a VDM requesting an ECU in the vehicle to perform reset procedure to reset the oil life in the vehicle. The USC 383 is selectable to cause the display 163 to display a home screen GUI for the session SID-5. As an example, in response to determining the USC 383 has been selected, a processor can cause the display 163 to display the GUI 349 shown in FIG. 22. The USC 385 is selectable to pause the session SID-5. In at least some implementations, in response to a selection of the USC 385, a processor can cause the display 163 to display the GUI 387 shown in FIG. 26.

Finally, the GUI 350 includes a timer icon 329. As an example, the timer icon 329 can indicate a time range corresponding to the service activity SA-1, such as a time range that indicates when the service activity SA-1 began and a time when completion of the service activity SA-1 is expected. A processor, such as the processor 151, can update the time range based on various factors, such as the service activity SA-1 being paused and unpaused.

Next, FIG. 24 shows a GUI 351 output on the display 163. In at least some implementations, the GUI 349 shown in FIG. 22 is a first display mode of the GUI 349 and the GUI 351 is another display mode of the GUI 349. The GUI 351 can be displayed in response to a selection of the USC 338 within the GUI 349. In the GUI 351, the session ID 341 is SID-5, the session state ID 342 is SSID-1, the vehicle ID 343 is VID-5, and the service activity ID 344 indicates service activity SA-2, which corresponds to "diagnose service engine soon lights."

The GUI 351 also includes a USC 356, 357, 358, 359. The USC 356 is selectable to select a diagnosis mode of a computing system. The USC 356 can be highlighted to indicate the computing system is in the diagnosis mode. The USC 357 is selectable to select a repair mode of a computing system. The USC 357 can be highlighted to indicate the computing system is in the repair mode. The USC 358 is selectable to select a validate mode of a computing system. The USC 358 can be highlighted to indicate the computing system is in the validate mode. The USC 359 is selectable to select a summary mode of a computing system. The USC 359 can be highlighted to indicate the computing system is in the summary mode. As an example, in the summary mode, the computing system can display a timeline including an event summary. Examples of such a timeline are described elsewhere in this description.

Next, FIG. 25 shows a GUI 352 output on the display 163. In at least some implementations, the GUI 349 shown in FIG. 22 is a first display mode of the GUI 349 and the GUI 352 is another display mode of the GUI 349. The GUI 352 can be displayed in response to a selection of the USC 339 within the GUI 349. In the GUI 352, the session ID 341 is SID-5, the session state ID 342 is SSID-1, the vehicle ID 343 is VID-5, the service activity ID 344 indicates service activity SA-3, which corresponds to "diagnose air conditioning not cooling," and the service bay ID is "SB-1." The GUI 352 includes the USC 383, 384, 385, each of which is described above. The GUI 352 also includes a specification 346. As an example, the specification 346 includes a specification regarding the service activity SA-3 and a vehicle corresponding to the vehicle ID VID-5.

Furthermore, the GUI 352 includes a USC 360, 361, 362 corresponding to the service activity SA-3. As an example, the USC 360, 361, 362 is selectable to select a different operating state of an ACRRR system. As an example, the USC 360 is selectable to select a recover operating state in which refrigerant is removed from a vehicle, the USC 361 is selectable to select an evacuate operating state in which a vacuum is created within an air conditioning system in the vehicle, and the USC 362 is selectable to select a recharge operating state in which refrigerant and/or refrigerant system oil is added into the air conditioning system. FIG. 25 includes cross-hatching in the USC 361 to indicate a USC can be highlighted to indicate a control corresponding to that USC is active. Finally, the GUI 352 includes a graphical timer 348. As an example, the graphical timer 348 can indicate how long a currently active operating state of the ACRRR has been active or an estimate of how much more time the currently active operating state of the ACRRR will be active.

Next, FIG. 26 shows a GUI 387 output on the display 163. The GUI 387 can be displayed in response to a selection of the USC 385 within the GUI 350, 351, 352 to pause a session. The GUI 387 includes the session ID 341, the session state ID 342, the vehicle ID 343, the USC 383, 384, each of which is described elsewhere in this description. The GUI 387 also includes a pause time indicator 388 and a USC 386, 389. A processor, such as the processor 151, can determine how long of a time a session identified by the session ID 341 has been paused (e.g., after selection of the USC 385 within a GUI) and output that determined time using the pause time indicator 388. The USC 386 is selectable to resume (i.e., unpause) a session that is currently paused. The USC 389 is selectable to select a reason why the session is paused. In FIG. 26, the "X" represents a selection of the pause reason shown as "technician break."

The GUI 349, 350, 351, 352, 387 can be displayed by the same computing system, such as a computing system arranged as an ACRRR system. Alternatively, the GUI 349, 350, 351, 352, 387 can be displayed by different computing systems. For example, the GUI 349, 350, 351, 387 can be displayed by a computing system arranged as a vehicle scan tool and the GUI 352, 387 can be displayed by a computing system arranged as an ACRRR system.

Next, FIG. 27 to FIG. 32 and FIG. 38 show different views of a GUI 390 output on the display 163. In at least some implementations, a server, such as the server 4, 8, 100 provides the GUI 390 to the computing system 150 for outputting on the display 163. In at least some other implementations, a server, such as the server 4, 8, 100 provides the computing system 150 with data (e.g., a service session file or a GUI file) for generating the GUI 390. The computing system 150 discussed in this paragraph can be arranged as the computing system 14, 15, 16, 17, 23, 24, 26, 55 shown in other drawings of this disclosure.

The GUI 390 includes a GUI that shows details of a service session tracked by a computing system and/or server. The GUI 390 can be displayed in response to a selection of a USC displayed in another GUI. For example, the GUI 390 can be displayed in response to a selection of the row 369 (shown in FIG. 40) corresponding to the session SID-7.

The GUI 390 includes vehicle details 391. The vehicle details 391 include a vehicle identifier VID-7, a VIN, an odometer reading indicative of a distance (e.g., miles or kilometers) a vehicle has been driven, and license plate characters. In at least some implementations, the vehicle identifier VID-7 can include at least a portion of the VIN.

The GUI 390 includes a vehicle work history 392. The vehicle work history 392 includes identifiers of repair orders pertaining to a vehicle corresponding to the vehicle VID-7 and the VIN. The vehicle work history 392 shows repair order numbers for two closed repair orders and a repair order number of a pending repair order. The GUI 390 also includes a session state identifier 393, a work request identifier 394, a customer concern identifier 395, and a timeline 396. The description of the example session state identifiers shown in FIG. 22 to FIG. 26 applies to the example session state identifiers shown in in FIG. 27 to FIG. 32 and FIG. 38.

Looking at FIG. 27, the timeline 396 includes an event summary 307 generated and tracked by a server and/or computing system for the service session SID-7. The event summary 307, like other event summaries described in this description, can include one or more temporal details. As an example, a temporal detail of an event summary can include a time detail (i.e., a time) when an event corresponding to the event summary occurred. For the event summary 307, a time detail 308 is a time "9:05 AM" to represent for example when a customer advisor CA-1 requested via a computing system (i.e., computing system CS-1) that a service session be opened or when the server 100 receives such request.

The event summary 307 corresponds to a communication 218 shown in FIG. 45. The communication 218 includes a field 223 corresponding to an event type. The server 100 can be configured to perform an action based on data within a field that corresponds to an event type of a service session. As an example, the server 100 can perform an action that includes generating a service session record based on the event type field including data requesting a session, such as the data shown in the field 223 in FIG. 45.

As another example, the server 100 can perform an action that includes populating a GUI (such as the GUI 390) with an event summary in an event timeline based on the event type field including data indicating a communication including an event type field containing data for a service activity, such as the data in a field 252 shown in FIG. 47, a field 273 shown in FIG. 49, a field 283 shown in FIG. 50, or a field 448 shown in FIG. 51. As yet another example, the server 100 can perform an action that includes updating an event summary within a GUI or a GUI file based on a communication including an event type field containing data for an event status, such as the data in a field 463 shown in FIG. 52.

Figure 28:
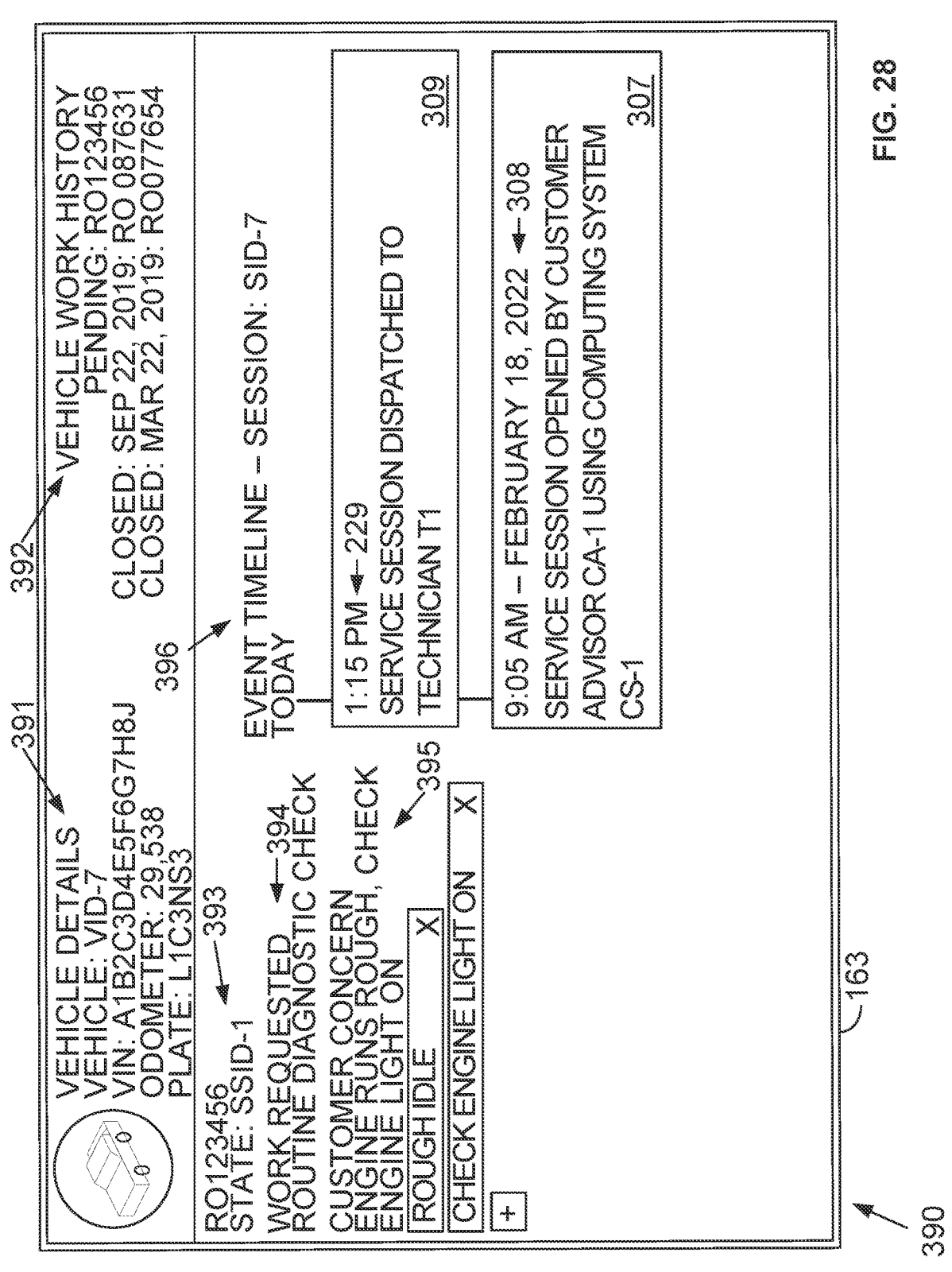

Turing to FIG. 28, the view of the GUI 390 shows the timeline 396 at a time later than a time at which the view of the GUI 390 (as shown in FIG. 27) is displayed on the display 163. FIG. 28 shows the vehicle details 391, the vehicle work history 392, the session state identifier 393, the work request identifier 394, the customer concern identifier 395, and the timeline 396. FIG. 28 shows the timeline 396 includes the event summary 307 and an event summary 309. For the event summary 309, a time detail 229 is a time "1:15

PM" to represent when the service session SID-7 was dispatched to a technician T1. The event summary 309 corresponds to a communication 250 shown in FIG. 47. The field 256 in the communication 250 could include a field with a source identifier of a computing system that requested the service session SID-7 to be dispatched to the technician T1. As an example, that computing system could be the computing system CS-1 used by the customer advisor CA-1 or the computing system CS-2 used by the technician T1.

Figure 29:
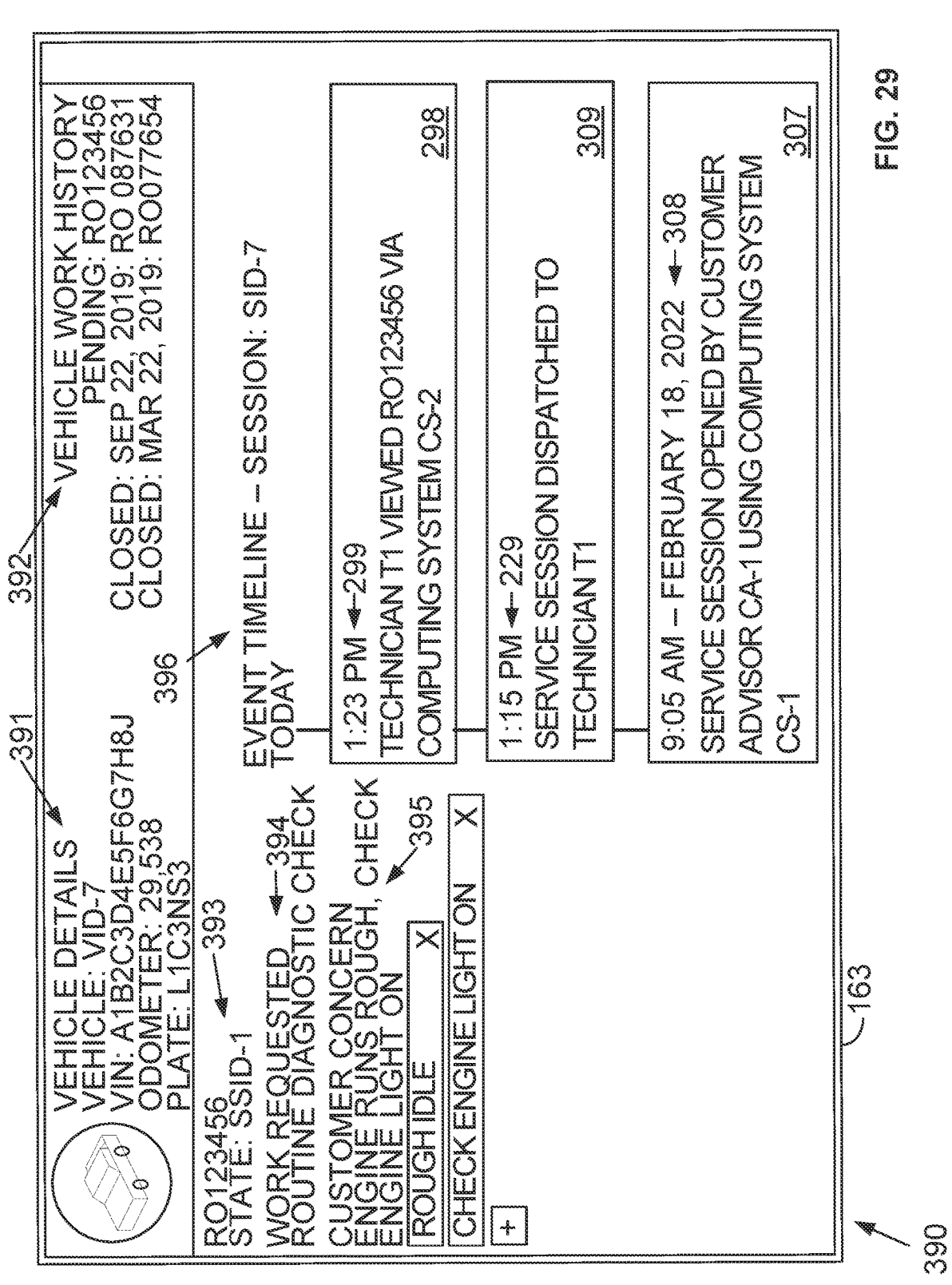

Turing to FIG. 29, the view of the GUI 390 shows the timeline 396 at a time later than a time at which the view of the GUI 390 (as shown in FIG. 28) is displayed on the display 163. FIG. 29 shows the vehicle details 391, the vehicle work history 392, the session state identifier 393, the work request identifier 394, the customer concern identifier 395, and the timeline 396. FIG. 29 shows the timeline 396 includes the event summary 307, the event summary 309, and an event summary 298. For the event summary 298, a time detail 299 is a time "1:23 PM" to represent when the technician T1 viewed an RO using the computing system CS-2. The event summary 298 corresponds to a communication 270 shown in FIG. 49. The event summary 298 can be added into the timeline 396 based on the communication 270 including the field 273 and the field 273 containing an event type identifier of event activity.

Turing to FIG. 30, the view of the GUI 390 shows the timeline 396 at a time later than a time at which the view of the GUI 390 (as shown in FIG. 29) is displayed on the display 163. FIG. 30 shows the vehicle details 391, the vehicle work history 392, the session state identifier 393, the work request identifier 394, the customer concern identifier 395, and the timeline 396. FIG. 30 shows the timeline 396 includes the event summary 298, the event summary 397, and an event summary 398.

The GUI 390 includes a scroll bar 410. The scroll bar 410 can be populated into the GUI 390 as a result of an event summary of the timeline 396 not being displayed on the display 163 along with one or more other event summaries (e.g., the event summary 398, the event summary 397 and a portion of the event summary 298) within the timeline 396. In at least some implementations, the display 163 is configured to display a horizontal scroll bar and/or a vertical scroll bar. The horizontal scroll bar and the vertical scroll bar can be used to cause the display 163 to display content of a currently displayed page, but not currently displayed on the display 163. In FIG. 30, use of the scroll bar 410 can cause the display 163 to display a bottom portion of the event summary 298, the event summary 309, and the event summary 307, all of which are shown in FIG. 29.

The event summary 397 includes a time detail 404 indicating a time when the technician T1 changed a status to diagnose. As an example, the technician T1 can change a status of a computing system (e.g., a computing system CS-2) into a diagnostic mode. The computing system can include a USC that is selectable to select a diagnostic mode from a menu or another GUI displayed on a display. As another example, the technician T1 can change a status of an RO to a diagnose state. As yet another example, the technician T1 can request the server 100 to change a status of a service session (e.g., the service session SID-7) to a diagnostic state. Alternatively, the computing system 150 can determine a change in its operating state and report that determination to the server 4, 8, 100.

The event summary 397 corresponds to a communication 280 shown in FIG. 50. The event summary 397 can be added into the timeline 396 based on the communication 280 including the field 283 and the field 283 containing an event type identifier of event activity.

The event summary 398 includes a time detail 405 indicating when a vehicle health scan (e.g., a pre-scan) was initiated by the computing system CS-2. The event summary 398 also includes a time detail in the form of a time bar 406. As an example, the time bar 406 can represent how long the activity associated with the event summary 398 has been occurring or how much longer the event will be occurring. The time bar 406 can represent a completion percentage ranging from 0% to 100% inclusive. The event summary 398 also includes a USC 407. As an example, the USC 407 can be selectable to cause a size of the event summary to change (e.g., increase or decrease).

The event summary 398 corresponds to a communication 445 shown in FIG. 51. The event summary 397 can be added into the timeline 396 based on the communication 445 including the field 448 and the field 448 containing an event type identifier of event activity.

Figure 31:
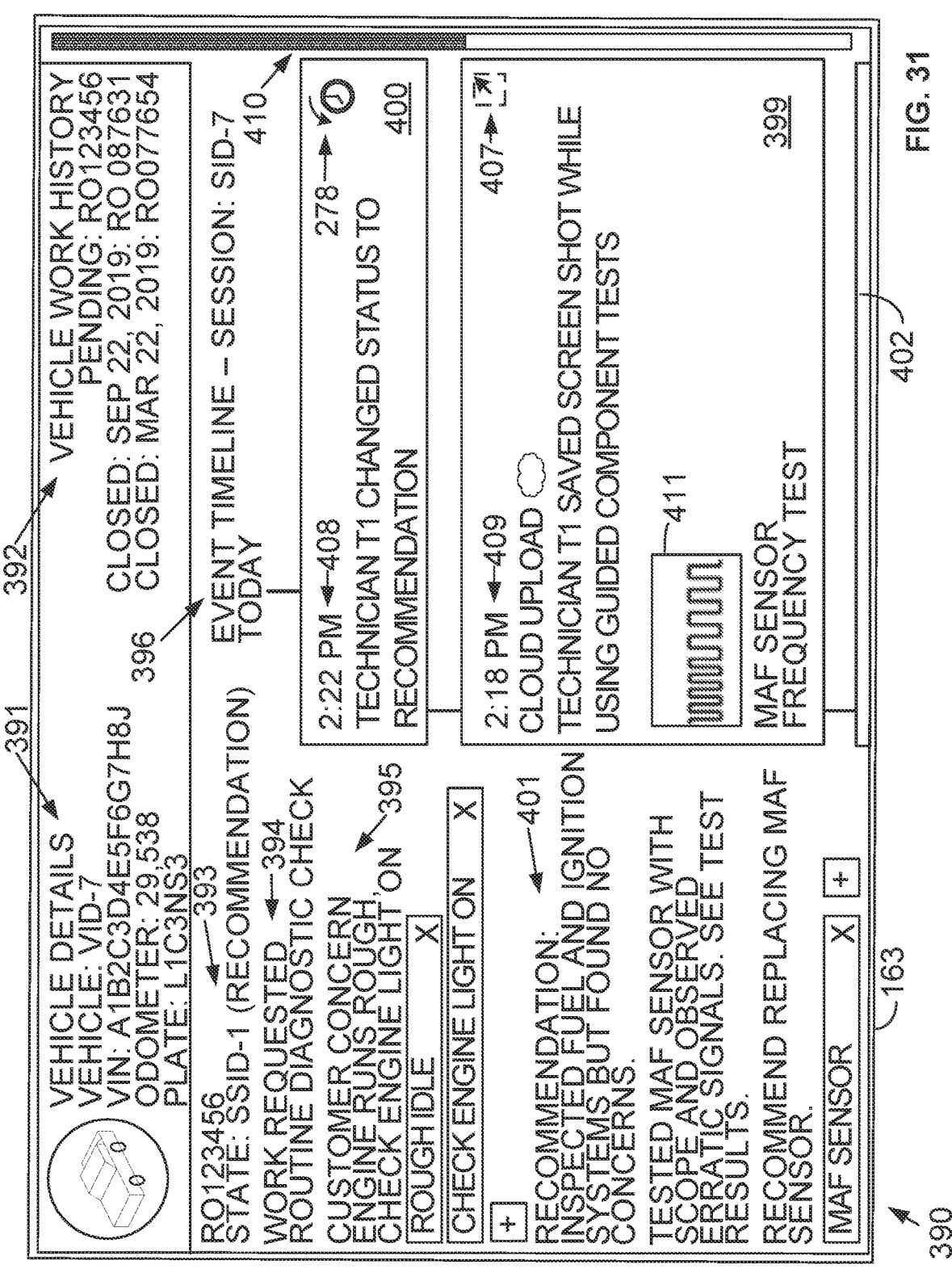

Turning to FIG. 31 and FIG. 32, these drawings show different portions of a view of the GUI 390 shown on the display 163 at a time later than a time at which the view of the GUI 390 (as shown in FIG. 30) is displayed on the display 163. In particular, the view of the GUI 390 in FIG. 31 includes a first portion of the timeline 396 and the view of the GUI 390 in FIG. 32 includes a second portion of the timeline 396. The first portion of the timeline 396 includes an event summary 399, 400 and a portion of an event summary 402. The second portion of the timeline 396 includes a portion of the event summary 399, the event summary 398, 402, and a portion of the event summary 397. The scroll bar 410 shown in FIGS. 31 and 32 can be used to change which portion of the timeline 396 (such as the first portion, the second portion or some other portion) is shown on the display 163.

As shown in FIG. 31, the GUI 390 includes the vehicle details 391, the vehicle work history 392, the session state ID 393, the work request ID 394, and the customer concern ID 395. In this view of the GUI 390, the session state ID 393 is SSID-1 and is further classified with a recommendation status. Moreover, the GUI 390 includes a recommendation 401. The recommendation 401 can include data the technician T1 enters using the computing system CS-2. That data can be transmitted to the server 100 via a communication, such as a communication 505 shown in FIG. 55. The recommendation 401 can include activity data within a field 510 of the communication 505. A customer advisor at the customer advisor station 10 can use the recommendation 401 to sell vehicle repair services and vehicle components to an owner of a vehicle.

The event summary 400 includes a time detail 408 including a time "2:22 PM" to represent when a technician T1 changes a status to recommendation. As an example, the technician T1 can change a status of a computing system (e.g., a computing system CS-2) into a recommendation state. The computing system can include a USC that is selectable to select the recommendation state from a menu or another GUI displayed on the display 163. As another example, the technician T1 can change a status of an RO to a recommendation state. As yet another example, the technician T1 can request the server 100 to change a status of a service session (e.g., the service session SID-7) to a recommendation state. The event summary 400 can be added into the timeline 396 in response to the server 100 receiving the communication 505.

The event summary 400 also includes a USC 278 selectable to cause the processor 151 to display a different portion of the GUI 390, such as a portion of the GUI 390 partially shown in FIG. 32. As an example, the processor 151 can cause the display 163 to show the event summary 397 to be displayed at a top portion or in a center portion of the timeline 396 shown on the display 163. If an entirety of the event summary 397 is displayable on the display 163, selection of the USC 278 can cause the event summary 397 to be displayed in its entirety (e.g., as shown in FIG. 30). The USC 278 includes an icon (i.e., a clock and a counter-clockwise arrow) to indicate that selection of the USC 278 will result in selecting an event summary ordered earlier in time in the temporally-ordered event summaries.

The event summary 399 includes a time detail 409 including a time "2:18 PM" to represent when a technician T1 saved a screen shot while using a guided component test. The event summary 399 includes a thumbnail image 411. As an example, the thumbnail image 411 can show at least a portion of the screenshot. As another example, the thumbnail image 411 can show a generic aspect (e.g., a generic waveform) that represents that the screenshot shows a waveform. The event summary 399 can be added into the timeline 396 in response to the server 100 receiving a communication (e.g., a communication 490 shown in FIG. 54) from a computing system used by technician T1.

Turning to FIG. 32, this view of the GUI 390 can, for example, be output on the display 163 in response to use of the scroll bar 410 from the GUI 390 as shown in FIG. 31. The GUI 390 shown in this view includes a portion of the recommendation 401, the second portion of the timeline 396, a portion of the event summary 397, the event summary 398, a portion of the event summary 399, and an event summary 402. The time detail 405 shown in FIG. 32 is later than a time represented by the time detail 405 shown in FIG. 30 and the time bar 406 represents that the vehicle health scan corresponding to the event summary 398 is complete.

The event summary 402 includes a time detail 403 that is a time "1:36 PM" to represent when a technician T1 viewed intelligent diagnostic information corresponding to an example diagnostic trouble code P0123. The event summary 402 also includes a USC 413, 414, 415, 416. As an example, the USC 413, 414, 415, 416 can be selectable to cause the display 163 to display a portion of the intelligent diagnostic information that was displayed on the display 163 during the event corresponding to the event summary 402. For instance, the USC 413 is selectable to cause the display 163 to display a technical bulletin, the USC 414 is selectable to cause the display 163 to display a real fix tip, the USC 413 is selectable to cause the display 163 to display a result of a component test performed during the event, and the USC 416 is selectable to cause the display 163 to display all modules viewed during the event. The technical bulletin, related real fixes, and guided component tests are examples of modules that can be displayed during an event.

In FIG. 32, the event summary 397 also includes a USC 279 selectable to cause the processor 151 to display a different portion of the GUI 390, such as a portion of the GUI 390 partially shown in FIG. 31. As an example, the processor 151 can cause the display 163 to show the event summary 400 to be displayed at a top portion or in a center portion of the timeline 396 shown on the display 163. If an entirety of the event summary 400 is displayable on the display 163, selection of the USC 279 can cause the event summary 400 to be displayed in its entirety (e.g., as shown in FIG. 31). The USC 279 includes an icon (i.e., a clock and a clockwise arrow) to indicate that selection of the USC 278 will result in selecting an event summary ordered later in time in the temporally-ordered event summaries.

FIG. 32 also shows the filter selector 417. The filter selector 417 includes one or more USCs configured for selecting criteria for filtering which event summaries are displayed in the GUI 390. As an example, the filter selector 417 can include USCs 418 for selecting a person identifier. The USCs 418 include a USC to select person-1 and a USC to select person-2. As an example, person-1 and person-2 could be technician T1 and customer advisor CA-1, respectively. As an example, the filter selector 417 can include USCs 419 for selecting a status identifier. The USCs 419 include a USC to select a status-1 and a USC to select a status-2. As an example, status-1 and status-2 could be SSID-0 and SSID-1, respectively. As another example, status-1 and status-2 could be SSID-1 (diagnosis) and SSID-1 (recommendation), respectively. As yet another example, the filter selector 417 can include USCs 456 for selecting a computing system identifier, such as the identifier CS-1 or CS-2. Other examples of the USCs 418, 419, 456 are also possible. FIG. 38 shows an example of the GUI 390 after use of the filter selector 417 (although at time later than represented in FIG. 32).

A service session record corresponding to the GUI 390 shown in FIG. 31 and FIG. 32 can include data corresponding to the event summaries of the GUI 390. Table F shows an example of such data. The data in Table F shows the event summaries temporally arranged based on a time in the third column from the left. The fourth column from the left includes data indicating whether any other event in the SSR is a classified as a common event. Based on the data in Table F, the event summaries 397 and 400 are classified as a common event. A processor can use data that identifies event summaries as being part of a common event to determine whether to include a USC like the USC 278 and/or the USC 279 within an event summary in the GUI. The USC 278 can be included in a particular event summary if another event of the common event occurred earlier in time than the time corresponding to the particular event summary. The USC 279 can be included in a particular event summary if another event of the common event occurred later in time than the time corresponding to the particular event summary. Table F includes data indicating one or more communications corresponding to each respective event summary indicated in the left-most column. The processor 101 can refer to the communication 201 to access the communication indicated in the right-most column in Table F in order to be able to populate a GUI.

428, 433 is selectable to cause the display 163 to display a GUI previously displayed on the display 163 immediately before the GUI 421, 428, 433, respectively. The USC 427 in the GUI 297, 421, 428, 433, 444 is selectable to cause the display 163 to exit a display mode for a currently-selected session. As an example, in response to selecting the USC 427, the display 163 can display a GUI 363 shown in FIG. 40.

Figure 33:
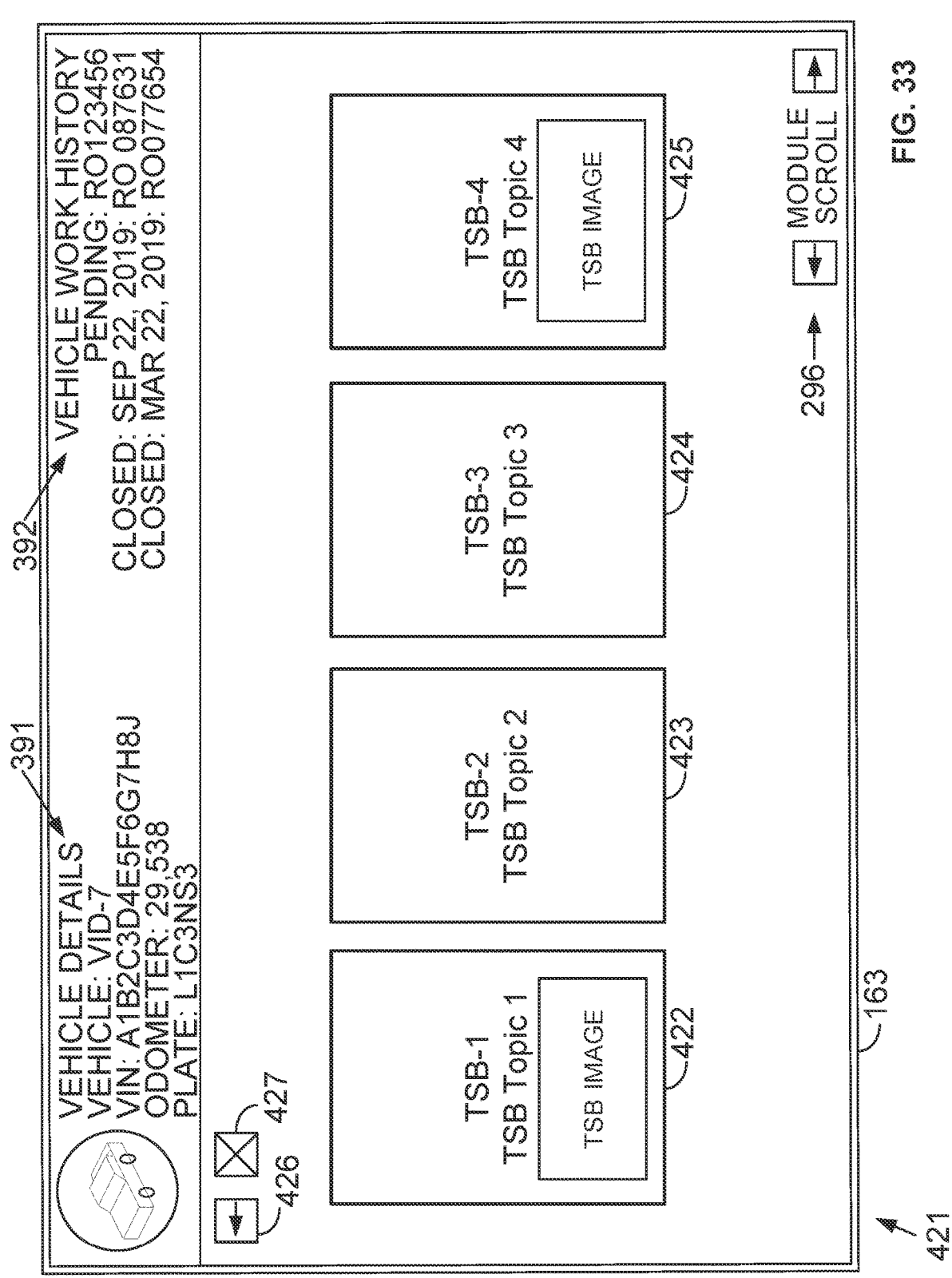

The GUI 421 includes a technical service bulletin 422, 423, 424, 425. As shown in FIG. 33, the technical service bulletin 422, 423, 424, 425 includes text, and the technical service bulletin 422, 425 includes an image. The content of a technical service bulletin can guide a technician as to how to service (e.g., repair or maintain) a vehicle.

The GUI 421 also includes a USC 296 selectable to cause the processor 151 to display a different GUI (i.e., a GUI that includes a summary of a module executed during a service session). Selecting the USC 296 can cause the processor 151 to scroll through module summaries corresponding to the modules executed during the service session. As an example, selecting the USC 296 while the GUI 421 is displayed can cause the processor 151 to output the GUI 428, the GUI 433, or the GUI 297.

Figure 34:
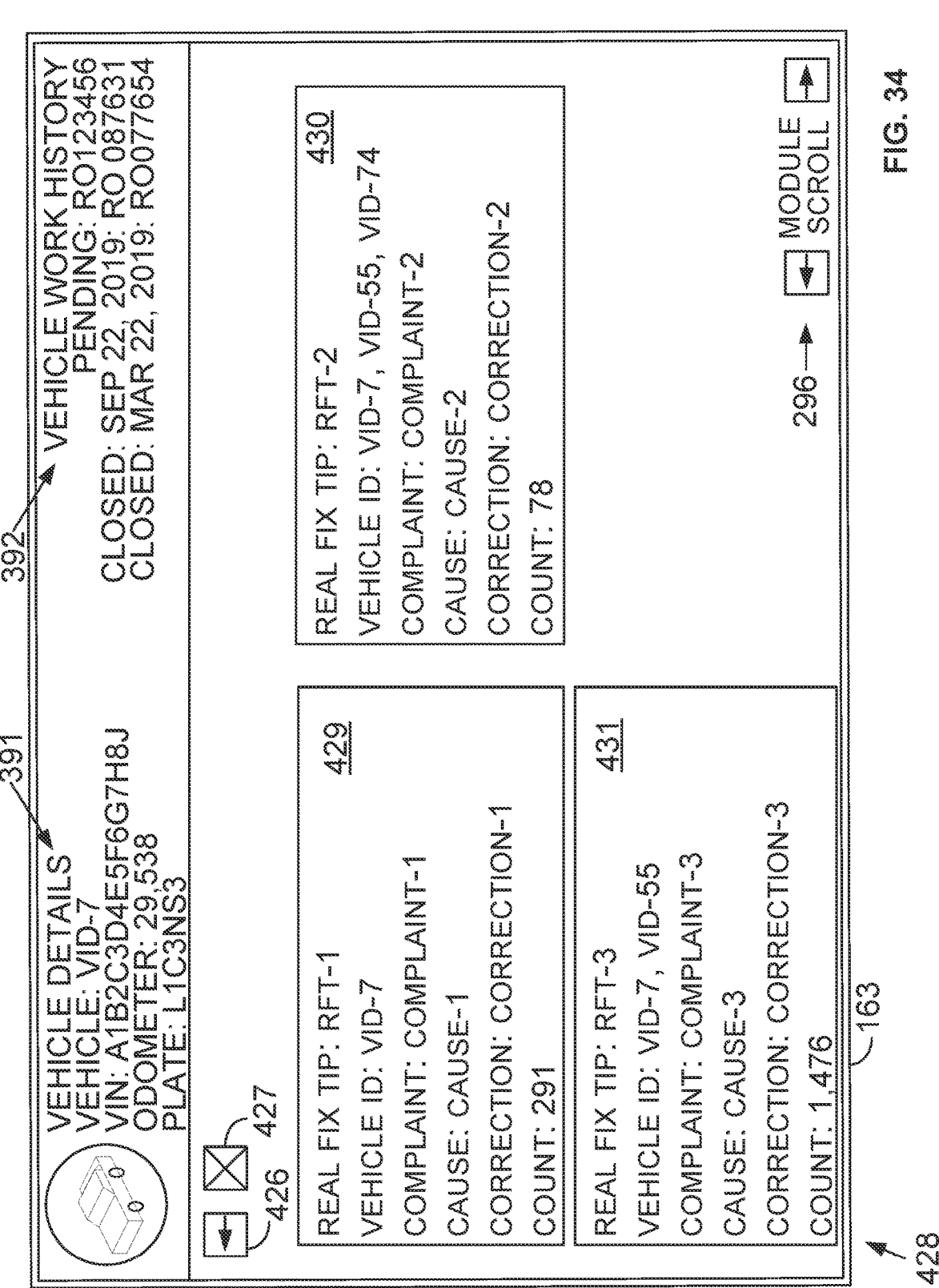

The GUI 428 includes a real-fix tip 429, 430, 431. As shown in FIG. 34, the real-fix tip 429, 430, 431 can include content including a real-fix tip identifier, a vehicle identifier, a complaint, a cause, a correction and/or a count. A vehicle identifier within and/or corresponding to a real-fix tip can include one or more vehicle identifiers. For example, the real-fix tip 429 includes a single vehicle identifier, the real-fix tip 430 includes three vehicle identifiers, and the real-fix tip 431 includes two vehicle identifiers. The content of a real-fix tip can guide a technician as to how to service (e.g., repair or maintain) a vehicle as the content describes how a same or similar type of vehicle was previously serviced. The count within a real-fix tip can indicate a quantity of occurrences of the correction for the corresponding cause and complaint for the identified vehicles. The count can be maintained within a database accessible to the server 4.

The GUI 428 also includes a USC 296 selectable to cause the processor 151 to display a different GUI (i.e., a GUI that includes a summary of a module executed during a service session). As an example, selecting the USC 296 while the GUI 428 is displayed can cause the processor 151 to output the GUI 421, the GUI 433, or the GUI 297.

TABLE F

| Event summary (Drawing Number) | Date | Time | Common Event(s) | Computing System | Communication (Drawing Number) |
|---|---|---|---|---|---|
| 307 | 18 FEB. 2022 | 9:05 AM | Null | CS-1 | 218 |
| 309 | 18 FEB. 2022 | 1:15 PM | Null | CS-1 | 250 |
| 298 | 18 FEB. 2022 | 1:23 PM | Null | CS-2 | 270 |
| 397 | 18 FEB. 2022 | 1:25 PM | 400 | CS-2 | 280 |
| 398 | 18 FEB. 2022 | 1:28 PM | Null | CS-2 | 445, 460 |
| 402 | 18 FEB. 2022 | 1:36 PM | Null | CS-2 | 475 |
| 399 | 18 FEB. 2022 | 2:18 PM | Null | CS-2 | 490 |
| 400 | 18 FEB. 2022 | 2:22 PM | 397 | CS-2 | 505 |

Figure 35:
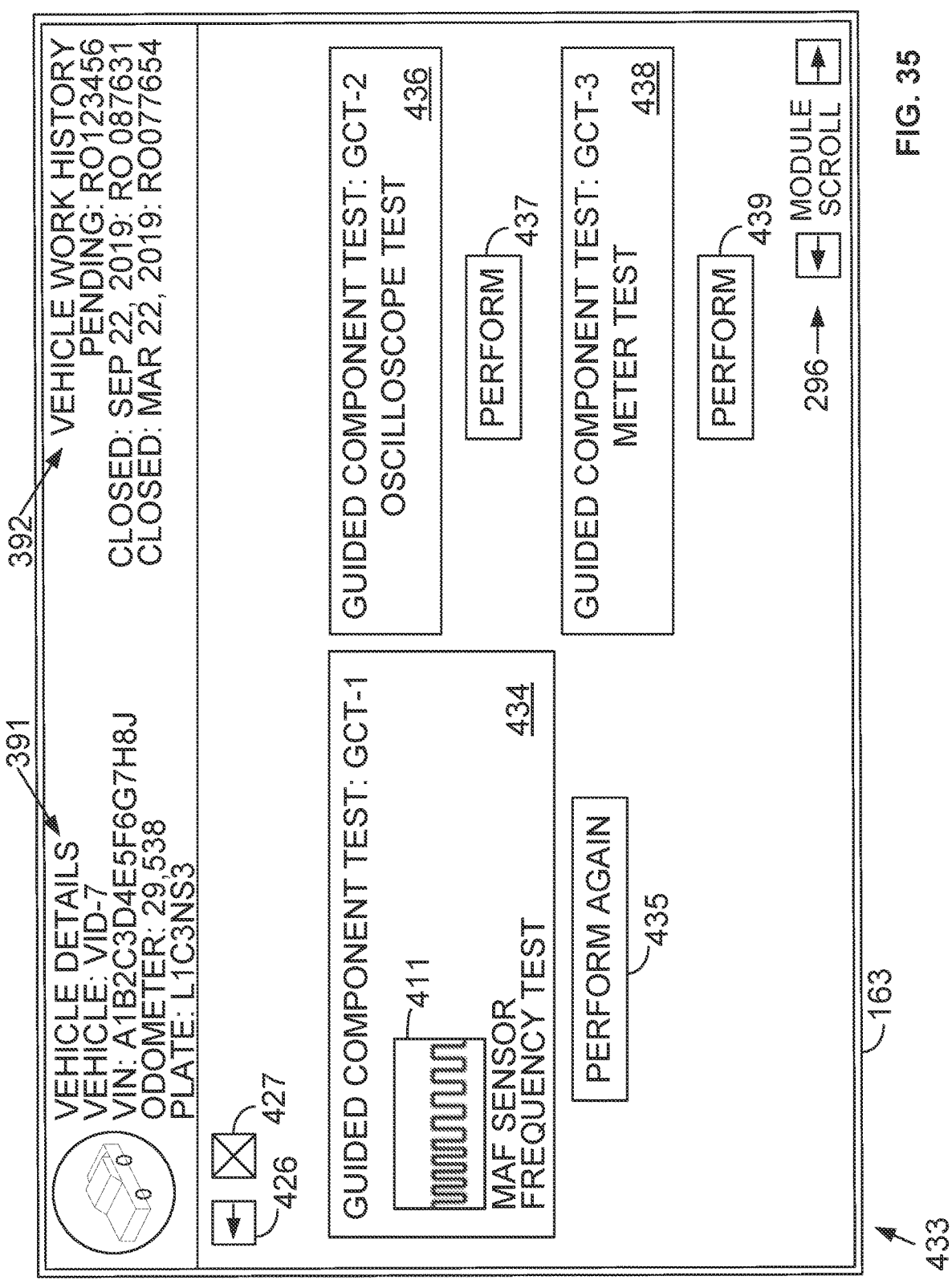

Next, FIG. 33 to FIG. 35 show a GUI 421, 428, 433 that can be displayed in response to selecting the USC 413, 414, 415, respectively (all shown in FIG. 32). The GUI 421, 428, 433 can be displayed on the display 163. The GUI 421, 428, 433 are shown to include the vehicle details 391 and the vehicle work history 392. The GUI 421, 428, 433, 444 includes a USC 426, 427. The USC 426 in the GUI 297, 421, The GUI 433 includes a guided component test identifier 434, 436, 438 and a USC 435, 437, 439. As shown in FIG. 35, the guided component test identifier 434 corresponds to a guided component test (GCT) that has already been performed as part of a service session. The guided component test identifier 434 includes the thumbnail image 411 shown in FIG. 31 and FIG. 32. The USC 435 is selectable to cause the processor 151 to re-launch a guided component test that has already been performed as part of the service session. FIG. 35 also show that a guided component test corresponding to the service session record has not yet been performed (e.g., a USC indicates "perform" rather than "perform again"). For example, the USC 437, 439 is selectable to cause the processor 151 to launch a guided component test. The USC 435, 437, 439 corresponds to a particular GCT within the guided component test 193 shown in FIG. 13B. In response to a selection of the USC 435, 437, 439, the processor 151 can launch performance of the GCT corresponding to the selected USC.

The GUI 433 also includes a USC 296 selectable to cause the processor 151 to display a different GUI (i.e., a GUI that includes a summary of a module executed during a service session). As an example, selecting the USC 296 while the GUI 433 is displayed can cause the processor 151 to output the GUI 421, the GUI 428, or the GUI 297.

Figure 36:
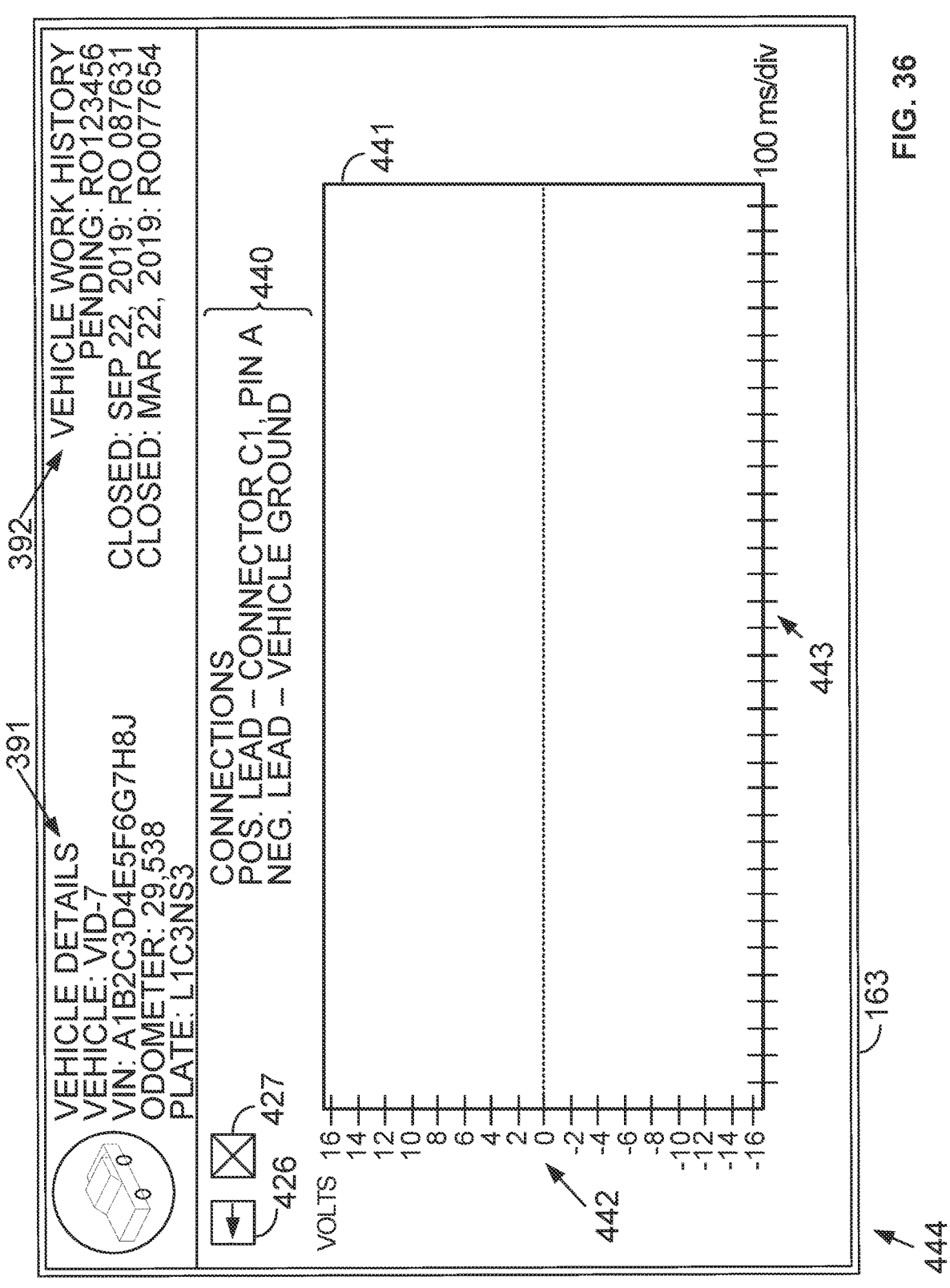

Next, FIG. 36 shows a GUI 444 displayed on the display 163. The GUI 444 can be displayed in response to a selection of the USC 435, 437, 439. The GUI 444 is shown to include the vehicle details 391, the vehicle work history 392, and the USC 426, 427. The GUI 444 also includes connection details 440 and a container 441. The connection details 440 can guide a technician how to connect the test device 164 to a component in a vehicle. The container 441 includes a vertical axis 442 and a horizontal axis 443. The vertical axis 442 and the horizontal axis 443 can include units based on how the processor 151 sets up the test device 164 according to the selected guided component test. The processor 151 can receive a signal from the test device 164 and graph values of the signal within the container 441.

Figure 37:
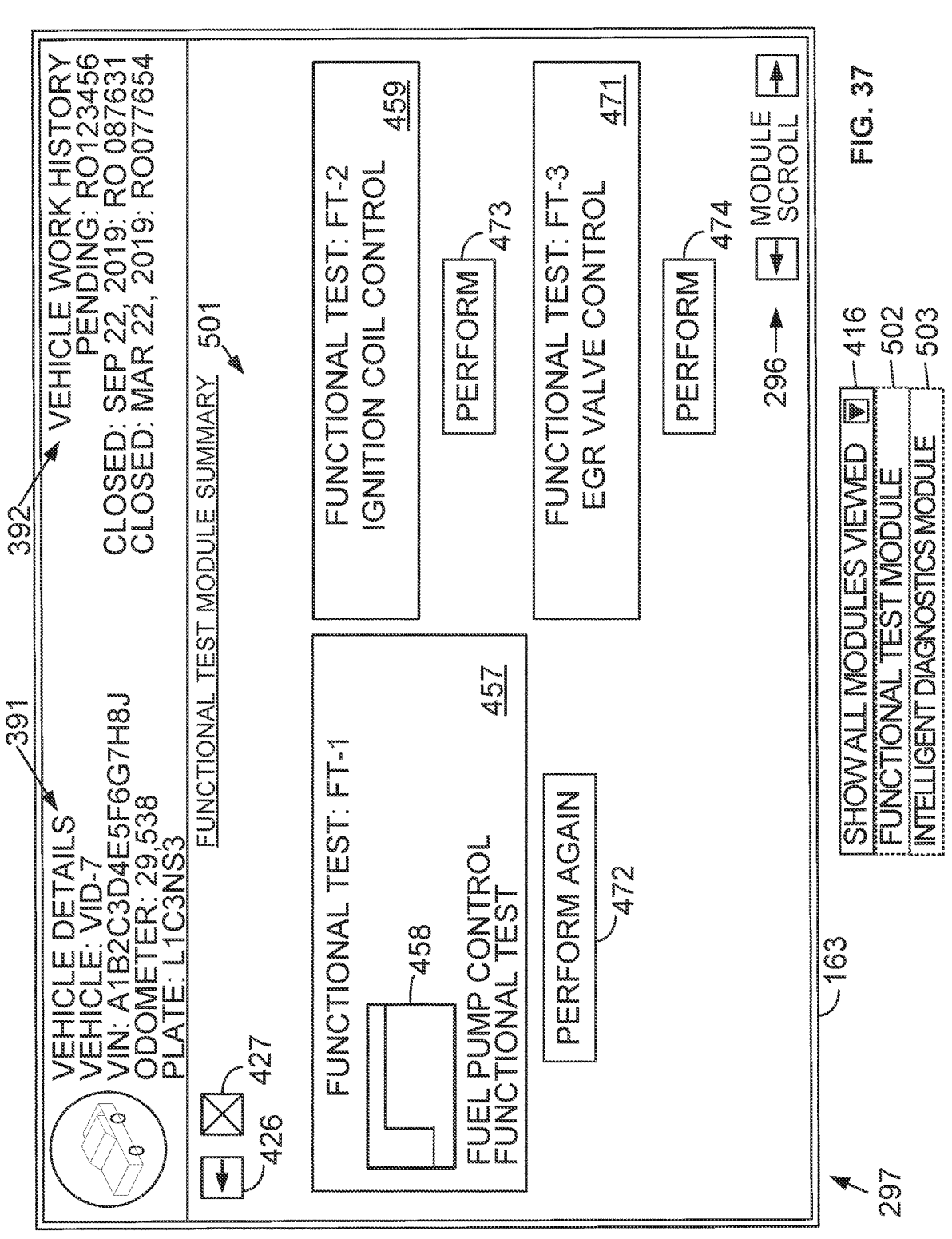

Next, FIG. 37 shows a GUI 297 displayed on the display 163. The GUI 297 includes the vehicle details 391, the vehicle work history 392, the USC 296, and a functional test module summary 501. The GUI 297 and the functional test module summary 501 includes a functional test identifier 457, 459, 471 and a USC 472, 473, 474. As shown in FIG. 37, the functional test identifier 457 corresponds to a functional test that has already been performed as part of a service session. The functional test identifier 457 includes the thumbnail image 458 corresponding to a measurement made during performance of the identified functional test. The USC 472 is selectable to cause the processor 151 to re-launch a functional test that has already been performed as part of the service session. FIG. 37 also show that a functional test corresponding to the service session record has not yet been performed (e.g., a USC indicates "perform" rather than "perform again"). For example, the USC 473, 474 is selectable to cause the processor 151 to launch a functional test. The USC 472, 473, 474 corresponds to a particular functional test within the vehicle scanner function 192 shown in FIG. 13B. In response to a selection of the USC 472, 473, 474, the processor 151 can launch performance of the functional test corresponding to the selected USC.

FIG. 37 also shows the USC 416 and two modules selectable via a USC 502, 503. As an example, the GUI 297 shown in FIG. 37 can be displayed in response to selecting the USC 502. As another example, a GUI pertaining to an intelligent diagnostic module could be displayed in response to selecting the USC 503. As yet another example, the USC 416 can include one or more USC to select other modules contained within the computing system 150. The modules can include modules within the memory 152 (e.g., within the CRPI 184, the vehicle selection data 191, the vehicle scanner function 192, or the guided component test). A module selectable via the USC 416 can include program instructions for performing at least a portion of an event for a service session. The GUI 297 also includes a USC 296 selectable to cause the processor 151 to display a different GUI (i.e., a GUI that includes a summary of a module executed during a service session). As an example, selecting the USC 296 while the GUI 297 is displayed can cause the processor 151 to output the GUI 421, the GUI 428, or the GUI 433.

Next, FIG. 38 shows another view of the GUI 390. This view of the GUI 390 shows the timeline 396 at a time later than a time at which the view of the GUI 390 (as shown in FIG. 31 and FIG. 32) is displayed on the display 163. FIG. 38 shows the vehicle details 391, the vehicle work history 392, the session state identifier 393, the work request identifier 394, the customer concern identifier 395, and the timeline 396. FIG. 38 shows the timeline 396 includes an event summary 288, an event summary 289, an event summary 290, the event the event summary 400, and the event summary 397.

The event summary 290 includes a time detail 293 including a time "2:38 PM" to represent when the computing system CS-2 requested set-up instructions. The event summary 290 can be added into the timeline 396 in response to the server 100 receiving a communication (e.g., a communication 530 shown in FIG. 56) from a computing system CS-2.

The event summary 289 includes a time detail 292 including a time "2:39 PM" to represent when the computing system CS-2 received requested set-up instructions. The event summary 289 can be added into the timeline 396 in response to the server 100 transmitting a communication (e.g., a communication 540 shown in FIG. 57) to the computing system CS-2.

The event summary 288 includes a time detail 291 including a time "2:41 PM" to represent when the computing system CS-2 sent set-up instructions to a computing system CS-3. The event summary 290 can be added into the timeline 396 in response to the server 100 receiving a communication (e.g., a communication 550 shown in FIG. 58) from the computing system CS-2.

The GUI 390 shows the USC 418 was used to select a person (i.e., a technician T1) and the USC was used to select a computing system (i.e., a computing system CS-2). The GUI 390 includes an icon 420 positioned between the event summary 397 and the event summary 400. The icon 420 includes a number indicating how many event summaries were filtered out between the event summary 400 and the event summary 397.

Figure 39:
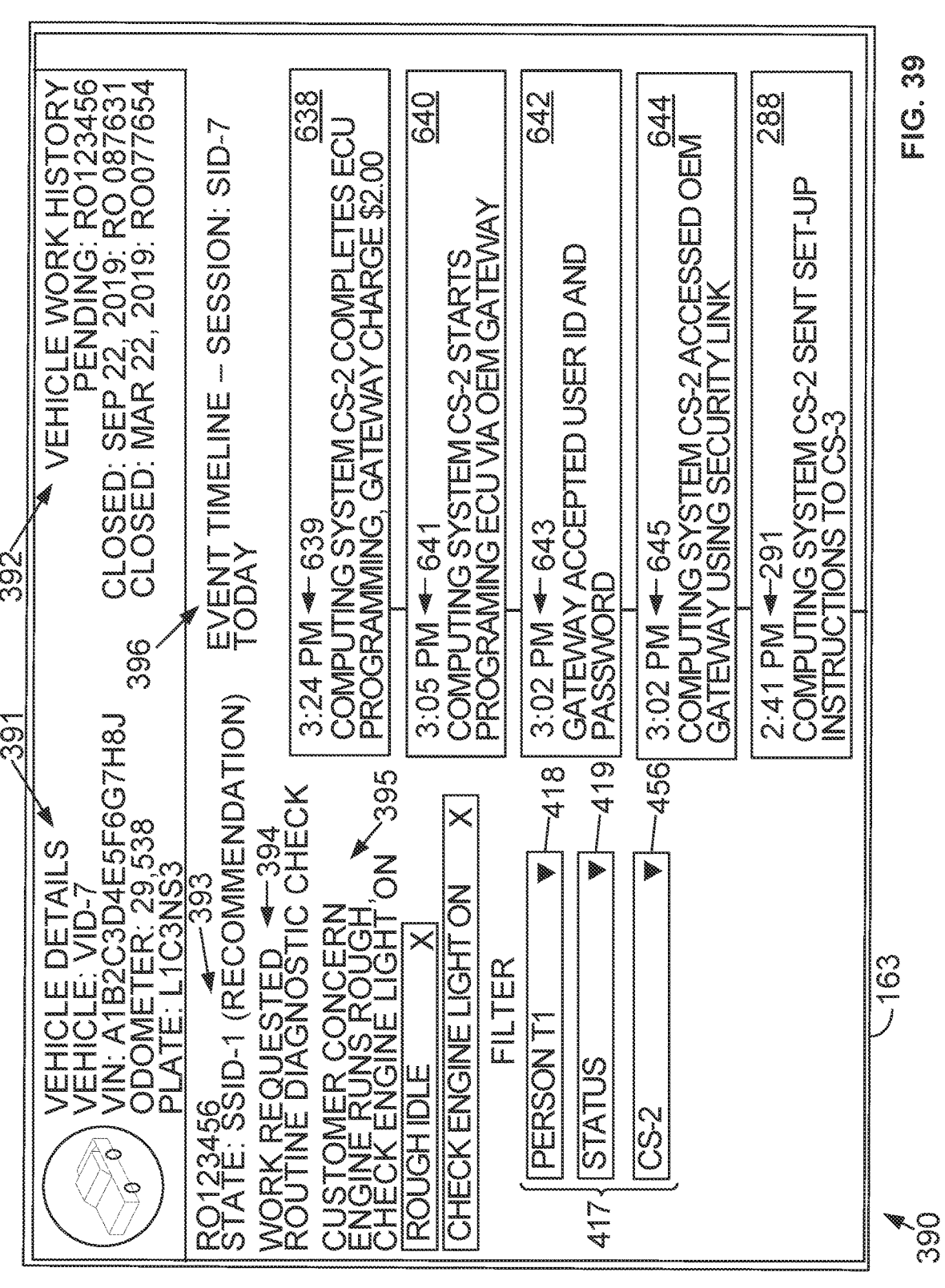

Next, FIG. 39 shows another view of the GUI 390. This view of the GUI 390 shows the timeline 396 at a time later than a time at which the view of the GUI 390 (as shown in FIG. 38) is displayed on the display 163. FIG. 39 shows the vehicle details 391, the vehicle work history 392, the session state identifier 393, the work request identifier 394, the customer concern identifier 395, and the timeline 396. FIG. 39 shows the timeline 396 includes an event summary 638, an event summary 640, an event summary 642, and event summary 644, and the event the event summary 288.

The event summary 638 includes a time detail 639 including a time "3:24 PM" to represent when the computing system CS-2 completed programming an ECU in the vehicle and receives notification of a service fee (e.g., a gateway charge of $2.00) for use of an OEM secure gateway to program the vehicle. As an example, the event summary 638 can be added into the timeline 396 in response to the server 100 receiving a communication from the computing system CS-2 indicating the ECU was successfully programmed and data indicating the service fee.

The event summary 640 includes a time detail 641 including a time "3:05 PM" to represent when the computing system CS-2 starts programming the ECU via the OEM gateway. As an example, the event summary 640 can be added into the timeline 396 in response to the server 100 receiving a communication from the computing system CS-2 indicating the first vehicle data message to begin programming the ECU was sent to the vehicle.

The event summary 642 includes a time detail 643 including a time "3:02 PM" to represent when the computing system CS-2 received acknowledgment from the OEM server that a user identifier and password sent to the OEM server from the computing system CS-2 was accepted. As an example, the event summary 642 can be added into the timeline 396 in response to the server 100 receiving a communication from the computing system CS-2 indicating the OEM server accepted the user identifier and password.

The event summary 644 includes a time detail 645 including a time "3:02 PM" to represent when the computing system CS-2 accessed an OEM gateway using a secure link module within the computing system CS-2. As an example, the event summary 644 can be added into the timeline 396 in response to the server 100 receiving a communication from the computing system CS-2 indicating the OEM gateway has been accessed.

Figure 40:
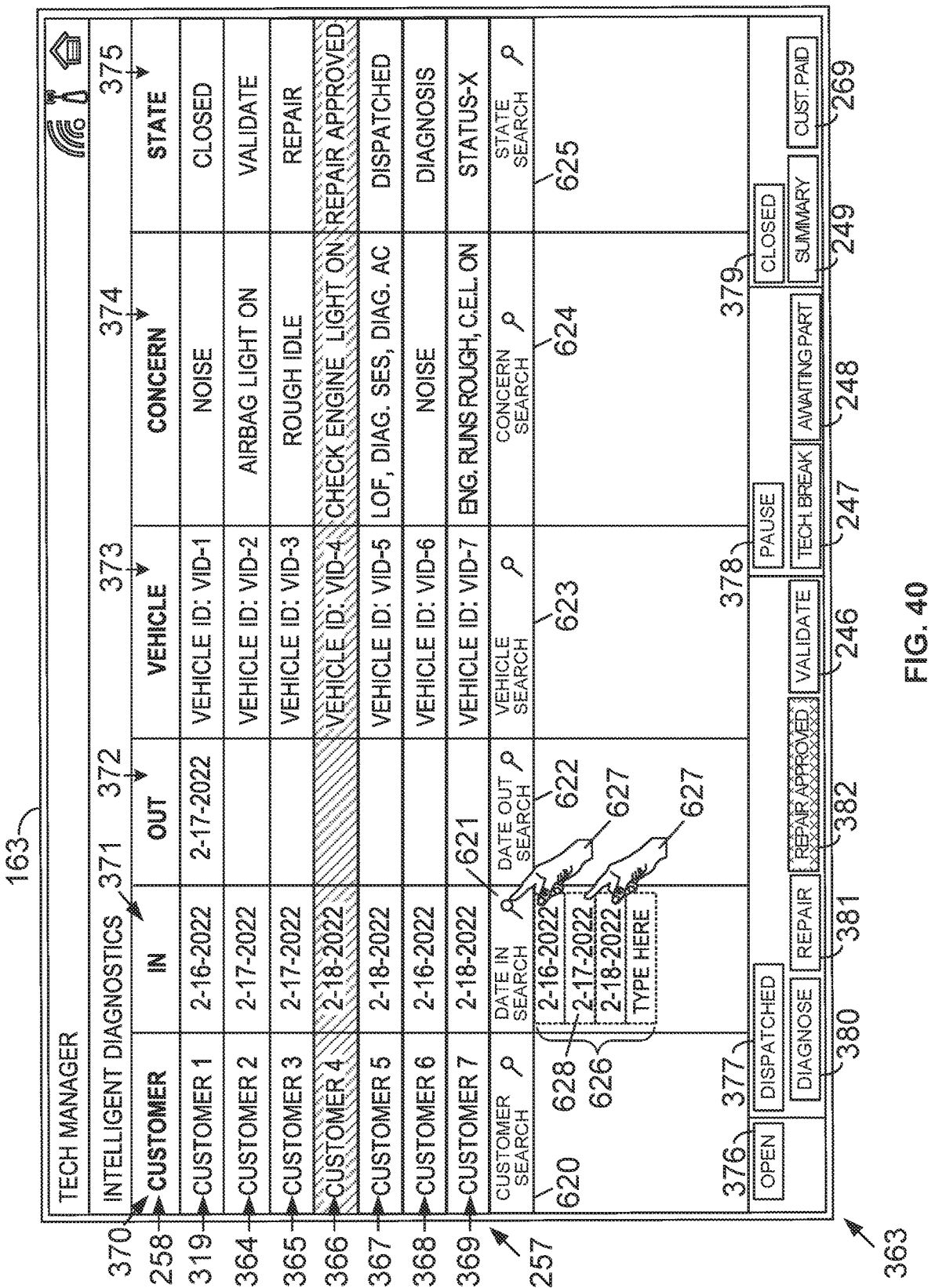

Next, FIG. 40 shows the GUI 363 displayed on the display 163. As an example, a computing system displaying the GUI 363 can include the computing system 17 at the customer advisor station 10, a computing system used by a manager and/or owner of the repair shop 6, or a computing system used by a technician at the repair shop 6. The GUI 363 includes a table 257 having a column 370, 371, 372, 373, 374, 375 and a row 258, 319, 364, 365, 366, 367, 368, 369. Each of those rows (other than row 258) corresponds to a respective service session. At least a portion of each of the rows can be configured as a respective USC that is selectable to signal to the processor 151 that the corresponding row has been selected.

Row 258 includes identifiers described in the aforementioned columns. The column 370 includes customer identifiers. The column 371 includes temporal identifiers corresponding to a vehicle identified in each row (e.g., a temporal identifier indicating when the vehicle arrived at the repair shop 6). The column 372 includes temporal identifiers corresponding to a vehicle identified in each row (e.g., a temporal identifier when an SSR was completed). The column 373 includes vehicle identifiers. The column 374 includes concern identifiers. As an example, each concern identifier can include an identifier of a complaint identifier on a repair order corresponding to the vehicle for the SSR in the row including that concern identifier. The column 375 includes state identifiers corresponding to a state of a service session and/or an SSR.

The GUI 363 also includes a USC 246, 247, 248, 249, 269, 376, 377, 378, 379, 380, 381, 382. The USC 376, 377, 378, 379 corresponds to a particular state of a service session and/or an SSR. The USC 246, 380, 381, 382 corresponds to a particular classification of the particular state corresponding to the USC 377. Similarly, the USC 247, 248 corresponds to a particular classification of the particular state corresponding to the USC 378, and the USC 249, 269 corresponds to a particular classification of the particular state corresponding to the USC 379.

The USC 246, 247, 248, 249, 269, 376, 377, 378, 379, 380, 381, 382 is selectable for filtering the table 257. For example, selecting one of the USC 246, 247, 248, 249, 269, 376, 377, 378, 379, 380, 381, 382 can cause a row for each SSR in the table 257 that corresponds to status of the selected USC to be highlighted. For instance, FIG. 40 shows the USC 382 highlighted to represent that the USC 382 has been selected. As a result of that selection, the row 366 is selected because the USC 382 and the row 366 correspond to the same state (i.e., repair approved).

Highlighting an SSR in the table 257 can occur in various ways. For example, SSRs corresponding to a particular filter criteria can be highlighted using a particular highlighting style, such as a particular background color or a particular font color or style (e.g., bold faced). Multiple highlighting styles can be used at the same time. For example, SSRs having a first status can be highlighted using a first background color and SSRs having a second status can be highlighted using a second background color. In at least some implementations, the USC among the USC 246, 247, 248, 249, 269, 376, 377, 378, 379, 380, 381, 382 corresponding to the first status and second status can be highlighted using the first and second background colors, respectively.

As another example, selecting the USC 246, 247, 248, 249, 269, 376, 377, 378, 379, 380, 381, 382 to filter the table can include adding one or more SSR(s) into the table 257 or removing one or more SSR(s) from the table 257. As an example, the USC 381 can be selectable to cause the processor 151 to add into the table 257 row(s) having the status of "Repair," such as the row 365. As another example, instead of highlighting the row 366 in response to selecting the USC 382, the processor 151 could alternatively remove the row 366 from the table 257. Then with the USC 382 highlighted and the row 366 removed from the table 257, the USC 382 can be selected to cause the processor to remove the highlighting from the USC 382 and add the row 366 back into the table 257.

An SSR corresponding to a row within the table 257 can be selected. As an example, selection of an SSR can occur by touching any portion of the row corresponding to the SSR one or more times. In at least some implementations, multiple SSRs can be shown in the GUI 363 as being selected.

Various actions can be performed after selection of one or more SSRs. For example, the selected SSR(s) can be sent to a printer. As another example, the selected SSR(s) can be assigned to a technician working within the repair shop 6. As yet another example, the status of the SSR(s) can be modified. For instance, the status of two or more selected SSRs can be modified to the same status using a single selection of that status, linked to one another as being associated with one another, or merged. A linked SSR could be assigned to a different repair shop, such as a repair shop to which a portion of repair work is sublet to the different repair shop. As another example, an SSR can be split into multiple SSRs. In at least some instances, splitting an SSR can include generating a copy of an SSR and modifying the copied SSR. Copying an SSR might be performed for an instance when a vehicle comes back to the repair shop 6 for continued work on the vehicle after a prior unsuccessful repair.

As still yet another example, the processor 151 can output further details regarding a selected SSR on the display. In at least some implementations, the processor 151 can cause the display 163 to display a different GUI in order to display the further details. In at least some of those implementations, the processor 151 can cause the display 163 to display the different GUI in response to tapping some portion of the row twice in quick succession (similar to double clicking a computer mouse). As an example, in response to double tapping the row 369 corresponding to the service session SID-7, the processor 151 can cause the display 163 to display the GUI 390 (shown in FIG. 27 to FIG. 32).

As noted previously, an SSR and/or a row corresponding to the SSR can be highlighted within the GUI 363 in response to a selection of the USC 246, 247, 248, 249, 269, 376, 377, 378, 379, 380, 381, 382. As another example, an SSR and/or row in the table 257 can be highlighted in response to a selection of that SSR and/or row. As yet another example, an SSR and/or row in the table 257 can be highlighted in response to a temporal value corresponding to the status. For instance, the temporal value can be a quantity of minutes, such as five or fifteen minutes and any service session shown in the GUI 363 whose status has changed within the most-recent amount of time equal to the temporal value can be highlighted.

In at least some other implementations, a column, such as the column 370, can include the identifiers shown in row 258 and each of the other columns in the table 257 can be used to include the data for a respective SSR. In at least some other implementations, the data in the table 257 can be displayed in the GUI 363 in an arrangement other than in a table. Furthermore, the USC shown in FIG. 40 can include other USC for filtering the table in addition to or as an alternative to one or more of USC shown in FIG. 40. As an example, those other USC can be associated with other content contained in an SSR, such as an identifier of a person (e.g., a technician, a customer adviser, or a vehicle owner), a repair shop, a piece of shop equipment, a computing system, or some other content of an SSR.

The GUI 363 also includes a USC 620, 621, 622, 623, 624, 625 to select particular data to be displayed within the GUI 363, namely a particular customer, date-in, date-out, vehicle, concern, or state, respectively. In embodiments in which the table 257 includes other categories of data, the GUI 363 can include other USC to select particular data from one of the other categories. As an example, FIG. 40 shows a selector 627 (e.g., a person's finger or a cursor on output on the display 163) being used to select the USC 621 so that a group 626 of data selections are displayed on the display 163 and the selector 627 being used to select a data selection 628 corresponding to a date-in selection of Feb. 17, 2022. The group 626 also includes data selections for two other dates and a field configured to allow a user to type in characters for selecting particular data to be displayed with the GUI 363.

Figure 41:
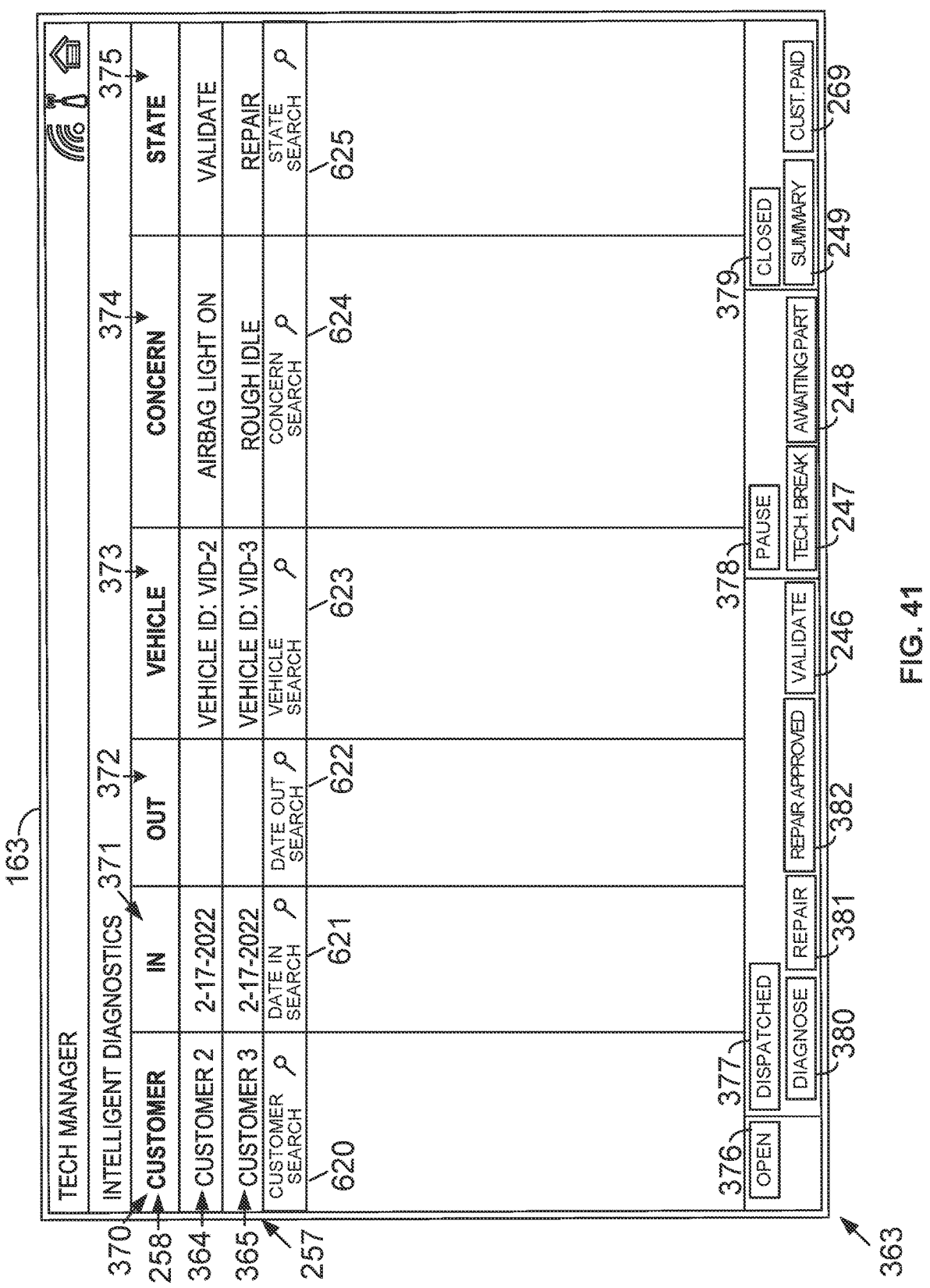

Next, FIG. 41 shows the GUI 363 in response to selections of the USC 621 and the data selection 628. As a result of those selections, the processor has filtered the table 257 such that the GUI 363 includes the row 364 and the row 365, because those rows have the Feb. 17, 2022 date-in and excludes the row 319, the row 366, the row 367, and the row 368, because those rows have a date-in other than Feb. 17, 2022. In FIG. 41, the table 257 also includes the row 258 having the column identifiers. The processor can be configured to filter particular categories of data in response to a selection and use of the USC 620, 622, 623, 624, 625 similar to how the processor can filter the date-in data in response to a selection and use of the USC 621.

Next, FIG. 42 shows a GUI 171, 172, 173, 174. The GUI 171, 172 can be displayed on the display 123 shown in FIG. 16. The GUI 173, 174 can be displayed on the display 145 shown in FIG. 17. The GUI 171, 172, 173, 174 include a session identifier 175, a vehicle identifier 176, a component identifier 177, a power supply level indicator 178, and an instruction 179.

The data displayed by the session identifier 175, the vehicle identifier 176, the component identifier 177, and the instruction 179 shown in the GUI 171, 172 can be sent to the shop equipment 122 (shown in FIG. 16) from a computing system (e.g., the computing system 14, 150) to generate the GUI 171, 172. The data displayed by the session identifier 175, the vehicle identifier 176, the component identifier 177, and the instruction 179 shown in the GUI 173, 174 can be sent to the shop equipment 99 (shown in FIG. 17) from a computing system (e.g., the computing system 14, 150) to generate the GUI 173, 174.

The GUI 171, 172 includes a mode count 259 that can indicate how many fasteners have been fastened to a specific setting for the service session. The GUI 171 also includes a measurement indicator 181 indicative of a torque measurement made while fastening a fastener using the shop equipment 122. The GUI 172 also includes a measurement indicator 182 indicative of an angle measurement made while fastening a fastener using the shop equipment 122. The GUI 173, 174 also include a measurement indicator 294 indicative of a measurement made using the shop equipment 99.

Content within the GUI 171, 172, 173, 174 can be populated into a service session record and then output within an event summary and timeline shown on a GUI. In at least some implementations, the shop equipment 99, 122 transmits at least a portion of the content within the GUI 171, 172 or the GUI 173, 174, respectively, to the server 100 via a communication, such as the communication 212. In at least some other implementations, the shop equipment 99, 122 transmits at least a portion of the content within the GUI 171, 172 or the GUI 173, 174, respectively, to the computing system 150 via a communication, such as the communication 212. Such transmission could, for example, occur using a personal area network and/or using an NFC device, or otherwise. Afterwards, the computing system 150 can transmit the data received from the shop equipment 99, 122 to the server 100 for inclusion in an event summary in a timeline and/or an SSR.

Figure 43:
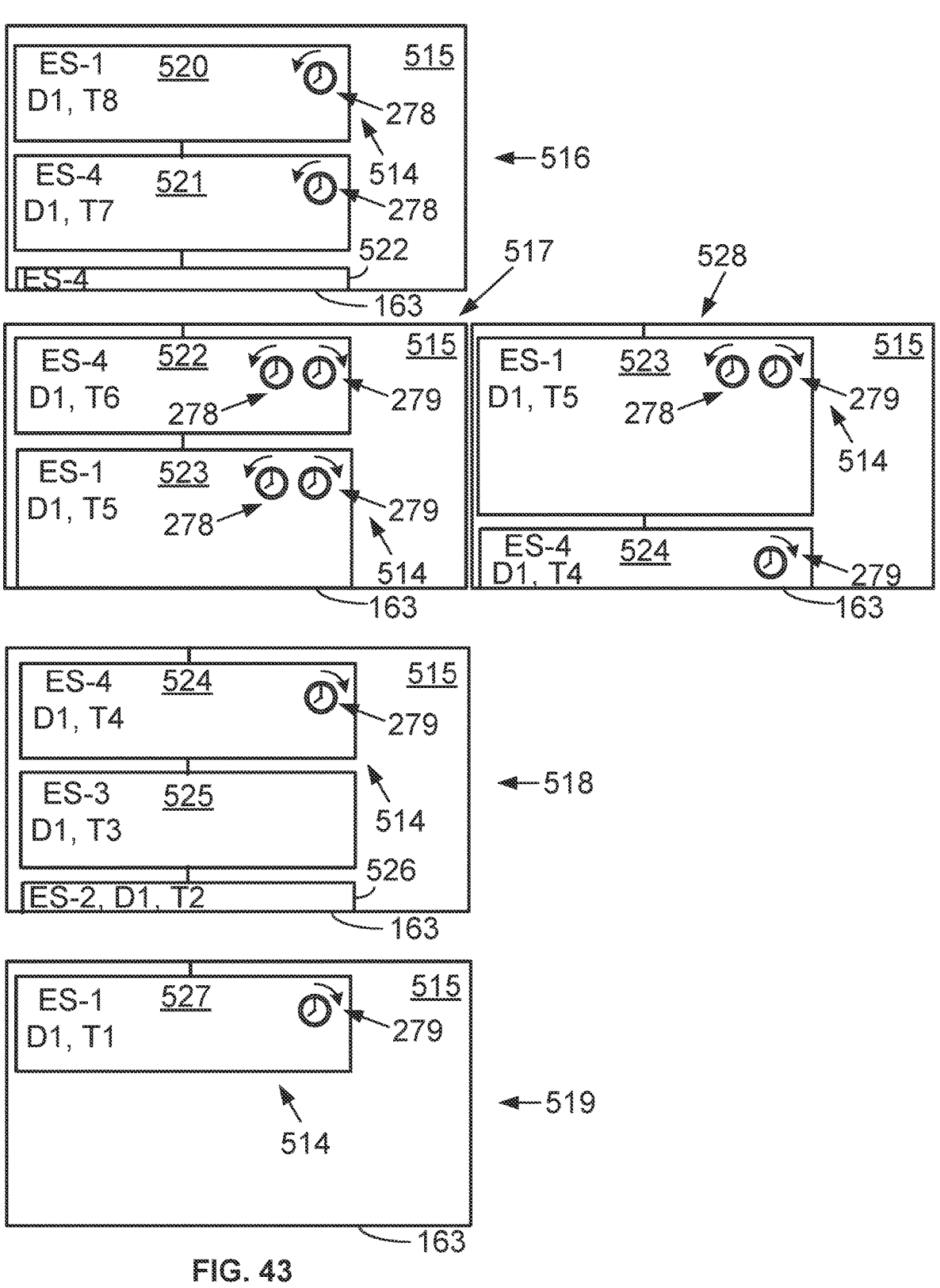

Next, FIG. 43 shows a view 516, 517, 518, 519, 528 of a GUI 515 including a portion of a timeline 514 corresponding to an SSR displayed on the display 163. Each of those views is shown on the display 163. The timeline 514 includes a container 520 including a portion of an event summary ES-1. That portion corresponds to a date D1 and a time T8. The timeline 514 includes a container 521 including a portion of an event summary ES-4. That portion corresponds to the date D1 and a time T7. The timeline 514 also includes a container 522 including a portion of the event summary ES-4. That portion corresponds to the date D1 and a time T6. The timeline 514 also includes a container 523 including a portion of the event summary ES-1. That portion corresponds to the date D1 and a time T5. The timeline 514 further includes a container 524 including a portion of the event summary ES-4, that portion corresponding to the date D1 and a time T4. The timeline 514 includes a container 525 including an event summary ES-3 corresponding to the date D1 and a time T3. Furthermore, the timeline 514 includes a container 526 including an event summary ES-2 corresponding to the date D1 and a time T2. Furthermore still, the timeline 514 includes a container 527 including a portion of the event summary ES-1, that portion corresponding to the date D1 and a time T1.

Table G shows data regarding the event summaries shown in FIG. 43. Some of the event summaries (i.e., ES-1 and ES-4) are classified as being part of a common event having multiple event summaries.

TABLE G

| Container (Drawing number) | Event summary | Date | Time | Common Event(s) |
|---|---|---|---|---|
| 520 | ES-1 | D1 | T8 | YES |
| 521 | ES-4 | D1 | T7 | YES |
| 522 | ES-4 | D1 | T6 | YES |
| 523 | ES-1 | D1 | T5 | YES |
| 524 | ES-4 | D1 | T4 | YES |
| 525 | ES-3 | D1 | T3 | NO |
| 526 | ES-2 | D1 | T2 | NO |
| 527 | ES-1 | D1 | T1 | YES |

Common events can be defined in various ways. As an example, common events can be events corresponding to a particular vehicle component. As another example, common events can include an event corresponding to a pre-scan of the vehicle before a repair to the vehicle is made and an event corresponding to a post-scan of the vehicle after the repair to the vehicle has been made. As yet another example, common events can include events for activities performed by a particular person (e.g., technician T1) or performed using a particular computing system.

The container 520, 521, 522, 523 includes the USC 278, as described above. The container 522, 523, 524, 527 includes the USC 279, as described above. As an example, selecting the USC 278 within the container 520 shown in the view 516 can cause the processor 151 to display the view 528. Selecting the USC 278 within the container 521 shown in the view 516 can cause the processor 151 to display the view 517.

Selecting the USC 278 within the container 522 shown in the view 517 can cause the processor 151 to display the view 518. In contrast, selecting the USC 279 within the container 522 shown in the view 517 can cause the processor 151 to display the view 516.

Selecting the USC 278 within the container 523 shown in the view 517, 528 can cause the processor 151 to display the view 519. In contrast, selecting the USC 279 within the container 523 shown in the view 517, 528 can cause the processor 151 to display the view 516.

Selecting the USC 279 within the container 524 shown in the view 518 can cause the processor 151 to display the view 517. Selecting the USC 279 within the container 527 shown in the view 519 can cause the processor 151 to display the view 528.

VII. Example Communications and Files

Next, FIG. 44 shows a communication 212 in accordance with the example implementations. The communication 212 can be transmitted by a server, such as the server 4, 8, 100, shop equipment, such as the shop equipment 11, 12, or a computing system, such as the computing system 14, 15, 16, 17, 23, 24, 26, 55, 150. The fields of any communication including multiple fields shown in the drawings can be arranged in an order different than shown in the drawings.

The communication 212 includes a quantity of 1+N fields. N is greater than or equal to 0. FIG. 44 shows a field 213, 214, 215, 216, 217. When N equals 0, the communication 212 includes the field 213. When N equals 1, the communication 212 includes the field 213 and the field 217. When N equals 2, the communication 212 includes the field 213, the field 216, and the field 217. When N equals 3, the communication 212 includes the field 213, the field 215, the field 216, and the field 217. When N is greater than or equal to 4, the communication 212 includes the field 213, the field 214, the field 215, the field 216, and the field 217. In that case the field 214 represents one or more fields. One or more fields in the communication 212 can include at least a part of a vehicle identifier.

As an example, the communication 212 can include fields of a communication 218 shown in FIG. 45. For example, the field 213 can include a field 219 shown in FIG. 45. The field 214 can include a field 220, a field 221, a field 222, a field 223, and a field 224 shown in FIG. 45. The field 215 can include a field 225 shown in FIG. 45. The field 216 can include a field 226 shown in FIG. 45, and the field 217 can include a field 227 shown in FIG. 45.

As another example, the communication 212 can include fields of a communication 250 shown in FIG. 47. For example, the field 213 can include a field 251 shown in FIG. 47. The field 214 can include a field 252 and a field 256 shown in FIG. 47. The field 215 can include a field 253 shown in FIG. 47. The field 216 can include the field 254 shown in FIG. 47. The field 217 can include the field 256 shown in FIG. 47. The fields of the communication 212 can also be mapped to a communication 270, 280, 445, 460, 475, 490, 505, 530, 540, 550 shown in FIG. 49 to FIG. 58.

Next, FIG. 45 shows fields of a communication 218 in accordance with the example implementations. The communication 218 can be generated by a computing system, such as the computing system 150. The computing system 150 can transmit the communication 218 for transmission to the server 100. The communication 218 includes a field 219, 220, 221, 222, 223, 224, 225, 226, 227. The text directly above those fields is a respective field descriptor. In particular, the field 219 is designated to include a destination identifier, the field 220 is designated to include a source identifier, and the field 221 is designated to include a user identifier. The field 222 is designated to include a shop identifier. The field 223 is designated to include an event type. The field 224 is designated to include a vehicle identifier. The field 225 is designated to include a repair order number. The field 226 is designated to include a technician identifier. The field 227 is designated to include a message map.

FIG. 45 shows example content in the field 219, 220, 221, 222, 223, 224, 225, 226, 227. A person having ordinary skill in the art will understand that transmission of the communication 218 or other communications described in this description and/or shown in the drawings over a communication network can include transmitting a binary representation of the content of the communication. FIG. 45 shows that some of content in a communication can be null. Null content might be contained in a communication, such as the communication 218, if other data for a field with null data has not yet been determined. For example, a vehicle identifier and a technician identifier may not be known when the communication 218 is transmitted.

The field 223 shows an event type of request session. The server 100 can generate a service session record in response to receiving the communication 218. The server 100 can condition generating the service session record based on data contained within the communication 218. For example, if the server 100 determines that a service session record for the repair shop referred to as Acme Repair and its repair order number "123456" has already been generated, the server 100 can be configured to send a notification to a computing system that transmitted the communication 218 of a possible conflict with a pre-existing service session record. Additionally or alternatively, the server 100 can be configured to aggregate data within a communication requesting generation of a service session record into the pre-existing service session record. For example, if the server 100 generates a service session record in response to receiving the communication 218 and thereafter receives a communication like the communication 218, but also including a vehicle identifier in the field 224 and/or a technician identifier in the field 226, the server 100 can aggregate the vehicle identifier and/or the technician identifier into the pre-existing service session record.

A message map, in the field 227 or any other field containing a message map discussed in this description and/or shown in the drawings, includes an indicator of a map that can be used to decode a communication including the message map field. As an example, a message map can indicate how many bits and/or bytes are used by each field in a communication, an order of the fields in a communication, and a dictionary to decode the content of each field.

The communication 218 and/or other communication shown in the drawings can include other fields, such as a check sum field, a source identifier field, a destination identifier field, and/or a time field. As an example, the source identifier can include an IP address assigned to the computing system 150 and the destination identifier can include an IP address assigned to the server 100. The time field can include temporal information such as a time or time and date when the communication is generated and/or transmitted.

Next. FIG. 46 shows a service session record (SSR) 230 in accordance with the example implementations. In at least some of those implementations, the SSR 230 can be generated in response to the server receiving the communication 218 and/or based on data contained within the communication 218.

The SSR 230 is a computer-readable file that can be stored in a memory. For example, the SSR 230 can be stored within the SSR 206 in the memory 102 or the SSR 199 in the memory 152. The SSR 230 is shown as an XML file. The content of the SSR 230 can be stored in other file formats as well, such as JSON, PDF, or CSV.

The SSR 230 includes a preamble 231 identifying that the SSR 230 is arranged as an XML file. The SSR 230 includes a set 232, 233 of fields. The set 232 includes fields corresponding to a service session. The set 233 includes fields corresponding to an event of the service session corresponding to the set 232. Not including the fields of the set 233, the set 232 includes a field 234 corresponding to a service session identifier, a field 235 corresponding to a vehicle identifier, a field 236 corresponding to a technician identifier, a field 237 corresponding to a session status, a field 238 corresponding to a shop identifier, a field 239 corresponding to a shop contact identifier, and a field 240 corresponding to an RO number.

In at least some implementations, since the communication 218 includes null in the field 224, 226, the field 235, 236 in the SSR 230 are shown as null. In at least some implementations, the content of any field within a set of fields for an SSR can be modified. For example, the content of the field 235, 236 can be modified to include data representing a vehicle identifier and a technician identifier, respectively.

In at least some implementations, the content of the field 234 is assigned by the server 100. Such assignment can occur in response to the server receiving the communication 218. As another example, the processor 101 can populate content into a field of an SSR based on content received in a communication from a computing system. For instance, the processor 101 can populate a shop contact identifier based on a source identifier that is to be included within a communication transmitted to the server 100.

As yet another example, the processor 101 can populate content into a field of an SSR based on data stored in the memory 102. For instance, the processor 101 can refer to the computing system database 210 to determine a shop contact identifier for the field 239. Such determination, could be based on the shop identifier in the field 238, or other content such as a computing system identifier that corresponds to a source of the communication 218 (e.g., the computing system CS-1).

The set 233 includes a field 241 corresponding to a source performing an event, a field 242 corresponding to a user identifier, a field 243 corresponding to an event type, a field 244 corresponding to a session status, and a field 245 corresponding to an event time. The field 241 can include content corresponding to the field 220 in the communication 218. The field 242 can include content corresponding to the field 221 in the communication 218. The field 243 can include content corresponding to the content of the field 223 in the communication 218. The field 244 can include content the server 100 tracks regarding a status of the event corresponding to the set 233. The field 245 can include temporal data regarding an event corresponding to the set 233. As an example, the temporal data within the field 245 can include a time or time and data indicative of when a request to perform the event occurred, when the server 100 receives a request to perform the event, or when the event is initiated or experiences a change in state. The content of fields within a set of fields corresponding to an event can be used to populate an event summary within a GUI that corresponds to a service session.

Next, FIG. 47 shows fields of a communication 250 in accordance with the example implementations. The communication 250 can be generated by a computing system, such as the computing system 150. The computing system 150 can transmit the communication 250 for transmission to the server 100. The communication 250 includes a field 251, 252, 253, 254, 255, 256. The text directly above those fields is a respective field descriptor.

In particular, the field 251 is designated to include a session identifier. The field 252 is designated to include an event type identifier. The field 253 is designated to include a session state identifier. The field 254 is designated to include a technician identifier. The field 255 is designated to include a message map. The field 256 indicates that the communication 250 can include one or more other fields. As an example, the field 256 can include one or more of a field (like the field 219) corresponding to a destination identifier, a field (like the field 220) corresponding to a source identifier, a field (like the field 221) corresponding to a user identifier, or some other field.

In at least some implementations, the server 100 can map one or more aspects to a session identifier, such as the session identifier SID-7. As an example, the server 100 can map a shop identifier, a vehicle identifier, and/or an RO number to the session identifier SID-7. In these implementations, the computing system can send a communication (e.g., the communication 250) without a shop identifier, a vehicle identifier, or an RO number, and then use the session identifier in that communication and mapping data to determine a shop identifier, a vehicle identifier, or an RO number corresponding to the session identifier.

Next, FIG. 48 shows the SSR 230 after being modified in response to the server 100 receiving the communication 250. FIG. 48 shows that the SSR 230 the set 232 includes the set 233 and a set 260. The set 260 includes fields corresponding to another event of the service session corresponding to the set 232 (i.e., the service session SID-7).

The set 260 includes a field 261 corresponding to an event type, a field 262 corresponding to a session status, a field 263 corresponding to a technician identifier, and a field 264 corresponding to an event time. The field 261 can include content corresponding to the field 252 in the communication 250. The field 262 can include content corresponding to the content of the field 253 in the communication 250. The field 263 can include content corresponding to the content of the field 254 in the communication 250. The field 264 can include temporal data regarding an event corresponding to the set 260. As an example, the temporal data within the field 264 can include a time or time and data indicative of when a request to perform the event corresponding to the set 260 occurred, when the server 100 receives a request to perform the event corresponding to the set 260, or when the event corresponding to the set 260 is initiated or experiences a change in state. The field 264 shows a time based on a twenty-four hour clock, but could additionally or alternatively include a time in a different time format.

Next, FIG. 49 shows fields of a communication 270 in accordance with the example implementations. The communication 270 can be generated by a computing system, such as the computing system 150. The computing system 150 can transmit the communication 270 for transmission to the server 100. The communication 270 includes a field 271, 272, 273, 274, 275, 276, 277. The text directly above those fields is a respective field descriptor.

In particular, the field 271 is designated to include a source identifier. The field 272 is designated to include a session identifier. The field 273 is designated to include an event type identifier. The field 274 is designated to include a session state identifier. The field 275 is designated to include a technician identifier. The field 276 is designated to include a message map. The field 277 indicates that the communication 270 can include one or more other fields. As an example, the field 277 can include one or more of a field (like the field 219) corresponding to a destination identifier, a field (like the field 221) corresponding to a user identifier, or some other field. The event summary 298 in FIG. 29 can be based on the communication 270.

Next, FIG. 50 shows fields of a communication 280 in accordance with the example implementations. The communication 280 can be generated by a computing system, such as the computing system 150. The computing system 150 can transmit the communication 280 for transmission to the server 100. The communication 280 includes a field 281, 282, 283, 284, 285, 286, 287. The text directly above those fields is a respective field descriptor.

In particular, the field 281 is designated to include a source identifier. The field 282 is designated to include a session identifier. The field 283 is designated to include an event type identifier. The field 284 is designated to include a session state identifier. The field 285 is designated to include a technician identifier. The field 286 is designated to include a message map. The field 287 indicates that the communication 280 can include one or more other fields. As an example, the field 287 can include one or more of a field (like the field 219) corresponding to a destination identifier, a field (like the field 221) corresponding to a user identifier, or some other field. The field 276 in FIG. 49 and the field 286 in FIG. 50 include data representing a common message map. The event summary 397 in FIG. 30 can be based on the communication 280.

Next, FIG. 51 shows fields of a communication 445 in accordance with the example implementations. The communication 445 can be generated by a computing system, such as the computing system 150. The computing system 150 can transmit the communication 445 for transmission to the server 100. The communication 445 includes a field 446, 447, 448, 449, 450, 451, 452, 453, 454, 455. The text directly above those fields is a respective field descriptor.

In particular, the field 446 is designated to include a source identifier. The field 447 is designated to include a session identifier. The field 448 is designated to include an event type identifier. The field 449 is designated to include a session state identifier. The field 450 is designated to include an indication of how many DTC are set in the vehicle or in a particular ECU in the vehicle and/or which DTC are set in the vehicle or in the particular ECU. The field 451 is designated to include an indication of how many monitors in the vehicle or in an ECU are in the complete state and/or which monitors are in the complete state. The field 452 is designated to include an indication of how many health concerns were determined for the vehicle or the ECU in the vehicle and/or which health concerns were determined. The field 453 is designated to include a technician identifier. The field 454 is designated to include a message map. As an example, a health concern could indicate a low fluid level, a fluid contamination, a worn brake pad, a low battery level, a low pressure level (e.g., a low tire pressure level), a malfunctioning light bulb (e.g., a malfunctioning license plate light), abnormal tire wear, or a vehicle malfunction indicator lamp on status. Other examples of the health concern are also possible.

The field 455 indicates that the communication 445 can include one or more other fields. As an example, the field 455 can include one or more of a field (like the field 219) corresponding to a destination identifier, a field (like the field 221) corresponding to a user identifier, or some other field. The event summary 398 in FIG. 30 can be based on the communication 445.

Next, FIG. 52 shows fields of a communication 460 in accordance with the example implementations. The communication 460 can be generated by a computing system, such as the computing system 150. The computing system 150 can transmit the communication 460 for transmission to the server 100. The communication 460 includes a field 461, 462, 463, 464, 465, 466, 467, 468, 469, 470. The text directly above those fields is a respective field descriptor.

In particular, the field 461 is designated to include a source identifier. The field 462 is designated to include a session identifier. The field 463 is designated to include an event type identifier. The field 464 is designated to include a session state identifier. The field 465 is designated to include an indication of how many DTC are set in the vehicle or in a particular ECU in the vehicle and/or which DTC are set in the vehicle or in the particular ECU. The field 466 is designated to include an indication of how many monitors in the vehicle or in an ECU are in the complete state and/or which monitors are in the complete state. The field 467 is designated to include an indication of how many health concerns were determined for the vehicle or the ECU in the vehicle and/or which health concerns were determined. The field 468 is designated to include a technician identifier. The field 469 is designated to include a message map.

The field 470 indicates that the communication 460 can include one or more other fields. As an example, the field 470 can include one or more of a field (like the field 219) corresponding to a destination identifier, a field (like the field 221) corresponding to a user identifier, or some other field. The modification to the event summary 398 in FIG. 32 as compared to how the event summary 398 appears in the GUI 390 shown in FIG. 30 can be based on the communication 460. The field 454 in FIG. 51 and the field 469 in FIG. 52 include data representing a common message map.

Figures 53, 54, 55:
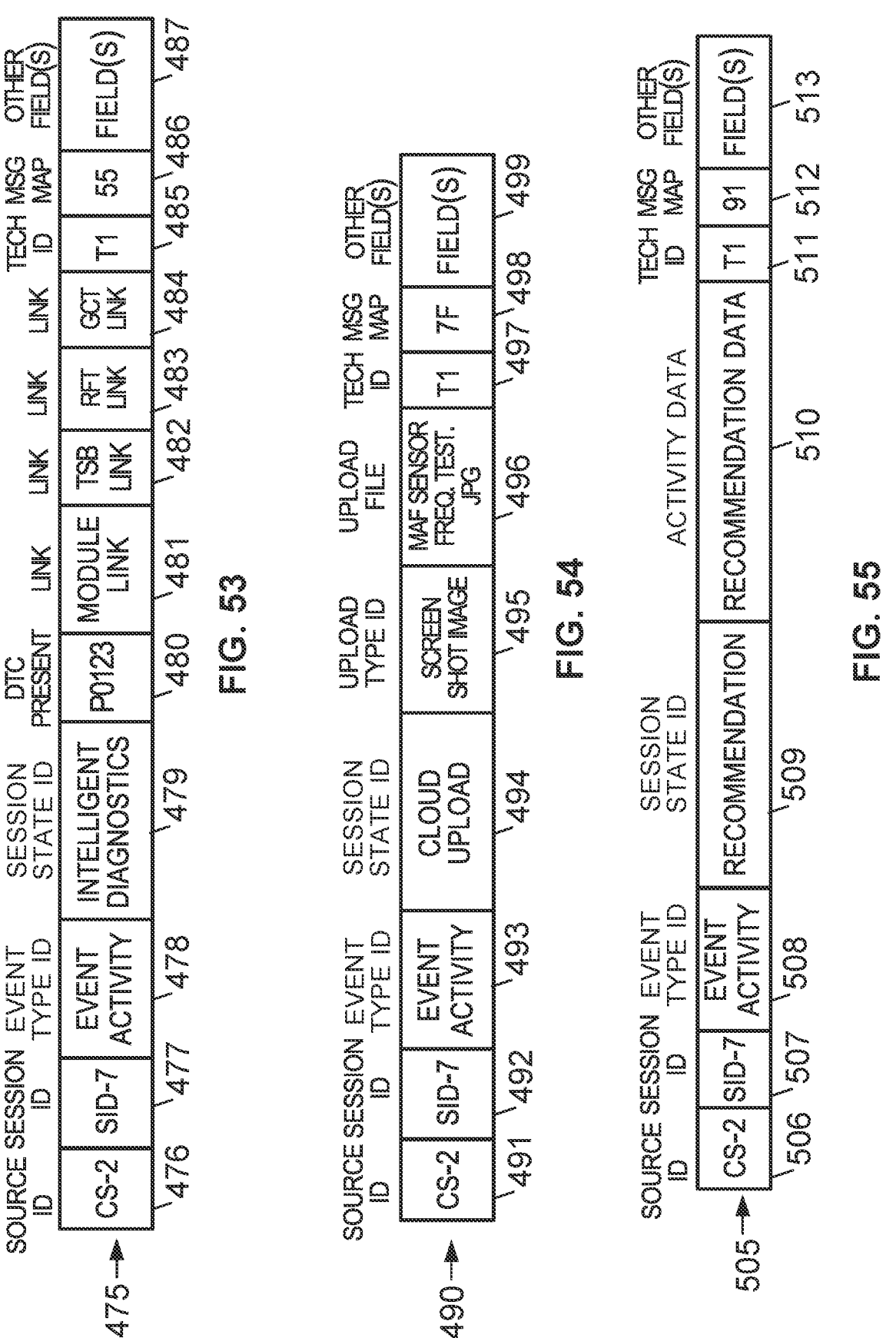

Next, FIG. 53 shows fields of a communication 475 in accordance with the example implementations. The communication 475 can be generated by a computing system, such as the computing system 150. The computing system 150 can transmit the communication 475 for transmission to the server 100. The communication 475 includes a field 476, 477, 478, 479, 480, 481, 482, 483, 484, 485, 486, 487. The text directly above those fields is a respective field descriptor.

In particular, the field 476 is designated to include a source identifier. The field 477 is designated to include a session identifier. The field 478 is designated to include an event type identifier. The field 479 is designated to include a session state identifier. The field 480 is designated to include an indication of how many DTC are set in the vehicle or in a particular ECU in the vehicle and/or which DTC are set in the vehicle or in the particular ECU. The field 481 is designated to include a link to a list of modules accessed while performing the intelligent diagnostics service activity on a vehicle. The field 482 is designated to include a link to one or more technical service bulletins (TSBs). The server 100 can determine the TSBs based on performing the intelligent diagnostics service activity on a vehicle. The field 483 is designated to include a link to one or more real-fix tips. The server 100 can determine the real-fix tips based on performing the intelligent diagnostics service activity on a vehicle. The field 484 is designated to include a link to one or more guided component tests. The server 100 can determine the guided component tests based on performing the intelligent diagnostics service activity on a vehicle. The field 485 is designated to include a technician identifier. The field 486 is designated to include a message map.

The field 487 indicates that the communication 475 can include one or more other fields. As an example, the field 487 can include one or more of a field (like the field 219) corresponding to a destination identifier, a field (like the field 221) corresponding to a user identifier, or some other field. The event summary 402 in FIG. 32 can be based on the communication 280.

Next, FIG. 54 shows fields of a communication 490 in accordance with the example implementations. The communication 490 can be generated by a computing system, such as the computing system 150. The computing system 150 can transmit the communication 490 for transmission to the server 100. The communication 490 includes a field 491, 492, 493, 494, 495, 496, 497, 498, 499. The text directly above those fields is a respective field descriptor.

In particular, the field 491 is designated to include a source identifier. The field 492 is designated to include a session identifier. The field 493 is designated to include an event type identifier. The field 494 is designated to include a session state identifier. The field 495 is designated to include and upload type identifier. As an example, an upload type identifier can include an identifier of: an image, a source of an image (e.g., a screen shot, a visible light camera, or a thermal imager), a vehicle data message list, or measurement data (e.g., a scope waveform). The field 496 is designated to include an identifier of a file (e.g., a file name). In at least some implementations, the file is included within the communication 490. In at least some other implementations, the file is transmitted to the server 100 separate from the communication 490. The field 497 is designated to include a technician identifier. The field 498 is designated to include a message map.

The field 499 indicates that the communication 490 can include one or more other fields. As an example, the field

499 can include one or more of a field (like the field 219) corresponding to a destination identifier, a field (like the field 221) corresponding to a user identifier, or some other field. The event summary 399 in FIG. 31 can be based on the communication 490.

Next, FIG. 55 shows fields of a communication 505 in accordance with the example implementations. The communication 505 can be generated by a computing system, such as the computing system 150. The computing system 150 can transmit the communication 505 for transmission to the server 100. The communication 505 includes a field 506, 507, 508, 509, 510, 511, 512, 513. The text directly above those fields is a respective field descriptor.

In particular, the field 506 is designated to include a source identifier. The field 507 is designated to include a session identifier. The field 508 is designated to include an event type identifier. The field 509 is designated to include a session state identifier. The field 510 is designated to include activity data determined by the processor 151 during performance of a service activity during an SSR. The field 511 is designated to include a technician identifier. The field 512 is designated to include a message map. The field 513 indicates that the communication 505 can include one or more other fields. As an example, the field 513 can include one or more of a field (like the field 219) corresponding to a destination identifier, a field (like the field 221) corresponding to a user identifier, or some other field. The event summary 400 in FIG. 31 can be based on the communication 505.

Next, FIG. 56 shows fields of a communication 530 in accordance with the example implementations. The communication 530 can be generated by a computing system, such as the computing system 150. The computing system 150 can transmit the communication 530 for transmission to the server 100. The communication 530 includes a field 531, 532, 533, 534, 535, 536, 537, 538. The text directly above those fields is a respective field descriptor.

In particular, the field 531 is designated to include a source identifier. The field 532 is designated to include a session identifier. The field 533 is designated to include an event type identifier. The field 534 is designated to include a session state identifier. The field 535 is designated to include a test identifier. The field 536 is designated to include a component identifier. The field 537 is designated to include a message map. The field 538 indicates that the communication 530 can include one or more other fields. As an example, the field 538 can include one or more of a field (like the field 219) corresponding to a destination identifier, a field (like the field 221) corresponding to a user identifier, or some other field. The event summary 288 in FIG. 38 can be based on the communication 530.

Next, FIG. 57 shows fields of a communication 540 in accordance with the example implementations. The communication 540 can be generated by a server, such as the server 100. The server 100 can transmit the communication 540 for transmission to the computing system 150. The communication 540 includes a field 541, 542, 543, 544, 545, 546, 547. The text directly above those fields is a respective field descriptor.

In particular, the field 541 is designated to include a destination identifier. The field 542 is designated to include a session identifier. The field 543 is designated to include an event type identifier. The field 544 is designated to include a session state identifier. The field 545 is designated to include instructions and/or an index value associated with a set of set-up instructions. The field 546 is designated to include a message map. The field 547 indicates that the communication 540 can include one or more other fields. As an example, the field 547 can include one or more of a field (like the field 219) corresponding to a destination identifier, a field (like the field 221) corresponding to a user identifier, or some other field. The event summary 289 in FIG. 38 can be based on the communication 540.

Next, FIG. 58 shows fields of a communication 550 in accordance with the example implementations. The communication 550 can be generated by a computing system, such as the computing system 150. The computing system 150 can transmit the communication 550 for transmission to the server 100. The communication 550 includes a field 551, 552, 553, 554, 555, 556, 557. The text directly above those fields is a respective field descriptor.

In particular, the field 551 is designated to include a source identifier. The field 552 is designated to include a session identifier. The field 553 is designated to include an event type identifier. The field 554 is designated to include a session state identifier. The field 555 is designated to include a destination identifier (e.g., an identifier of a computing system) for the set-up instructions. The field 556 is designated to include a message map. The field 557 indicates that the communication 550 can include one or more other fields. As an example, the field 557 can include one or more of a field (like the field 219) corresponding to a destination identifier, a field (like the field 221) corresponding to a user identifier, or some other field. The event summary 290 in FIG. 38 can be based on the communication 550.

VIII. Conclusion

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether. Furthermore, various functions described and/or shown in the drawings as being performed by one or more elements can be carried out by a processor executing computer-readable program instructions or by a combination of hardware, firmware, and/or software. For purposes of this description, execution of CRPI contained in a computer-readable medium to perform some function can include executing all of the program instructions of those CRPI or only a portion of those CRPI.

The computing systems and servers described in this description can be configured to comply with regulation(s) pertaining to data protections and/or privacy where applicable. As an example, the regulations(s) can include the General Data Protection Regulation (GDPR) applicable to the European Union or the California Consumer Privacy Act (CCPA) applicable to California, United States. As another example, the computing systems and servers can be configured to encrypt personally identifiable information (PII), such as a vehicle identifier, a vehicle owner name, a license plate number, a driving record of a vehicle driver, or a technician identifier.

While various aspects and implementations are described herein, other aspects and implementations will be apparent to those skilled in the art. The various aspects and implementations disclosed herein are for purposes of illustration and are not intended to be limiting, with the true scope being indicated by the claims, along with the full scope of equivalents to which such claims are entitled. It is also to be understood that the terminology used herein for the purpose of describing implementations only, and is not intended to be limiting.

In this description, the articles "a," "an," and "the" are used to introduce elements and/or functions of the example implementations. The intent of using those articles is that there is one or more of the introduced elements and/or functions.

In this description, the intent of using the term "and/or" within a list of at least two elements or functions and the intent of using the terms "at least one of," "at least one of the following," "one or more of," and "one or more of the following" immediately preceding a list of at least two components or functions is to cover each implementation including a listed component or function independently and each implementation including a combination of the listed components or functions. For example, an implementation described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible implementations: (i) an implementation including A, but not B and not C, (ii) an implementation including B, but not A and not C, (iii) an implementation including C, but not A and not B, (iv) an implementation including A and B, but not C, (v) an implementation including A and C, but not B, (v) an implementation including B and C, but not A, and/or (vi) an implementation including A, B, and C. For the implementations including component or function A, the implementations can include one A or multiple A. For the implementations including component or function B, the implementations can include one B or multiple B. For the implementations including component or function C, the implementations can include one C or multiple C. The use of ordinal numbers such as "first," "second," "third" and so on is to distinguish respective elements rather than to denote an order of those elements unless the context of using those terms explicitly indicates otherwise. The use of the symbol "$" as prefix to a number indicates the number is a hexadecimal number.

Implementations of the present disclosure may thus relate to one of the enumerated example embodiments (EEEs) listed below.

EEE A1 is a method comprising: outputting, by a computing system, a request for transmission to a server, wherein: the request includes an identifier of a service session record corresponding to a vehicle, and the service session record includes a timeline for tracking one or more events corresponding to the service session record; receiving, in response to the request, a first graphical user interface corresponding to the service session record; displaying, on a display, the first graphical user interface in a first display mode, wherein: displaying the first graphical user interface in the first display mode includes displaying a first event summary of the timeline, the first event summary corresponds to a first event of the service session record, and the first event summary includes a first user-selectable control selectable to trigger changing a display mode of the first graphical user interface; and displaying, in response to a selection of the first user-selectable control, the first graphical user interface in a second display mode, wherein displaying the first graphical user interface in the second display mode includes displaying a particular detail regarding the first event not shown in the first display mode.

EEE A2 is a method according to EEE A1, wherein: displaying the first graphical user interface in the first display mode includes displaying multiple event summaries arranged in a first temporal order, and the multiple event summaries include the first event summary.

EEE A3 is a method according to any one of EEE A1 or A2, wherein: displaying the first graphical user interface in the first display mode further includes displaying a filter selector including a first selection criterion, the method further comprises: determining a selection of the first selection criterion has occurred; and displaying a modified version of the first graphical user interface, and displaying the modified version of the first graphical user interface incudes displaying a subset of the one or more event summaries arranged in a second temporal order.

EEE A4 is a method according to any one of EEE A1 to A3, further comprising: outputting, by the computing system for transmission to the server, a communication including an input for modifying the service session record, wherein: the communication includes one or more from among: the identifier of the service session record, an identifier of the vehicle, or data that corresponds to the input for modifying the service session record and the input for modifying the service session record is generated by the computing system in response to performing an event with respect to the vehicle using the computing system or a service activity of the event.

EEE A5 is a method according to EEE A4, wherein performing the event with respect to the vehicle using the computing system or the service activity of the event includes performing one or more from among: capturing data generated by the vehicle, testing operation of a vehicle component, measuring a vehicle component, inspecting the vehicle, capturing an image of at least a portion of the vehicle, capturing a screen shot of the display, capturing a sound made by the vehicle, analyzing a gas emitted by the vehicle, aligning a vehicle component, adjusting a vehicle component, performing a maintenance task on the vehicle, test driving the vehicle, selecting a new state of the service session record, selecting a new state of an event of the service session record, or using a module of the computing system.

EEE A6 is a method according to any one of EEE A1 to A5, wherein: each event of the one or more events is classified with a particular state from among multiple states, and the multiple states include one or more from among: an open state, a dispatched state, a paused stated, and a closed state.

EEE A7 is a method according to EEE A6, wherein the first event of the service session record is classified with one or more additional states based on one or more from among: the computing system being selected for use during the service session, or an operating state of the computing system.

EEE A8 is a method according to EEE A7, wherein: the computing system includes a vehicle scan tool operatively connectable directly or indirectly to the vehicle, whereby the vehicle scan tool is operable to transmit a vehicle data message onto a communication link in the vehicle and to receive a vehicle data message transmitted by a component in the vehicle onto the communication link, and the one or more additional states include a state selected from among: a diagnose state, a repair state, and a report state.

EEE A9 is a method according to any one of EEE A1 to A8, wherein: the particular detail regarding the first event includes a user-selectable control selectable to display information based on diagnostic data determined during the first event, the method further comprises: determining a selection of the user-selectable control occurs, and displaying, on the display, the information based on diagnostic data determined during the first event.

EEE A10 is a method according to any one of EEE A1 to A9, wherein: the particular detail regarding the first event includes a user-selectable control selectable to configure a test device for performing a component test, and the method further comprises: determining a selection of the user-selectable control occurs, configuring the test device for performing the component test in response to the determined selection, determining a test result by performing the component test using the configured test device, and modifying the first event summary to include the test result or adding into the service session record a new event summary including the test result.

EEE A11 is a method according to any one of EEE A1 to A10, wherein: the particular detail regarding the first event includes a user-selectable control selectable to cause a vehicle communication transceiver to transmit a vehicle data message to the vehicle including a request to perform a functional test, and the method further comprises: determining a selection of the user-selectable control occurs, transmitting the vehicle data message to the vehicle including the request to perform the functional test, determining a status or result of performing the functional test, and modifying the first event summary to include the test result or status, or adding into the service session record a new event summary including the test result or status.

EEE A12 is a method according to any one of EEE A1 to A11, further comprising: receiving, while the first graphical user interface is displayed in the first display mode or the second display mode, a communication indicating that the timeline has been modified resulting in a modified timeline; displaying, on the display, a notification that timeline has been modified; and displaying, on the display, at least a portion of the modified timeline.

EEE A13 is a method according to any one of EEE A1 to A12, wherein: the computing system includes a first computing system, the first event summary includes event identification information generated by the first computing system or a second computing system used during performance of the first event, and the event identification information includes one or more from among: an identifier of the first computing system or the second computing system, an event identifier, a time identifier, or an event type identifier.

EEE A14 is a method according to EEE A13, further comprising: outputting, by the first computing system, a request for transmission to the second computing system, wherein the request includes at least a portion of the event identification information; and receiving, in response to the request for transmission to the second computing system, a communication from the second computing system including the detail regarding the first event, wherein displaying the first graphical user interface in the second display mode is conditioned on receiving the communication from the second computing system including the detail regarding the first event.

EEE A15 is a method according to any one of EEE A1 to A14, wherein receiving the first graphical user interface includes receiving the first event summary of the timeline and the particular detail regarding the first event.

EEE A16 is a method according to any one of EEE A1 to A15, wherein the timeline includes at least one event summary corresponding to an event or service activity performed using the computing system.

EEE A17 is a method according to any one of EEE A1 to A16, wherein displaying the particular detail regarding the first event includes displaying information determined or captured during performance of the first event.

EEE A18 is a method according to any one of EEE A1 to A17, wherein: the computing system includes a first computing system, displaying the first graphical user interface in the second display mode further includes displaying a user-selectable control, the method further comprises outputting, by the first computing system in response to a selection of the user-selectable control, a communication for transmission to a second computing system, the communication includes a request for the second computing system to perform a service activity for the service session record; and the method further comprises displaying, on the display, a notification indicating a status of the second computing system performing the service activity for the service session record.

EEE A19 is a method according to any one of EEE A1 to A18, wherein: the service session record includes a second event summary, and the second event summary corresponds to the first event of the service session record.

EEE A20 is a method according to EEE A19, wherein the first user-selectable control indicates whether an activity associated with the second event summary occurred earlier or later in time than a time corresponding to an activity associated with the first event summary.

EEE A21 is a method accord to any one of EEE A19 to A20, wherein: displaying the first graphical user interface in the first display mode includes displaying at least a portion of a first container including the first event summary, but not a second container including the second event summary; and displaying the first graphical user interface in the second display mode includes displaying at least a portion of the second container including the second event summary, but not the first container including the first event summary.

EEE A22 is a method according to any one of EEE A20 to A21, wherein: the activity associated with the first event summary includes a service activity, and the activity associated with the second event summary includes a service activity or a non-service activity.

EEE A23 is a method according to any one of EEE A20 to A21, wherein: the activity associated with the first event summary includes a non-service activity, and the activity associated with the second event summary includes a service activity or a non-service activity.

EEE A24 is a method according to any one of EEE A19 to A23, wherein: the service session record includes a third event summary, and the third event summary corresponds to the first event of the service session record.

EEE A25 is a method according to EEE A24, wherein the first user-selectable control indicates whether an activity associated with the third event summary occurred earlier or later in time than a time corresponding to the activity associated with the first event summary.

EEE A26 is a method according to any one of EEE A24 to A25, wherein: displaying the first graphical user interface in the first display mode includes displaying at least a portion of a first container including the first event summary, but not a second container including the second event summary and not a third container including the third event summary; displaying the first graphical user interface in the second display mode includes displaying at least a portion of the second container including the second event summary, but not the first container including the first event summary and not the third container including the third event summary.

EEE A27 is a method according to any one of EEE A25 to A26, wherein: the activity associated with the first event summary includes a service activity, the activity associated with the second event summary includes a service activity or a non-service activity, and the activity associated with the third event summary includes a service activity or a non-service activity.

EEE A28 is a method according to any one of EEE A25 to A26, wherein: the activity associated with the first event summary includes a non-service activity, the activity associated with the second event summary includes a service activity or a non-service activity, and the activity associated with the third event summary includes a service activity or a non-service activity.

EEE A29 is a method according to any one of EEE A25 to A28, wherein: the second container includes a second user-selectable control, the second user-selectable control indicates whether an activity associated with the third event summary occurred earlier or later in time than a time corresponding to the activity associated with the second event summary.

EEE A30 is a computing system comprising: a processor; and a non-transitory computer-readable memory storing executable instructions, wherein execution of the executable instructions by the processor causes the computing system to perform functions comprising: outputting a request for transmission to a server, wherein: the request includes an identifier of a service session record corresponding to a vehicle, and the service session record includes a timeline for tracking one or more events corresponding to the service session record; receiving, in response to the request, a first graphical user interface corresponding to the service session record; displaying, on a display, the first graphical user interface in a first display mode, wherein: displaying the first graphical user interface in the first display mode includes displaying a first event summary of the timeline, the first event summary corresponds to a first event of the service session record, and the first event summary includes a first user-selectable control selectable to trigger changing a display mode of the first graphical user interface; and displaying, in response to a selection of the first user-selectable control, the first graphical user interface in a second display mode, wherein displaying the first graphical user interface in the second display mode includes displaying a particular detail regarding the first event not shown in the first display mode.

EEE A31 is a non-transitory computer-readable memory having stored therein instructions executable by a processor to cause a computing system to perform functions comprising: outputting, by the computing system, a request for transmission to a server, wherein: the request includes an identifier of a service session record corresponding to a vehicle, and the service session record includes a timeline for tracking one or more events corresponding to the service session record; receiving, in response to the request, a first graphical user interface corresponding to the service session record; displaying, on a display, the first graphical user interface in a first display mode, wherein: displaying the first graphical user interface in the first display mode incudes displaying a first event summary of the timeline, the first event summary corresponds to a first event of the service session record, and the first event summary includes a first user-selectable control selectable to trigger changing a display mode of the first graphical user interface; and displaying, in response to a selection of the first user-selectable control, the first graphical user interface in a second display mode, wherein displaying the first graphical user interface in the second display mode includes displaying a particular detail regarding the first event not shown in the first display mode.

EEE A32 is a computing system comprising: a processor and a computer-readable memory storing executable instructions, wherein execution of the executable instructions by the processor causes the computing system to perform the method of any one of EEE A1 to A29.

EEE A33 is a non-transitory computer-readable memory having stored therein instructions executable by one or more processors to cause a computing system to perform the method of any one of EEE A1 to A29.

EEE B1 is a method comprising: receiving, at a first computing system from a server, an identifier of a service session record and set-up information to configure a second computing system; displaying, on a display at the first computing system, a graphical user interface including an indication the set-up information has been received; outputting, at a wireless output device at the first computing system, a first wireless signal modulated with the identifier of the service session record and the set-up information; receiving, at a wireless input device at the second computing system, the first wireless signal modulated with the identifier of the service session record and the set-up information; demodulating, at the second computing system, the first wireless signal to obtain the identifier of the service session record and the set-up information; configuring, by a processor at the second computing system, the second computing system according to the set-up information; determining, at the processor at the second computing system, data for the service session record while the second computing system is configured according to the set-up information; and outputting, at a wireless output device of the second computing system, a second wireless signal modulated with the identifier of the service session record and the data for the service session record for delivery to the server.

EEE B2 is a method according to EEE B1, wherein: the wireless output device includes an antenna, and the first wireless signal modulated with the identifier of the service session record and the set-up information includes a radio carrier signal.

EEE B3 is a method according to EEE B2, wherein: the first computing system includes a near field communication controller, and the antenna is contained within the near field communication controller or is connected to the near field communication controller.

EEE B4 is a method according to any one of EEE B1 or B3, wherein the wireless output device includes a light emitting diode configured to output infrared light.

EEE B5 is a method according to any one of EEE B1 or B4, wherein: the second computing system includes a torque wrench, the set-up information includes a torque or angle setting for the torque wrench, and configuring the second computing system according to the set-up information includes configuring the torque wrench to tighten a fastener to: the torque or angle setting, or the torque or angle setting plus or minus a threshold amount.

EEE B6 is a method according to any one of EEE B1 or B4, wherein: the second computing system includes a measurement caliper, and the set-up information includes a dimension to be measured using the measurement caliper and/or an identifier of a component to be measured using the measurement caliper.

EEE B7 is a method according to any one of EEE B1 or B4, wherein the second computing system includes a dongle that is removably attachable to an on-board diagnostic connector in a vehicle.

EEE B8 is a method according to any one of EEE B1 or B4, wherein: the second computing system includes an advanced driver-assistance system target rig, and the set-up information includes a spatial dimension corresponding to the advanced driver-assistance system target rig.

EEE B9 is a method according to any one of EEE B1 or B8, further comprising: receiving, at the first computing system from the server, the graphical user interface and metadata, and wherein the set-up information is contained within the metadata.

EEE B10 is a method according to any one of EEE B1 or B9, wherein: the graphical user interface includes a user-selectable control configured for selecting the set-up information, displaying the graphical user interface including displaying the user-selectable control, the method further comprises: determining, by the first computing system, that the user-selectable control is selected, and outputting the first wireless signal modulated with the identifier of the service session record and the set-up information occurs in response determining that the user-selectable control is selected.

EEE B11 is a method according to any one of EEE B1 or B10, wherein outputting the identifier of the service session record and the data for the service session record for delivery to the server includes outputting, at the wireless output device of the second computing system, a second wireless signal modulated with the identifier of the service session record and the data for the service session record directly to the first computing system.

EEE B12 is a method according to any one of EEE B1 or B11, wherein the set-up information includes a code to unlock the second computing system.

EEE B13 is a method according to EEE B12, wherein the set-up information further includes data to unlock the second computing system for a predetermined amount of time.

EEE B14 is a method according to any one of EEE B1 or B12, wherein the set-up information includes a code to lock the second computing system.

EEE B15 is a method according to any one of EEE B1 or B14, wherein the second computing system is configured to communicate with the first computing system, but is unable to communicate with the server.

EEE B16 is a method according to any one of EEE B1 or B15, wherein: outputting the first wireless signal includes the wireless output device of the first computing system transmitting the first wireless signal over a personal area network established between the first computing system and the second computing system, and outputting the second wireless signal includes the wireless output device of the second computing system transmitting the second wireless signal over the personal area network established between the first computing system and the second computing system.

EEE B17 is a method according to any one of EEE B1 or B16, wherein: outputting the first wireless signal includes the wireless output device of the first computing system transmitting the first wireless signal over a personal area network established between the first computing system and the second computing system, and outputting the second wireless signal includes the wireless output device of the second computing system transmitting the second wireless signal to the first computing system indirectly over a wide area network.

EEE B18 is a method according to any one of EEE B1 or B17, wherein: the wireless output device includes an audio speaker, the wireless input device includes a microphone, and the first wireless signal includes an ultrasonic signal.

EEE B19 is a method according to any one of EEE B1 to B4, wherein the set-up information includes information regarding a test to be performed or initiated by the second computing system.

EEE B20 is a method according to EEE B19, wherein the test includes a guided-component test or a functional test.

EEE B21 is a method according to EEE B20, wherein the functional test includes an information test, a toggle test, a variable control test, or a reset test.

EEE B22 is a system comprising: a first computing system including a processor, a display, a wireless input device and a wireless output device; a second computing system including a processor, a display, a wireless input device and a wireless output device; non-transitory computer-readable memory storing executable instructions, wherein execution of a first portion of the executable instructions at the first processor and a second portion of the executable instructions at the second processor cause the computing system to perform functions comprising: receiving, at the first computing system from a server, an identifier of a service session record and set-up information to configure the second computing system; displaying, on the display of the first computing system, a graphical user interface including an indication the set-up information has been received; outputting, at the wireless output device of the first computing system, a first wireless signal modulated with the identifier of the service session record and the set-up information; receiving, at the wireless input device of the second computing system, the first wireless signal modulated with the identifier of the service session record and the set-up information; demodulating, at the second computing system, the first wireless signal to obtain the identifier of the service session record and the set-up information; configuring, by the processor of the second computing system, the second computing system according to the set-up information; determining, at the processor at the second computing system, data for the service session record while the second computing system is configured according to the set-up information; and outputting, at the wireless output device of the second computing system, a second wireless signal modulated with the identifier of the service session record and the data for the service session record for delivery to the server.

EEE B23 is a non-transitory computer readable memory having stored therein instructions executable by a processor to cause a computing system to perform functions comprising: receiving, at a first computing system from a server, an identifier of a service session record and set-up information to configure a second computing system; displaying, on a display at the first computing system, a graphical user interface including an indication the set-up information has been received; outputting, at a wireless output device at the first computing system, a first wireless signal modulated with the identifier of the service session record and the set-up information; receiving, at a wireless input device at the second computing system, the first wireless signal modulated with the identifier of the service session record and the set-up information; demodulating, at the second computing system, the first wireless signal to obtain the identifier of the service session record and the set-up information; configuring, by a processor at the second computing system, the second computing system according to the set-up information; determining, at the processor at the second computing system, data for the service session record while the second computing system is configured according to the set-up information; and outputting, at a wireless output device of the second computing system, a second wireless signal modulated with the identifier of the service session record and the data for the service session record for delivery to the server.

EEE B24 is a computing system comprising: a processor and a computer-readable memory storing executable instructions, wherein execution of the executable instructions by the processor causes the computing system to perform the method of any one of EEE B1 to B21.

EEE B25 is a non-transitory computer-readable memory having stored therein instructions executable by one or more processors to cause a computing system to perform the method of any one of EEE B1 to B21.

EEE C1 is a method comprising: receiving, at a computing system, a first state indicator of a first service session tracked by a server using a particular service session record, wherein the first service session corresponds to servicing a vehicle; displaying a graphical user interface on a display, wherein: the graphical user interface corresponds to the first service session, and the graphical user interface includes the first state indicator and an indicator of a first service activity corresponding to the vehicle; performing the first service activity; determining, at the computing system, a first input for modifying the particular service session record, wherein the first input includes data that corresponds to performing the first service activity; and outputting the first input by the computing system for transmission to the server.

EEE C2 is a method according to EEE C1, further comprising: displaying a preliminary graphical user interface on the display, wherein: the preliminary graphical user interface includes one or more user-selectable controls, each of the one or more user-selectable controls is configured for selecting a respective service session record, the one or more user-selectable controls includes a first user-selectable control configured for selecting the particular service session record, and displaying the graphical user interface occurs in response to receiving a selection of the first user-selectable control.

EEE C3 is a method according to any one of EEE C1 to C2, wherein the first state indicator indicates the first service session is in an open state, a dispatched state, a paused state, or a closed state.

EEE C4 is a method according to EEE C3, wherein the first state indicator of the first service session further indicates a current state of the computing system.

EEE C5 is a method according to EEE C4, wherein: the computing system includes a vehicle scan tool configured to transmit a vehicle data message onto a communication link within the vehicle and to receive a vehicle data message transmitted by the vehicle onto the communication link, and the current state of the computing system includes a diagnose state, a repair state, a validate state, or a summary state.

EEE C6 is a method according to EEE C5, wherein: the current state of the computing system is the diagnose state, and the method further comprises: displaying, on the display, a list of components received from the server in response to outputting the first input for modifying the particular service session record; determining, by the computing system, a component selection from the displayed list of components; switching, in response to determining the component selection, the current state of the computing system from the diagnose state to the repair state; and outputting, by the computing system, a second input for modifying the particular service session record for transmission to the server, and the second input is indicative of the component selection and switching the current state of the computing system from the diagnose state to the repair state.

EEE C7 is a method according to EEE C4, wherein: the computing system includes an air conditioning refrigerant recovery, recycle, and recharge station, and the current state of the computing system includes a refrigerant recovery state, an evacuation state, a recharge state, or a flushing state.

EEE C8 is a method according to EEE C7, wherein: a refrigerant system component to add into the vehicle during the recharge state includes a refrigerant or a refrigerant oil, and the method further includes measuring, via the computing system, an amount of the refrigerant system component added into the vehicle during the recharge state.

EEE C9 is a method according to EEE C4, wherein: the computing system is configured to perform a multi-point inspection of the vehicle, the multi-point inspection includes multiple inspection points, and the current state associated with the computing system is indicative of one or more from among: a percentage of the multiple inspection points completed, a quantity of the multiple inspection points completed, a percentage of the multiple inspection points that remain to be completed, a quantity of the multiple inspection points that remain to be completed, or a result of each inspection point of the quantity of the multiple inspection points completed.

EEE C10 is a method according to EEE C3, wherein: the graphical user interface include a first graphical user interface, the first state indicator indicates the first service session is in the dispatched state, performing the first service activity includes diagnosing a malfunction on the vehicle to determine a recommended vehicle component to be replaced, outputting the first input includes outputting a communication indicative of the recommended vehicle component to be replaced, the method further comprises: receiving, at the computing system, a second state indicator of the first service session while displaying the first graphical user interface, wherein the second state indicator indicates the first service session is in the paused state; displaying a second graphical user interface on the display, wherein the second graphical user interface includes the second state indicator; receiving, at the computing system while displaying the second graphical user interface, a third state indicator of the first service session, wherein the third state indicator indicates the first service session is in the dispatched state; displaying a third graphical user interface on the display, wherein: the third graphical user interface corresponds to the first service session, the third graphical user interface includes the third state indicator, and an indicator of a second service activity corresponding to the vehicle; performing the second service activity; determining, at the computing system, a second input for modifying the particular service session record, wherein the second input for modifying the particular service session record includes data that corresponds to performing the second service activity; outputting the second input, by the computing system for transmission to the server; receiving, at the computing system while displaying the third graphical user interface, a fourth state indicator, wherein the fourth state indicator indicates the first service session is in the closed state; and displaying a fourth graphical user interface on the display, wherein: the fourth graphical user interface corresponds to the first service session, and the fourth graphical user interface includes the fourth state indicator.

EEE C11 is a method according to EEE C3, wherein: the first state indicator further indicates a current state associated with performing the first service activity, and the current state associated with performing the first service activity includes an un-started state, an active state, a halted state, or a completed state.

EEE C12 is a method according to any one of EEE C1 to C11, wherein: the computing system includes an image capture device, and determining the first input for modifying the particular service session record includes capturing one or more from among: an image with the image capture device or a screen shot of the display.

EEE C13 is a method according to any one of EEE C1 to C12, wherein: performing the first service activity corresponding to the vehicle includes making a measurement with respect to a vehicle component on the vehicle, and the data that corresponds to performing the first service activity corresponding to the vehicle includes a measurement value obtained by using a measurement device embedded within the computing system or a measurement device external to the computing system.

EEE C14 is a method according to any one of EEE C1 to C13, wherein: performing the first service activity corresponding to the vehicle includes performing a first service activity on the vehicle, and performing the first service activity on the vehicle includes one or more from among: replacing a vehicle component on the vehicle, reconditioning a vehicle component on the vehicle, aligning a vehicle component on the vehicle, tightening a vehicle component on the vehicle, diagnosing a malfunction on the vehicle, performing a new vehicle preparation activity for an original equipment manufacturer, washing the vehicle, or detailing the vehicle.

EEE C15 is a method according to any one of EEE C1 to C14, wherein: performing the first service activity corresponding to the vehicle includes performing a first service activity on the vehicle, and performing the first service activity on the vehicle includes one or more from among: performing a pre-adjustment inspection of a vehicle component on the vehicle, performing a pre-adjustment of a service tool to be used in adjusting the vehicle component on the vehicle, performing an adjustment of the vehicle component on the vehicle, or performing a verification of the adjustment of the vehicle component on the vehicle.

EEE C16 is a method according to any one of EEE C1 to C15, wherein: the first input for modifying the particular service session record includes data indicating a state of the particular service session record has changed, the method further includes displaying a modified graphical user interface on the display, the modified graphical user interface includes both a state indicator and a service activity indicator, and the state indicator on the modified graphical user interface indicates that the particular service session record is in a second state.

EEE C17 is a method according to any one of EEE C1 to C16, wherein the first input also includes data indicating a first particular state of the first service session has ended, the method further comprising: receiving, at the computing system, a second state indicator that indicates the first service session is a second particular state; displaying, on the display, a second graphical user interface, wherein the second graphical user interface includes the second state indicator and an indicator of a second service activity corresponding to the vehicle; performing the second service activity; determining, at the computing system, a second input for modifying the particular service session record, wherein the second input includes data that corresponds to performing the second service activity; and outputting the second input by the computing system for transmission to the server.

EEE C18 is a method according to any one of EEE C1 to C17, wherein: the vehicle includes a first vehicle, and the method further includes: displaying a second graphical user interface on the display, wherein: the second graphical user interface includes a list of multiple service session records tracked by the server, and the list of multiple service session records includes an identifier of the particular service session record and an identifier of a second service session record; transmitting, by the computing system to the server, a communication indicating that the identifier of the second service session record was selected from the list of multiple service session records; receiving, at the computing system, the identifier of the second service session record and a state indicator indicative of a first state of the second service session record, wherein the second service session record corresponds to a second vehicle; and displaying a third graphical user interface on the display, wherein: the third graphical user interface includes both the state indicator indicative of the first state of the second service session record and a service activity indicator, and the service activity indicator corresponds to a particular service activity.

EEE C19 is a method according to EEE C18, wherein: the computing system includes a first computing system, and the particular service activity indicates: a service activity performed by use of a second computing system other than the first computing system, or a service activity performed by use of the first computing system prior to receiving the identifier of the second service session record and the state indicator indicative of the first state of the second service session record.

EEE C20 is a method according to any one of EEE C1 to C19, wherein: the computing system includes a non-transitory computer-readable memory, the non-transitory computer-readable memory contains multiple graphical user interfaces, each graphical user interface of the multiple graphical user interfaces corresponds to both one or more states of a service session and one or more service activities, the multiple graphical user interfaces include the graphical user interface, and the method further comprises: determining, at the computing system, the graphical user interface is to be displayed based at least in part on the first state indicator, and displaying the graphical user interface includes automatically displaying the graphical user interface in response to determining that the graphical user interface is to be displayed.

EEE C21 is a method according to any one of EEE C1 to C20, wherein: performing the first service activity includes transmitting a request for a vehicle component to be replaced on the vehicle, and the method further comprises receiving a delivery of the vehicle component.

EEE C22 is a method according to any one of EEE C1 to C20, wherein performing the first service activity includes performing a test using the computing system.

EEE C23 is a method according to C22, wherein the test includes a guided-component test or a functional test.

EEE C24 is a method according to C23, wherein the functional test includes an information test, a toggle test, a variable control test, or a reset test.

EEE C25 is a computing system comprising: a processor; and a non-transitory computer-readable memory storing executable instructions, wherein execution of the executable instructions by the processor causes the computing system to perform functions comprising: receiving a first state indicator of a first service session tracked by a server using a particular service session record, wherein the first service session corresponds to servicing a vehicle; displaying a graphical user interface on a display, wherein: the graphical user interface corresponds to the first service session, and the graphical user interface includes the first state indicator and an indicator of a first service activity corresponding to the vehicle; performing the first service activity; determining a first input for modifying the particular service session record, wherein the first input includes data that corresponds to performing the first service activity; and outputting the first input by the computing system for transmission to the server.

EEE C26 is a non-transitory computer-readable memory having stored therein instructions executable by a processor to cause a computing system to perform functions comprising: receiving a first state indicator of a first service session tracked by a server using a particular service session record, wherein the first service session corresponds to servicing a vehicle; displaying a graphical user interface on a display, wherein: the graphical user interface corresponds to the first service session, and the graphical user interface includes the first state indicator and an indicator of a first service activity corresponding to the vehicle; performing the first service activity; determining a first input for modifying the particular service session record, wherein the first input includes data that corresponds to performing the first service activity; and outputting the first input by the computing system for transmission to the server.

EEE C27 is a computing system comprising: a processor and a computer-readable memory storing executable instructions, wherein execution of the executable instructions by the processor causes the computing system to perform the method of any one of EEE C1 to C24.

EEE C28 is a non-transitory computer-readable memory having stored therein instructions executable by one or more processors to cause a computing system to perform the method of any one of EEE C1 to C24.

EEE D1 is a method comprising: determining, at a server, a first communication received at the server includes a request to initiate a first service session corresponding to a vehicle; generating, at the server based at least in part on the first communication, a first service session record corresponding to the first service session, wherein: the first service session record includes a state indicator, a timeline, and an identifier of the first service session, the state indicator is indicative of a first current state of the first service session, and the timeline is indicative of one or more events corresponding to the first service session; determining, at the server, a second communication received at the server includes an input for modifying the first service session record; modifying, at the server, at least a portion of the first service session record based at least in part on the input, wherein the portion of the first service session record includes the state indicator, the timeline, or the state indicator and the timeline; and outputting, at the server for transmission to the first computing system, at least the portion of the first service session record.

EEE D2 is a method according to EEE D1, wherein: determining the first communication includes the request to initiate the first service session corresponding to the vehicle includes determining that the first communication includes a vehicle identifier corresponding to the vehicle and an identifier of a repair order corresponding to the vehicle, and that a service session record corresponding to the repair order and the vehicle does not exist, and generating the first service session record includes adding the vehicle identifier and the identifier of the repair order to the first service session record.

EEE D3 is a method according to EEE D2, wherein: the first current state of the first service session is indicative of a first current state of the repair order, and the first current state of the repair order is an open state, a dispatched state, a paused state, or a closed state.

EEE D4 is a method according to EEE D3, wherein: the first current state of the first service session further includes a current state corresponding to an event being performed by the first computing system or a second computing system, and the input for modifying the first service session record includes an indicator that the current state corresponding to the event being performed by the first computing system or the second computing system is a diagnose state, a repair state, a validate state, or a summary state.

EEE D5 is a method according to any one of EEE D1 to D4, wherein the first communication includes a communication transmitted from a telematics system within the vehicle.

EEE D6 is a method according to EEE D5, further comprising: determining, at the server after receiving the first communication, a first repair order generated for the vehicle, wherein: the first repair order includes an identifier of the first repair order and an identifier of the vehicle, and generating the first service session record includes adding the identifier of the first repair order and the identifier of the vehicle to the first service session record.

EEE D7 is a method according to any one of EEE D1 to D6, wherein the input for modifying the first service session record includes the identifier of the first service session.

EEE D8 is method according to any one of EEE D1 to D7, wherein: the input for modifying the first service session record does not include the identifier of the first service session, but includes data from which the identifier of the first service session can be derived, and the method further includes the server deriving the identifier of the first service session from the data.

EEE D9 is a method according to EEE D8, wherein the data includes one or more from among: a vehicle identification number of the vehicle, alpha-numeric characters from a license plate attached to the vehicle, an image of a portion of the vehicle, an identifier of a technician to whom a repair order was dispatched, an identifier of a repair order corresponding to the first service session, data from shop equipment required to perform an event listed on a repair order corresponding to the first service session, or an indicator of a particular repair shop.

EEE D10 is a method according to any one of EEE D1 to D9, wherein: modifying at least the portion of the first service session record includes modifying the timeline, and modifying the timeline includes adding to the timeline an indicator of an event performed by the first computing system.

EEE D11 is a method according to EEE D10, wherein the event performed by the first computing system includes one or more from among: navigation of a hierarchy of menus, obtaining a result of a test performed on the vehicle, capture of a screen shot of a display at the first computing system, capture of one or more vehicle data messages from the vehicle, or capture of an image of a portion of the vehicle.

EEE D12 is a method according to any one of EEE D1 to D11, wherein: the second communication includes a communication from the first computing system indicative of a first service session state and a communication from a second computing system indicative of a second service session state, the first service session state and the second service session state are different service session states, and determining the input for modifying the first service session record includes resolving a conflict based on the communication from the first computing system indicative of the first service session state and the communication from the second computing system indicative of the second service session state.

EEE D13 is a method according to EEE D12, wherein: the communication from the first computing system indicative of the first service session state is associated with a first hierarchy value and the communication from the second computing system indicative of the second service session state is associated with a second hierarchy value, resolving the conflict includes the server determining which of the first hierarchy value and the second hierarchy value is greater, and modifying at least the portion of the first service session record includes modifying the portion of the first service session record based on the first service session state if the first hierarchy value is greater than the second hierarchy value or based on the second service session state if the second hierarchy value is greater than the first hierarchy value.

EEE D14 is a method according to EEE D13, wherein: the first service session state indicates that a repair is recommended and customer approval is pending, the second service session state indicates that a repair is recommended and customer approval was received, and the second hierarchy value is greater than the first hierarchy value.

EEE D15 is a method according to EEE D13, wherein: the communication from the first computing system is received at the server at a first time, the communication from the second computing system is received at the server at a second time, resolving the conflict includes the server determining which of the first time and the second time occurred later, and modifying the portion of the first service session record includes modifying the state indicator based on the first service session state if the first time is later than the second time or based on the second service session state if the second time is later than the first time.

EEE D16 is a method according to any one of EEE D1 to D15, further comprising: managing, by the server, multiple service sessions, wherein: the multiple service sessions includes the first service session, each service session of the multiple service sessions is associated with a unique service session identifier, the unique service session identifier of the first service session is the identifier of the first service session, and determining the second communication received at the server includes the input for modifying the first service session record is conditioned on the server determining that the second communication includes the identifier of the first service session.

EEE D17 is a method according to any one of EEE D1 to D16, further comprising: determining, at the server, a location of the vehicle and an identifier of the vehicle, and determining the location of the vehicle is within a threshold distance of a location associated with a repair shop corresponding to the first computing system.

EEE D18 is a method according to any one of EEE D1 to D17, further comprising: determining, at the server, multiple service session records corresponding to a single identifier; and outputting, at the server, a third communication including at least a portion of each service session record of the multiple service session records, wherein outputting the third communication includes outputting at least the portion of the first service session record.

EEE D19 is a method according to any one of EEE D1 to D18, wherein: the first service session record includes a vehicle identifier corresponding to the vehicle, generating the first service session record includes generating a first file within a particular non-transitory computer-readable memory, and a processor of the server writing the state indicator, the timeline, the identifier of the first service session, and the vehicle identifier into the first file, and the method further includes: determining, at the server, the particular non-transitory computer-readable memory includes a second service session record within a second file, the second service session record includes the vehicle identifier corresponding to the vehicle and a state indicator indicating that a second service session correspond to the vehicle is active, wherein the second service session record includes a timeline indicative of one or more events corresponding to the second service session; and merging the first service session record with the second service session record, and merging the first service session record with the second service session record includes aggregating the one or more events of the timeline from the first service session record and the one or more events of the timeline from the second service session record.

EEE D20 is a method according to EEE D11, wherein the test includes a guided-component test or a functional test.

EEE D21 is a method according to EEE D20, wherein the functional test includes an information test, a toggle test, a variable control test, or a reset test.

EEE D22 is a server comprising: a processor; and a non-transitory computer-readable memory storing executable instructions, wherein execution of the executable instructions by the processor causes the server to perform functions comprising: determining, at the server, a first communication received at the server includes a request to initiate a first service session corresponding to a vehicle; generating, at the server based at least in part on the first communication, a first service session record corresponding to the first service session, wherein: the first service session record includes a state indicator, a timeline, and an identifier of the first service session, the state indicator is indicative of a first current state of the first service session, and the timeline is indicative of one or more events corresponding to the first service session; determining, at the server, a second communication received at the server includes an input for modifying the first service session record; modifying, at the server, at least a portion of the first service session record based at least in part on the input, wherein the portion of the first service session record includes the state indicator, the timeline, or the state indicator and the timeline; and outputting, at the server for transmission to the first computing system, at least the portion of the first service session record.

EEE D23 is a non-transitory computer-readable memory having stored therein instructions executable by a processor to cause a server to perform functions comprising: determining, at the server, a first communication received at the server includes a request to initiate a first service session corresponding to a vehicle; generating, at the server based at least in part on the first communication, a first service session record corresponding to the first service session, wherein: the first service session record includes a state indicator, a timeline, and an identifier of the first service session, the state indicator is indicative of a first current state of the first service session, and the timeline is indicative of one or more events corresponding to the first service session; determining, at the server, a second communication received at the server includes an input for modifying the first service session record; modifying, at the server, at least a portion of the first service session record based at least in part on the input, wherein the portion of the first service session record includes the state indicator, the timeline, or the state indicator and the timeline; and outputting, at the server for transmission to the first computing system, at least the portion of the first service session record.

EEE D24 is a computing system comprising: a processor and a computer-readable memory storing executable instructions, wherein execution of the executable instructions by the processor causes the computing system to perform the method of any one of EEE D1 to D21.

EEE D25 is a non-transitory computer-readable memory having stored therein instructions executable by one or more processors to cause a computing system to perform the method of any one of EEE D1 to D21.

What is claimed is:

1. A method comprising:

outputting, by a first computing system, a request for transmission to a server, wherein:

the request includes an identifier of a service session record corresponding to a vehicle, the service session record includes a timeline for tracking multiple events corresponding to the service session record chronologically, the multiple events include a first event and a second event initiated after the first event, the first and second events were initiated by the first computing system or a second computing system, and the service session record further includes a respective event summary for each of the multiple events;

receiving, by the first computing system in response to the request, one or more graphical user interface resources for displaying a first graphical user interface corresponding to the service session record after summaries corresponding to the first and second events have been displayed at the first or second computing system;

displaying, on a display at the first computing system, the first graphical user interface in a first display mode, wherein:

displaying the first graphical user interface in the first display mode includes displaying a first event summary of the timeline, the first event summary corresponds to the first event of the service session record, and the first event summary includes a first user-selectable control selectable to trigger changing a display mode of the first graphical user interface;

displaying, in response to a selection of the first user-selectable control after summaries corresponding to the first and second events have been displayed at the first or second computing system, the first graphical user interface in a second display mode, wherein:

displaying the first graphical user interface in the second display mode includes displaying a particular detail regarding the first event of the service session record not shown in the first display mode, and the particular detail includes a test identifier corresponding to a specific test and a second user-selectable control to launch performance of the specific test that includes measuring a voltage via a voltmeter or an oscilloscope, or transmitting a message onto a vehicle data bus within the vehicle;

outputting, by the first computing system in response to a selection of the second user-selectable control, an instruction to launch performance of the specific test;

determining, by the first computing system, a result based on performance of the specific test; and outputting, by the first computing system, a communication to the server for modifying the first event summary or adding another event summary to the service session record based on performance of the specific test and the result.

2. A method according to claim 1, wherein:

displaying the first graphical user interface in the first display mode includes displaying multiple event summaries arranged in a first temporal order, and the multiple event summaries include the first event summary.

3. A method according to claim 1, wherein:

displaying the first graphical user interface in the first display mode further includes displaying a filter selector including a first selection criterion, the method further comprises:

determining a selection of the first selection criterion has occurred; and displaying a modified version of the first graphical user interface, and displaying the modified version of the first graphical user interface incudes displaying a subset of the respective event summaries arranged in a second temporal order.

4. A method according to claim 1, further comprising:

outputting, by the first computing system for transmission to the server, a communication including an input for modifying the service session record, wherein:

the communication includes one or more from among: the identifier of the service session record, an identifier of the vehicle, or data that corresponds to the input for modifying the service session record, the input for modifying the service session record is generated by the first computing system in response to performing an event with respect to the vehicle using the first computing system or a service activity of the event with respect to the vehicle, and the event with respect to the vehicle includes the first event, the second event, or a third event.

5. A method according to claim 4, wherein performing the event with respect to the vehicle using the first computing system or the service activity of the event includes performing one or more from among:

capturing data generated by the vehicle, testing operation of a vehicle component, measuring a vehicle component, inspecting the vehicle, capturing an image of at least a portion of the vehicle, capturing a screen shot of the display, capturing a sound made by the vehicle, analyzing a gas emitted by the vehicle, aligning a vehicle component, adjusting a vehicle component, performing a maintenance task on the vehicle, test driving the vehicle, selecting a new state of the service session record, selecting a new state of an event of the service session record, or using a module of the first computing system.

6. A method according to claim 1, wherein:

each event of the multiple events is classified with a particular state from among multiple states, and the multiple states include one or more from among: an open state, a dispatched state, a paused stated, and a closed state.

7. A method according to claim 6, wherein the first event of the service session record is classified with one or more additional states based on one or more from among:

the first computing system being selected for use during a service session, or an operating state of the first computing system.

8. A method according to claim 7, wherein:

the first computing system is operatively connectable directly or indirectly to the vehicle, whereby a vehicle communication transceiver of the first computing system is operable to transmit a vehicle data message onto a communication link in the vehicle and to receive a vehicle data message transmitted by a component in the vehicle onto the communication link, and the one or more additional states include a state selected from among: a diagnose state, a repair state, and a report state.

9. A method according to claim 1, wherein:

the particular detail regarding the first event includes a third user-selectable control selectable to display information based on diagnostic data determined during the first event, the method further comprises:

determining a selection of the third user-selectable control occurs, and displaying, on the display, the information based on diagnostic data determined during the first event.

10. A method according to claim 1, wherein:

the message includes a request to perform a functional test, and the specific test includes the functional test.

11. A method according to claim 1, further comprising:

receiving, while the first graphical user interface is displayed in the first display mode or the second display mode, a communication indicating that the timeline has been modified resulting in a modified timeline;

displaying, on the display, a notification that timeline has been modified; and displaying, on the display, at least a portion of the modified timeline.

12. A method according to claim 1, wherein:

the first event summary includes event identification information generated by the first computing system or the second computing system used during performance of the first event, and the event identification information includes one or more from among: an identifier of the first computing system or the second computing system, an event identifier, a time identifier, or an event type identifier.

13. A method according to claim 12, further comprising:

outputting, by the first computing system, a request for transmission to the second computing system, wherein the request includes at least a portion of the event identification information; and receiving, in response to the request for transmission to the second computing system, a communication from the second computing system including the particular detail regarding the first event, wherein displaying the first graphical user interface in the second display mode is conditioned on receiving the communication from the second computing system including the particular detail regarding the first event.

14. A method according to claim 1, wherein receiving the one or more graphical user interfaces for displaying the first graphical user interface includes receiving the first event summary of the timeline and the particular detail regarding the first event.

15. A method according to claim 1, wherein the timeline includes at least one event summary corresponding to an event or service activity performed using the first computing system.

16. A method according to claim 1, wherein displaying the particular detail regarding the first event includes displaying information determined or captured during performance of the first event.

17. A method according to claim 1, wherein:

the method further comprises outputting, by the first computing system in response to a selection of the second user-selectable control, a communication for transmission to the second computing system, the communication includes a request for the second computing system to perform a service activity for the service session record; and the method further comprises displaying, on the display, a notification indicating a status of the second computing system performing the service activity for the service session record.

18. A computing system comprising:

a processor; and a non-transitory computer-readable memory storing executable instructions, wherein execution of the executable instructions by the processor causes a first computing system to perform functions comprising:

outputting a request for transmission to a server, wherein:

the request includes an identifier of a service session record corresponding to a vehicle, the service session record includes a timeline for tracking multiple events corresponding to the service session record chronologically, the multiple events include a first event and a second event initiated after the first event, the first and second events were initiated by the first computing system or a second computing system, and the service session record further includes a respective event summary for each of the multiple events;

receiving, by the first computing system in response to the request, one or more graphical user interface resources for displaying a first graphical user interface corresponding to the service session record after summaries corresponding to the first and second events have been displayed at the first or second computing system;

displaying, on a display at the first computing system, the first graphical user interface in a first display mode, wherein:

displaying the first graphical user interface in the first display mode includes displaying a first event summary of the timeline, the first event summary corresponds to the first event of the service session record, and the first event summary includes a first user-selectable control selectable to trigger changing a display mode of the first graphical user interface;

displaying, in response to a selection of the first user-selectable control after summaries corresponding to the first and second events have been displayed at the first or second computing system, the first graphical user interface in a second display mode, wherein:

displaying the first graphical user interface in the second display mode includes displaying a particular detail regarding the first event of the service session record not shown in the first display mode, and the particular detail includes a test identifier corresponding to a specific test and a second user-selectable control to launch performance of the specific test that includes measuring a voltage via a voltmeter or an oscilloscope, or transmitting a message onto a vehicle data bus within the vehicle;

outputting, by the first computing system in response to a selection of the second user-selectable control, an instruction to launch performance of the specific test;

determining, by the first computing system, a result based on performance of the specific test; and outputting, by the first computing system, a communication to the server for modifying the first event summary or adding another event summary to the service session record based on performance of the specific test and the result.

19. A non-transitory computer-readable memory having stored therein instructions executable by a processor to cause a first computing system to perform functions comprising:

outputting, by the first computing system, a request for transmission to a server, wherein:

the request includes an identifier of a service session record corresponding to a vehicle, the service session record includes a timeline for tracking multiple events corresponding to the service session record chronologically, the multiple events include a first event and a second event initiated after the first event, the first and second events were initiated by the first computing system or a second computing system, and the service session record further includes a respective event summary for each of the multiple events;

receiving, by the first computing system in response to the request, one or more graphical user interface resources for displaying a first graphical user interface corresponding to the service session record after summaries corresponding to the first and second events have been displayed at the first or second computing system;

displaying, on a display at the first computing system, the first graphical user interface in a first display mode, wherein:

displaying the first graphical user interface in the first display mode incudes displaying a first event summary of the timeline, the first event summary corresponds to the first event of the service session record, and the first event summary includes a first user-selectable control selectable to trigger changing a display mode of the first graphical user interface;

displaying, in response to a selection of the first user-selectable control after summaries corresponding to the first and second events have been displayed at the first or second computing system, the first graphical user interface in a second display mode, wherein:

displaying the first graphical user interface in the second display mode includes displaying a particular detail regarding the first event of the service session record not shown in the first display mode, and the particular detail includes a test identifier corresponding to a specific test and a second user-selectable control to launch performance of the specific test that includes measuring a voltage via a voltmeter or an oscilloscope, or transmitting a message onto a vehicle data bus within the vehicle;

outputting, by the first computing system in response to a selection of the second user-selectable control, an instruction to launch performance of the specific test;

determining, by the first computing system, a result based on performance of the specific test; and outputting, by the first computing system, a communication to the server for modifying the first event summary or adding another event summary to the service session record based on performance of the specific test and the result.

\* \* \* \* \*